United States Patent [19]

Ahuja et al.

[11] Patent Number: 5,471,318
[45] Date of Patent: Nov. 28, 1995

[54] MULTIMEDIA COMMUNICATIONS NETWORK

[75] Inventors: Sudhir R. Ahuja, Aberdeen; Murali Aravamudan, Berkeley Heights; James R. Ensor, Red Bank, all of N.J.

[73] Assignee: AT&T Corp., Murray Hill, N.J.

[21] Appl. No.: 52,492

[22] Filed: Apr. 22, 1993

[51] Int. Cl.$^6$ ............................... H04N 1/00; H04N 1/32
[52] U.S. Cl. ..................... 358/400; 358/407; 379/156; 379/201; 379/207
[58] Field of Search ............................. 358/400, 407; 379/53, 54, 93, 94, 100, 101, 156, 157, 158, 159, 201, 202, 207; 395/153, 154, 119; H04N 1/00, 1/32

[56] References Cited

U.S. PATENT DOCUMENTS

| | | | |
|---|---|---|---|
| 5,136,634 | 8/1992 | Rae et al. | 379/100 |
| 5,192,999 | 3/1993 | Graczyk et al. | 379/93 |
| 5,193,110 | 3/1993 | Jones et al. | 379/94 |
| 5,195,086 | 3/1993 | Baumgartner et al. | 370/62 |
| 5,200,989 | 4/1993 | Milone | 379/53 |
| 5,253,341 | 10/1993 | Rozmanith | 395/200 |

OTHER PUBLICATIONS

"Broadband Multimedia Applications Using ATM Networks: High–Performance Computing, High–Capacity Storage, and High–Speed Communication", H. Armbruster and K. Wimmer, IEEE Journal on Selected Areas in Communications, vol. 10, No. 9, Dec. 1992, pp. 1382–1396.

"Networking Requirements on the Rapport Multimedia Conferencing System", S. R. Ahuja et al., Seventh Anual Joint Conference on the IEEE Computer and Communications Societies–Networks: Evolution or Revolution?, New Orleans, La., Mar. 27–31, 1988, pp. 0746–0751.

"The Rapport Multimedia Conferencing System", S. R. Ahuja et al., Conference on Office Information Systems, Palo Alto, Calif., Mar. 23–25, 1988, pp. 1–8.

"Personal Visual Communications Enters the Marketplace", J. Angiolillo and J. A. Hicks, AT&T Technology, vol. 7, No. 3, Fall 1992, pp. 18–23.

"The Promise of Multimedia Communications", D. Brittan, Technology Review, May/Jun. 1992, pp. 43–50.

"The Coming HDTV Wave", R. L. Cerbone, AT&T Technology, vol. 7, No. 3, Fall 1992, pp. 14–17.

"Creating Tomorrow's Multimedia Systems Today", A. C. Englander and K. H. Rosen, AT&T Technology, vol. 7, No. 3, Fall 1992, pp. 24–30.

"The Rapport Multimedia Conferencing System–A Software Overview", J. R. Ensor et al., Proceedings of the 2nd IEEE Conference on Computer Workstations, Santa Clara, Calif., Mar. 7–10, 1988, pp. 52–58.

"Videoconferencing Systems: Seeing is Believing", D. E. Harvey et al., AT&T Technology, vol. 7, No. 3, Fall 1992, pp. 7–13.

"A Distributed Cooperative Model for Multimedia Applications", A. Karmouch, date unknown.

(List continued on next page.)

*Primary Examiner*—Edward L. Coles, Sr.
*Assistant Examiner*—Jerome Grant, II
*Attorney, Agent, or Firm*—Eugene S. Indyk

[57] ABSTRACT

A circuit configuration in a multimedia network representing a controllably persistent virtual meeting room simulates an actual meeting room where conferences between two or more people may be held. This facilitates the creation in the network of flexible, long-term multimedia conferences between conferees who are separated from one another. Any number of conferees may communicate with one another via one or more of audio, video, and data. Virtual meeting rooms may persist in the network for predetermined periods of time controlled by the users of the meeting room. The room may remain in the network independent of whether or not a user is connected to the room. The meeting room is a vehicle whereby the activity of various media servers is coordinated to effectuate conferences between multiple participants in more than one medium. The servers are associated with storage devices which may record or store certain aspects of multimedia conferences using the virtual meeting room.

2 Claims, 6 Drawing Sheets

OTHER PUBLICATIONS

"A New Metaphor for Multimedia Desktop Conferencing Systems", Georg Michelitsch, IEEE Multimedia '90, Bordeaux, Nov. 14–17, 1990, pp. 1–6.

"Versatile Services Streamline Global Videoconferencing", J. L. Posko, AT&T Technology, vol. 7, No. 3, Fall 1992, pp. 2–6.

"A Multimedia Interactive Conferencing Application for Personal Workstations", J. Robinson et al., IEEE Transactions on Communications, vol. 39, No. 11, Nov. 1991, pp. 1698–1708.

"Personal Multimedia–Multipoint Teleconference System", H. Tanigawa et al., IEEE INFOCOM '91, Apr. 7–11, 1991, pp. 1127–1134.

"A Multipoint Communications Service for Interactive Applications", G. Vonderweidt et al., IEEE Transactions on Communications, vol. 39, No. 12, Dec. 1991, pp. 1875–1885.

FIG. 2 CONNECTION TOPOLOGY

MR STATE DIAGRAM

CONVERSATION MANAGER: ROOM STATE DIAGRAM

MEDIA SERVER

MULTIMEDIA COMMUNICATIONS NETWORK

CROSS-REFERENCE TO RELATED APPLICATION

This application is related to Application Serial No. [Kuthyar 1-1-1-7] of Ahuja, Aravamudan, Ensor, Kuthyar, Ramamurthy, Stuntebeck, and Weber filed in the Patent and Trademark Office on the same day this application is being filed.

TECHNICAL FIELD

This invention relates to communications networks. More particularly, this invention relates to multimedia communications networks able to effectuate conferences between two or more parties in multiple media, such as voice, video, and data.

BACKGROUND

The essential characteristics of face-to-face meetings can be simulated by multimedia conferencing systems. Such conferencing systems permit separated conference participants to communicate with one another in multiple media such as voice, video, and data from their own work places without requiring that they actually convene in the same place.

In one prior approach, these conferencing systems involve a plurality of complicated and expensive computer workstations connected together by transmission facilities which act merely as a transport mechanism for whatever is to be communicated between the workstations. There are significant problems with such a distributed architecture which are preventing this approach from becoming a widespread commercially viable reality. Each of the workstations in these prior distributed environments contains a large amount of the multimedia data processing capabilities, including the necessary bridging and synchronization circuits, used to effectuate a conference between meeting participants. This increases the cost to each potential multimedia user which usually places multimedia communications beyond that user's interest or financial means. In addition, prior localized desktop applications make it difficult to achieve long-term flexible multimedia conferencing environments conveniently because at least one of the workstations must stay up at all times during the required life of the conference environment. There is no way convenient for all the conferees to leave the conference and then easily return and pick up the conference where it left off. It also is difficult to synchronize the various parts of a multimedia conference for proper presentation to the meeting participants in a distributed environment. In this situation, it is difficult to create multimedia connections between disparate communications equipment, for example, two computers running different operating systems.

In addition to the distributed architectures described above, there are some centralized architectures involving media bridges located in the network rather than in local workstations. For example, the AT&T long distance network contains some audio and video bridging capability such as the bridging involved in the AT&T Alliance teleconferencing service and the AT&T Global Business Video Conferencing Services. Although these services are useful telecommunication services, Applicants have identified significant areas which might be improved. Applicants have appreciated that it is difficult to achieve flexible, long term multimedia conferences between a variable number of users having different media capabilities. Synchronous modes of communications, such as telephone calls, and asynchronous modes of communications, such as electronic mail, are not easily merged in the prior multimedia communications systems. The prior multimedia communications systems also make it difficult to integrate disparate communications equipment possessed by various conferees into an effective multimedia conference. It is difficult for conferees having different levels of multimedia communications capabilities to enter and leave a given multimedia conference freely. There is no convenient way to effectuate multimedia communications between many potential users such as those who might be connected together by way of a complicated network, such as an extensive local area network or a wide area network such as a public telephone network. For example, there is no way for a telecommunications carrier to provide a multimedia communications service to a wide range of its telephone customers using the present multimedia conferencing systems.

SUMMARY

The problems mentioned above are solved by a multimedia communications network which provides a shared multimedia work environment accessible from one or more multimedia ports. In specific terms, the multimedia communications network comprises at least one meeting room server located in the network and connected to a plurality of ports which provide users with access to the network. The meeting room server creates a special electronic circuit configuration in the network in response to a command from a user terminal connected to one of the multimedia ports. The electronic circuit configuration has predetermined characteristics created by the users of the network and has a preselected lifetime in the network in accordance with the desires of those who use the electronic circuit configuration to effectuate electronic multimedia conferences. The electronic circuit configuration may be a data structure which represents a controllably persistent virtual meeting room in the network. Conferences may be held using this meeting room involving any number of participants. Those conference participants may be able to communicate with the others in a variety of media. They need not each have the same ability to communicate in all media. The participants may come and go with respect to conferences held in the virtual meeting room. Even when all participants leave a conference, the virtual meeting room will persist in the network and may be used at a later time to resume or continue the conference by the same participants or others. The virtual meeting room may be used to initiate or continue other conferences by the same participants or others. The virtual meeting room is thus an electronic analog of a physical meeting place where conferences are held.

DETAILED DESCRIPTION

Figure 1:
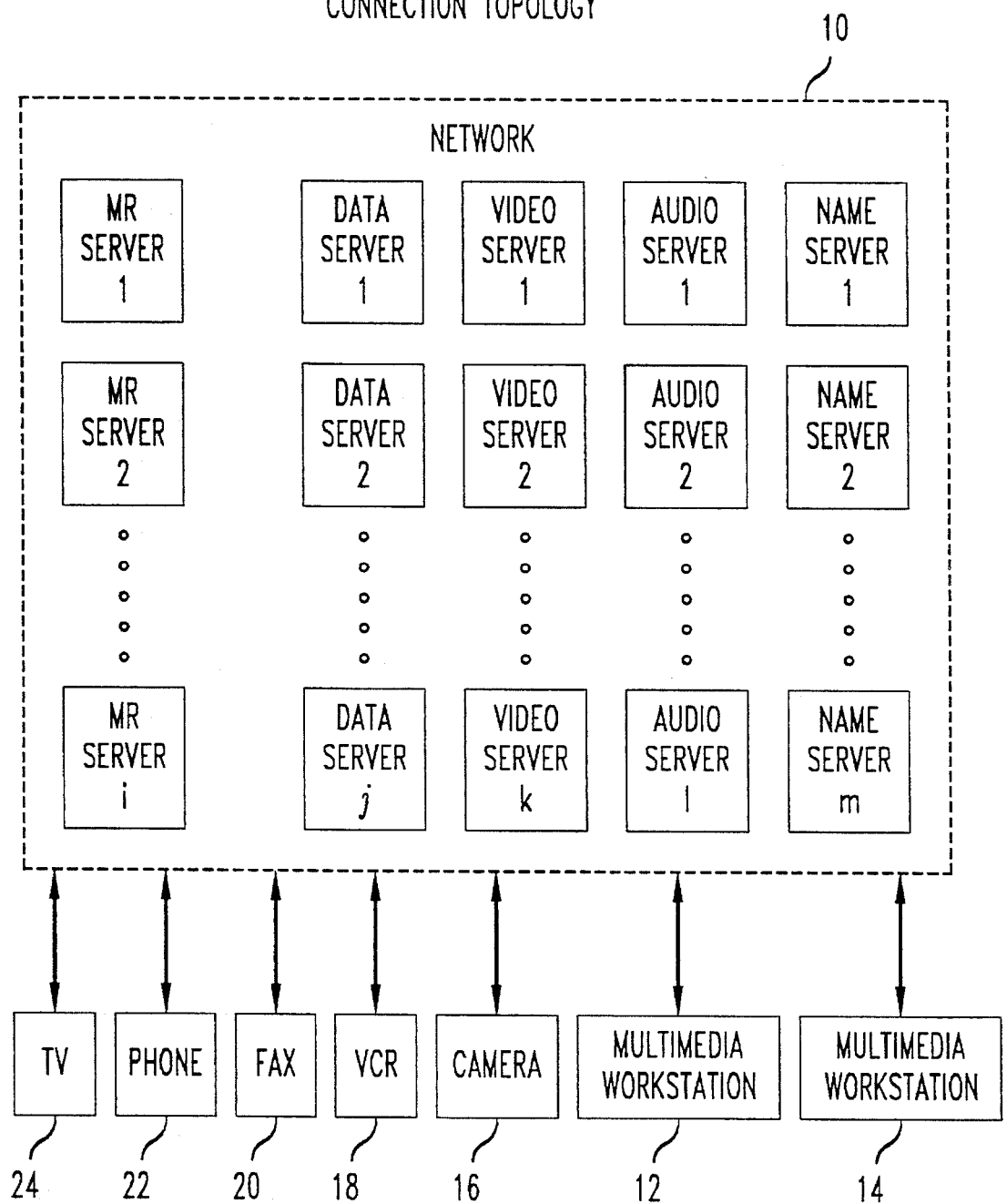
FIG. 1 is an illustrative multimedia network constructed in accordance with the principles of this invention.

FIG. 1 shows a multimedia network 10 which can selectively connect together one or more of a number of devices so that information may be transported from one device to another. The devices may include one or more multimedia workstations, such as a pair multimedia workstations 12 and 14 shown in FIG. 1. The multimedia workstations are connected to respective multimedia ports of the network 10 and are capable of communicating with one another and with other devices connected to the network 10 in a plurality of media such as audio, video, and data. Other devices which can be interconnected by the network 10 in FIG. 1 include a camera 16, a video cassette recorder 18, a facsimile device 20, a telephone 22, and a television 24. The telephone 22 may be simple POTS telephone, an ISDN telephone, a cellular or other wireless telephone, or any other voice band telecommunications device such as a personal communicator. Each of the devices shown in FIG. 1 is connected to the network 10 by means of suitable connections to appropriate ports of the network 10.

The network 10 contains a number of servers used to effectuate connections in predetermined media between selected ones of the devices shown in FIG. 1. The network 10 contains one or more meeting room servers 1, 2, . . . . i each of which is a repository of information relating to virtual meeting rooms created in the network 10. The characteristics of illustrative virtual meeting rooms are described in more detail below. The meeting room servers also coordinate and control access to media servers in the network 10. Those media servers include one or more data servers 1, 2 . . . . . j, one or more video servers 1, 2, . . . , k, and one or more audio servers 1, 2, . . . , 1. The data servers selectively connect the data portions of the inputs and outputs of the devices shown in FIG. 1 with selected data inputs and outputs of others of the devices shown in FIG. 1. Similarly, the video servers selectively connect the video inputs and outputs of the devices shown in FIG. 1 and the audio servers selectively connect the audio inputs and outputs of those devices. The network 10 also contains one or more name servers 1, 2, . . . . m each of which may store addresses of the devices connected to the network 10 and addresses of network resources used by the media servers and the meeting room servers. The meeting room servers are responsive to information handled by the name servers to create associations between selected users and selected virtual meeting rooms.

In one example of the invention, the servers shown in FIG. 1 may be implemented as software entities on one or more UNIX® based workstations such as those made by Sun Microsystems. As described in more detail below, controllably persistent virtual meeting rooms can be created in the multimedia network 10 shown in FIG. 1 which can be used to effectuate flexibly configured multimedia conferences of any required direction between two or more users of the network 10.

Figure 2:
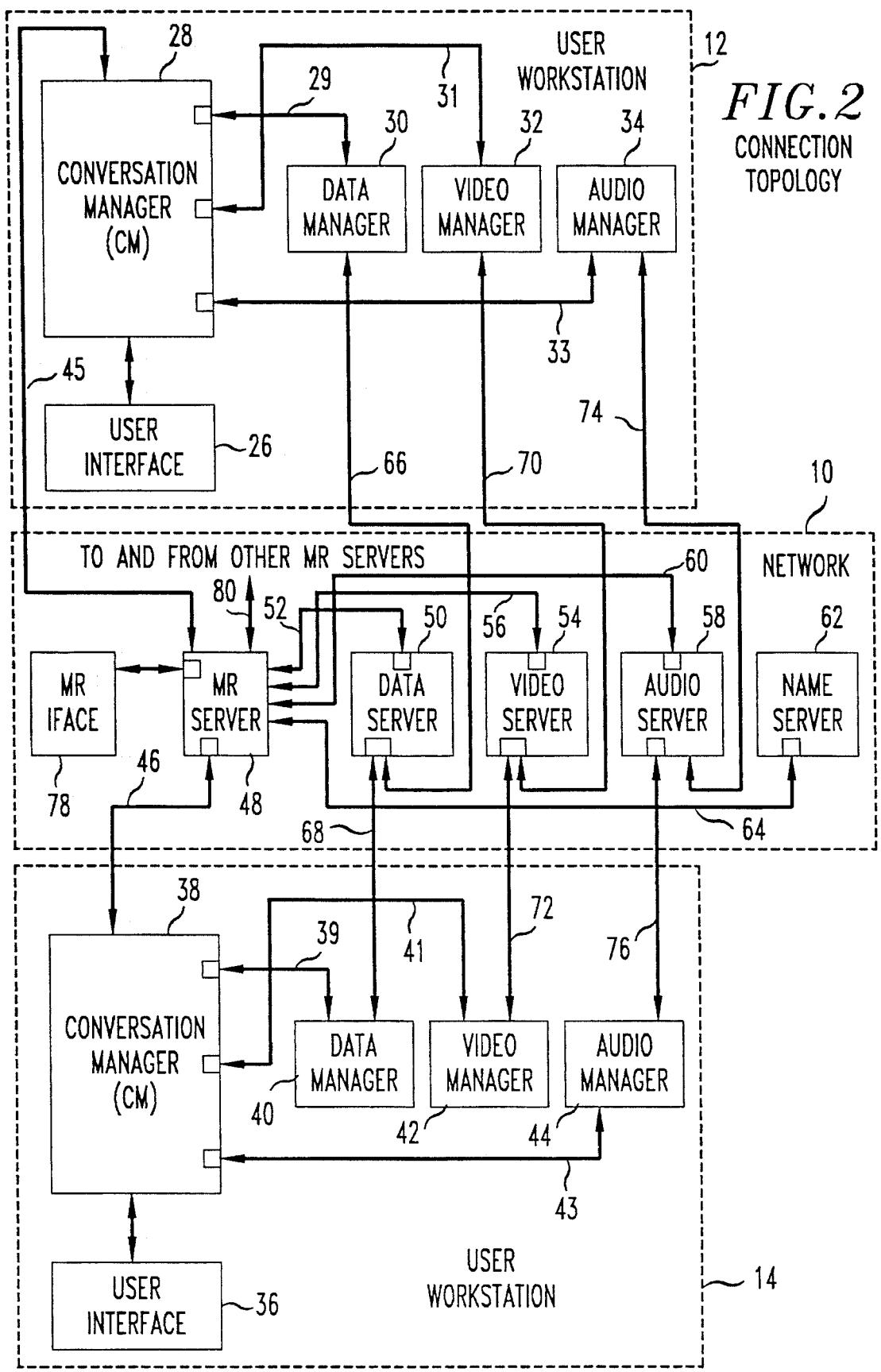
FIG. 2 is an illustrative connection topology involving two multimedia workstations connected through pertinent portions of the multimedia network of FIG. 1.

FIG. 2 shows an illustrative multimedia connection between the workstations 12 and 14 in FIG. 1 through the network 10. Workstation 12 contains a user interface 26 which may include a visual interface on a computer. The interface may also include data entry devices such as a keyboard, a mouse, pen based entry devices, or speech activated input devices. The user interface 26 is connected to a conversation manager 28. The conversation manager 28 coordinates the activity of a group of media managers located in the workstation 12. The conversation manager 28 is also a signaling agent in the workstation 12 which signals the network 10 to create or destroy one or more virtual meeting rooms used by the operator of the workstation 12. The conversation manager 28 also is used to signal the network 10 to create various meeting configurations in each of the virtual meeting rooms accessible by the operator of the workstation 12.

The workstation 12 also contains a group of media managers which are associated with respective hardware devices and software entities which produce outputs in respective media and receive inputs in those respective media from other participants in the conference. The workstation 12 contains a data manager 30 which receives data produced by one or more application programs running in the workstation 12, such as spreadsheet programs, word processing programs, graphics programs, and the like. The data manager 30 directs this data to other meeting participants through the network 10, specifically, in this example of the invention, to other similar data managers in multimedia workstations participating in the conference. The workstation 12 also contains a video manager 32 which receives video signals from one or more video devices associated with the workstation 12 such as video cameras, vcr's, scan converters, and the like. The video manager 32 directs video signals to other meeting participants through the network 10, for example, to other video managers in similar multimedia workstations. Finally, the workstation 12 contains an audio manager 34 which is associated with one or more audio devices, such as telephones, microphones, and the like. In addition to sending signals from the workstation 12 to other meeting participants through the network 10, the media managers 30, 32, and 34 also receive respective signals from other meeting participants and appropriately communicate those signals to the user of the workstation 12 in an appropriate manner. For example, the managers 30, 32, and 34 may cause data and video to be displayed on a television or video monitor and audio to be played through a speaker. There may be other media managers in the workstation 12 in other examples of the invention, for example, a manager to handle facsimile signals produced by the workstation 12 or received by the workstation 12.

Signalling messages are directed between the conversation manager 28 and the data manager 30 on line 29; signalling messages are directed between the conversation manager 28 and the video manager 32 on line 31; and signalling messages are directed between the conversation manager 28 and the audio manager 34 on line 33. Similarly, workstation 14 contains a user interface 36 connected to a conversation manager 38. The workstation 14 also contains a data manager 40, a video manager 42, and an audio manager 44 connected to the conversation manager 38 by way of signalling lines 39, 41, and 43, respectively. The workstations 12 and 14 may be UNIX® based computers or workstations such as those made by Sun Microsystems and the like. The manager and user interfaces may be software entities on those computers.

User terminals, such as workstations 12 and 14 in FIG. 2, are connected to multimedia ports of the network 10. Signalling and communications traffic in multiple media are received in the multimedia ports from respective user terminals connected to the multimedia ports. An example of the multimedia ports also direct signalling and communications traffic in multiple media to respective user terminals connected to the multimedia ports. The details of how signalling and multimedia communications traffic of workstations 12 and 14 are connected to multimedia ports of the network 10 are shown in FIG. 2 and described below.

In a multimedia connection between the workstations 12 and 14, the conversation manager 28 in the workstation 12 is connected to the conversation manager 38 in the workstation 14 by means of a suitable connection 46 through the network 10. Each of the multimedia workstations is associated with a particular one of the meeting room servers shown in FIG. 1. In the example shown in FIG. 2, the workstations 12 and 14 each are associated with the same meeting room server 48, which may, for example, be meeting room server 1 shown in FIG. 1.

A connection between the workstations 12 and 14 is initiated by a workstation user first creating a persistent virtual meeting room in the meeting room server 48 by way of commands from one of the conversation managers 28 or 38 to the server 48 on one of lines 45 or 46. The virtual meeting room comprises a data structure in the meeting room server 48 representing certain computer resources allocated to the connections and signalling between the workstations 12 and 14. For example, those resources may involve part or all of a memory, a computer file, a database table, or other memory or storage facility associated with the meeting room server 48. More than one meeting room may be created in each meeting room server in the network 10. Each virtual meeting room is given a unique identification by which it can be accessed by potential users of the meeting room. The virtual meeting room may contain the identities of the servers which will be used to effectuate connections in various media between the workstations 12 and 14. In addition, the virtual meeting room will contain the identities of the participants involved in meetings held in the virtual meeting room. There may be one or more meetings held in the virtual meeting room, each of which is also given a unique identification stored in the virtual meeting room. The virtual meeting room may also contain information about certain access rights of potential conference participants who may be permitted to use the room. In certain situations it may be advantageous for the virtual meeting room to contain information about the length of time it has existed in the network. For example, in a situation where the network 10 is a telephone network, it would be advantageous for the virtual meeting room to contain information about the time at which it was originally created and the amount of time it was used to actually hold conferences. This information may be used for purposes of billing telephone customers for using a virtual meeting room to hold conferences and store information in the network about those conferences.

Figure 3:
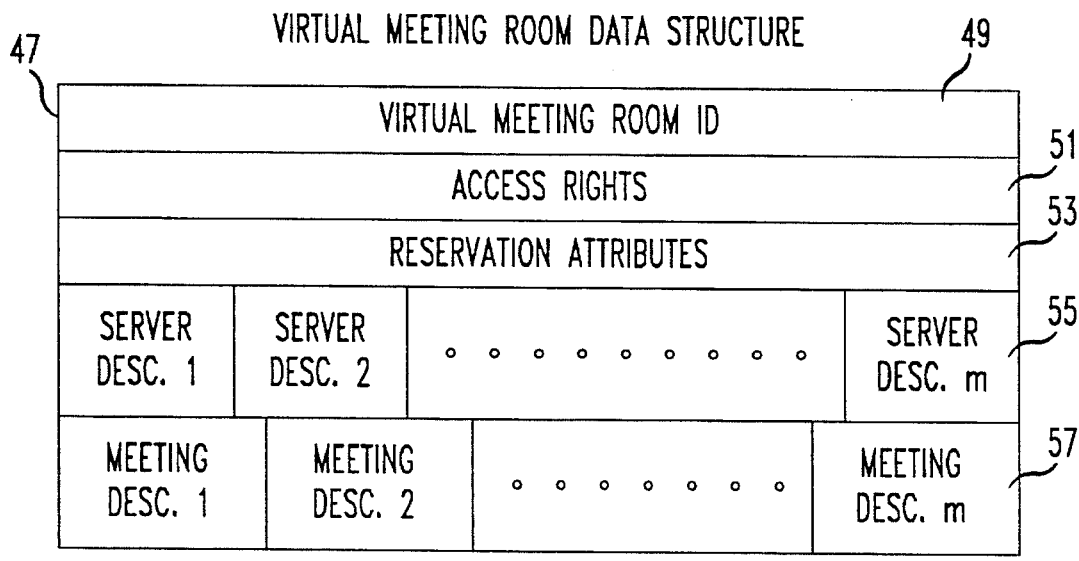
FIGS. 3a–3d are representations of an illustrative virtual meeting room created in the meeting room server of FIG. 2.

FIGS. 3a–3d are illustrations of a representative virtual meeting room 47 which may be created by the meeting room server 48 in FIG. 2. In the example of FIG. 3a, the meeting room comprises a designated region in the memory of the server 48 set aside for this particular virtual meeting room. A unique virtual meeting room identification is stored in location 49. Access rights to the virtual meeting room are stored in location 51. These access rights signify who may use this virtual meeting room. Reservation attributes are stored in location 53. Reservation attributes may include information about the persons who have reserved the virtual meeting room, the time period during which the room has been reserved, and the identity of the media servers which will be used. Any other users, not identified in the reservation attributes, will be denied the use of the room during a reserved period. Reservation conflicts may be resolved by using some sort of a priority scheme. There can be multiple reservations of a virtual meeting room at nonconflicting times. Descriptions identifying the characteristics of m media servers which have been associated with the virtual meeting room 47 are stored in locations 55. As shown in FIG. 3b, each server description may comprise a designation 59 uniquely identifying each server. Those server descriptions may also contain connection information 61, for example, the network address of the respective server. The server descriptions may also contain information 63 about who has the right to access the particular server, billing information 65 relating to the usage level of each billable user of the server, reservation information 67 reflective of the reservation attributes described above relating to this server, and a service description 69, which may define the particular kind of audio, video, or data services handled by this server, for example, voice messaging, audio information services, NTSC video (compressed and uncompressed), bulletin board services, games, weather, news, and the like.

The room 47 may also contain a representation relating to a meeting between a group of meeting participants. Descriptions identifying n such meetings which have been or will be held using the virtual meeting room are stored in locations 57. As shown in FIG. 3c, each meeting description contains a unique meeting identifier stored in location 71, access rights 73, billing information 75, and one or more participant descriptions 77. As shown in FIG. 3d, each participant description shown in FIG. 3c may contain a unique identifier 79, state information 81 relating to whether or not the participant is using the meeting room, a static media description 83 indicating the media in which this participant is capable of communicating, a dynamic media description 85 indicating the media in which this participant is currently communicating, and a profile 87 containing information about the participant which might be useful to the network such as the length of time the participant was a part of the meeting, what resources he used during the course of the meeting, and whether and how this participant to be billed. The server 48 may contain any number of meeting rooms. Each meeting room may contain any number of servers, any number of meetings and any number of participants in each meeting. Each participant may communicate in any one or more of a plurality of communications media, such as audio, video, and data.

The virtual meeting room created in the meeting room server 48 has a characteristic of persistence, which means that the data structure defined by the virtual meeting room may remain in the network for a predetermined period of time controllable by users of the network. The virtual meeting room may even remain in the network though there are no users connected to the meeting room or to the network. Moreover, the length of time a virtual meeting room is to persist in the network is controllable by one or more of the users of the virtual meeting room. Such a persistent meeting room is also a mechanism by which certain preselected events occurring during the course of a multimedia or other conference may be recorded as they occur during the conference. These events may later be stored in the network for a predetermined time set by one or more of the conference participants independent of whether or not any conference participants are actually connected to the network or are using the virtual meeting room. For example, in a situation where the multimedia network 10 is a telephone network, all conferees may go on hook and information about their conference selected by the conferees will be stored in the network for any of them to retrieve in the future. This storage capability also permits conferences to be suspended and later resumed at a point where it was suspended. New conferees may join an existing conference and be brought up to speed on what happened earlier in the conference. Some or all of the information in a virtual meeting room may be deleted by selected ones or all of the users of that virtual meeting room.

In a multimedia conference between workstations 12 and 14, the meeting room server 48 is connected to one of the data servers 50 in the network 10 by means of a two-way connection 52. The meeting room server 48 is connected to one of the video servers 54 in the network 10 by means of a two-way connection 56. Similarly, the meeting room server 48 is connected to one of the audio servers 58 in the network 10 by means of a two-way connection 60. One of the name servers 62 in the network 10 is connected to the meeting room server 48 by means of a two-way connection 64.

The data server 50 receives data output and data signalling produced by the data managers 30 and 40 in the workstations 12 and 14 on two-way connections 66 and 68, respectively. The data outputs and signalling from each of the workstations 12 and 14 are directed by the data server 50 to the other of the workstations so that the data produced by each workstation can be shared between the users of the two workstations 12 and 14. This is accomplished by the data server 50 receiving the data output and signalling of the data manager 30 of the workstation 12 on line 66 and directing it to the data manager 40 in the workstation 14 on line 68. The data server 50 also receives the data output and signalling from the data manager 40 in the workstation 14 on line 68 and directs that data output and signalling to the input of the data manager 30 in the workstation 12 on line 66.

The video server 54 receives video output and video signalling of the workstation 12 from the video manager 32 on a two-way connection 70 and video output and video signalling of the workstation 14 from the video manager 42 on a two-way connection 72. The video server 54 directs the video and signalling received from the workstation 12 on the connection 70 to the workstation 14 by way of the connection 72. The video server 54 also directs the video and signalling received from the workstation 14 on connection 72 to the workstation 12 by way of the two-way connection 70.

The audio server 58 receives workstation 12's audio output and audio signalling from the audio manager 34 on a two-way connection 74 and directs that audio output and signalling to the audio manager 44 in the workstation 14 by way of a two-way connection 76. The audio server 58 also receives workstation 14's audio output and audio signalling from the audio manager 44 on connection 76 and directs that audio output and signalling to the audio manager 34 by way of the connection 74.

Although the example of the invention shown in FIG. 2 only deals with a connection between two multimedia workstations, the invention is equally applicable to any number of conference participants who may be involved in a single conference. The data server 50, video server 54, and the audio server 58 essentially act as bridging circuits for combining the respective media outputs of the conference participants and directing selected ones of those outputs to the participants on appropriate communications paths. The assembly and coordination of the servers to effectuate a multimedia conference between plural participants is handled by the multimedia server 48 using the information stored in a virtual meeting room created for handling a conference between the participants. A meeting room interface 78 is connected to the meeting room server 48 so that the server 48 may be provisioned with certain information generated by network administrators and the like. Information about the meeting rooms in the network 10 may be obtained through the interface 78. The meeting room server is connected to other meeting room servers in the network 10 by means of a connection 80 attached to an input/output port of the server 48 which is needed in situations where the conference participants are assigned to use different meeting room servers located in the network.

Figure 4:
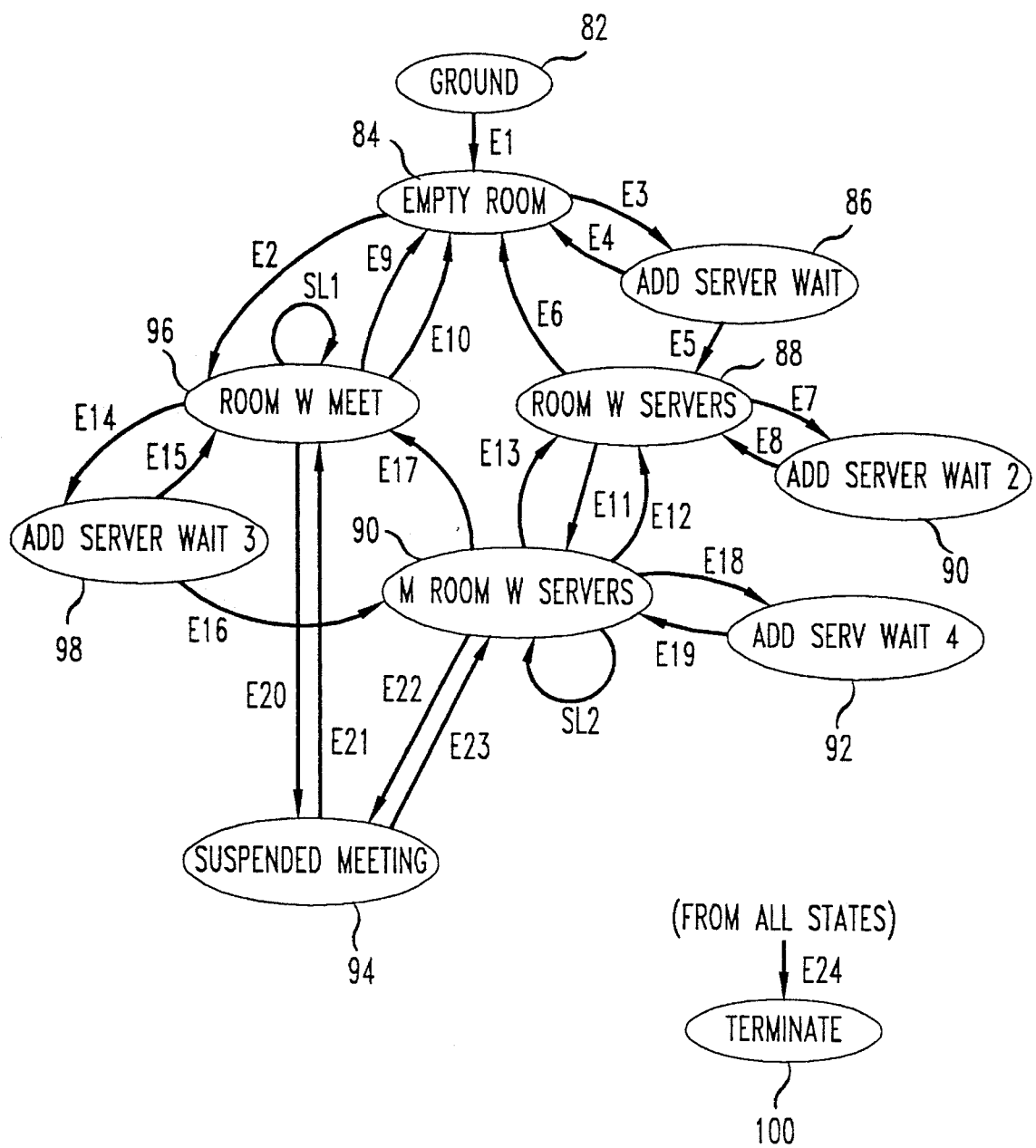
FIG. 4 is a state diagram representing the operation of one of the meeting room servers in FIG. 1 with respect to one virtual meeting room created in the network.

FIG. 4 is a state diagram illustrating in detail the nature of the operation of the meeting room server 48 in FIG. 1 with respect to a single virtual meeting room. Similar state diagrams are applicable for each virtual meeting room handled by the server 48. In FIG. 4, each state in which the server 48 may reside relative to a given virtual meeting room is represented in schematic form by an oval shaped structure. Transitions between states are represented by arrows labeled with numbers preceded by a capital "E". Self-loops are identified by numbers preceding by "SL". Table I is a listing of all the state transitions shown in FIG. 4. Table I is a complete listing of the allowed transitions, referred to as "edges", including an identification of that which triggers a transition between states along with the action which takes place as a result of the trigger.

Prior to the creation of a virtual meeting room in the server 48, the server 48 is in a ground state 82. The server 48 receives a command from a conversation manager in a workstation associated with the server 48 to create an empty virtual meeting room which may be an allocation of memory space or other computer resources to specific conferences which will be entered into by a user who creates the virtual meeting room and others. The meeting room server 48 leaves the ground state 82 and enters an empty room state 84. Appropriate servers may be associated with the empty room to effectuate conferences in predetermined media. These servers may be selected from the collection of servers in the network, such as those illustrated in FIG. 1. When a server is to be associated with a virtual meeting room, the meeting room server 48 leaves the empty room state 84 and enters a wait state 86 as a result of a command, for example, from the conversation manager in the workstation which created the virtual meeting room. Once a requested server has been actually assigned to the virtual meeting room, for example, when an acknowledgement is generated by a server requested to be associated with the virtual meeting room, the meeting room server 48 then enters a state 88 signifying that there is a virtual meeting room with at lease one associated server. When the server 48 is in the state 88, additional servers may be added to the virtual meeting room upon appropriate command from a conversation manager, as signified by the second wait state 90 shown in FIG. 4.

In addition to creating an empty virtual meeting room and associating predetermined network resources to that virtual meeting room, actual meetings may be held in the virtual meeting room whereby conference participants may be connected to one another in selected media. Two or more participants may share one or more of audio, such as the usual voice conversations, data such as certain computer programs, and video such as that produced by cameras situated in the locations of the conference participants. In this regard, the conversation manager signals the meeting room server 48 to create a uniquely identified meeting in the virtual meeting room. The server 48 leaves the state 88 and enters a state 90 in which the virtual meeting room contains servers and in which a meeting is being conducted. In state 90, additional servers may be added, as signified by the wait state 92 in FIG. 4. While the server 48 is in state 90, any number of conference participants may be added to or dropped from the meeting as signified by the self-loop SL2 shown in FIG. 4. A meeting may be suspended in which all of the conference participants either go on hold or actually entirely disconnect from the network 10, as signified by a transition from state 90 to state 94 in FIG. 4. Since the virtual meeting room has a persistent characteristic, the meeting room and information about the meeting may continue to be stored in the network 10 in accordance with the desires of the meeting room users. The meeting may be resumed by one or more users at a place where the meeting was suspended as represented by a transition from state 94 to state 90.

In addition to the states and transitions described above, the meeting room server 48 may also enter into a state 96 from the empty room state 84 involving a situation where there is a virtual meeting room in the server 48 having a meeting but no servers as yet. Servers may be added as represented by the wait state 98 from which the state 90 may be entered involving a virtual meeting room associated with servers and conference participants. A terminate state 100 in which the virtual meeting room and its contents are completely erased from storage in the network 10 may be entered into by the meeting room server 48 from any of the other states shown in FIG. 4 in response to a command from a preselected conversation manager.

Figure 5:
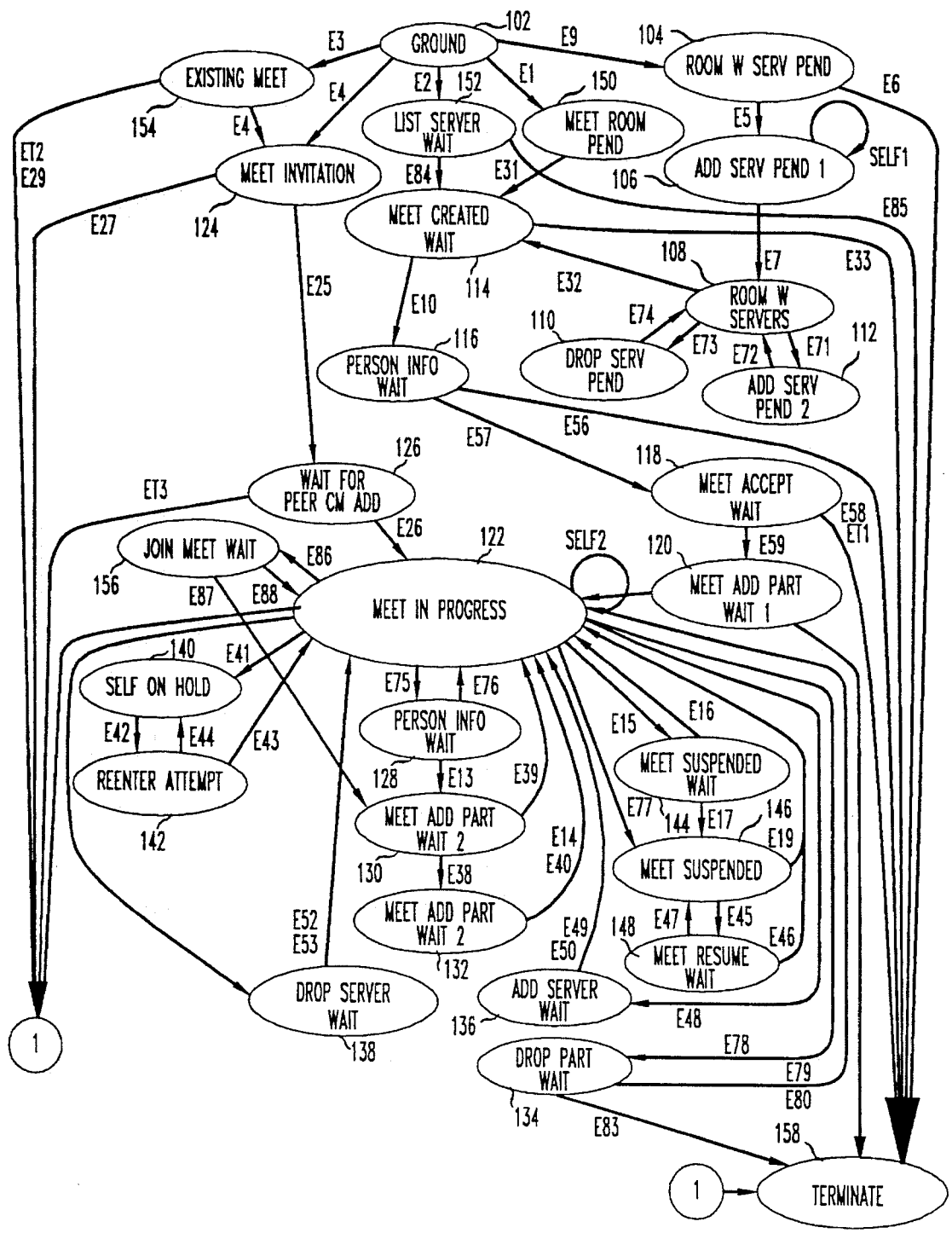
FIG. 5 is a state diagram representing the operation of one of the conversation managers in FIG. 2 with respect to one virtual meeting room created in the network.

FIG. 5 is a state diagram representing the operation of a conversation manager in a multimedia workstation with respect to a single virtual meeting room. Additional state diagrams like the one in FIG. 5 may represent the operation of that conversation manager with respect to other virtual meeting rooms with which that manager is associated. As in the case of FIG. 4, the state diagram of FIG. 5 is composed of representations of the states in which the conversation manager may reside along with the allowed transitions between those states. Table II is a complete listing of the allowed transitions, referred to as "edges", including an identification of that which triggers a transition between states along with the action which takes place as a result of the trigger.

For purposes of this description, it is assumed that a user of workstation 12 desires to call a user of workstation 14. The operation of a conversation manager begins in a ground state 102 prior to a command from a user of the workstation to create a virtual meeting room in the network 10. When a user of the workstation 12 desires to communicate with someone else, for example, a user of workstation 14, he or she enters a request into the user interface of the workstation 12. This can be same as or analogous to a calling party dialing the telephone number of a called party to initiate a telephone call between the parties. The user desiring to be connected with another workstation user may manually select which media will be used to effectuate a conference. Alternatively, information about which media are to be used may be stored somewhere between the two workstation users for use in automatically configuring an appropriate connection between the users. Once the initiating user of workstation 12 has indicated a desire to set up a connection to another user, the conversation manager 28 enters a waiting state 104 during which the conversation manager 28 waits for the meeting room server 48 to create an appropriate virtual meeting room in the network 10. When the conversation manager 28 is notified that the virtual meeting room has been established, the conversation manager 28 then enters a wait state 106 during which the conversation manager awaits an indication that the meeting room server 48 has associated appropriate media servers with the virtual meeting room it has just created. Whenever servers are added to a virtual meeting room, the conversation manager 28 also organizes local resources in the workstation 12 to interface appropriately with each of the media servers associated with the virtual meeting room created by the meeting room server 48. When all of the appropriate media servers have been associated with the virtual meeting room, the conversation manager 28 enters a state 108 designated room with servers. While the conversation manager 28 is in state 108, additional servers may be added to the meeting room by making a transition from state 108 to state 112 and back. Also, servers may be dropped from the meeting room while in state 108 by making a transition from state 108 to state 110 and back. Whenever servers are dropped from a meeting room, the conversation manager 28 also deallocates corresponding local resources from the conference.

When the conversation manager 28 is in state 108, a meeting may be created in the virtual meeting room. The conversation manager 28 makes a transition from state 108 to state 114 during which the conversation manager waits for a meeting to be created. Alternatively, the conversation manager 28 may reach state 114 via a state 150 which does not involve the association of a meeting room with servers. Servers also may be added to the virtual meeting room created along the path through state 150 when the conversation manager reaches a meeting-in-progress state 122 to be described below. This state is similar to the state 104 described above.

Creation of a meeting in the virtual meeting room may be the creation of some identification for the meeting in the meeting room. When the meeting has been created in the virtual meeting room, the conversation manager 28 then makes a transition from state 114 to a state 116 during which the conversation manager 28 requests the meeting room server 48 to give it information about the person the user of the workstation is trying to contact, for example, the location of the user. When this information has been obtained, the conversation manager 28 makes a transition from state 116 to state 118 during which it waits for a message to be sent to the person to be contacted and a return message from that person that he or she wishes to meet with the user of the workstation 12. When the return message is received that the called party wishes to meet with the calling party, the conversation manager 28 sends a message to the meeting room server 48 to add the called party identification to the virtual meeting room. The conversation manager 28 awaits confirmation of this in state 120. When such confirmation is received, the conversation manger 28 makes a transition from state 120 to a meeting-in-progress state 122 during which the two workstation users are connected together and may communicate with one another in the selected media.

What has been described above is a situation where the user of workstation 12 has initiated a connection with the user of workstation 14. In an alternative situation, where the user of workstation 14 has initiated a connection with the user of workstation 12, the conversation manager 28 makes a transition from the ground state 102 to a state 124 in which the user of workstation 12 is invited to participate in a multimedia conference with the user of workstation 14. The conversation manager 28 awaits acceptance in state 124 of such an invitation by the user of workstation 12. When the invitation has been accepted by the user of workstation 12, the conversation manager 28 makes a transition from state 124 to a wait state 126 where it waits for confirmation that the workstation 12 has been added to a conference, after which the conversation manager 28 makes a transition from state 126 to state 122.

While a meeting is in progress and the conversation manager 28 is in state 122, additional meeting participants may be added to the conference by way of transitions between states 122, 128, 130, and 132 shown in FIG. 5. Participants may be dropped by way of transitions made between states 122 and 134 as shown in FIG. 5. Servers may be added by way of transitions between states 122 and 136 as shown in FIG. 5. Servers may also be dropped by way of transitions between states 122 and 138 as shown in FIG. 5.

Any of the participants in a conference may temporarily leave a conference by placing him or herself on hold where a conversation manager, such as the conversation manager 28, enters a state 140. When a participant on hold wishes to return to the conference, the conversation manager 28 makes a transition from state 140 to state 142 and then to state 122 if the participant on hold is granted permission to re-enter the conference.

One or more of the conference participants, such as the user of workstation 12, may entirely suspend the meeting whereby all participants may be placed on hold or even actually disconnected from the network 10. However, the virtual meeting room and some or all of its associated data, may persist in the network so that the meeting may be resumed at the place it was suspended. Also, storage capabilities of the media servers to be described below permit some or all of the history of the conference to be reviewed by those who are returning to the conference after the suspension. When a meeting is suspended, the conversation manager 28 makes a transition from state 122 to state 144 and then to a state 146. In resuming a meeting, the conversation manager 28 makes a transition from state 146 to a state 148 after which the conversation manager returns to the state 122.

When the conversation manager is in the ground state 102, a user of the workstation 12 may inquire about the nature of the resources available in a virtual meeting room already existing in the network 10. The conversation manager makes a transition from state 102 to state 152 and the conversation manager organizes appropriate local resources to interface with the resources in the virtual meeting room. Once this has been accomplished, the conversation manager 28 then makes a transition from state 152 to state 114 and continues to operate in the manner described above in state 114 and beyond.

When the conversation manager 28 is in the ground state 102, a user of the workstation 12 also may seek to enter an existing meeting which is presently going on. The user so indicates his or her desire to enter this existing meeting and the conversation manager 28 makes a transition from state 102 to state 154. In effect, the network is queried about the meeting and one of the existing meeting participants is asked to send an invitation to the user to join the meeting. When this indication is forthcoming, the conversation manager 28 then makes a transition from state 154 to state 124 and the operation of the conversation manager continues as described above. In a situation where the user of workstation 12 is already a participant in an ongoing meeting and the conversation manager 28 is in state 122, a request by another workstation user not already part of the conference made to the user of workstation 12 causes the conversation manager 28 to make a transition from state 122 to a state 156. If the user of workstation 12 sends an invitation to the newcomer, the conversation manager 28 then makes a transition from state 156 to state 130 and then back to state 122. If the user of workstation 12 refuses to invite the newcomer, the conversation manager 28 makes a transition from state 156 directly back to state 122.

As shown in FIG. 5, a terminate state 158 may be entered by the conversation manager 28 from selected ones of the other states shown in FIG. 5. The terminate state 158 may be viewed as the equivalent of the ground state 102.

Figure 6:
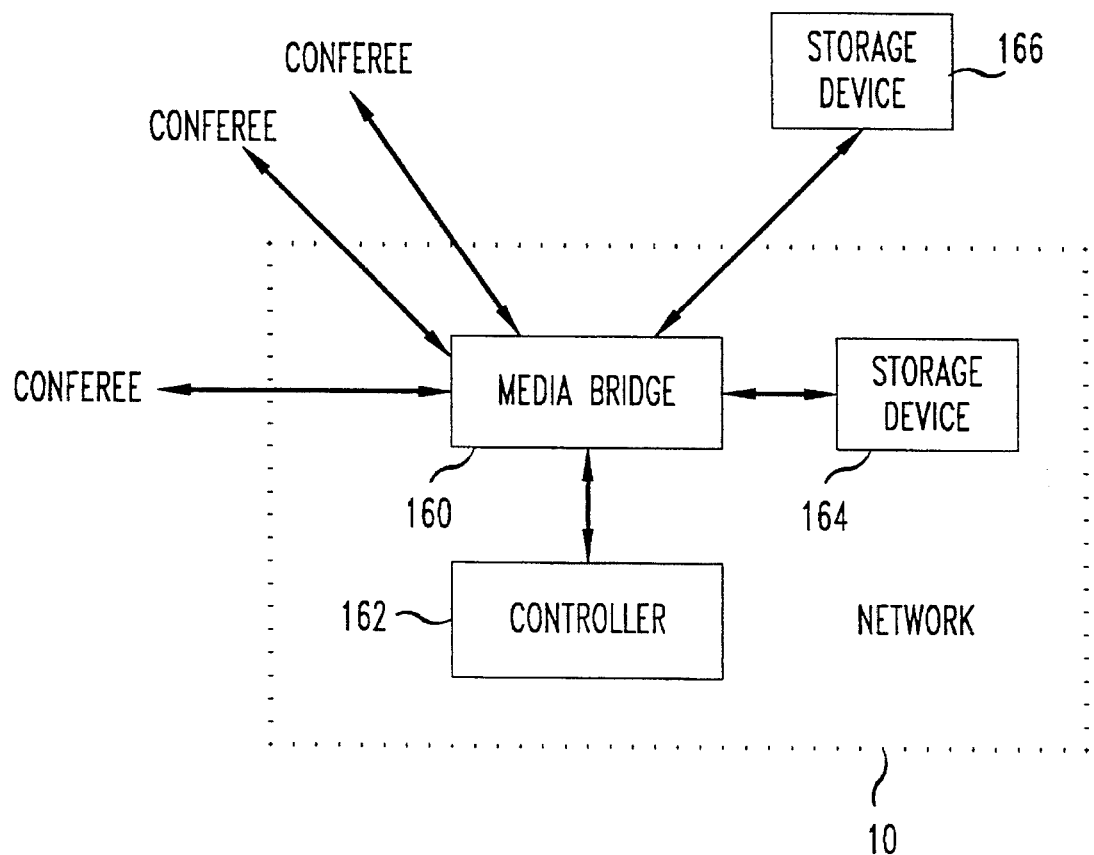
FIG. 6 is a block diagram of a generalized media server associated with storage devices which assist in effectuating a persistent characteristic of a virtual meeting room in accordance with this invention.

FIG. 6 is a schematic diagram of one of the media servers shown in FIG. 1. All of the media servers may use this architecture. The media server comprises a media bridge 160 which serves to receive the respective media outputs from each conference participant. The media bridge 160 combines selected media outputs from the conference participants and directs that combination back to selected conference participants. A controller 162 manages the combination of the conferee outputs and direction of those outputs back to the conferees. In the case of an audio server, the media bridge can be any teleconferencing bridge which receives the audio outputs of each conference participant and controllably directs selected ones of those audio outputs to each of the participants. In the case of data server, the media bridge can be any data bridge, such as a windows bridge or an X windows data bridge, which receives data outputs from the conference participants and directs selected ones of those data outputs to each of the participants. Similarly, in the case of a video server, any video bridge may be used as the media bridge 160 for receiving the video outputs from the conference participants and directing selected ones of the video outputs to each of the participants. The media bridge 160 may be connected to a storage device 164 located in the network which serves to store information about various aspects of a conference in a virtual meeting room. For example, the storage device 164 may store certain video information about the conference, such as a video recording of selected parts of the conference, where the media bridge 160 is a video bridge. It may also store certain information related to computer programs which have been shared by conference participants, for example, the state of the executable program in the case where the media bridge is a data bridge. It may also store an audio recording of some or all of the conference when the media bridge is an audio bridge. The media bridge 160 may also be connected to a similar storage device 166 which is located outside the network 10.

Appendix 1 is an illustrative protocol for the multimedia network 10. Appendices 2 and 3 are computer program listings representing illustrative implementations of a meeting room server and a conversation manager described more generally above. The listings are written in the generally known C++ computer language. The programs may be compiled and executed on Sun Microsystems workstations running the well known UNIX® operating system. These computer programs are copyrighted programs owned by the American Telephone & Telegraph Co. (© 1993 American Telephone & Telegraph Co.) and are not to be copied except in connection with making paper copies of this patent.

TABLE I

Edge E1:
    Trigger:
        MR_CREATE_ROOM (from CM)

Action:
        Send Reply MR_CREATE_ROOM (to CM)

Edge E2/E11:
    Trigger:
        MR_CREATE_MEETING (from CM)

Action:
        Send Reply MR_CREATE_MEETING (to CM)

Edge E3/E7/E14/E18:
    Trigger:
        MR_ADD_SERVER (from CM)

Action:
        Send GEN_ASSOCIATE_ROOM (to appropriate Media Server)

Edge E4/E8 - 1/E15/E19 - 1:
    Trigger:
        Error GEN_ASSOCIATE_ROOM (from Media Server)

Action:
        Send Error MR_ADD_SERVER (to CM)

Edge E5/E8 - 2/E16/E19 - 2:
    Trigger:
        Reply GEN_ASSOCIATE_ROOM (from Media Server)

Action:
        Send Reply MR_ADD_SERVER (to CM)
        NS++ (NS = Number of Servers in Room)

Edge E6:
    Trigger:
        MR_DROP_SERVER and NS = 1

Action:
        Send GEN_DISASSOCIATE_ROOM (to approp. Media Server)
        Send Reply MR_DROP_SERVER

Edge E9:
    Trigger:
        MR_DESTROY_MEETING (from CM)

Action:
        Send Reply MR_DESTROY_MEETING (to CM)

Edge E10:
    Trigger:
        MR_DROP_PARTICIPANT and NP = 1(from CM)
        (NP = Number of Participants)

Action:
        Send Reply MR_DROP_PARTICIPANT (to CM)

Edge E12:
    Trigger:
        MR_DROP_PARTICIPANT and NP = 1(from CM)
        (NP = Number of Participants)

Action:

Send Reply MR_DROP_PARTICIPANT (to CM)

Edge E13:
Trigger:
MR_DESTROY_MEETING (from CM)

Action:
Send Reply MR_DESTROY_MEETING (to CM)

Edge E17:
Trigger:
MR_DROP_SERVER and NS = 1

Action:
Send GEN_DISASSOCIATE_ROOM (to approp. Media Server)
Send Reply MR_DROP_SERVER

Edge E20/E22:
Trigger:
MR_SUSPEND_MEETING (from CM)

Action:
Reply MR_SUSPEND_MEETING (to CM)

Edge E21/E23:
Trigger:
MR_RESUME_MEETING (from CM)

Action:
Reply MR_RESUME_MEETING (to CM)

Edge E24:
Trigger:
MR_DESTROY_ROOM (from CM)

Action:
Reply MR_DESTROY_ROOM (to CM)

Edge SL1 - 1, SL2 - 1:
Trigger:
MR_ADD_PARTICIPANT (from CM)

Action:
Send Reply MR_ADD_PARTICIPANT (to CM)
NP++

Edge SL1 - 2, SL2 - 2:
Trigger:
MR_DROP_PARTICIPANT and NP > 1 (from CM)

Action:
Send Reply MR_DROP_PARTICIPANT (to CM)
NP--

TABLE II

Edge E1:

Trigger:
        EVE_CREATE_MEETING (from VI)
        EVE_CREATE_PERSISTENT_MEETING (from VI)

Action:
        Send MR_CREATE_ROOM (to MR)
        if (Trigger = EVE_CREATE_MEETING)
            Scenario = TRANSIENT_MEETING;
        if (Trigger = EVE_CREATE_PERSISTENT_MEETING)
            Scenario = PERSISTENT_MEETING;
        NS = Number of Servers

Edge E2:

Trigger:
        EVE_VI_CREATE_MEET_IN_EROOM (from VI)

Action:
        Send MR_LIST_SERVERS

Edge E3:

Trigger:
        EVE_VI_JOIN_MEETING (from VI)

Action:
        Send EVE_JOIN_MEETING to meeting owner

Edge E4:

Trigger:
        EVE_MEETING_INVITE (from peer CM)

Action:
        Send req. VI_MEETING_INVITATION (to VI)

Edge E5:

Trigger:
        Reply MR_CREATE_ROOM (from MR)

Action:
        Send MR_ADD_SERVER (to MR)

Edge E6:

Trigger:
        Error MR_CREATE_ROOM (from MR)

Action:
        Send event EVE_VI_ADDED_PARTICIPANT failed (to VI)

Edge E7:

Trigger:
        Reply MR_ADD_SERVER (from MR) and NS = 0

Action:
        if (success) {
            Send MAN_CONNECT_TO_BRIDGE to approp. Local manager
        }

Edge E9:

Trigger:
    EVE_CREATE_ROOM_W_SERVERS (from VI)

Action:
    Send MR_CREATE_ROOM (to MR)
    NS = Number of Servers

Edge E10:

Trigger:
    Reply MR_CREATE_MEETING success (from MR)

Action:
    Send MR_GET_PERSON_INFO (to MR)

Edge E12 - 1 (E12):

Trigger:
    EVE_DROPPED_PARTICIPANT participant SELF (from a peer CM)

Action:
    Send EVE_DROPPED_PARTICIPANT (to VI)

Edge E12 - 2 (E69):

Trigger:
    EVE_MEETING_DESTROYED (from a peer CM)

Action:
    Send EVE_MEETING_DESTROYED (to VI)

Edge E12 - 3 (E70):

Trigger:
    EVE_ROOM_DESTROYED (from a peer CM)

Action:
    Send EVE_ROOM_DESTROYED (to VI)

Edge E13:

Trigger:
    Reply MR_GET_PERSON_INFO (from MR)

Action:
    Send EVE_MEETING_INVITATION to peer CM

Edge E14:

Trigger:
    Reply MR_ADD_PARTICIPANT (from MR)

Action:
    Send event EVE_VI_ADDED_PARTICIPANT success (to VI)
    Send event EVE_ADDED_PARTICIPANT (to all peer CM's who are

Edge E15:

Trigger:
    EVE_VI_SUSPEND_MEETING (from VI)

Action:
    Send MR_SUSPEND_MEETING (to MR)

Edge E16:

Trigger:
>    Error MR_SUSPEND_MEETING (from MR)

Action:
>    Send EVE_MEETING_SUSPENDED fail (to VI)

Edge E17:

Trigger:
>    Reply MR_SUSPEND_MEETING (from MR)

Action:
>    Send EVE_MEETING_SUSPENDED (to all peer CMs)
>    Send EVE_MEETING_SUSPENDED success (to VI)

Edge E18:

Trigger:
>    EVE_MEETING_SUSPENDED (from a peer CM)

Action:
>    Send EVE_MEETING_SUSPENDED (to VI)

Edge E19:

Trigger:
>    EVE_MEETING_RESUMED (from a peer CM)

Action:
>    Send EVE_MEETING_RESUMED (to VI)

Edge E25:

Trigger:
>    Reply VI_MEETING_INVITATION Accepted (from VI)

Action:
>    Send EVE_ACCEPT_INVITATION (to calling CM)

Edge E26:

Trigger:
>    EVE_ADDED_PARTICIPANT participant SELF (from a peer CM)

Action:
>    Send MAN_CONNECT_TO_BRIDGE to approp. Local manager

Edge E27:

Trigger:
>    Reply VI_MEETING_INVITATION Rejected (from VI)

Action:
>    Send EVE_REJECT_INVITATION (to calling CM)

Edge E28:

Trigger:
>    EVE_MEETING_INVITE (from peer CM)

Action:
>    Send EVE_ACCEPT_INVITATION to the requester

Edge E29:

Trigger:
EVE_JOIN_MEETING_REJECTED (from peer CM)

Action:
Send EVE_VI_JOIN_MEETING failed (to VI)

Edge E31:

Trigger:
Reply MR_CREATE_ROOM (from MR)

Action:
Send MR_CREATE_MEETING (to MR)

Edge E32:

Trigger:
Request EVE_CREATE_MEETING (from VI)

Action:
Send MR_CREATE_MEETING (to MR)

Edge E33:

Trigger:
Error MR_CREATE_MEETING (from MR)

Action:
Send event EVE_VI_ADDED_PARTICIPANT failed (to VI)

Edge E34:

Trigger:
Reply MR_ADD_PARTICIPANT (from MR)

Action:
Send event EVE_VI_ADDED_PARTICIPANT success (to VI)
Send event EVE_ADDED_PARTICIPANT (to all peer CM's who are Edge E37:

Trigger:
Error MR_ADD_PARTICIPANT (from MR)

Action:
Send EVE_VI_ADDED_PARTICIPANT fail(to VI)

Edge E38:

Trigger:
EVE_ACCEPT_INVITATION (from peer CM)

Action:
Send MR_ADD_PARTICIPANT (to MR)

Edge E39:

Trigger:
EVE_REJECT_INVITATION (from peer CM)

Action:
Send event EVE_VI_ADDED_PARTICIPANT fail (to VI)

Edge E40:

Trigger:
Error MR_ADD_PARTICIPANT (from MR)

Action:
Send event EVE_VI_ADDED_PARTICIPANT fail (to VI)

Edge E41:

Trigger:
EVE_VI_LEAVE_MEETING (from VI)

Action:
Send req. MR_LEAVE_MEETING (to MR)
Send EVE_LEFT_MEETING (to all peer CMs)

Edge E42:

Trigger:
EVE_VI_REENTER_MEETING (from VI)

Action:
Send req. MR_REENTER_MEETING (to MR)

Edge E43:

Trigger:
Reply MR_REENTER_MEETING (from MR)

Action:
Send EVE_REENTER_MEETING (to all peer CMs)
Send EVE_REENTER_MEETING success (to VI)

Edge E44:

Trigger:
Error MR_REENTER_MEETING (from MR)

Action:
Send EVE_REENTER_MEETING fail (to VI)

Edge E45:

Trigger:
EVE_VI_RESUME_MEETING (from VI)

Action:
Send MR_RESUME_MEETING (to MR)

Edge E46:

Trigger:
Reply MR_RESUME_MEETING (from MR)

Action:
Send EVE_MEETING_RESUMED (to VI)
Send EVE_MEETING_RESUMED (to all peer CMs)

Edge E47:

Trigger:
Error MR_RESUME_MEETING (from MR)

Action:
Send EVE_MEETING_RESUMED fail (to VI)

Edge E48:

Trigger:
    EVE_VI_ADD_SERVER (from VI)

Action:
    Send req. MR_ADD_SERVER (to MR)

Edge E49:

Trigger:
    Reply MR_ADD_SERVER (from MR)

Action:
    Send MAN_CONNECT_TO_BRIDGE (to approp. local manager)
    Send EVE_SERVER_ADDED (to VI)
    Send EVE_SERVER_ADDED (to all peer CMs)

Edge E50:

Trigger:
    Error MR_ADD_SERVER (from MR)

Action:
    Send EVE_SERVER_ADDED (fail?) (to VI)

Edge E51:

Trigger:
    EVE_VI_DROP_SERVER (from VI)

Action:
    Send req. MR_DROP_SERVER (to MR)

Edge E52:

Trigger:
    Reply MR_DROP_SERVER (from MR)

Action:
    Send MAN_DISCONNECT_FROM_BRIDGE (to approp. local manager)
    Send EVE_SERVER_DROPPED (to VI)
    Send EVE_SERVER_DROPPED (to all peer CMs)

Edge E53:

Trigger:
    Error MR_DROP_SERVER (from MR)

Action:
    Send EVE_SERVER_DROPPED (fail?) (to VI)

Edge E56:

Trigger:
    Error MR_GET_PERSON_INFO (from MR)

Action:
    Send event EVE_VI_ADDED_PARTICIPANT failed (to VI)

Edge E57:

Trigger:
    Reply MR_GET_PERSON_INFO (from MR)

Action:
    Send EVE_MEETING_INVITATION (to peer CM)

Edge E58:

> Trigger:
> > EVE_REJECT_INVITATION (from peer CM)
>
> Action:
> > Send event EVE_VI_ADDED_PARTICIPANT failed (to VI)

Edge E59:

> Trigger:
> > EVE_ACCEPT_INVITATION (from peer CM)
>
> Action:
> > Send MR_ADD_PARTICIPANT (to MR)

Edge SELF1 (E60):

> Trigger:
> > Reply MR_ADD_SERVER (from MR) and NS > 0
>
> Action:
> > if (success) {
> >     Send MAN_CONNECT_TO_BRIDGE to approp. Local manager
> > }
> > if (NS > 0) Send MR_ADD_SERVER (to MR)

Edge SELF2 - 1 (E61):

> Trigger:
> > EVE_ADDED_PARTICIPANT participant NOT SELF (from a peer CM)
>
> Action:
> > Send EVE_VI_ADDED_PARTICIPANT (to VI)

Edge SELF2 - 2 (E62):

> Trigger:
> > EVE_DROPPED_PARTICIPANT participant NOT SELF (from a peer CM)
>
> Action:
> > Send EVE_DROPPED_PARTICIPANT (to VI)

Edge SELF2 - 3 (E63):

> Trigger:
> > EVE_LEFT_MEETING (from a peer CM)
>
> Action:
> > Send EVE_LEFT_MEETING (to VI)

Edge SELF2 - 4 (E64):

> Trigger:
> > EVE_REENTER_MEETING (from a peer CM)
>
> Action:
> > Send EVE_REENTER_MEETING (to VI)

Edge SELF2 - 5 (E65):

> Trigger:
> > EVE_SERVER_ADDED (from a peer CM)

Action:
     Send MAN_CONNECT_TO_BRIDGE (to approp. local manager)
     Send EVE_SERVER_ADDED (to VI)
     Send EVE_SERVER_ADDED (to all peer CMs)

Edge SELF2 - 6 (E66):

Trigger:
     EVE_SERVER_DROPPED (from a peer CM)

Action:
     Send MAN_DISCONNECT_FROM_BRIDGE (to approp. local manager)
     Send EVE_SERVER_DROPPED (to VI)
     Send EVE_SERVER_DROPPED (to all peer CMs)

Edge ET1 (E67):
Trigger:
     TimeOut (wait for EVE_ACCEPT_INVITATION)

Action:
     Send EVE_VI_ADDED_PARTICIPANT fail(to VI)

Edge ET2 (E68):
Trigger:
     TimeOut (wait for EVE_MEETING_INVITATION)

Action:
     Send EVE_VI_JOIN_MEETING fail(to VI)

Edge ET3 (E68):
Trigger:
     TimeOut (wait for EVE_ADDED_PARTICIPANT self)

Action:
     Send EVE_VI_JOIN_MEETING fail(to VI)

Edge E71:
Trigger:
     EVE_VI_ADD_SERVER (from VI)

Action:
     Send MR_ADD_SERVER (to MR)

Edge E72 - 1:
Trigger:
     Reply MR_ADD_SERVER (from MR)

Action:
     Send MAN_CONNECT_TO_BRIDGE to approp. Local manager

Edge E72 - 2:
Trigger:
     Error MR_ADD_SERVER (from MR)

Action:
     None

Edge E73:
Trigger:
     EVE_VI_DROP_SERVER (from VI)

Action:

Send MR_DROP_SERVER (to MR)

Edge E74 - 1:
    Trigger:
        Reply MR_DROP_SERVER (from MR)

Action:
        Send MAN_DISCONNECT_FROM_BRIDGE to approp. Local manager

Edge E74 - 2:
    Trigger:
        Error MR_DROP_SERVER (from MR)

Action:
        None

Edge E75:
    Trigger:
        EVE_VI_ADD_PARTICIPANT (from VI)

Action:
        Send MR_GET_PERSON_INFO (to MR)

Edge E76:
    Trigger:
        Error MR_GET_PERSON_INFO (from MR)

Action:
        Send event EVE_VI_ADDED_PARTICIPANT fail (to VI)

Edge E77:
    Trigger:
        EVE_MEETING_SUSPENDED (from peer CM)

Action:
        EVE_MEETING_SUSPENDED (to VI)

Edge E78:
    Trigger:
        EVE_VI_DROP_PARTICIPANT (from VI)

Action:
        Send MR_DROP_PARTICIPANT (to MR)

Edge E79:
    Trigger:
        Reply MR_DROP_PARTICIPANT (from MR)

Action:
        Send EVE_DROP_PARTICIPANT (to VI)
        Send EVE_DROP_PARTICIPANT (to all peer CMs)

Edge E80:
    Trigger:
        Error MR_DROP_PARTICIPANT (from MR)

Action:
        None

Edge E83:
    Trigger:
        Reply MR_DROP_PARTICIPANT (from MR) && participant = SELF Action:
        Send EVE_DROP_PARTICIPANT (to VI)

Send EVE_DROP_P... ICIPANT (to all peer CMs)

Edge E84 - 1:
    Trigger:
        Reply MR_LIST_SERVERS from MR

Action:
        Send MR_CREATE_MEETING to MR

Edge E85 :
    Trigger:
        Error MR_LIST_SERVERS from MR

Action:
        E6 action.

Edge E86 :
    Trigger:
        EVE_MEETING_JOIN (from peer CM)

Action:
        Send EVE_VI_JOIN_MEETING (to VI)

Edge E87 :
    Trigger:
        EVE_JOIN_MEETING_ACCEPTED (from VI)

Action:
        Send EVE_MEETING_INVITE (to peer CM)

Edge E88 :
    Trigger:
        EVE_JOIN_MEETING_REJECTED (from VI)

Action:
        EVE_JOIN_MEETING_REJECTED (to peer CM)

APPENDIX I

.na
.nf
.H 1 "PROTOCOL BETWEEN MR SERVER AND ITS CLIENTS "

.H 2 "Overall Room Control"

1. CreateRoom:
```
   REQ_TYPE req_type      REQUEST_MR_SERVER
   REQ_CODE req_code      MR_CREATE_ROOM
   CARD32   seq_no
   CARD32   length
   CARD32   MR_id
   CARD32   owner
   ROOM_ATTRIBUTES   attrib Reply->
   REP_TYPE rep_type      REPLY_MR_SERVER
   REP_CODE rep_code      MR_CREATE_ROOM
   CARD32   seq_no
   CARD32   length
   CARD32   room_id Error->
   REP_TYPE rep_type      ERROR_MR_SERVER
   REP_CODE rep_code      MR_CREATE_ROOM
   CARD32   seq_no
   CARD32   length
   ERR_CODE err_code
```

2. DestroyRoom:
```
   REQ_TYPE req_type      REQUEST_MR_SERVER
   REQ_CODE req_code      RM_DESTROY_ROOM
   CARD32   seq_no
   CARD32   length
   CARD32   MR_id
   CARD32   src
   CARD32   room_id Reply->
   REP_TYPE rep_type      REPLY_MR_SERVER
   REP_CODE rep_code      RM_DESTROY_ROOM
   CARD32   seq_no
   CARD32   length Error->
   REP_TYPE rep_type      ERROR_MR_SERVER
   REP_CODE rep_code      RM_DESTROY_ROOM
   CARD32   seq_no
   CARD32   length
   ERR_CODE err_code
```

3. ListRooms:
```
   REQ_TYPE req_type      REQUEST_MR_SERVER
   REQ_CODE req_code      MR_LIST_ROOMS
   CARD32   seq_no
   CARD32   length
   CARD32   MR_id
   CARD32   src Reply->
   REP_TYPE rep_type      REPLY_MR_SERVER
   REP_CODE rep_code      MR_LIST_ROOMS
   CARD32   seq_no
   CARD32   length
   CARD32   list_length
   L_ROOM   list_of_rooms
```

```
    Error->
      REP_TYPE   rep_type      ERROR_MR_SERVER
      REP_CODE   rep_code      MR_LIST_ROOMS
      CARD32     seq_no
      CARD32     length
      ERR_CODE   err_code 4. ShowRoomStatus:
      REQ_TYPE   req_type      REQUEST_MR_SERVER
      REQ_CODE   req_code      MR_SHOW_ROOM_STATUS
      CARD32     seq_no
      CARD32     length
      CARD32     MR_id
      CARD32     src
      CARD32     room_id Reply->
      REP_TYPE   rep_type      REPLY_MR_SERVER
      REP_CODE   rep_code      MR_SHOW_ROOM_STATUS
      CARD32     seq_no
      CARD32     length
      STATUS     status
      LOCK_STATUS lock_status
      CARD32     list_length
      L_MEDIA_SERV_INFO media_list Error->
      REP_TYPE   rep_type      ERROR_MR_SERVER
      REP_CODE   rep_code      MR_SHOW_ROOM_STATUS
      CARD32     seq_no
      CARD32     length
      ERR_CODE   err_code 5. ShowRoomAttributes:
      REQ_TYPE   req_type      REQUEST_MR_SERVER
      REQ_CODE   req_code      MR_SHOW_ROOM_ATTRIBUTES
      CARD32     seq_no
      CARD32     length
      CARD32     MR_id
      CARD32     src
      CARD32     room_id Reply->
      REP_TYPE   rep_type      REPLY_MR_SERVER
      REP_CODE   rep_code      MR_SHOW_ROOM_ATTRIBUTES
      CARD32     seq_no
      CARD32     length
      ROOM_ATTRIBUTES    attrib Error->
      REP_TYPE   rep_type      ERROR_MR_SERVER
      REP_CODE   rep_code      MR_SHOW_ROOM_ATTRIBUTES
      CARD32     seq_no
      CARD32     length
      ERR_CODE   err_code 6. AlterRoomAttributes:
      REQ_TYPE   req_type      REQUEST_MR_SERVER
      REQ_CODE   req_code      MR_ALTER_ROOM_ATTRIBUTES
      CARD32     seq_no
      CARD32     length
      CARD32     MR_id
      CARD32     src
      CARD32     room_id
      ROOM_ATTRIBUTES    attrib
```

```
    Reply->
      REP_TYPE  rep_type     REPLY_MR_SERVER
      REP_CODE  rep_code     MR_ALTER_ROOM_ATTRIBUTES
      CARD32    seq_no
      CARD32    length Error->
      REP_TYPE  rep_type     ERROR_MR_SERVER
      REP_CODE  rep_code     MR_ALTER_ROOM_ATTRIBUTES
      CARD32    seq_no
      CARD32    length
      ERR_CODE  err_code 7. LockRoom:
      REQ_TYPE  req_type     REQUEST_MR_SERVER
      REQ_CODE  req_code     MR_LOCK_ROOM
      CARD32    seq_no
      CARD32    length
      CARD32    MR_id
      CARD32    src
      CARD32    room_id Reply->
      REP_TYPE  rep_type     REPLY_MR_SERVER
      REP_CODE  rep_code     MR_LOCK_ROOM
      CARD32    seq_no
      CARD32    length Error->
      REP_TYPE  rep_type     ERROR_MR_SERVER
      REP_CODE  rep_code     MR_LOCK_ROOM
      CARD32    seq_no
      CARD32    length
      ERR_CODE  err_code 8. UnlockRoom:
      REQ_TYPE  req_type     REQUEST_MR_SERVER
      REQ_CODE  req_code     MR_UNLOCK_ROOM
      CARD32    seq_no
      CARD32    length
      CARD32    MR_id
      CARD32    src
      CARD32    room_id Reply->
      REP_TYPE  rep_type     REPLY_MR_SERVER
      REP_CODE  rep_code     MR_UNLOCK_ROOM
      CARD32    seq_no
      CARD32    length Error->
      REP_TYPE  rep_type     ERROR_MR_SERVER
      REP_CODE  rep_code     MR_UNLOCK_ROOM
      CARD32    seq_no
      CARD32    length
      ERR_CODE  err_code .H 3 "Overall Meeting Control"

1. CreateMeeting:
      REQ_TYPE  req_type     REQUEST_MR_SERVER
      REQ_CODE  req_code     MR_CREATE_MEETING
      CARD32    seq_no
      CARD32    length
```

```
        CARD32    MR_id
        CARD32    src
        CARD32    room_id
        MEETING_ATTRIBUTES   attrib Reply->
        REP_TYPE  rep_type     REPLY_MR_SERVER
        REP_CODE  rep_code     MR_CREATE_MEETING
        CARD32    seq_no
        CARD32    length
        CARD32    meeting_id Error->
        REP_TYPE  rep_type     ERROR_MR_SERVER
        REP_CODE  rep_code     MR_CREATE_MEETING
        CARD32    seq_no
        CARD32    length
        ERR_CODE  err_code 2. DestroyMeeting:
        REQ_TYPE  req_type     REQUEST_MR_SERVER
        REQ_CODE  req_code     MR_DESTROY_MEETING
        CARD32    seq_no
        CARD32    length
        CARD32    MR_id
        CARD32    src
        CARD32    meeting_id Reply->
        REP_TYPE  rep_type     REPLY_MR_SERVER
        REP_CODE  rep_code     MR_DESTROY_MEETING
        CARD32    seq_no
        CARD32    length Error->
        REP_TYPE  rep_type     ERROR_MR_SERVER
        REP_CODE  rep_code     MR_DESTROY_MEETING
        CARD32    seq_no
        CARD32    length
        ERR_CODE  err_code 3. ListMeetings:
        REQ_TYPE  req_type     REQUEST_MR_SERVER
        REQ_CODE  req_code     MR_LIST_MEETINGS
        CARD32    seq_no
        CARD32    length
        CARD32    MR_id
        CARD32    src Reply->
        REP_TYPE  rep_type     REPLY_MR_SERVER
        REP_CODE  rep_code     MR_LIST_MEETINGS
        CARD32    seq_no
        CARD32    length
        CARD32    list_length
        L_MEETING list_of_meetings Error->
        REP_TYPE  rep_type     ERROR_MR_SERVER
        REP_CODE  rep_code     MR_LIST_MEETINGS
        CARD32    seq_no
        CARD32    length
        ERR_CODE  err_code 4. ShowMeetingStatus:
```

```
      REQ_TYPE req_type      REQUEST_MR_SERVER
      REQ_CODE req_code      MR_SHOW_MEETING_STATUS
      CARD32   seq_no
      CARD32   length
      CARD32   MR_id
      CARD32   src
      CARD32   meeting_id Reply->
      REP_TYPE rep_type      REPLY_MR_SERVER
      REP_CODE rep_code      MR_SHOW_MEETING_STATUS
      CARD32   seq_no
      CARD32   length
         CARD8     status
      CARD32   room_id
      CARD32   owner
         CARD32    list_length
      L_PART_SERV part_serv_list Error->
      REP_TYPE rep_type      ERROR_MR_SERVER
      REP_CODE rep_code      MR_SHOW_MEETING_STATUS
      CARD32   seq_no
      CARD32   length
      ERR_CODE err_code 4. ShowMeetRoomStatus:
      REQ_TYPE req_type      REQUEST_MR_SERVER
      REQ_CODE req_code      MR_SHOW_MEETROOM_STATUS
      CARD32   seq_no
      CARD32   length
      CARD32   MR_id
      CARD32   src
      CARD32   room_id Reply->
      REP_TYPE rep_type      REPLY_MR_SERVER
      REP_CODE rep_code      MR_SHOW_MEETING_STATUS
      CARD32   seq_no
      CARD32   length
         CARD8     status
      CARD32   meeting_id
      CARD32   owner
         CARD32    list_length
      L_PART_SERV part_serv_list Error->
      REP_TYPE rep_type      ERROR_MR_SERVER
      REP_CODE rep_code      MR_SHOW_MEETING_STATUS
      CARD32   seq_no
      CARD32   length
      ERR_CODE err_code 5. ShowMeetingAttributes:
      REQ_TYPE req_type      REQUEST_MR_SERVER
      REQ_CODE req_code      MR_SHOW_MEETING_ATTRIBUTES
      CARD32   seq_no
      CARD32   length
      CARD32   MR_id
      CARD32   src
      CARD32   meeting_id Reply->
      REP_TYPE rep_type      REPLY_MR_SERVER
      REP_CODE rep_code      MR_SHOW_MEETING_ATTRIBUTES
      CARD32   seq_no
```

```
    CARD32    length
    MEETING_ATTRIBUTES    attrib

Error->
    REP_TYPE  rep_type    ERROR_MR_SERVER
    REP_CODE  rep_code    MR_SHOW_MEETING_ATTRIBUTES
    CARD32    seq_no
    CARD32    length
    ERR_CODE  err_code 6. AlterMeetingAttributes:
    REQ_TYPE  req_type    REQUEST_MR_SERVER
    REQ_CODE  req_code    MR_ALTER_MEETING_ATTRIBUTES
    CARD32    seq_no
    CARD32    length
    CARD32    MR_id
    CARD32    src
    CARD32    meeting_id
    MEETING_ATTRIBUTES    attrib Reply->
    REP_TYPE  rep_type    REPLY_MR_SERVER
    REP_CODE  rep_code    MR_ALTER_MEETING_ATTRIBUTES
    CARD32    seq_no
    CARD32    length Error->
    REP_TYPE  rep_type    ERROR_MR_SERVER
    REP_CODE  rep_code    MR_ALTER_MEETING_ATTRIBUTES
    CARD32    seq_no
    CARD32    length
    ERR_CODE  err_code 7. AddParticipant:
    REQ_TYPE  req_type    REQUEST_MR_SERVER
    REQ_CODE  req_code    MR_ADD_PARTICIPANT
    CARD32    seq_no
    CARD32    length
    CARD32    MR_id
    CARD32    src
    CARD32    meeting_id
    PARTICIPANT participant Reply->
    REP_TYPE  rep_type    REPLY_MR_SERVER
    REP_CODE  rep_code    MR_ADD_PARTICIPANT
    CARD32    seq_no
    CARD32    length Error->
    REP_TYPE  rep_type    ERROR_MR_SERVER
    REP_CODE  rep_code    MR_ADD_PARTICIPANT
    CARD32    seq_no
    CARD32    length
    ERR_CODE  err_code 8. DropParticipant:
    REQ_TYPE  req_type    REQUEST_MR_SERVER
    REQ_CODE  req_code    MR_DROP_PARTICIPANT
    CARD32    seq_no
    CARD32    length
    CARD32    MR_id
    CARD32    src
    CARD32    meeting_id
    PARTICIPANT participant
```

```
    Reply->
      REP_TYPE  rep_type    REPLY_MR_SERVER
      REP_CODE  rep_code    MR_DROP_PARTICIPANT
      CARD32    seq_no
      CARD32    length Error->
      REP_TYPE  rep_type    ERROR_MR_SERVER
      REP_CODE  rep_code    MR_DROP_PARTICIPANT
      CARD32    seq_no
      CARD32    length
      ERR_CODE  err_code 9. LeaveMeeting:
      REQ_TYPE  req_type    REQUEST_MR_SERVER
      REQ_CODE  req_code    MR_LEAVE_MEETING
      CARD32    seq_no
      CARD32    length
      CARD32    MR_id
      CARD32    src
      CARD32    meeting_id
      CARD32    list_length
      L_MEDIA   media_list Reply->
      REP_TYPE  rep_type    REPLY_MR_SERVER
      REP_CODE  rep_code    MR_LEAVE_MEETING
      CARD32    seq_no
      CARD32    length Error->
      REP_TYPE  rep_type    ERROR_MR_SERVER
      REP_CODE  rep_code    MR_LEAVE_MEETING
      CARD32    seq_no
      CARD32    length
      ERR_CODE  err_code 10. ReenterMeeting:
      REQ_TYPE  req_type    REQUEST_MR_SERVER
      REQ_CODE  req_code    MR_REENTER_MEETING
      CARD32    seq_no
      CARD32    length
      CARD32    MR_id
      CARD32    src
      CARD32    meeting_id
      CARD32    list_length
      L_MEDIA   server_list Reply->
      REP_TYPE  rep_type    REPLY_MR_SERVER
      REP_CODE  rep_code    MR_REENTER_MEETING
      CARD32    seq_no
      CARD32    length Error->
      REP_TYPE  rep_type    ERROR_MR_SERVER
      REP_CODE  rep_code    MR_REENTER_MEETING
      CARD32    seq_no
      CARD32    length
      ERR_CODE  err_code 11. SuspendMeeting:
      REQ_TYPE  req_type    REQUEST_MR_SERVER
      REQ_CODE  req_code    MR_SUSPEND_MEETING
      CARD32    seq_no
      CARD32    length
```

```
        CARD32    MR_id
        CARD32    src
        CARD32    meeting_id

Reply->
        REP_TYPE  rep_type     REPLY_MR_SERVER
        REP_CODE  rep_code     MR_SUSPEND_MEETING
        CARD32    seq_no
        CARD32    length Error->
        REP_TYPE  rep_type     ERROR_MR_SERVER
        REP_CODE  rep_code     MR_SUSPEND_MEETING
        CARD32    seq_no
        CARD32    length
        ERR_CODE  err_code 12. ResumeMeeting:
        REQ_TYPE  req_type     REQUEST_MR_SERVER
        REQ_CODE  req_code     MR_RESUME_MEETING
        CARD32    seq_no
        CARD32    length
        CARD32    MR_id
        CARD32    src
        CARD32    meeting_id Reply->
        REP_TYPE  rep_type     REPLY_MR_SERVER
        REP_CODE  rep_code     MR_RESUME_MEETING
        CARD32    seq_no
        CARD32    length Error->
        REP_TYPE  rep_type     ERROR_MR_SERVER
        REP_CODE  rep_code     MR_RESUME_MEETING
        CARD32    seq_no
        CARD32    length
        ERR_CODE  err_code .H 2 "Meeting Association with a Room"

1. ShowAssociatedRoom:
        REQ_TYPE  req_type     REQUEST_MR_SERVER
        REQ_CODE  req_code     MR_SHOW_ASSOCIATED_ROOM
        CARD32    seq_no
        CARD32    length
        CARD32    MR_id
        CARD32    src
        CARD32    meeting_id Reply->
        REP_TYPE  rep_type     REPLY_MR_SERVER
        REP_CODE  rep_code     MR_SHOW_ASSOCIATED_ROOM
        CARD32    seq_no
        CARD32    length
        CARD32    room_id Error->
        REP_TYPE  rep_type     ERROR_MR_SERVER
        REP_CODE  rep_code     MR_SHOW_ASSOCIATED_ROOM
        CARD32    seq_no
        CARD32    length
        ERR_CODE  err_code 2. ShowAssociatedMeeting:
        REQ_TYPE  req_type     REQUEST_MR_SERVER
```

```
    REQ_CODE  req_code     MR_SHOW_ASSOCIATED_MEETING
    CARD32    seq_no
    CARD32    length
    CARD32    MR_id
    CARD32    src
    CARD32    room_id Reply->
    REP_TYPE  rep_type     REPLY_MR_SERVER
    REP_CODE  rep_code     MR_SHOW_ASSOCIATED_MEETING
    CARD32    seq_no
    CARD32    length
    CARD32    meeting_id Error->
    REP_TYPE  rep_type     ERROR_MR_SERVER
    REP_CODE  rep_code     MR_SHOW_ASSOCIATED_MEETING
    CARD32    seq_no
    CARD32    length
    ERR_CODE  err_code .H 2 "Media Server Associations With a Room"

1. AddServer:
    REQ_TYPE  req_type     REQUEST_MR_SERVER
    REQ_CODE  req_code     MR_ADD_SERVER
    CARD32    seq_no
    CARD32    length
    CARD32    src
    CARD32    room_id
    MEDIA     server
    STRING    user_desc
    CARD32    list_length
    L_PARTICIPANT participant_list Reply->
    REP_TYPE  rep_type     REPLY_MR_SERVER
    REP_CODE  rep_code     MR_ADD_SERVER
    CARD32    seq_no
    CARD32    length
    SERV_CONN conn Error->
    REP_TYPE  rep_type     ERROR_MR_SERVER
    REP_CODE  rep_code     MR_ADD_SERVER
    CARD32    seq_no
    CARD32    length
    ERR_CODE  err_code 2. DropServer:
    REQ_TYPE  req_type     REQUEST_MR_SERVER
    REQ_CODE  req_code     MR_DROP_SERVER
    CARD32    seq_no
    CARD32    length
    CARD32    src
    CARD32    room_id
    MEDIA     server
    STRING    user_desc Reply->
    REP_TYPE  rep_type     REPLY_MR_SERVER
    REP_CODE  rep_code     MR_DROP_SERVER
    CARD32    seq_no
    CARD32    length
```

```
    Error->
      REP_TYPE rep_type       ERROR_MR_SERVER
      REP_CODE rep_code       MR_DROP_SERVER
      CARD32   seq_no
      CARD32   length
      ERR_CODE err_code 3. SetServerAccessList:
      REQ_TYPE req_type       REQUEST_MR_SERVER
      REQ_CODE req_code       MR_SET_SERVER_ACCESS_LIST
      CARD32   seq_no
      CARD32   length
      CARD32   src
      CARD32   room_id
      MEDIA    server
      CARD32   list_length
      L_PARTICIPANT participant_list Reply->
      REP_TYPE rep_type       REPLY_MR_SERVER
      REP_CODE rep_code       MR_SET_SERVER_ACCESS_LIST
      CARD32   seq_no
      CARD32   length Error->
      REP_TYPE rep_type       ERROR_MR_SERVER
      REP_CODE rep_code       MR_SET_SERVER_ACCESS_LIST
      CARD32   seq_no
      CARD32   length
      ERR_CODE err_code 4. ListServers:
      REQ_TYPE req_type       REQUEST_MR_SERVER
      REQ_CODE req_code       MR_LIST_SERVERS
      CARD32   seq_no
      CARD32   length
      CARD32   src
      CARD32   room_id Reply->
      REP_TYPE rep_type       REPLY_MR_SERVER
      REP_CODE rep_code       MR_LIST_SERVERS
      CARD32   seq_no
      CARD32   length
      CARD32   list_length
      L_MEDIA  server_list Error->
      REP_TYPE rep_type       ERROR_MR_SERVER
      REP_CODE rep_code       MR_LIST_SERVERS
      CARD32   seq_no
      CARD32   length
      CARD32   err_code 5. GetServerInfo :
      REQ_TYPE req_type       REQUEST_MR_SERVER
      REQ_CODE req_code       MR_GET_SERVER_INFO
      CARD32   seq_no
      CARD32   length
      CARD32   src
      MEDIA    server
      STRING   user_desc Reply->
      REP_TYPE rep_type       REPLY_MR_SERVER
      REP_CODE rep_code       MR_GET_SERVER_INFO
```

```
    CARD32   seq_no
    CARD32   length
    SERV_CONN conn

Error->
    REP_TYPE rep_type    ERROR_MR_SERVER
    REP_CODE rep_code    MR_GET_SERVER_INFO
    CARD32   seq_no
    CARD32   length
    ERR_CODE err_code .H 2 "Name Service Messages"

1. CreateUser :
    REQ_TYPE req_type    REQUEST_REGISTRY_SERVER
    REQ_CODE req_code    REG_CREATE_USER
    CARD32   seq_no
    CARD32   length
    STRING   name
    CONN_LIST connection_list Reply->
    REP_TYPE rep_type    REPLY_REGISTRY_SERVER
    REP_CODE rep_code    REG_CREATE_USER
    CARD32   seq_no
    CARD32   length
    CARD32   id      ID Error->
    REP_TYPE rep_type    ERROR_REGISTRY_SERVER
    REP_CODE rep_code    REG_CREATE_USER
    CARD32   seq_no
    CARD32   length
    ERR_CODE err_code 2. CreateDuplicateUser :
    REQ_TYPE req_type    REQUEST_REGISTRY_SERVER
    REQ_CODE req_code    REG_CREATE_DUP_USER
    CARD32   seq_no
    CARD32   length
    CARD32   ID
    STRING   name
    CONN_LIST connection_list Reply->
    REP_TYPE rep_type    REPLY_REGISTRY_SERVER
    REP_CODE rep_code    REG_CREATE_DUP_USER
    CARD32   seq_no
    CARD32   length Error->
    REP_TYPE rep_type    ERROR_REGISTRY_SERVER
    REP_CODE rep_code    REG_CREATE_DUP_USER
    CARD32   seq_no
    CARD32   length
    ERR_CODE err_code 3. DeleteUser :
    REQ_TYPE req_type    REQUEST_REGISTRY_SERVER
    REQ_CODE req_code    REG_DELETE_USER
    CARD32   seq_no
    CARD32   length
    CARD32   ID
    CONN_LIST connection_list
```

```
    Reply->
    REP_TYPE  rep_type      REPLY_REGISTRY_SERVER
    REP_CODE  rep_code      REG_CHANGE_USER
    CARD32    seq_no
    CARD32    length Error->
    REP_TYPE  rep_type      ERROR_REGISTRY_SERVER
    REP_CODE  rep_code      REG_CHANGE_USER
    CARD32    seq_no
    CARD32    length
    ERR_CODE  err_code 4.  GetPersonInfo :
    REQ_TYPE  req_type      REQUEST_REGISTRY_SERVER
    REQ_CODE  req_code      REG_GET_PERSON_INFO
    CARD32    seq_no
    CARD32    length
    CARD32    part_id       ID Reply->
    REP_TYPE  rep_type      REPLY_REGISTRY_SERVER
    REP_CODE  rep_code      REG_GET_PERSON_INFO
    CARD32    seq_no
    CARD32    length
        CARD32    part_id
        STRING    name
    CARD32    list_length
    L_NM_CONNECTIONS list_of_all_connections Error->
    REP_TYPE  rep_type      ERROR_REGISTRY_SERVER
    REP_CODE  rep_code      REG_GET_PERSON_INFO
    CARD32    seq_no
    CARD32    length
    ERR_CODE  err_code 5.  CreateNMEntry:
    REQ_TYPE  req_type      REQUEST_REGISTRY_SERVER
    REQ_CODE  req_code      REG_CREATE_NM_ENTRY
    CARD32    seq_no
    CARD32    length
    NM_ADDR   nm_address
    RANGE_ID  range Reply->
    REP_TYPE  rep_type      REPLY_REGISTRY_SERVER
    REP_CODE  rep_code      REG_CREATE_NM_ENTRY
    CARD32    seq_no
    CARD32    length Error->
    REP_TYPE  rep_type      ERROR_REGISTRY_SERVER
    REP_CODE  rep_code      REG_CREATE_NM_ENTRY
    CARD32    seq_no
    CARD32    length
    ERR_CODE  err_code 6.  DeleteNMEntry:
    REQ_TYPE  req_type      REQUEST_REGISTRY_SERVER
    REQ_CODE  req_code      REG_DELETE_NM_ENTRY
    CARD32    seq_no
    CARD32    length
    NM_ADDR   nm_address Reply->
```

```
     REP_TYPE  rep_type    REPLY_REGISTRY_SERVER
     REP_CODE  rep_code    REG_DELETE_NM_ENTRY
     CARD32    seq_no
     CARD32    length Error->
     REP_TYPE  rep_type    ERROR_REGISTRY_SERVER
     REP_CODE  rep_code    REG_DELETE_NM_ENTRY
     CARD32    seq_no
     CARD32    length
     ERR_CODE  err_code 7. GetNMEntry:
     REQ_TYPE  req_type    REQUEST_REGISTRY_SERVER
     REQ_CODE  req_code    REG_GET_NM_ENTRY
     CARD32    seq_no
     CARD32    length
     CARD32    id Reply->
     REP_TYPE  rep_type    REPLY_REGISTRY_SERVER
     REP_CODE  rep_code    REG_GET_NM_ENTRY
     CARD32    seq_no
     CARD32    length
     NM_ADDR   nm_address Error->
     REP_TYPE  rep_type    ERROR_REGISTRY_SERVER
     REP_CODE  rep_code    REG_GET_NM_ENTRY
     CARD32    seq_no
     CARD32    length
     ERR_CODE  err_code 8. GetPhoneInfo :
     REQ_TYPE  req_type    REQUEST_REGISTRY_SERVER
     REQ_CODE  req_code    REG_GET_PHONE_INFO
     CARD32    seq_no
     CARD32    length
     CARD32    part_id     ID Reply->
     REP_TYPE  rep_type    REPLY_REGISTRY_SERVER
     REP_CODE  rep_code    REG_GET_PHONE_INFO
     CARD32    seq_no
     CARD32    length
        CARD32    part_id
        STRING    name
     CARD32    list_length
     L_PHONE_CONNECTIONS list_of_all_phone_numbers Error->
     REP_TYPE  rep_type    ERROR_REGISTRY_SERVER
     REP_CODE  rep_code    REG_GET_PHONE_INFO
     CARD32    seq_no
     CARD32    length
     ERR_CODE  err_code 8. GetVideoClassInfo :  // Return info about all devices with class_id, part_id
     REQ_TYPE  req_type    REQUEST_REGISTRY_SERVER
     REQ_CODE  req_code    REG_GET_VIDEO_CLASS_INFO
     CARD32    seq_no
     CARD32    length
     CARD32    participant_id //-ve pid means return with only class_id as match
     CARD32    class_id Reply->
```

```
    REP_TYPE rep_type      REPLY_REGISTRY_SERVER
    REP_CODE rep_code      REG_GET_VIDEO_CLASS_INFO
    CARD32   seq_no
    CARD32   length
    CARD32   list_length
    L_VIDEO_CONNECTIONS list_of_all_video_conns Error->
    REP_TYPE rep_type      ERROR_REGISTRY_SERVER
    REP_CODE rep_code      REG_GET_VIDEO_CLASS_INFO
    CARD32   seq_no
    CARD32   length
    CARD32   participant_id
    ERR_CODE err_code 8. GetVideoDevInfo :
    REQ_TYPE req_type      REQUEST_REGISTRY_SERVER
    REQ_CODE req_code      REG_GET_VIDEO_DEV_INFO
    CARD32   seq_no
    CARD32   length
    CARD32   vid Reply->
    REP_TYPE rep_type      REPLY_REGISTRY_SERVER
    REP_CODE rep_code      REG_GET_VIDEO_DEV_INFO
    CARD32   seq_no
    CARD32   length
        VIDEO_LIST vid_list Error->
    REP_TYPE rep_type      ERROR_REGISTRY_SERVER
    REP_CODE rep_code      REG_GET_VIDEO_DEV_INFO
    CARD32   seq_no
    CARD32   length
    ERR_CODE err_code 9. GetVideoDeviceList :
    REQ_TYPE req_type      REQUEST_REGISTRY_SERVER
    REQ_CODE req_code      REG_GET_VIDEO_DEV_LIST
    CARD32   seq_no
    CARD32   length Reply->
    REP_TYPE rep_type      REPLY_REGISTRY_SERVER
    REP_CODE rep_code      REG_GET_VIDEO_DEV_LIST
    CARD32   seq_no
    CARD32   length
    VIDEO_LIST vid_list Error->
    REP_TYPE rep_type      ERROR_REGISTRY_SERVER
    REP_CODE rep_code      REG_GET_VIDEO_DEV_INFO
    CARD32   seq_no
    CARD32   length
    ERR_CODE err_code .H 1 "Protocol between Conversation Managers"

.H 2 "Requests"

1. ShowAssociatedRoom:
    REQ_TYPE req_type      REQUEST_CM            57
    REQ_CODE req_code      CM_SHOW_ASSOCIATED_ROOM
```

```
    CARD32    seq_no
    CARD32    length
    CARD32    src
    CARD32    meeting_id Reply->
    REP_TYPE  rep_type    REPLY_CM
    REP_CODE  req_code    CM_SHOW_ASSOCIATED_ROOM
    CARD32    seq_no
    CARD32    length
    CARD32    src
    CARD32    room_id Error->
    REP_TYPE  rep_type    REPLY_CM
    REP_CODE  req_code    CM_SHOW_ASSOCIATED_ROOM
    CARD32    seq_no
    CARD32    length
    ERR_CODE  err_code 2. ShowAssociatedMeeting:
    REQ_TYPE  req_type    REQUEST_CM
    REQ_CODE  req_code    CM_SHOW_ASSOCIATED_MEETING
    CARD32    seq_no
    CARD32    length
    CARD32    src
    CARD32    room_id Reply->
    REP_TYPE  rep_type    REPLY_CM
    REP_CODE  req_code    CM_SHOW_ASSOCIATED_MEETING
    CARD32    seq_no
    CARD32    length
    CARD32    src
    CARD32    meeting_id Error->
    REP_TYPE  rep_type    REPLY_CM
    REP_CODE  req_code    CM_SHOW_ASSOCIATED_MEETING
    CARD32    seq_no
    CARD32    length
    ERR_CODE  err_code .H 2 "Events"

1. EveMeetingInvite:
    REQ_TYPE  req_type    EVENT_CM
    REQ_CODE  req_code    EVE_MEETING_INVITE
    CARD32    seq_no
    CARD32    length
    CARD32    src
    STRING    src_name
    CARD32    room_id
    CARD32    meeting_id
    CARD32    list_length
    L_MEDIA   server_list
        CARD32    list_length
        L_PART_MED_INFO  part_list 2. EveAcceptInvitation :
    REQ_TYPE  req_type    EVENT_CM
    REQ_CODE  req_code    EVE_ACCEPT_INVITATION
    CARD32    seq_no
    CARD32    length
    CARD32    src
```

```
        CARD32    room_id
        CARD32    meeting_id
        CARD32    list_length
        L_MEDIA   server_list 3. EveMeetingJoin :
        REQ_TYPE  req_type    EVENT_CM
        REQ_CODE  req_code    EVE_MEETING_JOIN
        CARD32    seq_no
        CARD32    length
        CARD32    src
        CARD32    room_id
        CARD32    meeting_id 4. EveAddedParticipant :
        REP_TYPE  rep_type    EVENT_CM
        REP_CODE  rep_code    EVE_ADDED_PARTICIPANT
        CARD32    seq_no
        CARD32    length
        CARD32    src
        CARD32    room_id
        CARD32    meeting_id
        CARD32    participant
        CARD32    list_length
        L_MEDIA_SERV_INFO media_list 5. EveDroppedParticipant:
        REP_TYPE  rep_type    EVENT_CM
        REP_CODE  rep_code    EVE_DROPPED_PARTICIPANT
        CARD32    seq_no
        CARD32    length
        CARD32    src
        CARD32    room_id
        CARD32    meeting_id
        CARD32    participant 6. EveMeetingDestroyed:
        REP_TYPE  rep_type    EVENT_CM
        REP_CODE  rep_code    EVE_MEETING_DESTROYED
        CARD32    seq_no
        CARD32    length
        CARD32    src
        CARD32    room_id
        CARD32    meeting_id 7. EveRoomDestroyed:
        REP_TYPE  rep_type    EVENT_CM
        REP_CODE  rep_code    EVE_ROOM_DESTROYED
        CARD32    seq_no
        CARD32    length
        CARD32    src
        CARD32    room_id 8. EveLeftMeeting:
        REP_TYPE  rep_type    EVENT_CM
        REP_CODE  rep_code    EVE_LEFT_MEETING
        CARD32    seq_no
        CARD32    length
        CARD32    src
        CARD32    room_id
        CARD32    meeting_id
        CARD32    person_id
        CARD32    list_length
        L_MEDIA   server_list 9. EveReenterMeeting:
```

```
    REP_TYPE  rep_type      EVENT_CM
    REP_CODE  rep_code      EVE_REENTER_MEETING
    CARD32    seq_no
    CARD32    length
    CARD32    src
    CARD32    room_id
    CARD32    meeting_id
    CARD32    person_id
    CARD32    list_length
    L_MEDIA   server_list 10. EveMeetingSuspended:
    REP_TYPE  rep_type      EVENT_CM
    REP_CODE  rep_code      EVE_MEETING_SUSPENDED
    CARD32    seq_no
    CARD32    length
    CARD32    src
    CARD32    room_id
    CARD32    meeting_id 11. EveMeetingResumed:
    REP_TYPE  rep_type      EVENT_CM
    REP_CODE  rep_code      EVE_MEETING_RESUMED
    CARD32    seq_no
    CARD32    length
    CARD32    src
    CARD32    room_id
    CARD32    meeting_id 12. EveServerAdded:
    REP_TYPE  rep_type      EVENT_CM
    REP_CODE  rep_code      EVE_SERVER_ADDED
    CARD32    seq_no
    CARD32    length
    CARD32    src
    CARD32    room_id
    CARD32    meeting_id
    MEDIA_SERV_INFO media_info
    CARD32    list_len
    L_PARTICIPANT part_list // participant list  who have access 13. EveServerDropped:
    REP_TYPE  rep_type      EVENT_CM
    REP_CODE  rep_code      EVE_SERVER_DROPPED
    CARD32    seq_no
    CARD32    length
    CARD32    src
    CARD32    room_id
    CARD32    meeting_id 14. EveRoomLocked:
    REP_TYPE  rep_type      EVENT_CM
    REP_CODE  rep_code      EVE_ROOM_LOCKED
    CARD32    seq_no
    CARD32    length
    CARD32    src
    CARD32    room_id 16. EveRoomUnocked:
    REP_TYPE  rep_type      EVENT_CM
    REP_CODE  rep_code      EVE_ROOM_UNLOCKED
    CARD32    seq_no
    CARD32    length
    CARD32    src
    CARD32    room_id
```

17. EveServerAccessListSet:
    REP_TYPE  rep_type     EVENT_CM
    REP_CODE  rep_code     EVE_SERVER_ACCESS_LIST_SET
    CARD32    seq_no
    CARD32    length
    CARD32    src
    MEDIA     media number
    STRING    media name
    CARD32    list_length
    L_PARTICIPANT  part_list  //list of participants granted access 18. EveServerAccessDenied:
    REP_TYPE  rep_type     EVENT_CM
    REP_CODE  rep_code     EVE_SERVER_ACCESS_DENIED
    CARD32    seq_no
    CARD32    length
    CARD32    src
    MEDIA     media number
    STRING    media name
    CARD32    participant 19. EveRejectInvitation:
    REP_TYPE  rep_type     EVENT_CM
    REP_CODE  rep_code     EVE_REJECT_INVITATION
    CARD32    seq_no
    CARD32    length
    CARD32    src
    CARD32    room_id
    CARD32    meeting_id .H 1 "Media Server Messages"

.H 2 "Generic Requests to Media Servers"

1. AssociateServer:
    REQ_TYPE  req_type     REQUEST_GEN_SERVER
    REQ_CODE  req_code     GEN_ASSOCIATE_SERVER
    CARD32    seq_no
    CARD32    length
    CARD32    room_id Reply->
    REP_TYPE  rep_type     REPLY_GEN_SERVER
    REP_CODE  rep_code     GEN_ASSOCIATE_SERVER
    CARD32    seq_no
    CARD32    length
    CARD32     port Error->
    REP_TYPE  rep_type     ERROR_GEN_SERVER
    REP_CODE  rep_code     GEN_ASSOCIATE_SERVER
    CARD32    seq_no
    CARD32    length
    ERR_CODE  err_code 2. DisassociateServer:
    REQ_TYPE  req_type     REQUEST_GEN_SERVER
    REQ_CODE  req_code     GEN_DISASSOCIATE_SERVER
    CARD32    seq_no
    CARD32    length
    CARD32    room_id Reply->
    REP_TYPE  rep_type     REPLY_GEN_SERVER
    REP_CODE  rep_code     GEN_DISASSOCIATE_SERVER

```
    CARD32    seq_no
    CARD32    length

Error->
    REP_TYPE  rep_type    ERROR_GEN_SERVER
    REP_CODE  rep_code    GEN_DISASSOCIATE_SERVER
    CARD32    seq_no
    CARD32    length
    ERR_CODE  err_code 3. SetAccessList:
    REQ_TYPE  req_type    REQUEST_GEN_SERVER
    REQ_CODE  req_code    GEN_SET_ACCESS_LIST
    CARD32    seq_no
    CARD32    length
    CARD32    room_id
    CARD32    list_length
    L_PARTICIPANT participant_list Reply->
    REP_TYPE  rep_type    REPLY_GEN_SERVER
    REP_CODE  rep_code    GEN_SET_ACCESS_LIST
    CARD32    seq_no
    CARD32    length Error->
    REP_TYPE  rep_type    ERROR_GEN_SERVER
    REP_CODE  rep_code    GEN_SET_ACCESS_LIST
    CARD32    seq_no
    CARD32    length
    ERR_CODE  err_code .H 2 "Events from MR Server to Media Servers"

1. EveAddedParticipant :
    REP_TYPE  rep_type    EVENT_MR_SERVER
    REP_CODE  rep_code    EVE_ADDED_PARTICIPANT
    CARD32    seq_no
    CARD32    length
    CARD32     room_id
    CARD32    meeting_id
    CARD32    participant 2. EveDroppedParticipant:
    REP_TYPE  rep_type    EVENT_MR_SERVER
    REP_CODE  rep_code    EVE_DROPPED_PARTICIPANT
    CARD32    seq_no
    CARD32    length
    CARD32     room_id
    CARD32    meeting_id
    CARD32    participant 3. EveMeetingCreated:
    REP_TYPE  rep_type    EVENT_MR_SERVER
    REP_CODE  rep_code    EVE_MEETING_CREATED
    CARD32    seq_no
    CARD32    length
    CARD32     room_id
    CARD32    meeting_id 4. EveMeetingDestroyed:
    REP_TYPE  rep_type    EVENT_MR_SERVER
    REP_CODE  rep_code    EVE_MEETING_DESTROYED
    CARD32    seq_no
    CARD32    length
```

```
        CARD32    room_id
        CARD32    meeting_id

5. EveRoomDestroyed:
        REP_TYPE  rep_type     EVENT_MR_SERVER
        REP_CODE  rep_code     EVE_ROOM_DESTROYED
        CARD32    seq_no
        CARD32    length
        CARD32    src
        CARD32    room_id 6. EveLeftMeeting:
        REP_TYPE  rep_type     EVENT_MR_SERVER
        REP_CODE  rep_code     EVE_LEFT_MEETING
        CARD32    seq_no
        CARD32    length
        CARD32    room_id
        CARD32    meeting_id
        CARD32    person_id 7. EveReenterMeeting:
        REP_TYPE  rep_type     EVENT_MR_SERVER
        REP_CODE  rep_code     EVE_REENTER_MEETING
        CARD32    seq_no
        CARD32    length
        CARD32    room_id
        CARD32    meeting_id
        CARD32    person_id 8. EveMeetingSuspended:
        REP_TYPE  rep_type     EVENT_MR_SERVER
        REP_CODE  rep_code     EVE_MEETING_SUSPENDED
        CARD32    seq_no
        CARD32    length
        CARD32    room_id
        CARD32    meeting_id 9. EveMeetingResumed:
        REP_TYPE  rep_type     EVENT_MR_SERVER
        REP_CODE  rep_code     EVE_MEETING_RESUMED
        CARD32    seq_no
        CARD32    length
        CARD32    room_id
        CARD32    meeting_id

.H 2 "X BRIDGE MESSAGES"

1. CreateApplication :
        REQ_TYPE  req_type     REQUEST_X_BRIDGE
        REQ_CODE  req_code     X_CREATE_APPL
        CARD32    seq_no
        CARD32    length
        CARD32    src
        CARD32    room_id
        CARD32    machine
        STRING    appl_name
        /* application attribs here */

Reply->
       None

Error->
        REP_TYPE  rep_type     ERROR_X_BRIDGE
        REP_CODE  rep_code     X_CREATE_APPL
        CARD32    seq_no
        CARD32    length
```

```
    ERR_CODE  err_code

2. AssociateApplication :
    REQ_TYPE  req_type    REQUEST_X_BRIDGE
    REQ_CODE  req_code    X_ASSOCIATE_APPL
    CARD32    seq_no
    CARD32    length
    CARD32    src
    CARD32    room_id
    APPL_ID   appl_id Reply->
   None Error->
    REP_TYPE  rep_type    ERROR_X_BRIDGE
    REP_CODE  rep_code    X_ASSOCIATE_APPL
    CARD32    seq_no
    CARD32    length
    ERR_CODE  err_code 3. DisassociateApplication :
    REQ_TYPE  req_type    REQUEST_X_BRIDGE
    REQ_CODE  req_code    X_DISASSOCIATE_APPL
    CARD32    seq_no
    CARD32    length
    CARD32    src
    APPL_ID   appl_id Reply->
   None Error->
    REP_TYPE  rep_type    ERROR_X_BRIDGE
    REP_CODE  rep_code    X_DISASSOCIATE_APPL
    CARD32    seq_no
    CARD32    length
    ERR_CODE  err_code 4. DestroyApplication :
    REQ_TYPE  req_type    REQUEST_X_BRIDGE
    REQ_CODE  req_code    X_DESTROY_APPL
    CARD32    seq_no
    CARD32    length
    CARD32    src
    APPL_ID   appl_id Reply->
   None Error->
    REP_TYPE  rep_type    ERROR_X_BRIDGE
    REP_CODE  rep_code    X_DESTROY_APPL
    CARD32    seq_no
    CARD32    length
    ERR_CODE  err_code 5. SetInputFilter :
    REQ_TYPE  req_type    REQUEST_X_BRIDGE
    REQ_CODE  req_code    X_SET_INPUT
    CARD32    seq_no
    CARD32    length
    CARD32    src
    APPL_ID   appl_id
    CARD32    list_length
    L_PART_INMODE  part_mode_list
```

64

```
    Reply->
     None

Error->
     REP_TYPE rep_type      ERROR_X_BRIDGE
     REP_CODE rep_code      X_SET_INPUT
     CARD32   seq_no
     CARD32   length
     ERR_CODE err_code 6. SetOutputFilter :
     REQ_TYPE req_type      REQUEST_X_BRIDGE
     REQ_CODE req_code      X_SET_OUTPUT
     CARD32   seq_no
     CARD32   length
     CARD32   src
     APPL_ID  appl_id
     CARD32   list_length
     L_PART_OUTMODE part_mode_list Reply->
     None Error->
     REP_TYPE rep_type      ERROR_X_BRIDGE
     REP_CODE rep_code      X_SET_OUTPUT
     CARD32   seq_no
     CARD32   length
     ERR_CODE err_code 7. GetApplicationStatus :
     REQ_TYPE req_type      REQUEST_X_BRIDGE
     REQ_CODE req_code      X_APPL_STATUS
     CARD32   seq_no
     CARD32   length
     CARD32   src
     APPL_ID  appl_id Reply->
     REP_TYPE rep_type      REPLY_X_BRIDGE
     REP_CODE rep_code      X_APPL_STATUS
     CARD32   seq_no
     CARD32   length
     APPL_STATUS appl_stat Error->
     REP_TYPE rep_type      ERROR_X_BRIDGE
     REP_CODE rep_code      X_APPL_STATUS
     CARD32   seq_no
     CARD32   length
     ERR_CODE err_code 8. ListApplicationsInRoom :
     REQ_TYPE req_type      REQUEST_X_BRIDGE
     REQ_CODE req_code      X_LIST_ROOM_APPLS
     CARD32   seq_no
     CARD32   length
     CARD32   src
     CARD32   room_id Reply->
     REP_TYPE rep_type      REPLY_X_BRIDGE
     REP_CODE rep_code      X_LIST_ROOM_APPLS
     CARD32   seq_no
     CARD32   length
```

```
    CARD32    list_length
    L_APPL    appl_list

Error->
     REP_TYPE  rep_type    ERROR_X_BRIDGE
     REP_CODE  rep_code    X_LIST_ROOM_APPLS
     CARD32    seq_no
     CARD32    length
     ERR_CODE  err_code .H 2 "Requests from X Bridge to local X managers"

1. StartApplication :
    REQ_TYPE  req_type    REQUEST_LOCALX
    REQ_CODE  req_code    LOCX_START_APPL
    CARD32    seq_no
    CARD32    length
    CARD32    src
    APPL_ID   appl_id
    STRING    appl_name Reply->
     REP_TYPE  rep_type    REPLY_LOCALX
     REP_CODE  rep_code    LOCX_START_APPL
     CARD32    seq_no
     CARD32    length
     CARD8     status         // success or failure Error->
     REP_TYPE  rep_type    ERROR_LOCALX
     REP_CODE  rep_code    LOCX_START_APPL
     CARD32    seq_no
     CARD32    length
     ERR_CODE  err_code 2. KillApplication :
    REQ_TYPE  req_type    REQUEST_LOCALX
    REQ_CODE  req_code    LOCX_KILL_APPL
    CARD32    seq_no
    CARD32    length
    CARD32    src
    APPL_ID   appl_id Reply->
    None Error->
    None .H 2 "Events from X Bridge to local X managers"

1. EveApplicationAdded :
    REP_TYPE  rep_type    EVENT_X_BRIDGE
    REP_CODE  rep_code    EVE_X_APPL_ADDED
    CARD32    seq_no
    CARD32    length
    APPL_ID   appl_id 2. EveApplicationAssociated :
    REP_TYPE  rep_type    EVENT_X_BRIDGE
    REP_CODE  rep_code    EVE_X_APPL_ASSOCIATED
    CARD32    seq_no
    CARD32    length
    APPL_ID   appl_id 3. EveApplicationDestroyed :
```

```
    REP_TYPE rep_type    EVENT_X_BRIDGE
    REP_CODE rep_code    EVE_X_APPL_DESTROYED
    CARD32   seq_no
    CARD32   length
    APPL_ID  appl_id 4. EveApplicationDisassociated :
    REP_TYPE rep_type    EVENT_X_BRIDGE
    REP_CODE rep_code    EVE_X_APPL_DISASSOCIATED
    CARD32   seq_no
    CARD32   length
    APPL_ID  appl_id 5. EveInputFilterSet :
    REP_TYPE rep_type    EVENT_X_BRIDGE
    REP_CODE rep_code    EVE_X_INPUT_SET
    CARD32   seq_no
    CARD32   length
    APPL_ID  appl_id
    APPL_MODE mode 6. EveOutputFilterSet :
    REP_TYPE rep_type    EVENT_X_BRIDGE
    REP_CODE rep_code    EVE_X_OUTPUT_SET
    CARD32   seq_no
    CARD32   length
    APPL_ID  appl_id
    APPL_MODE mode

.H 2 "VIDEO BRIDGE MESSAGES"

.H 3 "Protocol between Video Bridge and Local Video Manager"

1. Input_filter:
    REQ_TYPE req_type    REQUEST_VIDEO_BRIDGE
    REQ_CODE req_code    VID_INPUT_FILTER
    CARD32   seq_no
    CARD32   length
    CARD32   room_id
    CARD32   src          ID
    CARD32   list_length
    L_INP_FILT filt_participants Reply->
    None Error->
    REP_TYPE rep_type    ERROR_VIDEO_BRIDGE
    REP_CODE rep_code    VID_INPUT_FILTER
    CARD32   seq_no
    CARD32   length
    ERR_CODE err_code 2. Output_filter:
    REQ_TYPE req_type    REQUEST_VIDEO_BRIDGE
    REQ_CODE req_code    VID_OUTPUT_FILTER
    CARD32   seq_no
    CARD32   length
    CARD32   room_id
    CARD32   src          ID
    CARD32   list_length
    L_INP_FILT filt_participants Reply->
    None
```

```
     Error->
       REP_TYPE rep_type    ERROR_VIDEO_BRIDGE
       REP_CODE rep_code    VID_OUTPUT_FILTER
       CARD32   seq_no
       CARD32   length
       ERR_CODE err_code 3. Start_logging:
       REQ_TYPE req_type    REQUEST_VIDEO_BRIDGE
       REQ_CODE req_code    VID_START_LOGGING
       CARD32   seq_no
       CARD32   length
       CARD32   room_id
       CARD32   src         ID
       STRING   log_params Reply->
     None Error->
       REP_TYPE rep_type    ERROR_VIDEO_BRIDGE
       REP_CODE rep_code    VID_START_LOGGING
       CARD32   seq_no
       CARD32   length
       ERR_CODE err_code 4. Stop_logging:
       REQ_TYPE req_type    REQUEST_VIDEO_BRIDGE
       REQ_CODE req_code    VID_STOP_LOGGING
       CARD32   seq_no
       CARD32   length
       CARD32   src         ID
       CARD32   room_id Reply->
     None Error->
       REP_TYPE rep_type    ERROR_VIDEO_BRIDGE
       REP_CODE rep_code    VID_STOP_LOGGING
       CARD32   seq_no
       CARD32   length
       ERR_CODE err_code 5. Set_switch_params
       REQ_TYPE req_type    REQUEST_VIDEO_BRIDGE
       REQ_CODE req_code    VID_SET_SWITCH_PARAMS
       CARD32   seq_no
       CARD32   length
       CARD32   src         ID
       VID_SWITCH_PARAMS vid_sw Reply->
     None Error->
       REP_TYPE rep_type    ERROR_VIDEO_BRIDGE
       REP_CODE rep_code    VID_SET_SWITCH_PARAMS
       CARD32   seq_no
       CARD32   length
       ERR_CODE err_code .H 2 "Protocol between Video Bridges"

Requests:
```

1. Device_Info :
     REQ_TYPE  req_type    REQUEST_VIDEO_BRIDGE
     REQ_CODE  req_code    VID_DEVICE_INFO
     CARD32    seq_no
     CARD32    length Reply->
     REP_TYPE  rep_type    REPLY_VIDEO_BRIDGE
     REP_CODE  rep_code    VID_DEVICE_INFO
     CARD32    seq_no
     CARD32    length
     VID_DEV_INFO vid_dev Error->
   None 2. Send_Single:
     REQ_TYPE  req_type    REQUEST_VIDEO_BRIDGE
     REQ_CODE  req_code    VID_SEND_SINGLE
     CARD32    seq_no
     CARD32    length
     PARTICIPANT src Reply->
     REQ_TYPE  req_type    REPLY_VIDEO_BRIDGE
     REQ_CODE  req_code    VID_SEND_SINGLE
     CARD32    seq_no
     CARD32    length
     VID_SINGLE_INFO info Error->
     REQ_TYPE  req_type    ERROR_VIDEO_BRIDGE
     REQ_CODE  req_code    VID_SEND_SINGLE
     CARD32    seq_no
     CARD32    length
     ERR_CODE  error 3. Send_Composite :
     REQ_TYPE  req_type    REQUEST_VIDEO_BRIDGE
     REQ_CODE  req_code    VID_SEND_COMPOSITE
     CARD32    seq_no
     CARD32    length
     CARD32    list_length
     L_PARTICIPANT participant_list Reply->
     REQ_TYPE  req_type    REPLY_VIDEO_BRIDGE
     REQ_CODE  req_code    VID_SEND_COMPOSITE
     CARD32    seq_no
     CARD32    length
     VID_COMPOSITE_INFO info Error->
     REQ_TYPE  req_type    ERROR_VIDEO_BRIDGE
     REQ_CODE  req_code    VID_SEND_COMPOSITE
     CARD32    seq_no
     CARD32    length
     ERR_CODE  error .H 1 "Events from Local Interface to Local Media Managers"

1. SuspendServer:
     REQ_TYPE  req_type    EVENT_CM
     REQ_CODE  req_code    MAN_SUSPEND_MANAGER
     CARD32    seq_no
     CARD32    length 2. ResumeServer :
    REQ_TYPE  req_type    EVENT_CM
    REQ_CODE  req_code    MAN_RESUME_MANAGER
    CARD32    seq_no
    CARD32    length 3. ConnectToBridge :
    REQ_TYPE  req_type    EVENT_CM
    REQ_CODE  req_code    MAN_CONNECT_TO_BRIDGE
    CARD32    seq_no
    CARD32    length
    CARD32    room_id
    SERV_CONN server_connection 4. DisconnectFromBridge :
    REQ_TYPE  req_type    EVENT_CM
    REQ_CODE  req_code    MAN_DISCONNECT_FROM_BRIDGE
    CARD32    seq_no
    CARD32    length
    CARD32    room_id .H 1 "Events from Local Media Managers to Conversation Manager"

1. ManagerUp :
    REQ_TYPE  req_type    EVENT_MAN
    REQ_CODE  req_code    EVE_MAN_UP
    CARD32    seq_no
    CARD32    length
    MEDIA     media
    STRING    udesc 2. StateChange :
    REQ_TYPE  req_type    EVENT_MAN
    REQ_CODE  req_code    EVE_STATE_CHANGE
    CARD32    seq_no
    CARD32    length
    CARD8     state       // code: CONNECTION_NORMAL = 1, CONNECTION_BROKEN = 0

.H 1 "Events from Conversation Manager to Local Media Managers"

1. ParticipantInfo :
    REQ_TYPE   req_type    EVENT_CM
    REQ_CODE   req_code    EVE_PARTICIPANT_INFO
    CARD32     seq_no
    CARD32     length
    STRING     participant_name
    PARTICIPANT participant_id .H 1 "Requests from Conversation Manager to VI"

1. MeetingInvitation:
    REQ_TYPE  req_type    REQUEST_VI
    REQ_CODE  req_code    VI_MEETING_INVITATION
    CARD32    seq_no
    CARD32    length
    CARD32    meeting_id        //the real id
    CARD32    participant_id
    CARD32    list_length
    L_MEDIA   media Reply->
    REP_TYPE  rep_type    REPLY_VI
    REP_CODE  rep_code    VI_MEETING_INVITATION
    CARD32    seq_no

```
       CARD32    length
       CARD8     status            //0 = rejected, 1 = accepted
       CARD32    pseudo_meeting_id
       CARD32    list_length
       L_MEDIA   media Error->
       REP_TYPE  rep_type    ERROR_VI
       REP_CODE  rep_code    VI_MEETING_INVITATION
       CARD32    seq_no
       CARD32    length
       ERR_CODE  err_code .H 1 "Events from CM to VI"

1. AddedParticipant:
       REP_TYPE  rep_type    EVENT_CM
       REP_CODE  rep_code    EVE_VI_ADDED_PARTICIPANT
       CARD32    seq_no
       CARD32    length
       CARD8     status            //0 = failed, 1 = success
       CARD32    pseudo_meeting_id
       CARD32    participant_id
       CARD32    list_length
       L_MEDIA   media .H 1 "Events from VI to CM"

1. VIUp :
       REQ_TYPE  req_type    EVENT_VI
       REQ_CODE  req_code    EVE_VI_UP
       CARD32    seq_no
       CARD32    length      //length is zero 1. CreateMeeting:
       REP_TYPE  rep_type    EVENT_VI
       REP_CODE  rep_code    EVE_CREATE_MEETING
       CARD32    seq_no
       CARD32    length
       CARD32    pseudo_meeting_id
       CARD32    participant_id
       CARD8     audio_flag        //0 = media absent, 1 = media included
       CARD8     video_flag
       CARD8     xwin_flag 2. CreatePersistentMeeting:
       REP_TYPE  rep_type    EVENT_VI
       REP_CODE  rep_code    EVE_CREATE_PERSISTENT_MEETING
       CARD32    seq_no
       CARD32    length
       CARD32    pseudo_meeting_id
       CARD32    participant_id
       CARD8     audio_flag        //0 = media absent, 1 = media included
       CARD8     video_flag
       CARD8     xwin_flag Protocol between Video Manager and Visual Interface :

Events from Visual Interface to Local Video Manager
1. OpenDisplay :
   REP_TYPE rep_type EVENT_VI
   REP_CODE rep_code EVE_OPEN_DISPLAY
   CARD32 seq_no
   CARD32 length
```

```
2. ViewParticipant :
     REP_TYPE  rep_type    EVENT_VI
     REP_CODE  rep_code    EVE_VIEW_PARTICIPANT
     CARD32    seq_no
     CARD32    length
     CARD32    display_desc
     CARD32    room_id
     CARD32    part_id
         CARD32    xpos                    // upper left hand corner
         CARD32    ypos
         CARD32    window_size   // 1 - full size, 2 - half size, 3 ...

/******* don't know if needed, too similar to one next *****/
2. ViewVideoSrc :
     REP_TYPE  rep_type    EVENT_VI
     REP_CODE  rep_code    EVE_VIEW_VIDEO_SRC
     CARD32    seq_no
     CARD32    length
     CARD32    display_desc
     CARD32    room_id
     CARD32    vid
         CARD32    xpos                    // upper left hand corner
         CARD32    ypos
         CARD32    window_size   // 1 - full size, 2 - half size, 3 ...
/***************/

3. ShareVideo :
     REP_TYPE  rep_type    EVENT_VI
     REP_CODE  rep_code    EVE_SHARE_VIDEO
     CARD32    seq_no
     CARD32    length
     CARD32    display_desc
     CARD32    room_id
     CARD32    vid
         CARD32    xpos                    // upper left hand corner
         CARD32    ypos
         CARD32    window_size   // 1 - full size, 2 - half size, 3 ...

4. GetVideoId :
     REP_TYPE  rep_type    EVENT_VI
     REP_CODE  rep_code    EVE_GET_VIDEO_ID
     CARD32    seq_no
     CARD32    length
         STRING    description 5. SetVideoDisplayParams :
     REP_TYPE  rep_type    EVENT_VI
     REP_CODE  rep_code    EVE_SET_VIDEO_DISPLAY_PARAMS
     CARD32    seq_no
     CARD32    length
         CARD32    display_desc
         CARD32    xpos                    // upper left hand corner
         CARD32    ypos
         CARD32    window_size   // 1 - full size, 2 - half size, 3 ...
         STRING    chroma_key 6  CloseDisplay :
     REP_TYPE  rep_type    EVENT_VI
     REP_CODE  rep_code    EVENT_CLOSE_DISPLAY
     CARD32    seq_no
     CARD32    length
     CARD32    display_descriptor
```

Protocol between Visual Interface and Video Manager:
Events from Local Video Manager to Visual Interface 1. DisplayDescInfo
    REP_TYPE  rep_type  EVENT_VIDEO_MGR
    REP_CODE  rep_code  EVE_DISPLAY_DESC
    CARD32    seq_no
    CARD32    length
    CARD32    display_descriptor 2. GetVideoId :
    REP_TYPE  rep_type  EVENT_VIDEO_MGR
    REP_CODE  rep_code  EVE_GET_VIDEO_ID
    CARD32    seq_no
    CARD32    length
    CARD32        video_id  // returned value 3. VideoRequestFail :
    REP_TYPE  rep_type  EVENT_VIDEO_MGR
    REP_CODE  rep_code  EVE_SHARE_VIDEO
    CARD32    seq_no
    CARD32    length
    CARD32    room_id
    CARD32    display_descriptor
    CARD32    filiure_type    /** shared_dev_in_use, dev_not_available,
                                   request_preempted **/

4. SharedVideoInvite :
    REP_TYPE  rep_type  EVENT_VIDEO_MGR
    REP_CODE  rep_code  EVE_SHARED_VIDEO_INVITE
    CARD32    seq_no
    CARD32    length
    CARD32    room_id 5. SharedVideoAccept :
    REP_TYPE  rep_type  EVENT_VIDEO_MGR
    REP_CODE  rep_code  EVE_SHARED_VIDEO_ACCEPT
    CARD32    seq_no
    CARD32    length
    CARD32    room_id
    CARD32    display_descriptor

```
.tr ~
.TL
MR: A Multimedia Meeting Service (Appendices)
.AU "J. Robert Ensor" JRE HO 11353 2979 4F-607 vax135!jre
.AU "Murali Aravamudan" MA MH 51152 7396 7E-418 ulysses!mur
.MT 0
.bp
.HU "APPENDIX A"
.DF
PROTOCOL TYPE DEFINITIONS:

BYTE:    8-bit value
INT8:    8-bit signed integer
INT16:   16-bit signed integer
INT32:   32-bit signed integer
CARD8:   8-bit unsigned integer
CARD16:  16-bit unsigned integer
CARD32:  32-bit unsigned integer REQ_TYPE: CARD8
REQ_CODE: CARD8
ERR_CODE: CARD32
STRING: [CARD32, <item>] // length, actual string id length*CARD8
L_ROOM:   ListOfCARD32
FULL_ROOM: [CARD32, STRING] // room_id, room_name
L_FULL_ROOM:    ListOfFULL_ROOM
PARTICIPANT: CARD32 // ID
L_PARTICIPANT: ListOfPARTICIPANT
MEDIA: CARD8 // 0 - Audio, 1 - Phone, 2 - Video, 3 - XWindows,
                // 4 - MSWindows 5 - Mac  6 - C
```

```
:wq

L_MEDIA: ListOfMEDIA

STATUS: CARD8  // 0=EMPTY_ROOM, 1=ROOM_W_MEETING, 2=ROOM_W_RESOURCES,
              // 3=ROOM_W_MEETING_RESOURCES, 4=ROOM_W_SUSPENDED_MEETING

LOCK_STATUS: CARD8  // 0=LOCKED, 1=UNLOCKED

ROOM_ATTRIB: CARD32
MEETING_ATTRIB: CARD8

CONN_LIST: [STRING, CARD32]  // <Machine, Port>
PHONE_LIST: [STRING, STRING, STRING, STRING, STRING, STRING, STRING, STRING]
            which is [LocationCode, OutsideDialPrefix, InterexchangeCarrier,
                            AreaCode, Phone, InternalPhone, CountryE
                            CountryCode]
VIDEO_LIST : [CARD32, CARD32, String, String, String, String, String,
              String, CARD32, CARD32, CARD32, CARD32]
            which is [vid, vid_dev_type, function, location_mach,
        loc_mach_add, control_mach, control_mach_add, control_dev,
        switch_type, io_type, io_number, pid]
L_CONNECTIONS: ListOfCONN_LIST
L_NM_CONNECTIONS: ListOfCONN_LIST
L_PHONE_CONNECTIONS: ListOfPHONE_LIST
L_VIDEO_CONNECTIONS: ListOfVIDEO_LIST

NM_ADDR: <STRING, CARD32>
RANGE_ID: <CARD32, CARD32>

SERV_CONN_TYPE: CARD8  // 0 for X like connections, 1 for Uninterpreted

SERV_CONN: <STRING, CARD32>

SERVER_DESC: [MEDIA, STRING, SERV_CONN, STRING, STRING]
L_SERVERS : ListOfSERVER_DESC MEDIA_SERV_INFO: [MEDIA, SERV_CONN]
L_MEDIA_SERV_INFO: ListOfMEDIA_SERV_INFO MR_EVENTS: CARD32  // meeting_destroyed, server_added etc.
L_MR_EVENTS: ListOfMR_EVENTS PART_SERV: [PARTICIPANT, MEDIA]
L_PART_SERV: ListOfPART_SERV

.DE

.bp
.HU "APPENDIX B"
.DF
PROTOCOL MESSAGE HEADER STRUCTURE:

Three classes of messages between Server-Client:
        (i) Requests (Client -> Server)
        (ii) Replies (Server -> Client)
        (iii) Events (Server -> Client)
        (iv) Errors  (Server -> Client)
Here 'Server' can be one of the following: MR Server, Registry Server,
X Bridge, Video Bridge, and Audio Bridge.

All packet lengths will be multiples of 4 bytes. The Header structure for
any of these packets will be 10 bytes long.

Header Structure of a Request Packet (the first 4 bytes):
```

```
REQ_TYPE  req_type
REQ_CODE  req_code
CARD32    seq_no // sequence number for asynchronous protocol
CARD32    length // X uses 18 bits for largest message
```

The req_type indicates what type of request (request
to a MR Server, request to a Registry server, request to a Media
Server etc.). The req_code is the actual request opcode (e.g., create
a room, show participant A, list rooms etc.). Since the protocols are
asynchronous we need a sequence number so that a client can
correlate replies/errors from the server with its requests.

Header Structure of a Reply/Event/Error Packet (the first 4 bytes):

```
REPLY_TYPE rep_type
REP_CODE   rep_code
CARD32     seq_no
CARD32     length
```

The rep_type indicates what type of reply (a proper reply from one
of the servers, an event from one of the servers, an error from
one of the servers). The rep_code is the actual reply/event/error.
.DE client.h  APPENDIX 2  client.h

```
#ifndef _CLIENT_H
define _CLIENT_H 1 define INIT_MAX_BUFLEN 65536 include <NM_types.h>
include <system_proto.h>
#include <common.h>
#include <List.h>
include <String.h>
#include <Block.h>
#include <pcpp/pString.h>

List_of_pdeclare(MessageInfo)                                           List_of_pdeclare Blockdeclare(char)                                                       Blockdeclare class Connection {
public:
        Connection(MRInterface *iface, MmConnection pconn);
        ~Connection();
        MmConnection connection() { return(conn); }
        int send(char *data, int len);
        int send(Message *msg);
        int send(MedServRequestClass *msg);
        Protocol *Proto() { return(Prot); }
        Convert *Conv() { return(Iface->Conv()); }
        MRInterface *MRIface() { return(Iface); }
        int is_alive() { return(alive); }
        RoomMgr *RoomManager() { return(Iface->RoomManager()); }
        void deactivate_self() { client_dead(); }
        void reply_for_routed_msg(Message *msg, char *header, char *data,
                                                 int data_len);
        void serviced_msg(Message *msg) { delete msg; }
        void send_disconnect();
        virtual void process_msg() = 0;

protected:
        void client_process_msg();
        void client_dead();
        int alive;
        MRInterface *Iface;
        Protocol *Prot;
        char header[MSG_HEADER_LEN];
        //static char header[MSG_HEADER_LEN];
        static int header_len;
        Block(char) buf;
        //static Block(char) buf;
        MmConnection conn;
};

class SeqNoPair{
public:
        SeqNoPair(Message *m, int orig_seq) : msg(m), orig_seq_no(orig_seq) {}
        Message *GetMsg() { return msg; }
        int GetOrigSeq() { return orig_seq_no; } private:
        Message *msg;
        int orig_seq_no;
};

List_of_pdeclare(SeqNoPair)                                              List_of_pdeclare class ReqNM : public Connection {
public:
        ReqNM (MRInterface *iface, MmConnection serv);
        int send_request_msg(Message *msg);
``` client.h

```
        void process_msg();

private:
        int nm_seq_no;
        List_of_p(SeqNoPair) msg_list;
};

class LocalSession : public Connection {
public:
        LocalSession (MRInterface *iface, MmConnection pCli);
        void process_msg();
};

class FrontEnd : public Connection {
public:
        FrontEnd(MRInterface *iface, MmConnection pCli);
        void process_msg();
};

class ReqMR: public Connection {
public:
        ReqMR(MRInterface *iface, MmConnection serv);
        void process_msg();
        int send_request_msg(Message *msg)
                {
                        request_msg = msg; return(send(msg));
                } private:
        Message *request_msg;
};

endif
``` client.h

*...List_of_pdeclare* common.h

```c
#ifndef _COMMON_H
define _COMMON_H 1 include <sys/types.h>
include <sys/time.h>
#include <netdb.h>          //For struct hostent
#include <sys/socket.h>     //For AF_INET
#include <cc/netinet/in.h>  //For struct in_addr
include <arpa/inet.h>      //For inet_ntoa //class UserInterface;
class MRInterface;
class EventNotifier;
class MRServerConnInfo;
class ServerRegistry;
class MediaServerInfo;
class Protocol;
class Connection;
class LocalSession;
class FrontEnd;
class ReqMR;
class ReqNM;
class Room;
class Meeting;
class Conferee;
class RoomMgr;
class Convert;
class Message;
class MediaServer;
class CommObjMgr;
class MediaServerMgr;
class LocalSessionMgr;
class FrontEndMgr;
class ReqMRMgr;
class ReqNMMgr;
struct MessageInfo;

define HOST_NAME_LEN 1024 include <Mm/MmNetworkMan.h>
include <Mm/MmEnum.h>
#include <Mm/MmConnection.h>
#include <NM_types.h>

Listdeclare(MmConnection)
Listdeclare(String)

#define NW (MmNetworkManager::NetworkManager())

#endif
``` eve_msg.h

```
#ifndef _EVE_MSG_H
define _EVE_MSG_H 1 include <msg.h> class EveTemplate1: public EventClass {
public:
        EveTemplate1(char *header, CARD8 msg_typ, CARD8 msg_code,
                int msg_seq_no, int msg_len, char *msg_data,
                Connection *invoker,
                List(MmConnection)& server_list,
                int src, int room_id, int meeting_id, int participant);
};

class EveTemplate2: public EventClass {
public:
        EveTemplate2(char *header, CARD8 msg_typ, CARD8 msg_code,
                int msg_seq_no, int msg_len, char *msg_data,
                Connection *invoker,
                List(MmConnection)& server_list,
                int src, int room_id);
};

class EveTemplate3: public EventClass {
public:
        EveTemplate3(char *header, CARD8 msg_typ, CARD8 msg_code,
                int msg_seq_no, int msg_len, char *msg_data,
                Connection *invoker,
                List(MmConnection)& server_list,
                int src, int room_id, int meeting_id,
                List(int)& plist);
};

class EveTemplate4: public EventClass {
public:
        EveTemplate4(char *header, CARD8 msg_typ, CARD8 msg_code,
                int msg_seq_no, int msg_len, char *msg_data,
                Connection *invoker,
                List(MmConnection)& server_list, int src,
                int room_id, int meeting_id, Media med,
                String& user_desc);
};

class EveTemplate5: public EventClass {
public:
        EveTemplate5(char *header, CARD8 msg_typ, CARD8 msg_code,
                int msg_seq_no, int msg_len, char *msg_data,
                Connection *invoker,
                List(MmConnection)& server_list,
                int src, int room_id, int meeting_id);
};

class EveTemplate6: public EventClass {
public:
        EveTemplate6(char *header, CARD8 msg_typ, CARD8 msg_code,
                int msg_seq_no, int msg_len, char *msg_data,
                Connection *invoker,
                List(MmConnection)& server_list, int src,
                int room_id, int meeting_id, Media med,
                String& user_desc, List(int)& part_list);
};

endif
``` event.h

```c
#ifndef _MR_EVENT_H
define _MR_EVENT_H 1 include <common.h> class EventNotifier {
public:
        EventNotifier(MRInterface *iface);

void AddedParticipant(int room_id, int src, int meeting_id,
                                        int participant);
        void DroppedParticipant(int room_id, int src, int meeting_id,
                                        int participant);
        void LeftMeeting(int room_id, int src, int meeting_id,
                                        int participant);
        void ReenterMeeting(int room_id, int src, int meeting_id,
                                        int participant);
        void RoomCreated(int room_id, int src);
        void RoomDestroyed(int room_id, int src);
        void RoomLocked(int room_id, int src);
        void RoomUnlocked(int room_id, int src);
        void MeetingCreated(int room_id, int src, int meeting_id);
        void MeetingDestroyed(int room_id, int src, int meeting_id);
        void MeetingSuspended(int room_id, int src, int meeting_id);
        void MeetingResumed(int room_id, int src, int meeting_id);
        void MeetingInfo(int room_id, int src, int meeting_id);

void ServerAdded(int src, int room_id, int meeting_id,
                        Media med, String user_desc, List(int)& part_list);
        void ServerDropped(int src, int room_id, int meeting_id,
                        Media med, String user_desc);
        void ServerAccessListSet(int src, int room_id, int meeting_id,
                        Media med, String user_desc, List(int)& part_list);

private:
        void Template1(CARD8 code, int room_id, int src,
                                        int id, int participant);
        void Template2(CARD8 code, int room_id, int src, int id);
        void Template4(CARD8 code, int src, int room_id, int meeting_id,
                                        Media med, String user_desc);
        void Template5(CARD8 code, int src, int room_id, int meeting_id);
        void Template6(CARD8 code, int src, int room_id, int meeting_id,
                        Media med, String user_desc, List(int)& part_list);
        void server_conn_list(int room_id, List(MmConnection)& conn_list);
        void fend_conn_list(List(MmConnection)& conn_list);
        int next_seq_no() { return (++seq_no); } int seq_no;
        MRInterface *Iface;
};

endif
``` generator.h           generator.h

```
#ifndef __GENERATOR_H
define __GENERATOR_H 1 include <msg.h>
include <mr_msg.h>
include <medserv_msg.h>

/*
    The following functions will create a message object. Note that
    only messages that are received by the MR Server will have an
    equivalent function (Requests, Events and Replies generated by
    the MR Server have no relation to this set of functions.
*/ class ProtoGenerator {
public:
static Message *default_generator(char *, CARD8, CARD8, CARD32, CARD32, char *, Connection *);

static Message *Gen_CreateRoom(char *, CARD8, CARD8, CARD32, CARD32, char *, Connection *);
    static Message *Gen_DestroyRoom(char *, CARD8, CARD8, CARD32, CARD32, char *, Connection *);
    static Message *Gen_ListRooms(char *, CARD8, CARD8, CARD32, CARD32, char *, Connection *);
    static Message *Gen_ShowRoomStatus(char *, CARD8, CARD8, CARD32, CARD32, char *, Connection *);
    static Message *Gen_ShowRoomAttributes(char *, CARD8, CARD8, CARD32, CARD32, char *, Connection *);
    static Message *Gen_AlterRoomAttributes(char *, CARD8, CARD8, CARD32, CARD32, char *, Connection *);
    static Message *Gen_LockRoom(char *, CARD8, CARD8, CARD32, CARD32, char *, Connection *);
    static Message *Gen_UnlockRoom(char *, CARD8, CARD8, CARD32, CARD32, char *, Connection *);
    static Message *Gen_ShowAssociatedRoom(char *, CARD8, CARD8, CARD32, CARD32, char *, Connection *);
    static Message *Gen_ShowAssociatedMeeting(char *, CARD8, CARD8, CARD32, CARD32, char *, Connection *)

static Message *Gen_CreateMeeting(char *, CARD8, CARD8, CARD32, CARD32, char *, Connection *);
    static Message *Gen_DestroyMeeting(char *, CARD8, CARD8, CARD32, CARD32, char *, Connection *);
    static Message *Gen_ListMeetings(char *, CARD8, CARD8, CARD32, CARD32, char *, Connection *);
    static Message *Gen_ShowMeetingStatus(char *, CARD8, CARD8, CARD32, CARD32, char *, Connection *);
    static Message *Gen_ShowMeetRoomStatus(char *, CARD8, CARD8, CARD32, CARD32, char *, Connection
    static Message *Gen_ShowMeetingAttributes(char *, CARD8, CARD8, CARD32, CARD32, char *, Connection
    static Message *Gen_AlterMeetingAttributes(char *, CARD8, CARD8, CARD32, CARD32, char *, Connection
    static Message *Gen_AddParticipant(char *, CARD8, CARD8, CARD32, CARD32, char *, Connection *);
    static Message *Gen_DropParticipant(char *, CARD8, CARD8, CARD32, CARD32, char *, Connection *);
    static Message *Gen_LeaveMeeting(char *, CARD8, CARD8, CARD32, CARD32, char *, Connection *);
    static Message *Gen_ReenterMeeting(char *, CARD8, CARD8, CARD32, CARD32, char *, Connection *);
    static Message *Gen_SuspendMeeting(char *, CARD8, CARD8, CARD32, CARD32, char *, Connection *);
    static Message *Gen_ResumeMeeting(char *, CARD8, CARD8, CARD32, CARD32, char *, Connection *);

static Message *Gen_AddServer(char *, CARD8, CARD8, CARD32, CARD32, char *, Connection *);
    static Message *Gen_DropServer(char *, CARD8, CARD8, CARD32, CARD32, char *, Connection *);
    static Message *Gen_SetServerAccessList(char *, CARD8, CARD8, CARD32, CARD32, char *, Connection *);
    static Message *Gen_ListServers(char *, CARD8, CARD8, CARD32, CARD32, char *, Connection *);
    static Message *Gen_GetServerInfo(char *, CARD8, CARD8, CARD32, CARD32, char *, Connection *);
    static Message *Gen_SuspendServer(char *, CARD8, CARD8, CARD32, CARD32, char *, Connection *);
    static Message *Gen_ResumeServer(char *, CARD8, CARD8, CARD32, CARD32, char *, Connection *);

static Message *Gen_NameServerMsg(char *, CARD8, CARD8, CARD32, CARD32, char *, Connection *);
    static Message *Gen_CreateUser(char *, CARD8, CARD8, CARD32, CARD32, char *, Connection *);
    static Message *Gen_CreateDupUser(char *, CARD8, CARD8, CARD32, CARD32, char *, Connection *);
    static Message *Gen_DeleteUser(char *, CARD8, CARD8, CARD32, CARD32, char *, Connection *);
    static Message *Gen_GetPersonInfo(char *, CARD8, CARD8, CARD32, CARD32, char *, Connection *);
    static Message *Gen_CreateNMEntry(char *, CARD8, CARD8, CARD32, CARD32, char *, Connection *);
    static Message *Gen_DeleteNMEntry(char *, CARD8, CARD8, CARD32, CARD32, char *, Connection *);
    static Message *Gen_GetNMEntry(char *, CARD8, CARD8, CARD32, CARD32, char *, Connection *);

static Message *Gen_Disconnect(char *, CARD8, CARD8, CARD32, CARD32, char *, Connection *);

};
``` generator.h generator.h endif iface.h

```c
#ifndef _IFACE_H
define _IFACE_H 1 include <common.h>
include <proto.h>
include <msg.h>
include <mr_msg.h>
include <medserv_msg.h>
#include <ports.h>
#include <iostream.h>
include <fstream.h>
#include <convert.h>

List_of_pdeclare(CommObjMgr)

void shutdown();

class MRInterface {
public:
        MRInterface() {};
        ~MRInterface();
        void startup(int argc, char *argv[]);
        RoomMgr *RoomManager() { return(RMgr); }
        MediaServerMgr *MediaServerManager() { return(MSMgr); }
        ReqMRMgr *ReqMRManager() { return(MRMgr); }
        ReqNMMgr *ReqNMManager() { return(NMMgr); }
        EventNotifier *EveNotifier() { return(EveNot); }
        FrontEndMgr *FEManager() { return(FEMgr); }
        Protocol *Proto() { return(Prot); }
        Convert *Conv() { return(ConvMethods); }
        ServerRegistry *ServReg() { return(SReg); }
        Connection *PersistentConnection() { return(PersConn); } private:
        // Connection and Coordination
        void main_loop();
        void garbage_collect();

List_of_p(CommObjMgr) object_list;
        Protocol *Prot;
        Convert *ConvMethods;
        RoomMgr *RMgr;
        EventNotifier *EveNot;
        ServerRegistry *SReg;
        MediaServerMgr *MSMgr;
        ReqNMMgr *NMMgr;
        ReqMRMgr *MRMgr;
        LocalSessionMgr *LSMgr;
        FrontEndMgr *FEMgr;
        Connection *PersConn;

int FE_port;
};

endif
```

*List_of_pdeclare* med_serv.h

```
#include <obj_man.h>

List_of_pdeclare(MediaServer)
List_of_pdeclare(MedServRequestClass)

class MediaServer : public Connection {
public:
        MediaServer(MRInterface *iface, MmConnection serv,
                            int med_id, int room, MediaServerInfo *info);
        void process_msg();

int ServerId() { return(id); }
        Media medium() { return(Medium); }
        String user_desc() { return(UserDesc); }
        int get_server_connection(MediaServerConn& info)
                                        { info = conn_info; return 0; }
        void set_manager_port(int port) { mgr_conn_info.port = port; }
        int get_manager_connection(MediaServerConn& info)
                                        { info = mgr_conn_info; return 0; }
        int send_request_msg(MedServRequestClass *medserv_msg);
        ~MediaServer();

private:
        int id;
        MediaServerConn conn_info;
        MediaServerConn mgr_conn_info;
        Media Medium;
        String UserDesc;
    List_of_p(MedServRequestClass) msg_list;
};

class MediaServerMgr : public CommObjMgr {
public:
        MediaServerMgr(MRInterface *iface) :
            CommObjMgr(iface)
            { is_alive = 1; next_server_id = 0; gen_seq_no = 0; }
        ~MediaServerMgr();
        void process(MmConnection serv);

int get_server_info(int server, Media& m, String& user_desc);
        int get_server_connection(Media m, String& user_desc,
                                                MediaServerConn& conn);
        int get_manager_connection(Media m, String& user_desc,
                                                MediaServerConn& conn);
        void set_manager_port(Media m, String& user_desc, int port);
        MmConnection ServerConnection(int server);
        int get_server_id(Media m, String& user_desc);
        void send(int m, char *data, int len);
        void send_to_all_servers(char *data, int len);
        int AddServer(RequestClass *msg, CARD32 requester, int room_id,
                Media media, String& user_desc, List(int)& part_list);
        int DropServer(RequestClass *msg, CARD32 requester, int room_id,
                Media media, String& user_desc);
        void DropServer(int room_id, int server_id);
        int SuspendServer(RequestClass *msg, CARD32 requester, int room_id,
                Media media, String& user_desc);
        int ResumeServer(RequestClass *msg, CARD32 requester, int room_id,
                Media media, String& user_desc);
        int SetServerAccessList(RequestClass *msg, CARD32 requester, int room_id,
                Media media, String& user_desc, List(int)& part_list);

private:
        void garbage_collect();
        int init_media_server(RequestClass *stimulant, int room, Media m,
                String user_desc, List(int) part_list);
``` med_serv.h

```
    MediaServer* get_media_server(Media m, String user_desc);
    MediaServer* get_media_server(int server_id);
       int next_seq_no() { return(++gen_seq_no); }

List_of_p(MediaServer) server_list;
       int gen_seq_no;
       int next_server_id;
       Block(char) send_buf;
};
``` med_serv.h

*...List_of_pdeclare* medserv_msg.h                                                      medserv_msg.h

```
#ifndef  _MEDSERV_MSG_H
define  _MEDSERV_MSG_H  1 include <msg.h>
include <iostream.h> class REP_AddServer : public ReplyClass {
public:
        REP_AddServer(char *header, CARD8 msg_typ, CARD8 msg_code, int msg_seq_no,
                      int msg_len, char *msg_data, Connection *invoker):
                ReplyClass(header, msg_typ, msg_code,msg_seq_no,
                           msg_len, msg_data, invoker) {}
        msg_obj_states action() {return(e_MSG_SERVICED);}
        void r_action(MediaServerConn& conn);
};

class AddServer : public RequestClass {
public:
        AddServer(char *header, CARD8 msg_typ, CARD8 msg_code, int msg_seq_no,
                  int msg_len, char *msg_data, Connection *invoker):
                RequestClass(header, msg_typ, msg_code,msg_seq_no,
                             msg_len, msg_data, invoker) {}
        msg_obj_states action();
};

class DropServer: public RequestClass {
public:
        DropServer(char *header, CARD8 msg_typ, CARD8 msg_code, int msg_seq_no,
                   int msg_len, char *msg_data, Connection *invoker):
                RequestClass(header, msg_typ, msg_code,msg_seq_no,
                             msg_len, msg_data, invoker) {}
        msg_obj_states action();
};

class SetServerAccessList: public RequestClass {
public:
        SetServerAccessList(char *header, CARD8 msg_typ, CARD8 msg_code, int msg_seq_no,
                            int msg_len, char *msg_data, Connection *invoker):
                RequestClass(header, msg_typ, msg_code,msg_seq_no,
                             msg_len, msg_data, invoker) {}
        msg_obj_states action();
};

class REP_ListServers: public ReplyClass {
public:
        REP_ListServers(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                           msg_len, msg_data, invoker) {}
        msg_obj_states action() {return(e_MSG_SERVICED);}
        void r_action(List_of_p(FullMediaDesc)& med_list);
};

class ListServers: public RequestClass {
public:
        ListServers(char *header, CARD8 msg_typ, CARD8 msg_code, int msg_seq_no,
                    int msg_len, char *msg_data, Connection *invoker):
                RequestClass(header, msg_typ, msg_code,msg_seq_no,
                             msg_len, msg_data, invoker) {}
        msg_obj_states action();
};

class REP_GetServerInfo: public ReplyClass {
public:
        REP_GetServerInfo(char *header, CARD8 msg_typ, CARD8 msg_code, int msg_seq_no,
                          int msg_len, char *msg_data, Connection *invoker):
                ReplyClass(header, msg_typ, msg_code,msg_seq_no,
``` medserv_msg.h

```cpp
                                msg_len, msg_data, invoker) {}
        msg_obj_states action() {return(e_MSG_SERVICED);}
        void r_action(MediaServerConn& conn);
};

class GetServerInfo: public RequestClass {
public:
        GetServerInfo(char *header, CARD8 msg_typ, CARD8 msg_code, int msg_seq_no,
                      int msg_len, char *msg_data, Connection *invoker):
                RequestClass(header, msg_typ, msg_code,msg_seq_no,
                             msg_len, msg_data, invoker) {}
        msg_obj_states action();
};

class SuspendServer: public RequestClass {
public:
        SuspendServer(char *header, CARD8 msg_typ, CARD8 msg_code, int msg_seq_no,
                      int msg_len, char *msg_data, Connection *invoker):
                RequestClass(header, msg_typ, msg_code,msg_seq_no,
                             msg_len, msg_data, invoker) {}
        msg_obj_states action();
};

class ResumeServer: public RequestClass {
public:
        ResumeServer(char *header, CARD8 msg_typ, CARD8 msg_code, int msg_seq_no,
                     int msg_len, char *msg_data, Connection *invoker):
                RequestClass(header, msg_typ, msg_code,msg_seq_no,
                             msg_len, msg_data, invoker) {}
        msg_obj_states action();
};

///////////////////////////////////////////////////////////////
// Reply and Error messages from Generic Media Servers
/////////////////////////////////////////////////////////////// class AssociateServer: public MedServRequestClass{
public:
        AssociateServer(RequestClass *stimulant, char *header, CARD8 msg_typ,
                        CARD8 msg_code, int msg_seq_no,
                        int msg_len, char *msg_data, Connection *invoker,
                        int proom, List(int)& plist,
                        Media pmedia, String& puser_desc);
        void special_action(Block(char)& reply_data, int rdata_len);

private:
        List(int) part_list;
};

class DisassociateServer: public MedServRequestClass{
public:
        DisassociateServer(RequestClass *stimulant, char *header, CARD8 msg_typ,
                           CARD8 msg_code, int msg_seq_no,
                           int msg_len, char *msg_data, Connection *invoker,
                           int proom, Media pmedia, String& puser_desc);
        void special_action(Block(char)& reply_data, int rdata_len);
};

class GenSuspendServer: public MedServRequestClass{
public:
        GenSuspendServer(RequestClass *stimulant, char *header, CARD8 msg_typ,
                         CARD8 msg_code, int msg_seq_no,
                         int msg_len, char *msg_data, Connection *invoker,
                         int proom, Media pmedia, String& puser_desc);
        void special_action(Block(char)& reply_data, int rdata_len);
};

class GenResumeServer: public MedServRequestClass{
``` medserv_msg.h                                                           medserv_msg.h

```
public:
        GenResumeServer(RequestClass *stimulant, char *header, CARD8 msg_typ,
                        CARD8 msg_code, int msg_seq_no,
                        int msg_len, char *msg_data, Connection *invoker,
                        int proom, Media pmedia, String& puser_desc);
        void special_action(Block(char)& reply_data, int rdata_len);
};

class SetAccessList: public MedServRequestClass{
public:
        SetAccessList(RequestClass *stimulant, char *header, CARD8 msg_typ,
                        CARD8 msg_code, int msg_seq_no,
                        int msg_len, char *msg_data, Connection *invoker,
                        int proom, List(int)& plist,
                        Media pmedia, String& puser_desc);
        void special_action(Block(char)& reply_data, int rdata_len);

private:
        List(int) part_list;
};

endif
``` mr_msg.h

```c
#ifndef _MR_MSG_H
define _MR_MSG_H  1 include <msg.h>

/********************************************************************/
/*                                                                  */
/*  REQUEST MESSAGES TO MR SERVER          */                        */
/*                                                                  */
/********************************************************************/ class Disconnect: public RequestClass {
public:
        Disconnect(char *header, CARD8 msg_typ, CARD8 msg_code, int msg_seq_no,
                        int msg_len, char *msg_data, Connection *invoker):
                RequestClass(header, msg_typ, msg_code,msg_seq_no,
                        msg_len, msg_data, invoker) {}
        msg_obj_states action();
};

class REP_CreateRoom : public ReplyClass {
public:
        REP_CreateRoom(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        void r_action(int id);
        msg_obj_states action() {return(e_MSG_SERVICED); }
};

class CreateRoom : public MRMRRequestClass {
public:
        CreateRoom(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();

private:
        REP_CreateRoom  *reply;
};

class DestroyRoom : public MRMRRequestClass {
public:
        DestroyRoom(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
};

class REP_ListRooms : public ReplyClass {
public:
        REP_ListRooms(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        msg_obj_states action() {return(e_MSG_SERVICED);}
        void r_action(List(int)& room_list, List(String)& name_list);
};

class ListRooms : public MRMRRequestClass {
public:
        ListRooms(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
``` mr_msg.h

```cpp
private:
        REP_ListRooms  *reply;
};

class REP_ShowRoomStatus : public ReplyClass {
public:
        REP_ShowRoomStatus(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        msg_obj_states action() {return(e_MSG_SERVICED);}
        void r_action(RoomStatus stat, RoomLockStatus lock_stat);
};

class ShowRoomStatus : public MRMRRequestClass {
public:
        ShowRoomStatus(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();

private:
        REP_ShowRoomStatus *reply;
};

class REP_ShowRoomAttributes: public ReplyClass {
public:
        REP_ShowRoomAttributes(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        msg_obj_states action() {return(e_MSG_SERVICED);}
        void r_action(RoomAttrib attrib);
};

class ShowRoomAttributes: public MRMRRequestClass {
public:
        ShowRoomAttributes(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();

private:
        REP_ShowRoomAttributes *reply;
};

class AlterRoomAttributes: public MRMRRequestClass {
public:
        AlterRoomAttributes(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
};

class LockRoom : public MRMRRequestClass {
public:
        LockRoom(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
};

class UnlockRoom : public MRMRRequestClass {
``` mr_msg.h

```cpp
public:
        UnlockRoom(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
};

class REP_ShowAssociatedRoom : public ReplyClass {
public:
        REP_ShowAssociatedRoom(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        msg_obj_states action() {return(e_MSG_SERVICED);}
        void r_action(int room_id);
};

class ShowAssociatedRoom : public MRMRRequestClass {
public:
        ShowAssociatedRoom(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();

private:
        REP_ShowAssociatedRoom *reply;
};

class REP_ShowAssociatedMeeting: public ReplyClass {
public:
        REP_ShowAssociatedMeeting(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        msg_obj_states action() {return(e_MSG_SERVICED);}
        void r_action(int meeting_id);
};

class ShowAssociatedMeeting : public MRMRRequestClass {
public:
        ShowAssociatedMeeting(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();

private:
        REP_ShowAssociatedMeeting *reply;
};

class REP_CreateMeeting : public ReplyClass {
public:
        REP_CreateMeeting(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        msg_obj_states action() {return(e_MSG_SERVICED);}
        void r_action(int id);
};

class CreateMeeting : public MRMRRequestClass {
public:
        CreateMeeting(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
``` mr_msg.h

```cpp
                                msg_len, msg_data, invoker) {}
        msg_obj_states action();
private:
        REP_CreateMeeting *reply;
};

class DestroyMeeting : public MRMRRequestClass {
public:
        DestroyMeeting(char *header, CARD8 msg_typ, CARD8 msg_code, int msg_seq_no,
                       int msg_len, char *msg_data, Connection *invoker):
                MRMRRequestClass(header, msg_typ, msg_code,msg_seq_no,
                                msg_len, msg_data, invoker) {}
        msg_obj_states action();
};

class REP_ListMeetings : public ReplyClass {
public:
        REP_ListMeetings(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                          msg_len, msg_data, invoker) {}
        msg_obj_states action() {return(e_MSG_SERVICED);}
        void r_action(List(int)& meeting_list);
};

class ListMeetings : public MRMRRequestClass {
public:
        ListMeetings(char *header, CARD8 msg_typ, CARD8 msg_code, int msg_seq_no,
                    int msg_len, char *msg_data, Connection *invoker):
                MRMRRequestClass(header, msg_typ, msg_code,msg_seq_no,
                                msg_len, msg_data, invoker) {}
        msg_obj_states action();

private:
        REP_ListMeetings *reply;
};

class REP_ShowMeetingStatus : public ReplyClass {
public:
        REP_ShowMeetingStatus(char *header, CARD8 msg_typ, CARD8 msg_code, int msg_seq_no,
                             int msg_len, char *msg_data, Connection *invoker):
                ReplyClass(header, msg_typ, msg_code,msg_seq_no,
                          msg_len, msg_data, invoker) {}
        msg_obj_states action() {return(e_MSG_SERVICED);}
        void r_action(List(ParticipantInfo)& info, int room_id,
                                int owner, MeetingStatus status);
};

class ShowMeetingStatus : public MRMRRequestClass {
public:
        ShowMeetingStatus(char *header, CARD8 msg_typ, CARD8 msg_code, int msg_seq_no,
                         int msg_len, char *msg_data, Connection *invoker):
                MRMRRequestClass(header, msg_typ, msg_code,msg_seq_no,
                                msg_len, msg_data, invoker) {}
        msg_obj_states action();

private:
        REP_ShowMeetingStatus *reply;
};

class REP_ShowMeetRoomStatus : public ReplyClass {
public:
        REP_ShowMeetRoomStatus(char *header, CARD8 msg_typ, CARD8 msg_code, int msg_seq_no,
                              int msg_len, char *msg_data, Connection *invoker):
                ReplyClass(header, msg_typ, msg_code,msg_seq_no,
                          msg_len, msg_data, invoker) {}
        msg_obj_states action() {return(e_MSG_SERVICED);}
``` mr_msg.h

```
                void r_action(List(ParticipantInfo)& info, int meeting_id,
                                int owner, MeetingStatus status);
};

class ShowMeetRoomStatus : public MRMRRequestClass {
public:
        ShowMeetRoomStatus(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();

private:
        REP_ShowMeetRoomStatus *reply;
};

class REP_ShowMeetingAttributes: public ReplyClass {
public:
        REP_ShowMeetingAttributes(char *header, CARD8 msg_typ, CARD8 msg_code, int msg_seq_no,
                        int msg_len, char *msg_data, Connection *invoker):
                ReplyClass(header, msg_typ, msg_code,msg_seq_no,
                        msg_len, msg_data, invoker) {}
        msg_obj_states action() {return(e_MSG_SERVICED);}
        void r_action(MeetingAttrib attrib);
};

class ShowMeetingAttributes: public MRMRRequestClass {
public:
        ShowMeetingAttributes(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();

private:
        REP_ShowMeetingAttributes *reply;
};

class AlterMeetingAttributes: public MRMRRequestClass {
public:
        AlterMeetingAttributes(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
};

class AddParticipant : public MRMRRequestClass {
public:
        AddParticipant (char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
};

class DropParticipant: public MRMRRequestClass {
public:
        DropParticipant(char *header, CARD8 msg_typ, CARD8 msg_code, int msg_seq_no,
                        int msg_len, char *msg_data, Connection *invoker):
                MRMRRequestClass(header, msg_typ, msg_code,msg_seq_no,
                        msg_len, msg_data, invoker) {}
        msg_obj_states action();
};

class LeaveMeeting: public MRMRRequestClass {
public:
        LeaveMeeting(char *header, CARD8 msg_typ, CARD8 msg_code, int msg_seq_no,
``` mr_msg.h                                                                      mr_msg.h

```
                    int msg_len, char *msg_data, Connection *invoker):
            MRMRRequestClass(header, msg_typ, msg_code,msg_seq_no,
                    msg_len, msg_data, invoker) {}
    msg_obj_states action();
};

class ReenterMeeting: public MRMRRequestClass {
public:
    ReenterMeeting(char *header, CARD8 msg_typ, CARD8 msg_code, int msg_seq_no,
                    int msg_len, char *msg_data, Connection *invoker):
            MRMRRequestClass(header, msg_typ, msg_code,msg_seq_no,
                    msg_len, msg_data, invoker) {}
    msg_obj_states action();
};

class SuspendMeeting: public MRMRRequestClass {
public:
    SuspendMeeting(char *header, CARD8 msg_typ, CARD8 msg_code, int msg_seq_no,
                    int msg_len, char *msg_data, Connection *invoker):
            MRMRRequestClass(header, msg_typ, msg_code,msg_seq_no,
                    msg_len, msg_data, invoker) {}
    msg_obj_states action();
};

class ResumeMeeting: public MRMRRequestClass {
public:
    ResumeMeeting(char *header, CARD8 msg_typ, CARD8 msg_code, int msg_seq_no,
                    int msg_len, char *msg_data, Connection *invoker):
            MRMRRequestClass(header, msg_typ, msg_code,msg_seq_no,
                    msg_len, msg_data, invoker) {}
    msg_obj_states action();
};

// Name Server Messages class CreateUser: public RequestClass {
public:
    CreateUser(char *header, CARD8 msg_typ, CARD8 msg_code, int msg_seq_no,
                    int msg_len, char *msg_data, Connection *invoker):
            RequestClass(header, msg_typ, msg_code,msg_seq_no,
                    msg_len, msg_data, invoker) {}
    msg_obj_states action() { return(e_MSG_SERVICED); }
};

class CreateDupUser: public RequestClass {
public:
    CreateDupUser(char *header, CARD8 msg_typ, CARD8 msg_code, int msg_seq_no,
                    int msg_len, char *msg_data, Connection *invoker):
            RequestClass(header, msg_typ, msg_code,msg_seq_no,
                    msg_len, msg_data, invoker) {}
    msg_obj_states action() { return(e_MSG_SERVICED); }
};

class DeleteUser: public RequestClass {
public:
    DeleteUser(char *header, CARD8 msg_typ, CARD8 msg_code, int msg_seq_no,
                    int msg_len, char *msg_data, Connection *invoker):
            RequestClass(header, msg_typ, msg_code,msg_seq_no,
                    msg_len, msg_data, invoker) {}
    msg_obj_states action() { return(e_MSG_SERVICED); }
};

class GetPersonInfo: public RequestClass {
public:
    GetPersonInfo(char *header, CARD8 msg_typ, CARD8 msg_code, int msg_seq_no,
                    int msg_len, char *msg_data, Connection *invoker):
            RequestClass(header, msg_typ, msg_code,msg_seq_no,
                    msg_len, msg_data, invoker) {}
``` mr_msg.h

```cpp
        msg_obj_states action() { return(e_MSG_SERVICED); }
};

class CreateNMEntry: public RequestClass {
public:
        CreateNMEntry(char *header, CARD8 msg_typ, CARD8 msg_code, int msg_seq_no,
                        int msg_len, char *msg_data, Connection *invoker):
                RequestClass(header, msg_typ, msg_code,msg_seq_no,
                        msg_len, msg_data, invoker) {}
        msg_obj_states action() { return(e_MSG_SERVICED); }
};

class DeleteNMEntry: public RequestClass {
public:
        DeleteNMEntry(char *header, CARD8 msg_typ, CARD8 msg_code, int msg_seq_no,
                        int msg_len, char *msg_data, Connection *invoker):
                RequestClass(header, msg_typ, msg_code,msg_seq_no,
                        msg_len, msg_data, invoker) {}
        msg_obj_states action() { return(e_MSG_SERVICED); }
};

class GetNMEntry: public RequestClass {
public:
        GetNMEntry(char *header, CARD8 msg_typ, CARD8 msg_code, int msg_seq_no,
                        int msg_len, char *msg_data, Connection *invoker):
                RequestClass(header, msg_typ, msg_code,msg_seq_no,
                        msg_len, msg_data, invoker) {}
        msg_obj_states action() { return(e_MSG_SERVICED); }
};

class NameServerMsg: public RequestClass {
public:
        NameServerMsg(char *header, CARD8 msg_typ, CARD8 msg_code, int msg_seq_no,
                        int msg_len, char *msg_data, Connection *invoker):
                RequestClass(header, msg_typ, msg_code,msg_seq_no,
                        msg_len, msg_data, invoker) {}
        msg_obj_states action();
};

endif
``` msg.h

```c
#ifndef _MSG_H
define _MSG_H   1 include <NM_types.h>
include <system_proto.h>
#include <common.h>
#include <List.h>
#include <Block.h>
include <event.h> define INIT_MAX_REPLYSIZE 8192

Blockdeclare(char)                                              Blockdeclare enum msg_obj_states { e_MSG_IN_SERVICE, e_MSG_READY,
                                    e_MSG_PENDING, e_MSG_SERVICED };

class Message {
public:
        Message(char *m_header, CARD8 msg_typ,
                   CARD8 msg_code, int msg_seq_no,
                   int msg_len, char *msg_data, Connection *invoker);

CARD8 msg_type() { return type; }
        CARD8 msg_code() { return opcode; }
        int msg_seq_no() { return seq_no; }
        int msg_len() { return len; }
        char *msg_data() { return data; }
        char *msg_header() { return header; }
        void set_msg_seq_no(int s);
        Connection *MsgSource() { return Invoker; }
        int for_NameServer();
        int for_some_other_MR(int MR_id);
        virtual msg_obj_states action() = 0;

protected:
        int len_in_CARD32(int len_in_bytes);

CARD8            type;
        CARD8            opcode;
        int              seq_no;
        int              len;
        char             header[MSG_HEADER_LEN];
        char             *data;
        Connection       *Invoker;
        Convert          *Conv;
        RoomMgr          *RMgr;
        MediaServerMgr   *MSMgr;

// temp vars
        int err, nbytes;
        int pos; // position in data to start processing
};

List_of_pdeclare(Message)                                       List_of_pdeclare
typedef Message * MessagePtr;

/////////////////////////////////////////////////////////////////
// Classes of Message: Request, Reply, Event & Error
///////////////////////////////////////////////////////////////// class GenericReplyClass : public Message {
public:
        GenericReplyClass(char *header, CARD8 msg_typ, CARD8 msg_code, int msg_seq_no,
                        int msg_len, char *msg_data, Connection *invoker):
                Message(header, msg_typ, msg_code, msg_seq_no, msg_len,
                        msg_data, invoker) { pos = MSG_HEADER_LEN; rep_len = 0;}
``` msg.h

```cpp
            virtual msg_obj_states action() = 0;                                    ...List_of_pdeclare
protected:
            void fill_reply_header(CARD8 msg_type, CARD8 msg_opcode,
                            CARD32 msg_seq_no, CARD32 msg_len);
            void send_reply();
            static Block(char) rep_buf;
            int rep_len;
};

class ReplyClass : public GenericReplyClass {
public:
            ReplyClass(char *header, CARD8 msg_typ, CARD8 msg_code, int msg_seq_no,
                            int msg_len, char *msg_data, Connection *invoker):
                    GenericReplyClass(header, msg_typ, msg_code,msg_seq_no,
                            msg_len, msg_data, invoker) {}
            virtual msg_obj_states action() = 0;
};

class EventClass : public GenericReplyClass {
public:
            EventClass(char *header, CARD8 msg_typ, CARD8 msg_code, int msg_seq_no,
                            int msg_len, char *msg_data, Connection *invoker,
                            List(MmConnection)& server_list):
                    GenericReplyClass(header, msg_typ, msg_code,msg_seq_no,
                                    msg_len, msg_data, invoker)
                    { slist = server_list; }
            void build(int src, int id1);
            void build(int src, int id1, int id2);
            void build(int src, int id1, int id2, int participant);
            void build(int src, int id1, int id2, List(int)& plist);
            void build(int src, int room_id, int meeting_id,
                    Media med, String& user_desc);
            void build(int src, int room_id, int meeting_id,
                    Media med, String& user_desc, List(int)& plist);
            void send_event();
            virtual msg_obj_states action() { return(e_MSG_SERVICED); }
private:
            List(MmConnection) slist;
};

class ErrorClass : public GenericReplyClass {
public:
            ErrorClass(Connection *invoker) :
                    GenericReplyClass(NULL, 0, 0, 0, 0, NULL, invoker) {}
            void connection(Connection *invoker)
                    { Invoker = invoker; }
            msg_obj_states action() {return(e_MSG_SERVICED); }
            msg_obj_states e_action(CARD32 err_type, CARD32 msg_code,
                            CARD32 seq_no, CARD32 err_code);
            msg_obj_states success_return(CARD32 err_type, CARD32 msg_code,
                            CARD32 seq_no);

private:
            void send_error(CARD32 err_type, CARD32 msg_code,
                            CARD32 seq_no, CARD32 err_code);
};

class IllegalMessage: public GenericReplyClass {
public:
            IllegalMessage(char *header, CARD8 msg_typ, CARD8 msg_code, int msg_seq_no,
                            int msg_len, char *msg_data, Connection *invoker):
                    GenericReplyClass(header, msg_typ, msg_code,msg_seq_no, msg_len, msg_data, invoker) {}
            msg_obj_states action();
};

class RequestClass : public Message {
``` msg.h

```
                                                                              ...List_of_pdeclare
public:
        RequestClass(char *header, CARD8 msg_typ, CARD8 msg_code, int msg_seq_no,
                        int msg_len, char *msg_data, Connection *invoker):
                Message(header, msg_typ, msg_code,msg_seq_no, msg_len, msg_data, invoker) {
                        res_len = len;
                        error = new ErrorClass(invoker);
                }
        ~RequestClass() { delete error; }

ErrorClass *error_obj() { return error; }
        virtual msg_obj_states action() = 0;

protected:
        ErrorClass *error;
        int res_len; // residue length of data
};

class MedServRequestClass: public RequestClass {
public:
        MedServRequestClass(RequestClass *stimulant_msg, char *header,
                        CARD8 msg_typ, CARD8 msg_code, int msg_seq_no,
                        int msg_len, char *msg_data, Connection *invoker,
                        int proom, Media pmedia, String& puser_desc):
                RequestClass(header, msg_typ, msg_code,msg_seq_no,
                        msg_len, msg_data, invoker)
        {
                stim_msg = stimulant_msg;
                media = pmedia; user_desc = puser_desc; room = proom;
        }

RequestClass *stimulant() { return stim_msg; }
        msg_obj_states action() { return(e_MSG_SERVICED); }
        virtual void special_action(Block(char)& reply_data, int rdata_len) = 0;
        char *request_buffer() { return (req_buf); } protected:
        void common_build();
        void fill_request_header();
        Block(char) req_buf;
        RequestClass *stim_msg;

Media media;
        String user_desc;
        int room;
};

class MRMRRequestClass : public RequestClass {
public:
        MRMRRequestClass(char *header, CARD8 msg_typ, CARD8 msg_code,
                int msg_seq_no, int msg_len, char *msg_data, Connection *invoker):
                RequestClass(header, msg_typ, msg_code,msg_seq_no,
                        msg_len, msg_data, invoker) { }
        virtual msg_obj_states action() = 0;

protected:
        int routing_action();
};

endif
``` obj_man.h

```
#ifndef __OBJ_MAN_H
define __OBJ_MAN_H include <common.h>
include <iface.h>
include <client.h>

List_of_pdeclare(LocalSession)
List_of_pdeclare(FrontEnd)
List_of_pdeclare(ReqMR)

class CommObjMgr {
public:
        CommObjMgr(MRInterface *iface);
        ~CommObjMgr() {}
        virtual void process(MmConnection pconn) = 0;
        int IsAlive() { return(is_alive); } protected:
        MRInterface *Iface;
        int is_alive;
        int next_id;
};

class LocalSessionMgr : public CommObjMgr {
public:
        LocalSessionMgr(MRInterface *iface) : CommObjMgr(iface)
                        { is_alive = 1; }
        void process(MmConnection pconn);

private:
        void garbage_collect();
        List_of_p(LocalSession) client_list;
};

class FrontEndMgr : public CommObjMgr {
public:
        FrontEndMgr(MRInterface *iface) : CommObjMgr(iface)
                        { is_alive = 1; }
        void process(MmConnection pconn);
        void GetObjectList(List_of_p(FrontEnd)& fend_list)
                { fend_list = client_list; } private:
        void garbage_collect();
        List_of_p(FrontEnd) client_list;
};

class ReqNMMgr : public CommObjMgr {
public:
        ReqNMMgr(MRInterface *iface);
        void process(MmConnection pconn);
        int send_to_NM(Message *msg);

private:
        ReqNM *nm_obj;
};

class ReqMRMgr: public CommObjMgr {
public:
        ReqMRMgr(MRInterface *iface) : CommObjMgr(iface) { is_alive = 1; }
        void process(MmConnection pconn);
        int send_to_MR(String machine, int port, Message *msg);

private:
        void garbage_collect();
    List_of_p(ReqMR) server_list;
``` obj_man.h

};
endif obj_man.h

*...List_of_pdeclare* proto.h

```
#ifndef _MR_PROTO_H
define _MR_PROTO_H 1 include <mr_msg.h>
include <medserv_msg.h>
#include <generator.h>
include <common.h> class Protocol {
public:
        Protocol(MRInterface *iface);
        ~Protocol() {};
        void interpret_header(char *header, CARD8& type, CARD8& opcode,
                                  CARD32& seq, CARD32& len);
        Message *construct_msg(char *header, CARD8 type, CARD8 opcode,
               CARD32 seq, CARD32 len, char *data, Connection *conn);

private:
        MessagePtr (*Gen_func_tab[MAX_MSG_TYPES][MAX_MSGS])(char *,
                      CARD8, CARD8, CARD32, CARD32, char *, Connection *);
        MRInterface *Iface;
        Convert *Conv;
};

endif
``` room.h

```
#ifndef _ROOM_H
define _ROOM_H 1 include <NM_types.h>
include <common.h>
#include <String.h>
#include <system_proto.h>

List_of_pdeclare(Conferee)

class Conferee {
public:
        Conferee(int c_id) { id = c_id; }
        ~Conferee();
        int ID() { return(id); }
        void add_media(MediaDesc med);
        void drop_media(MediaDesc med);
        void suspend_media(MediaDesc med);
        void suspend_media(List_of_p(MediaDesc)& med_list);
        void resume_media(MediaDesc med);
        void resume_media(List_of_p(MediaDesc)& med_list);
        List_of_p(FullMediaDesc) get_media_list() { return(media_list); } private:
        int id;
        ConfereeStatus status;
        List_of_p(FullMediaDesc) media_list; // list of servers used by
                                             // this conferee
};

class Meeting {
public:
        Meeting(int meeting_id, CARD32 mowner, RoomAttrib mattr,
                Room *mroom, RoomMgr *mRMgr);
        ~Meeting();
        int MeetingId() { return(id); }
        int num_conferees() { return(conf_list.length()); }
        MeetingAttrib get_meeting_attrib() { return(attrib); }
        void set_meeting_attrib(MeetingAttrib m_attrib) { attrib = m_attrib; }
        void get_meeting_info(List(ParticipantInfo)& info);
        void get_meeting_participants(List(int)& plist);
        int get_meeting_owner() { return owner; }
        MeetingStatus get_meeting_status() { return status; }
        int add_participant(int participant);
        int drop_participant(int participant);
        void add_media(int participant, MediaDesc med);
        void drop_media(int participant, MediaDesc med);
        void drop_media(MediaDesc med);
        void restrict_media_access(List(int)& part_list, MediaDesc med);
        void suspend_media(MediaDesc med);
        void resume_media(MediaDesc med);
        int suspend_meeting();
        int resume_meeting();
        int state_check();
        int leave_meeting(int participant,
                          List_of_p(MediaDesc)& media_list);
        int reenter_meeting(int participant,
                          List_of_p(MediaDesc)& media_list);

private:
        void drop_all_participants();
        void change_owner();

int id;
        Room *room;
        CARD32 owner;
        MeetingAttrib attrib;
        MeetingStatus status;
``` room.h

```
        RoomMgr *RMgr;
        EventNotifier *EveNot;
        List_of_p(Conferee) conf_list;
        int err;
};

enum MRScope { e_MEETING_SCOPE, e_ROOM_SCOPE };

struct MediaServerInfoInRoom {
        int server;
        MediaServerStatus status;
        MRScope scope;
};

List_of_pdeclare(MediaServerInfoInRoom)

class Room {
public:
        Room(int room_id, CARD32 rowner, RoomAttrib rattr,
                        String& rname, RoomMgr *rRMgr);
        ~Room();
        int RoomId() { return(id); }
        int MRId() { return(MR_id); }
        int IsClosed() { return(attrib); }
        String RoomName() { return(room_name); }
        void meeting_destroyed();
        void meeting_created(Meeting* m);
        RoomAttrib room_attrib() { return(attrib); }
        void set_room_attrib(RoomAttrib r_attrib) { attrib = r_attrib; }
        RoomStatus room_status() { return(status); }
        RoomLockStatus room_lock_status() { return(lock_status); }
        void set_room_status(RoomStatus r_status) { status = r_status; }
        int has_meeting() { return(meeting ? 1 : 0); }
        Meeting *get_meeting() { return(meeting); }
        int add_server(int server_id, Media media, String& user_desc,
                        List(int)& part_list);
        int drop_server(int server_id, Media media, String& user_desc);
        int suspend_server(int server_id, Media media, String& user_desc);
        int resume_server(int server_id, Media media, String& user_desc);
        int set_access_list(int server_id, Media media, String& user_desc,
                        List(int)& part_list);
        int list_servers(List_of_p(FullMediaDesc)& media_list);
        int is_server_present(int server_id);
        void associated_servers(List(int)& serv_list);
        void MediaServerDied(int m);
        int lock();
        int unlock();
        int state_check() { return 0; } private:
        void set_meeting(Meeting *m);
        int id;
        String room_name;
        Meeting *meeting;
        RoomAttrib attrib;
        CARD32 owner;
        int MR_id;
        RoomStatus status;
        RoomLockStatus lock_status;
        RoomMgr *RMgr;
        EventNotifier *EveNot;
        MediaServerMgr *MSMgr;
        List_of_p(MediaServerInfoInRoom) server_list;
                        // list of all servers (media ids) in the room
        int err;
};

List_of_pdeclare(Room)
```

...*List_of_pdeclare*

*List_of_pdeclare*

*List_of_pdeclare* room.h

// All int returns will be −ve if error. ALL ERR_CODEs are −ve

```cpp
class RoomMgr {
public:
        RoomMgr(MRInterface *MRIface, Range r);
        ~RoomMgr();

MRInterface *MRIface() { return(Iface); }
        int is_valid_room(int room_id);
        int IsServerPresent(int room_id, int server_id);
        void AssociatedServersInRoom(int room_id, List(int)& slist);
        int ActiveRoom() { return(active_room->RoomId()); } int CreateRoom(CARD32 owner, RoomAttrib attrib, String& rname);
        int DestroyRoom(CARD32 requester, int id);
        int ListRooms(CARD32 requester, List(int)& rlist,
                        List(String)& name_list);
        int ShowRoomStatus(CARD32 requester, int room_id,
                        RoomStatus& stat, RoomLockStatus& lock_stat);
        int ShowRoomAttributes(CARD32 requester, int room_id, RoomAttrib& attrib);
        int AlterRoomAttributes(CARD32 requester, int room_id, RoomAttrib attrib);
        int LockRoom(CARD32 requester, int room_id);
        int UnlockRoom(CARD32 requester, int room_id);

int CreateMeeting(CARD32 owner, int room_id, MeetingAttrib attrib);
        int DestroyMeeting(CARD32 requester, int meeting_id);
        int ListMeetings(CARD32 requester, List(int)& rlist);
        int ShowMeetingStatus(CARD32 requester, int meeting_id,
                List(ParticipantInfo)& info, int& p_room_id,
                int& owner, MeetingStatus& status);
        int ShowMeetRoomStatus(CARD32 requester, int room_id,
                List(ParticipantInfo)& info, int& p_meeting_id,
                int& owner, MeetingStatus& status);
        int ListMeetingParticipants(int meeting_id, List(int)& plist);
        int ShowMeetingAttributes(CARD32 requester, int meeting_id,
                                MeetingAttrib& attrib);
        int AlterMeetingAttributes(CARD32 requester, int meeting_id,
                                MeetingAttrib attrib);
        int ShowAssociatedRoom(CARD32 requester, int meeting_id,
                                int& room_id);
        int ShowAssociatedMeeting(CARD32 requester, int room_id,
                                int& meeting_id);
        int AddParticipant(CARD32 requester, int meeting_id, int participant);
        int DropParticipant(CARD32 requester, int meeting_id, int participant);
        int SuspendMeeting(CARD32 requester, int meeting_id);
        int ResumeMeeting(CARD32 requester, int meeting_id);

void MediaServerDied(int m);

int AddServer(int room_id, int server_id, Media media,
                        String& user_desc, List(int)& part_list);
        int DropServer(int room_id, int server_id, Media media, String& user_desc);
        int SuspendServer(int room_id, int server_id, Media media, String& user_desc);
        int ResumeServer(int room_id, int server_id, Media media, String& user_desc);
        int SetAccessList(int room_id, int server_id, Media media,
                        String& user_desc, List(int)& part_list);
        int ListServers(CARD32 requester, int room_id,
                        List_of_p(FullMediaDesc)& media_list);
        int LeaveMeeting(CARD32 requester, int meeting_id,
                        List_of_p(MediaDesc)& media_list);
        int ReenterMeeting(CARD32 requester, int meeting_id,
                        List_of_p(MediaDesc)& media_list);

private:
        int generate_room_id();
        void free_room_id(int id);
        int generate_meeting_id();
``` room.h

```
        void free_meeting_id(int id);

MRInterface *Iface;
    Range range;
    Room *active_room; // Room that is currently active
    List_of_p(Room) room_list;
    List(int) used_room_id_list;
    List(int) free_room_id_list;
    List(int) used_meeting_id_list;
    List(int) free_meeting_id_list;
};
endif
```

*...List_of_pdeclare* server_reg.h                                                                server_reg.h

```c
#ifndef _SERVER_REGISTRY
define _SERVER_REGISTRY 1 include <List.h>
include <NM_types.h>
#include <sysent.h>
#include <String.h>
#include <iostream.h>
include <fstream.h>
include <common.h> struct MediaServerInfo {
        MediaServerInfo(Media pType, String& pUserDesc,
                        MediaServerConn& pConn, String& pInitializer,
                        String& pOtherInfo);

Media MediaType;
        String UserDesc;
        String Initializer;
        String OtherInfo;
        MediaServerConn Conn;
};

struct MRServerConnInfo {
        MRServerConnInfo(String& pMachine, int pPort, int pStartRange,
                         int pEndRange)
            { Machine = pMachine; Port = pPort; StartRange = pStartRange;
              EndRange = pEndRange; }

String Machine;
        int Port;
        int StartRange;
        int EndRange;
};

List_of_pdeclare(MediaServerInfo);
List_of_pdeclare(MRServerConnInfo);

class ServerRegistry {
public:
        ServerRegistry(MRInterface *iface, String p_in_file);
        void ListAllMediaServerInfo(List_of_p(MediaServerInfo)& plist);
        void ListAllMRServerConnInfo(List_of_p(MRServerConnInfo)& slist);
        MediaServerInfo* ListMediaServerInfo(Media med, String& key);
        int in_my_range(int id) { return ((id >=  MyStartRange &&
                                           id <= MyEndRange) ? 1 : 0); } int server_for_id(int id, String& mach, int& port);
        void default_name_server(String& mach, int& port);
        void my_range(Range& r) { r.start = MyStartRange; r.end = MyEndRange; } private:
        void read_file();
        void my_range();
        void flush_to_file();

MRInterface *Iface;
        List_of_p(MediaServerInfo) MediaServerList;
        List_of_p(MRServerConnInfo) MRServerList;
        String MyName, name_server_machine;
        int MyStartRange, MyEndRange, name_server_port;
        String in_file, out_file;
};

endif
``` client.C

```
define DEBUG 1 include <iface.h>
include <room.h>
#include <client.h>
#include <server_reg.h>
```

List_of_pimplement(SeqNoPair)                                                *List_of_pimplement*

```
#define CHECK_MMC_CONNECTION(conn) if (conn->IsAssigned() == MmEnum::MmFalse){ \
            deactivate_self(); \
            return(-1); \
    } define VOID_CHECK_MMC_CONNECTION(conn) if (conn->IsAssigned() == MmEnum::MmFalse){ \
            deactivate_self(); \
            return; \
    }
```

Blockimplement(char)                                                          *Blockimplement*

```
int Connection::header_len = MSG_HEADER_LEN;
//MRInterface * Connection::Iface = (MRInterface *)NULL;
//Block(char) Connection::buf(INIT_MAX_BUFLEN);
```

Connection::Connection(MRInterface *iface, MmConnection pconn)                *Connection*
```
{
//      if (Iface == NULL) {                                                        if
            Iface = iface;
            Prot = Iface->Proto();
            alive = 1;
            conn = pconn;
//      }
}
``` void Connection::client_dead()                                                *client_dead*
```
{
        NW->HangUp(connection());
        alive = 0;
}
``` void Connection::reply_for_routed_msg(Message *msg, char *header,
                                char *data, int data_len)
```
{
#ifdef DEBUG
    cout << "Redirecting reply from Server.\n";
    cout.flush();
endif if (send(header, header_len) < 0){
        cout << "Write Error:: " << __FILE__ << " " << (int)__LINE__ << endl;
        delete msg;
        return;
    }
    if (send(data, data_len) < 0){
        cout << "Write Error:: " << __FILE__ << " " << (int)__LINE__ << endl;
    }
    delete msg;
}
``` void Connection::send_disconnect()                                            *send_disconnect*
```
{
        char tmpbuf[20];

tmpbuf[MSG_HOFFSET_TYPE] = REQUEST_MR_SERVER;
        tmpbuf[MSG_HOFFSET_CODE] = MR_DISCONNECT;
        Conv()->IntToBuf(0, tmpbuf+MSG_HOFFSET_SEQ);
        Conv()->IntToBuf(0, tmpbuf+MSG_HOFFSET_LEN);
``` client.C client.C

```
        if (send(tmpbuf, MSG_HEADER_LEN) == -1) {                        ...send_disconnect
        }
        deactivate_self();
} int Connection::send(char *data, int len)                                send
{
        CHECK_MMC_CONNECTION(conn)
        if (NW->Write(conn, data, len) < len) {
                deactivate_self();
                return(-1);
        }
        return(0);
} int Connection::send(Message *msg)                                       send
{
        CHECK_MMC_CONNECTION(conn)
        if (NW->Write(conn, msg->msg_header(), MSG_HEADER_LEN) < MSG_HEADER_LEN){
                deactivate_self();
                return(-1);
        }
        CHECK_MMC_CONNECTION(conn)
        if (NW->Write(conn, msg->msg_data(), msg->msg_len()) < msg->msg_len()){
                deactivate_self();
                return(-1);
        }
        return(0);
} int Connection::send(MedServRequestClass *msg)                           send
{
        CHECK_MMC_CONNECTION(conn)
        if (NW->Write(conn, msg->msg_header(), MSG_HEADER_LEN) < MSG_HEADER_LEN){
                deactivate_self();
                return(-1);
        }
        CHECK_MMC_CONNECTION(conn)
        if (NW->Write(conn, msg->request_buffer(), msg->msg_len()) < msg->msg_len()){
                deactivate_self();
                return(-1);
        }
        return(0);
} void Connection::client_process_msg()                                    client_process_msg
{
        CARD8 type, opcode;
        CARD32 msg_seq, msg_len;
        Message *msg;
        enum msg_obj_states status;

VOID_CHECK_MMC_CONNECTION(conn)
        if (NW->Read(header, header_len) < header_len){
#ifdef DEBUG
                cout << "Read Error:: " << __FILE__ << " " << (int)__LINE__ << endl;
#endif
                deactivate_self();
                return;
        }

Prot->interpret_header(header, type, opcode, msg_seq, msg_len);
#ifdef DEBUG
        cout << " Len:" << msg_len << " " << msg_seq << " Type: "
                << (int)type << " Opcode: " << (int)opcode << endl;
        cout.flush();
endif
``` client.C

*...client_process_msg*

```
        if (msg_len > 0) {
            buf.reserve(msg_len);
            VOID_CHECK_MMC_CONNECTION(conn)
            if (NW->Read(buf, msg_len) < msg_len){
#ifdef DEBUG
                cout << "Read Error:: " << __FILE__ << " " << (int)__LINE__ << endl;
#endif
                deactivate_self();
                return;
            }
        } msg = Prot->construct_msg(header, type, opcode, msg_seq, msg_len, buf, this);
        if (msg) {
            status = msg->action();
            switch(status) {
                case e_MSG_PENDING:
                    break;

case e_MSG_SERVICED:
                default:
                    delete msg;
                    break;
            }
        }
} // client_process_msg
```

```
Connection::~Connection()
{
}
```
*Connection*

```
///////////////////////////////////////////////////////////
// LocalSession Methods
///////////////////////////////////////////////////////////

LocalSession::LocalSession(MRInterface *iface, MmConnection pCli)
                : Connection(iface, pCli)
{
}
```
*LocalSession*

```
void LocalSession::process_msg()
{
    client_process_msg();
} // process_msg
```
*process_msg*

```
///////////////////////////////////////////////////////////
// FrontEnd Methods
///////////////////////////////////////////////////////////

FrontEnd::FrontEnd(MRInterface *iface, MmConnection pCli)
                : Connection(iface, pCli)
{
}
```
*FrontEnd*

```
void FrontEnd::process_msg()
{
    client_process_msg();
} // process_msg
```
*process_msg*

```
///////////////////////////////////////////////////////////
// ReqMR Methods
///////////////////////////////////////////////////////////

ReqMR::ReqMR(MRInterface *iface, MmConnection serv) :
                Connection(iface, serv)
{
``` client.C

*...process_msg*

```
}
void ReqMR::process_msg()                                              process_msg
{
        CARD8 type, opcode;
        CARD32 msg_seq, msg_len;
        Message *msg;
        enum msg_obj_states status;

VOID_CHECK_MMC_CONNECTION(conn)
        if (NW->Read(header, header_len) < header_len){
#ifdef DEBUG
                cout << "Read Error:: " << __FILE__ << " " << (int)__LINE__ << endl;
#endif
                deactivate_self();
                return;
        }

Prot->interpret_header(header, type, opcode, msg_seq, msg_len);
#ifdef DEBUG
        cout << "Received from other MR Server::  Len:" << msg_len << " " << msg_seq << endl;
        cout.flush();
endif if (msg_len > 0) {
                buf.reserve(msg_len);
                VOID_CHECK_MMC_CONNECTION(conn)
                if (NW->Read(buf, msg_len) < msg_len){
#ifdef DEBUG
                        cout << "Read Error:: " << __FILE__ << " " << (int)__LINE__ << endl;
#endif
                        deactivate_self();
                        return;
                }
        } request_msg->MsgSource()->reply_for_routed_msg(request_msg,
                                        header, buf, msg_len);
        send_disconnect();
} // process_msg
////////////////////////////////////////////////////////////
// ReqNM Methods
////////////////////////////////////////////////////////////

ReqNM::ReqNM(MRInterface *iface, MmConnection serv)                    ReqNM
                : Connection(iface, serv)
{
        nm_seq_no = 0;
} int ReqNM::send_request_msg(Message *msg)                              send_request_msg
{
        nm_seq_no++; // SHOULD REUSE LATER
        SeqNoPair *sp = new SeqNoPair(msg, msg->msg_seq_no());
        if (!sp) {
                cout << "FATAL MEM ALLOC ERROR : " << (int) __FILE__
                        << " " << (int) __LINE__ << endl;
        }
        msg_list.insert_next(sp);
        msg->set_msg_seq_no(nm_seq_no);
#ifdef DEBUG
        cout << "msg->seq : " << msg->msg_seq_no() << endl;
endif return(send(msg));
}
``` client.C

*process_msg*

```
void ReqNM::process_msg()
{
        CARD8 type, opcode;
        CARD32 msg_seq, msg_len;
        Message *m;
        List_of_piter(SeqNoPair) mlist(msg_list);
        enum msg_obj_states status;

VOID_CHECK_MMC_CONNECTION(conn)
        if (NW->Read(header, header_len) < header_len){
#ifdef DEBUG
                cout << "Read Error:: " << __FILE__ << " " << (int)__LINE__ << endl;
#endif
                deactivate_self();
                return;
        }

Prot->interpret_header(header, type, opcode, msg_seq, msg_len);
#ifdef DEBUG
                cout << "Received from Name Server::  Len:" << msg_len << " " << msg_seq << " Type: " <
        cout.flush();
endif if (msg_len > 0) {
                buf.reserve(msg_len);
                VOID_CHECK_MMC_CONNECTION(conn)
                if (NW->Read(buf, msg_len) < msg_len){
#ifdef DEBUG
                        cout << "Read Error:: " << __FILE__ << " " << (int)__LINE__ << endl;
#endif
                        deactivate_self();
                        return;
                }
        }

// The code below presumes that the MR Server would have requested
        // the Name Server ONLY on behalf of a LocalSession and NEVER on its
        // own volition. If the latter case is to be taken care, we need to
        // write a different method for 'm' (instead of reply_for_routed).

// traverse msg_list and find request_msg
        SeqNoPair *p;
        mlist.reset();
        while (mlist.next(p)){
                m = p->GetMsg();
#ifdef DEBUG
                cout << "m->seq : " << m->msg_seq_no() << "  m->code " << (int)m->msg_code()
#endif
                if (m->msg_code() == opcode && m->msg_seq_no() == msg_seq) {
                        Conv(]->IntToBuf(p->GetOrigSeq(), header+MSG_HOFFSET_SEQ);
                        m->MsgSource()->reply_for_routed_msg(m, header,
                                                                                 buf, msg_len);
                        mlist.remove_prev();
                        delete p;
                }
        }
} // process_msg
``` eve_msg.C

```cpp
#include <eve_msg.h>
EveTemplate1::EveTemplate1(char *header, CARD8 msg_typ,
         CARD8 msg_code, int msg_seq_no, int msg_len, char *msg_data,
         Connection *invoker, List(MmConnection)& server_list,
         int src, int room_id, int meeting_id, int participant) :
             EventClass(header, msg_typ, msg_code, msg_seq_no, msg_len,
                     msg_data, invoker, server_list)
{
    build(src, room_id, meeting_id, participant);
    send_event();
}

EveTemplate2::EveTemplate2(char *header, CARD8 msg_typ,
         CARD8 msg_code, int msg_seq_no, int msg_len, char *msg_data,
         Connection *invoker, List(MmConnection)& server_list,
         int src, int room_id) :
             EventClass(header, msg_typ, msg_code, msg_seq_no, msg_len,
                     msg_data, invoker, server_list)
{
    build(src, room_id);
    send_event();
}

EveTemplate3::EveTemplate3(char *header, CARD8 msg_typ,
         CARD8 msg_code, int msg_seq_no, int msg_len, char *msg_data,
         Connection *invoker, List(MmConnection)& server_list,
         int src, int room_id, int meeting_id, List(int)& plist) :
             EventClass(header, msg_typ, msg_code, msg_seq_no, msg_len,
                     msg_data, invoker, server_list)
{
    build(src, room_id, meeting_id, plist);
    send_event();
}

EveTemplate4::EveTemplate4(char *header, CARD8 msg_typ,
         CARD8 msg_code, int msg_seq_no, int msg_len, char *msg_data,
         Connection *invoker, List(MmConnection)& server_list, int src,
             int room_id, int meeting_id, Media med, String& user_desc) :
             EventClass(header, msg_typ, msg_code, msg_seq_no, msg_len,
                     msg_data, invoker, server_list)
{
    build(src, room_id, meeting_id, med, user_desc);
    send_event();
}

EveTemplate5::EveTemplate5(char *header, CARD8 msg_typ,
         CARD8 msg_code, int msg_seq_no, int msg_len, char *msg_data,
         Connection *invoker, List(MmConnection)& server_list,
         int src, int room_id, int meeting_id) :
             EventClass(header, msg_typ, msg_code, msg_seq_no, msg_len,
                     msg_data, invoker, server_list)
{
    build(src, room_id, meeting_id);
    send_event();
}

EveTemplate6::EveTemplate6(char *header, CARD8 msg_typ,
         CARD8 msg_code, int msg_seq_no, int msg_len, char *msg_data,
         Connection *invoker, List(MmConnection)& server_list, int src,
             int room_id, int meeting_id, Media med, String& user_desc,
             List(int)& part_list) :
             EventClass(header, msg_typ, msg_code, msg_seq_no, msg_len,
                     msg_data, invoker, server_list)
{
    build(src, room_id, meeting_id, med, user_desc, part_list);
    send_event();
``` eve_msg.C

} event.C

```c
#include <event.h>
#include <eve_msg.h>
#include <iface.h>
include <med_serv.h>
#include <obj_man.h>
#include <room.h>

Listimplement(MmConnection)

EventNotifier::EventNotifier(MRInterface *iface)
{
    Iface = iface;
    seq_no = 0;
} void EventNotifier::server_conn_list(int room_id,
                     List(MmConnection)& conn_list)
{
    int server;
    List(int) server_list;

Iface->RoomManager()->AssociatedServersInRoom(room_id, server_list);
    conn_list.reset();
#ifdef DEBUG
    cout << "Server List Length: " << server_list.length() << endl;
    cout.flush();
endif
    server_list.reset();
    while (server_list.next(server)){
        conn_list.insert_next(Iface->
                    MediaServerManager()->ServerConnection(server));
    }

// Should also include all the FrontEnd connections in list
    // so that they too receive the events
    List_of_p(FrontEnd) fend_list;
    FrontEnd *fend;
    Iface->FEManager()->GetObjectList(fend_list);
    fend_list.reset();
    while (fend_list.next(fend)) {
        if (fend) conn_list.insert_next(fend->connection());
    }
ifdef DEBUG
    cout << "Event Conn List Length: " << conn_list.length() << endl;
    cout.flush();
endif

} void EventNotifier::fend_conn_list(List(MmConnection)& conn_list)
{
    List_of_p(FrontEnd) fend_list;
    FrontEnd *fend;

conn_list.reset();
    Iface->FEManager()->GetObjectList(fend_list);
    fend_list.reset();
    while (fend_list.next(fend)) {
        if (fend) conn_list.insert_next(fend->connection());
    }
} void EventNotifier::Template1(CARD8 code, int room_id, int src,
                              int meeting_id, int participant)
{
    List(MmConnection) conn_list;
    EveTemplate1 *eve;
``` event.C

...List

```
        server_conn_list(room_id, conn_list);
        if (conn_list.length() > 0) {
                eve = new EveTemplate1((char *)NULL, EVENT_MR_SERVER,
                                code, next_seq_no(),
                                0, (char *)NULL, Iface->PersistentConnection(),
                                conn_list, src, room_id, meeting_id, participant);
                // constructor would have sent the event
                delete eve;
        }
} void EventNotifier::Template2(CARD8 code, int room_id, int src, int id)         Template2
{
        List(MmConnection) conn_list;
        EveTemplate2 *eve;

server_conn_list(room_id, conn_list);
        if (conn_list.length() > 0) {
                eve = new EveTemplate2((char *)NULL, EVENT_MR_SERVER,
                                code, next_seq_no(),
                                0, (char *)NULL, Iface->PersistentConnection(),
                                conn_list, src, id);
                // constructor would have sent the event
                delete eve;
        }
} void EventNotifier::Template4(CARD8 code, int src,
                int room_id, int meeting_id, Media med, String user_desc)
{
        List(MmConnection) conn_list;
        EveTemplate4 *eve;

fend_conn_list(conn_list);
        if (conn_list.length() > 0) {
                eve = new EveTemplate4((char *)NULL, EVENT_MR_SERVER,
                                code, next_seq_no(),
                                0, (char *)NULL, Iface->PersistentConnection(),
                                conn_list, src, room_id, meeting_id, med, user_desc);
                // constructor would have sent the event
                delete eve;
        }
} void EventNotifier::Template5(CARD8 code, int src,
                int room_id, int meeting_id)
{
        List(MmConnection) conn_list;
        EveTemplate5 *eve;

server_conn_list(room_id, conn_list);
        if (conn_list.length() > 0) {
                eve = new EveTemplate5((char *)NULL, EVENT_MR_SERVER,
                                code, next_seq_no(),
                                0, (char *)NULL, Iface->PersistentConnection(),
                                conn_list, src, room_id, meeting_id);
                // constructor would have sent the event
                delete eve;
        }
} void EventNotifier::Template6(CARD8 code, int src,
                int room_id, int meeting_id, Media med, String user_desc,
                List(int)& part_list)
{
        List(MmConnection) conn_list;
        EveTemplate6 *eve;
``` event.C                                                                event.C

*...Template2*

```
#ifdef DEBUG
        cout << "Template6: PLIST_LEN: " << part_list.length(); cout.flush();
endif fend_conn_list(conn_list);
        if (conn_list.length() > 0) {
                eve = new EveTemplate6((char *)NULL, EVENT_MR_SERVER,
                                      code, next_seq_no(),
                                      0, (char *)NULL, Iface->PersistentConnection(),
                                      conn_list, src, room_id, meeting_id, med,
                                      user_desc, part_list);
                // constructor would have sent the event
                delete eve;
        }
} void EventNotifier::AddedParticipant(int room_id, int src,
                                     int meeting_id, int participant)
{
        Template1(EVE_ADDED_PARTICIPANT, room_id, src, meeting_id,
                  participant);
} void EventNotifier::DroppedParticipant(int room_id, int src,
                                       int meeting_id, int participant)
{
        Template1(EVE_DROPPED_PARTICIPANT, room_id, src, meeting_id,
                  participant);
} void EventNotifier::LeftMeeting(int room_id, int src,
                                int meeting_id, int participant)
{
        Template1(EVE_LEFT_MEETING, room_id, src, meeting_id,
                  participant);
} void EventNotifier::ReenterMeeting(int room_id, int src,
                                   int meeting_id, int participant)
{
        Template1(EVE_REENTER_MEETING, room_id, src, meeting_id,
                  participant);
} void EventNotifier::MeetingDestroyed(int room_id, int src,
                                     int meeting_id)
{
        Template5(EVE_MEETING_DESTROYED, src, room_id, meeting_id);
} void EventNotifier::RoomCreated(int room_id, int src)
{
        Template2(EVE_ROOM_CREATED, room_id, src, room_id);
} void EventNotifier::RoomDestroyed(int room_id, int src)
{
        Template2(EVE_ROOM_DESTROYED, room_id, src, room_id);
} void EventNotifier::RoomLocked(int room_id, int src)
{
        Template2(EVE_ROOM_LOCKED, room_id, src, room_id);
} void EventNotifier::RoomUnlocked(int room_id, int src)
{
```

*RoomCreated*

*RoomDestroyed*

*RoomLocked*

*RoomUnlocked* event.C            event.C

```
        Template2(EVE_ROOM_UNLOCKED, room_id, src, room_id);              ...RoomUnlocked
} void EventNotifier::MeetingSuspended(int room_id, int src,
                                     int meeting_id)
{
        Template5(EVE_MEETING_SUSPENDED, src, room_id, meeting_id);
} void EventNotifier::MeetingResumed(int room_id, int src,
                                   int meeting_id)
{
        Template5(EVE_MEETING_RESUMED, src, room_id, meeting_id);
} void EventNotifier::MeetingCreated(int room_id, int src, int meeting_id)     MeetingCreated
{
        Template5(EVE_MEETING_CREATED, src, room_id, meeting_id);
} void EventNotifier::MeetingInfo(int room_id, int src, int meeting_id)        MeetingInfo
{
        List(MmConnection) conn_list;
        List(int) plist;
        EveTemplate3 *eve;

server_conn_list(room_id, conn_list);

if (Iface->RoomManager()->ListMeetingParticipants(meeting_id, plist) < 0)
                return;
        if (conn_list.length() > 0) {
                eve = new EveTemplate3((char *)NULL, EVENT_MR_SERVER,
                                EVE_MEETING_INFO, next_seq_no(),
                                0, (char *)NULL, Iface->PersistentConnection(),
                                conn_list, src, room_id, meeting_id, plist);
                // constructor would have sent the event
                delete eve;
        }
} void EventNotifier::ServerAdded(int src, int room_id, int meeting_id,
                                Media med, String user_desc, List(int)& part_list)
{
        Template6(EVE_SERVER_ADDED, src, room_id, meeting_id,
                        med, user_desc, part_list);
} void EventNotifier::ServerDropped(int src, int room_id, int meeting_id,
                                  Media med, String user_desc)
{
        Template4(EVE_SERVER_DROPPED, src, room_id, meeting_id,
                        med, user_desc);
} void EventNotifier::ServerAccessListSet(int src, int room_id,
        int meeting_id, Media med, String user_desc, List(int)& part_list)
{
        Template6(EVE_SERVER_ACCESS_LIST_SET, src, room_id, meeting_id,
                        med, user_desc, part_list);
}
``` generator.C

```cpp
#include <iostream.h>
include <generator.h>

Message * ProtoGenerator::default_generator(char * header, CARD8 type, CARD8 opcode, CARD32 seq,
        CARD32 len, char *data, Connection *invoker)
{
    cerr << "Illegal Message or Message not implemented: Type:" << type
         << " Code:" << opcode << endl;
    cerr.flush();
    return(new IllegalMessage(header, type, opcode, seq, len, data, invoker));
}

Message * ProtoGenerator::Gen_Disconnect(char * header, CARD8 type, CARD8 opcode, CARD32 seq,
        CARD32 len, char *data, Connection *invoker)
{
    return(new Disconnect(header, type, opcode, seq, len, data, invoker));
}

Message * ProtoGenerator::Gen_CreateRoom(char * header, CARD8 type, CARD8 opcode, CARD32 seq,
        CARD32 len, char *data, Connection *invoker)
{
    if (len < MR_CREATE_ROOM_LEN)
        return(new IllegalMessage(header, type, opcode, seq, len, data, invoker));
    return(new CreateRoom(header, type, opcode, seq, len, data, invoker));
}

Message * ProtoGenerator::Gen_DestroyRoom(char * header, CARD8 type, CARD8 opcode, CARD32 seq,
        CARD32 len, char *data, Connection *invoker)
{
    if (len < MR_DESTROY_ROOM_LEN)
        return(new IllegalMessage(header, type, opcode, seq, len, data, invoker));
    return(new DestroyRoom(header, type, opcode, seq, len, data, invoker));
}

Message * ProtoGenerator::Gen_ListRooms(char * header, CARD8 type, CARD8 opcode, CARD32 seq,
        CARD32 len, char *data, Connection *invoker)
{
    if (len < MR_LIST_ROOMS_LEN)
        return(new IllegalMessage(header, type, opcode, seq, len, data, invoker));
    return(new ListRooms(header, type, opcode, seq, len, data, invoker));
}

Message * ProtoGenerator::Gen_ShowRoomStatus(char * header, CARD8 type, CARD8 opcode, CARD32 seq,
        CARD32 len, char *data, Connection *invoker)
{
    if (len < MR_SHOW_ROOM_STATUS_LEN)
        return(new IllegalMessage(header, type, opcode, seq, len, data, invoker));
    return(new ShowRoomStatus(header, type, opcode, seq, len, data, invoker));
}

Message * ProtoGenerator::Gen_ShowRoomAttributes(char * header, CARD8 type, CARD8 opcode, CARD32 seq,
        CARD32 len, char *data, Connection *invoker)
{
    if (len < MR_SHOW_ROOM_ATTRIBUTES_LEN)
        return(new IllegalMessage(header, type, opcode, seq, len, data, invoker));
    return(new ShowRoomAttributes(header, type, opcode, seq, len, data, invoker));
}

Message * ProtoGenerator::Gen_AlterRoomAttributes(char * header, CARD8 type, CARD8 opcode, CARD32
        CARD32 len, char *data, Connection *invoker)
{
    if (len < MR_ALTER_ROOM_ATTRIBUTES_LEN)
        return(new IllegalMessage(header, type, opcode, seq, len, data, invoker));
    return(new AlterRoomAttributes(header, type, opcode, seq, len, data, invoker));
}
``` generator.C

```cpp
Message * ProtoGenerator::Gen_LockRoom(char * header, CARD8 type, CARD8 opcode, CARD32 seq,
            CARD32 len, char *data, Connection *invoker)
{
    if (len < MR_LOCK_ROOM_LEN)
        return(new IllegalMessage(header, type, opcode, seq, len, data, invoker));
    return(new LockRoom(header, type, opcode, seq, len, data, invoker));
}

Message * ProtoGenerator::Gen_UnlockRoom(char * header, CARD8 type, CARD8 opcode, CARD32 seq,
            CARD32 len, char *data, Connection *invoker)
{
    if (len < MR_UNLOCK_ROOM_LEN)
        return(new IllegalMessage(header, type, opcode, seq, len, data, invoker));
    return(new UnlockRoom(header, type, opcode, seq, len, data, invoker));
}

Message * ProtoGenerator::Gen_ShowAssociatedRoom(char * header, CARD8 type, CARD8 opcode, CARD32 seq,
            CARD32 len, char *data, Connection *invoker)
{
    if (len < MR_SHOW_ASSOCIATED_ROOM_LEN)
        return(new IllegalMessage(header, type, opcode, seq, len, data, invoker));
    return(new ShowAssociatedRoom(header, type, opcode, seq, len, data, invoker));
}

Message * ProtoGenerator::Gen_ShowAssociatedMeeting(char * header, CARD8 type, CARD8 opcode, CARD8
            CARD32 len, char *data, Connection *invoker)
{
    if (len < MR_SHOW_ASSOCIATED_MEETING_LEN)
        return(new IllegalMessage(header, type, opcode, seq, len, data, invoker));
    return(new ShowAssociatedMeeting(header, type, opcode, seq, len, data, invoker));
}

Message * ProtoGenerator::Gen_CreateMeeting(char * header, CARD8 type, CARD8 opcode, CARD32 seq,
            CARD32 len, char *data, Connection *invoker)
{
    if (len < MR_CREATE_MEETING_LEN)
        return(new IllegalMessage(header, type, opcode, seq, len, data, invoker));
    return(new CreateMeeting(header, type, opcode, seq, len, data, invoker));
}

Message * ProtoGenerator::Gen_DestroyMeeting(char * header, CARD8 type, CARD8 opcode, CARD32 seq,
            CARD32 len, char *data, Connection *invoker)
{
    if (len < MR_DESTROY_MEETING_LEN)
        return(new IllegalMessage(header, type, opcode, seq, len, data, invoker));
    return(new DestroyMeeting(header, type, opcode, seq, len, data, invoker));
}

Message * ProtoGenerator::Gen_ListMeetings(char * header, CARD8 type, CARD8 opcode, CARD32 seq,
            CARD32 len, char *data, Connection *invoker)
{
    if (len < MR_LIST_MEETINGS_LEN)
        return(new IllegalMessage(header, type, opcode, seq, len, data, invoker));
    return(new ListMeetings(header, type, opcode, seq, len, data, invoker));
}

Message * ProtoGenerator::Gen_ShowMeetingStatus(char * header, CARD8 type, CARD8 opcode, CARD32 seq,
            CARD32 len, char *data, Connection *invoker)
{
    if (len < MR_SHOW_MEETING_STATUS_LEN)
        return(new IllegalMessage(header, type, opcode, seq, len, data, invoker));
    return(new ShowMeetingStatus(header, type, opcode, seq, len, data, invoker));
}

Message * ProtoGenerator::Gen_ShowMeetRoomStatus(char * header, CARD8 type, CARD8 opcode, CARD32 seq,
``` generator.C

```
                CARD32 len, char *data, Connection *invoker)
{
        if (len < MR_SHOW_MEETING_STATUS_LEN)
                return(new IllegalMessage(header, type, opcode, seq, len, data, invoker));
        return(new ShowMeetRoomStatus(header, type, opcode, seq, len, data, invoker));
}

Message * ProtoGenerator::Gen_ShowMeetingAttributes(char * header, CARD8 type, CARD8 opcode, CARD32 seq,
                CARD32 len, char *data, Connection *invoker)
{
        if (len < MR_SHOW_MEETING_ATTRIBUTES_LEN)
                return(new IllegalMessage(header, type, opcode, seq, len, data, invoker));
        return(new ShowMeetingAttributes(header, type, opcode, seq, len, data, invoker));
}

Message * ProtoGenerator::Gen_AlterMeetingAttributes(char * header, CARD8 type, CARD8 opcode, CARD32 seq,
                CARD32 len, char *data, Connection *invoker)
{
        if (len < MR_ALTER_MEETING_ATTRIBUTES_LEN)
                return(new IllegalMessage(header, type, opcode, seq, len, data, invoker));
        return(new AlterMeetingAttributes(header, type, opcode, seq, len, data, invoker));
}

Message * ProtoGenerator::Gen_AddParticipant(char * header, CARD8 type, CARD8 opcode, CARD32 seq,
                CARD32 len, char *data, Connection *invoker)
{
        if (len < MR_ADD_PARTICIPANT_LEN)
                return(new IllegalMessage(header, type, opcode, seq, len, data, invoker));
        return(new AddParticipant(header, type, opcode, seq, len, data, invoker));
}

Message * ProtoGenerator::Gen_DropParticipant(char * header, CARD8 type, CARD8 opcode, CARD32 seq,
                CARD32 len, char *data, Connection *invoker)
{
        if (len < MR_DROP_PARTICIPANT_LEN)
                return(new IllegalMessage(header, type, opcode, seq, len, data, invoker));
        return(new DropParticipant(header, type, opcode, seq, len, data, invoker));
}

Message * ProtoGenerator::Gen_LeaveMeeting(char * header, CARD8 type, CARD8 opcode, CARD32 seq,
                CARD32 len, char *data, Connection *invoker)
{
        if (len < MR_LEAVE_MEETING_LEN)
                return(new IllegalMessage(header, type, opcode, seq, len, data, invoker));
        return(new LeaveMeeting(header, type, opcode, seq, len, data, invoker));
}

Message * ProtoGenerator::Gen_ReenterMeeting(char * header, CARD8 type, CARD8 opcode, CARD32 seq,
                CARD32 len, char *data, Connection *invoker)
{
        if (len < MR_REENTER_MEETING_LEN)
                return(new IllegalMessage(header, type, opcode, seq, len, data, invoker));
        return(new ReenterMeeting(header, type, opcode, seq, len, data, invoker));
}

Message * ProtoGenerator::Gen_SuspendMeeting(char * header, CARD8 type, CARD8 opcode, CARD32 seq,
                CARD32 len, char *data, Connection *invoker)
{
        if (len < MR_SUSPEND_MEETING_LEN)
                return(new IllegalMessage(header, type, opcode, seq, len, data, invoker));
        return(new SuspendMeeting(header, type, opcode, seq, len, data, invoker));
}

Message * ProtoGenerator::Gen_ResumeMeeting(char * header, CARD8 type, CARD8 opcode, CARD32 seq,
                CARD32 len, char *data, Connection *invoker)
{
        if (len < MR_RESUME_MEETING_LEN)
                return(new IllegalMessage(header, type, opcode, seq, len, data, invoker));
``` generator.C

```
                return(new ResumeMeeting(header, type, opcode, seq, len, data, invoker));
}

Message * ProtoGenerator::Gen_AddServer(char * header, CARD8 type, CARD8 opcode, CARD32 seq,
            CARD32 len, char *data, Connection *invoker)
{
        if (len < MR_ADD_SERVER_LEN)
                return(new IllegalMessage(header, type, opcode, seq, len, data, invoker));
        return(new AddServer(header, type, opcode, seq, len, data, invoker));
}

Message * ProtoGenerator::Gen_DropServer(char * header, CARD8 type, CARD8 opcode, CARD32 seq,
            CARD32 len, char *data, Connection *invoker)
{
        if (len < MR_DROP_SERVER_LEN)
                return(new IllegalMessage(header, type, opcode, seq, len, data, invoker));
        return(new DropServer(header, type, opcode, seq, len, data, invoker));
}

Message * ProtoGenerator::Gen_SetServerAccessList(char * header, CARD8 type, CARD8 opcode, CARD32 seq,
            CARD32 len, char *data, Connection *invoker)
{
        if (len < MR_SET_SERVER_ACCESS_LIST_LEN)
                return(new IllegalMessage(header, type, opcode, seq, len, data, invoker));
        return(new SetServerAccessList(header, type, opcode, seq, len, data, invoker));
}

Message * ProtoGenerator::Gen_ListServers(char * header, CARD8 type, CARD8 opcode, CARD32 seq,
            CARD32 len, char *data, Connection *invoker)
{
        if (len < MR_LIST_SERVERS_LEN)
                return(new IllegalMessage(header, type, opcode, seq, len, data, invoker));
        return(new ListServers(header, type, opcode, seq, len, data, invoker));
}

Message * ProtoGenerator::Gen_GetServerInfo(char * header, CARD8 type, CARD8 opcode, CARD32 seq,
            CARD32 len, char *data, Connection *invoker)
{
        return(new GetServerInfo(header, type, opcode, seq, len, data, invoker));
}

Message * ProtoGenerator::Gen_SuspendServer(char * header, CARD8 type, CARD8 opcode, CARD32 seq,
            CARD32 len, char *data, Connection *invoker)
{
        if (len < MR_SUSPEND_SERVER_LEN)
                return(new IllegalMessage(header, type, opcode, seq, len, data, invoker));
        return(new SuspendServer(header, type, opcode, seq, len, data, invoker));
}

Message * ProtoGenerator::Gen_ResumeServer(char * header, CARD8 type, CARD8 opcode, CARD32 seq,
            CARD32 len, char *data, Connection *invoker)
{
        if (len < MR_RESUME_SERVER_LEN)
                return(new IllegalMessage(header, type, opcode, seq, len, data, invoker));
        return(new ResumeServer(header, type, opcode, seq, len, data, invoker));
}

Message * ProtoGenerator::Gen_NameServerMsg(char * header, CARD8 type, CARD8 opcode, CARD32 seq,
            CARD32 len, char *data, Connection *invoker)
{
        return(new NameServerMsg(header, type, opcode, seq, len, data, invoker));
}

Message * ProtoGenerator::Gen_CreateUser(char * header, CARD8 type, CARD8 opcode, CARD32 seq,
            CARD32 len, char *data, Connection *invoker)
{
        return(new CreateUser(header, type, opcode, seq, len, data, invoker));
}
``` generator.C

```c
Message * ProtoGenerator::Gen_CreateDupUser(char * header, CARD8 type, CARD8 opcode, CARD32 seq,
        CARD32 len, char *data, Connection *invoker)
{
    return(new CreateDupUser(header, type, opcode, seq, len, data, invoker));
}

Message * ProtoGenerator::Gen_DeleteUser(char * header, CARD8 type, CARD8 opcode, CARD32 seq,
        CARD32 len, char *data, Connection *invoker)
{
    return(new DeleteUser(header, type, opcode, seq, len, data, invoker));
}

Message * ProtoGenerator::Gen_GetPersonInfo(char * header, CARD8 type, CARD8 opcode, CARD32 seq,
        CARD32 len, char *data, Connection *invoker)
{
    return(new GetPersonInfo(header, type, opcode, seq, len, data, invoker));
}

Message * ProtoGenerator::Gen_CreateNMEntry(char * header, CARD8 type, CARD8 opcode, CARD32 seq,
        CARD32 len, char *data, Connection *invoker)
{
    return(new CreateNMEntry(header, type, opcode, seq, len, data, invoker));
}

Message * ProtoGenerator::Gen_DeleteNMEntry(char * header, CARD8 type, CARD8 opcode, CARD32 seq,
        CARD32 len, char *data, Connection *invoker)
{
    return(new DeleteNMEntry(header, type, opcode, seq, len, data, invoker));
}

Message * ProtoGenerator::Gen_GetNMEntry(char * header, CARD8 type, CARD8 opcode, CARD32 seq,
        CARD32 len, char *data, Connection *invoker)
{
    return(new GetNMEntry(header, type, opcode, seq, len, data, invoker));
}
``` iface.C

```c
#define DEBUG 1
#define DEFAULT_INPUT_REGISTRY "SERVDESC"

#define DEFAULT_ROOM_START 0
define DEFAULT_ROOM_END 1000 include <iface.h>
include <client.h>
#include <sysent.h>
#include <stdlib.h>
#include <room.h>
#include <server_reg.h>
#include <obj_man.h>
#include <stream.h>
#include <med_serv.h>
#include <event.h>
//#include <Args.h>

List_of_pimplement(CommObjMgr)                              *List_of_pimplement*

MRInterface *G_Iface;

main(int argc, char *argv[])                                *main*
{
    cout << "Staring Server\n"; cout.flush();
    G_Iface = new MRInterface();
    G_Iface->startup(argc, argv);
} void
MRInterface::startup (int argc, char **argv)                *startup*
{
    int port = MR_CLIFACE_PORT;
    String in_file = DEFAULT_INPUT_REGISTRY;
    int c;
    extern char *optarg;
    extern int optind;
    Range range;

FE_port = MR_FEND_PORT;
    while ((c = getopt(argc, argv, "f:p:i:o:")) != -1){
        switch (c) {
            case 'p':
                port = atoi(optarg);
                break;

case 'f':
                FE_port = atoi(optarg);
                break;

case 'i':
                in_file = optarg;
                break;

default:
                cout << "Usage: MRServer [-p <client_port>] [-f <frontend_port>] [-i in_file
                exit(1);
        }
    } if (NW->ActivateServerPort(port) != MmEnum::MmOK){
        cout << "Cannot open listening port...\n"; cout.flush();
        exit(1);
    } if (NW->ActivateServerPort(FE_port) != MmEnum::MmOK){
        cout << "Cannot open front end listening port...\n"; cout.flush();
        exit(1);
``` iface.C

...startup

```
    }
    if (!(SReg = new ServerRegistry(this, in_file))){
            cout << "Fatal Memory Alloc. Error: " << __FILE__ << ":"
                    << __LINE__ << endl;
            exit(1);
    }
    SReg->my_range(range);

MSMgr = new MediaServerMgr(this);
    if (!MSMgr) {
            cout << "Fatal Memory Alloc. Error: " << __FILE__ << ":"
                    << __LINE__ << endl;
            exit(1);
    }
    object_list.insert_next((CommObjMgr *)MSMgr);

NMMgr = new ReqNMMgr(this);
    if (!NMMgr) {
            cout << "Fatal Memory Alloc. Error: " << __FILE__ << ":"
                    << __LINE__ << endl;
            exit(1);
    }
    if (!NMMgr->IsAlive()){
            cout << "Cannot talk to NameServer. Exiting...\n";
            exit(1);
    }
    object_list.insert_next((CommObjMgr *)NMMgr);

MRMgr = new ReqMRMgr(this);
    if (!MRMgr) {
            cout << "Fatal Memory Alloc. Error: " << __FILE__ << ":"
                    << __LINE__ << endl;
            exit(1);
    }
    object_list.insert_next((CommObjMgr *)MRMgr);

Range range1;
//  range1.start = range1.end = 0;
    range1.start = range.start; range1.end = range.end;
    if (!(RMgr = new RoomMgr(this, range1))){
            cout << "Fatal Memory Alloc. Error: " << __FILE__ << ":"
                    << __LINE__ << endl;
            exit(1);
    }

LSMgr = new LocalSessionMgr(this);
    if (!LSMgr) {
            cout << "Fatal Memory Alloc. Error: " << __FILE__ << ":"
                    << __LINE__ << endl;
            exit(1);
    }
    object_list.insert_next((CommObjMgr *)LSMgr);

FEMgr = new FrontEndMgr(this);
    if (!FEMgr) {
            cout << "Fatal Memory Alloc. Error: " << __FILE__ << ":"
                    << __LINE__ << endl;
            exit(1);
    }
// THIS WILL NOT BE INSERTED IN THE OBJECT LIST
// HANDLE AS SPECIAL CASE IN main_loop if (!(ConvMethods = new Convert())){
            cout << "Fatal Memory Alloc. Error: " << __FILE__ << ":"
                    << __LINE__ << endl;
            exit(1);
    }
``` iface.C

```
        if (!(Prot = new Protocol(this))){
                cout << "Fatal Memory Alloc. Error: " << __FILE__ << ":"
                        << __LINE__ << endl;
                exit(1);
        }

// This is a dummy connection - used to initialize some
        // objects which need a Connection*
        if (!(PersConn = new ReqMR(this, MmConnection()))){
                cout << "Fatal Memory Alloc. Error: " << __FILE__ << ":"
                        << __LINE__ << endl;
                exit(1);
        } if (!(EveNot = new EventNotifier(this))){
                cout << "Fatal Memory Alloc. Error: " << __FILE__ << ":"
                        << __LINE__ << endl;
                exit(1);
        } main_loop();
} void
MRInterface::main_loop ()
{
        List_of_piter(CommObjMgr) olist(object_list);
        CommObjMgr *obj;

//      NW->Block();
        for (;;) {
                if (NW->Select() != MmEnum::MmOK)
                        continue;

if (NW->CurrentConnection()->ServerPort() == FE_port) {
                        // Special case: msg from front end
                        FEMgr->process(NW->CurrentConnection());
                }
                else {
                        olist.reset();
                        while (olist.next(obj))
                                obj->process(NW->CurrentConnection());
                }
        }
} void MRInterface::garbage_collect()
{
}

MRInterface::~MRInterface()
{
        if (Prot) delete Prot ;
        if (RMgr) delete RMgr;
        if (SReg) delete SReg;
        if (MSMgr) delete MSMgr;
        if (NMMgr) delete NMMgr;
        if (LSMgr) delete LSMgr;
        if (MRMgr) delete MRMgr;
        if (EveNot) delete EveNot;
        if (PersConn) delete PersConn;
        if (FEMgr) delete FEMgr;
} void shutdown()
{
        if (G_Iface) delete G_Iface;
```

*...startup*

*main_loop*

*garbage_collect*

*MRInterface*

*shutdown* iface.C

```
        exit(1);
}
``` iface.C

*...shutdown* med_serv.C                                                                  med_serv.C

```
#include <iface.h>
include <room.h>
#include <client.h>
#include <med_serv.h>
#include <server_reg.h>

List_of_pimplement(MediaServer)                                         List_of_pimplement
List_of_pimplement(MedServRequestClass)                                 List_of_pimplement ///////////////////////////////////////////////////////////////
// MediaServer Methods
///////////////////////////////////////////////////////////////

MediaServer::MediaServer(MRInterface *iface,
          MmConnection serv, int med_id, int room, MediaServerInfo *info) :
          Connection(iface, serv)
{
    id = med_id; Medium = info->MediaType; UserDesc = info->UserDesc;
    mgr_conn_info = conn_info = info->Conn;
} void MediaServer::process_msg()                                         process_msg
{
        CARD8 type, opcode;
        CARD32 msg_seq, msg_len;
        MedServRequestClass *m;
        enum msg_obj_states status;

if (NW->Read(header, header_len) < header_len){
#ifdef DEBUG
                cerr << "Read Error:: " << __FILE__ << " " << (int)__LINE__ << endl;
#endif
                deactivate_self();
                return;
        }

Prot->interpret_header(header, type, opcode, msg_seq, msg_len);
#ifdef DEBUG
        cerr << "Received from Media Server:: Len:" << msg_len << " Seq:" << msg_seq << " Type: "
        cerr.flush();
endif if (msg_len > 0) {
                buf.reserve(msg_len);
                if (NW->Read(buf, msg_len) < msg_len){
#ifdef DEBUG
                        cerr << "Read Error:: " << __FILE__ << " " << (int)__LINE__ << endl;
#endif
                        deactivate_self();
                        return;
                }
        }

// Handling replies for this class is a bit funny -- Since the
        // messages of this class were sent on receipt of some other
        // messages, we have to take action on the original messages
        // rather than this message.

// Search for matching opcode/seq_no in msg_list
        // Invoke action on that message and delete it
        msg_list.reset();
        while (msg_list.next(m)){
            if (m->msg_code() == opcode && m->msg_seq_no() == msg_seq) {
                    if (type == ERROR_GEN_SERVER && m->stimulant()){
                        (void)m->stimulant()->error_obj()->e_action(
                            ERROR_MR_SERVER, (CARD32)m->stimulant()->msg_code(),
                            m->stimulant()->msg_seq_no(), -ERR_SERV_CONN_REJECT);
``` med_serv.C

```
            }
            else
                    (void) m->special_action(buf, msg_len);
            msg_list.remove_prev();
                    delete m;
        }
    }
} // process_msg
```
*...process_msg*

```
int MediaServer::send_request_msg(MedServRequestClass *medserv_msg)
{
        msg_list.insert_next(medserv_msg);
        return(send(medserv_msg));
}
```
*send_request_msg*

```
MediaServer::~MediaServer()
{
#ifdef DEBUG
cout << "MediaServer " << (int)Medium << " Deleted\n"; cout.flush();
#endif
        Iface->RoomManager()->MediaServerDied(id);
}
```
*MediaServer*

```
/////////////////////////////////////////
// MediaServerMgr methods
///////////////////////////////////////// void MediaServerMgr::process(MmConnection serv)
{
        List_of_piter(MediaServer) clist(server_list);
        MediaServer *obj;

clist.reset();
        while (clist.next(obj)){
                if (obj->connection() == serv){
                        obj->process_msg();
                        garbage_collect();
                        return;
                }
        }
}
```
*process*

```
MediaServerMgr::~MediaServerMgr()
{
        MediaServer *m;

server_list.reset();
        while (server_list.next(m)){
                if (m) delete m;
        }
}
```
*MediaServerMgr*

```
int     MediaServerMgr::init_media_server(RequestClass *stimulant,
        int room, Media m, String user_desc, List(int) part_list)
{
        List_of_piter(MediaServer) slist(server_list);
        MediaServer *med = (MediaServer *) NULL;
        MmConnection server;
        MediaServerInfo *info;
        String machine;
        int port, dummy, len;
        char host[HOST_NAME_LEN];
        AssociateServer *msg;
        int found = -1, err;

slist.reset();
``` med_serv.C

*...MediaServerMgr*

```
        while (slist.next(med)){
                dummy = (med->user_desc() == user_desc) ? 1 : 0;
                if (dummy && med->medium() == m){
                        if (Iface->RoomManager()->IsServerPresent(room, med->ServerId()))
                                return(-ERR_SERVER_ALREADY_ADDED);
                        found = med->ServerId();
                        break;
                }
        } if (found == -1) { // Not in the list. Create a new one.
                if (info = Iface->ServReg()->ListMediaServerInfo(m, user_desc)){
                        if (info->Conn.conn_type == INTERNET_CONNECTION){
                                server = NW->CallServer(info->Conn.machine.dump(host),
                                                        info->Conn.port);
                                if (server->IsAssigned() == MmEnum::MmFalse) {
                                        cout << "Cannot connect to " << info->Conn.machine
                                                << ":" << info->Conn.port << endl;
                                        return(-ERR_CANNOT_CONTACT_MEDIA_SERVER);
                                }
                                server->NameTag("MS");
                                med = new MediaServer(Iface, server, ++next_server_id,
                                                        room, info);
                                if (med)
                                        server_list.insert_next(med);
                        }
                }
                else{
                        return(-ERR_CANNOT_CONTACT_MEDIA_SERVER);
                }
        } if (!med) return(-ERR_NO_RESOURCES);

// send an AssociateServer msg to the media server
        msg = new AssociateServer(stimulant, NULL, REQUEST_GEN_SERVER,
                        GEN_ASSOCIATE_SERVER, next_seq_no(), 0, NULL, med,
                        room, part_list, m, user_desc);
        if (!msg) return(-ERR_NO_RESOURCES);
        if (med->send_request_msg(msg) < 0)
                return(-ERR_CANNOT_CONTACT_MEDIA_SERVER);
        return(0);
}
```

MediaServer * MediaServerMgr::get_media_server(Media m, String user_desc)    *get_media_server*
```
{
        List_of_piter(MediaServer) slist(server_list);
        MediaServer *med = (MediaServer *) NULL;
        int dummy;

slist.reset();
        while (slist.next(med)){
                dummy = (med->user_desc() == user_desc) ? 1 : 0;
                if (dummy && med->medium() == m)
                        break;
        }
        return(med);
}
```

MediaServer * MediaServerMgr::get_media_server(int server_id)    *get_media_server*
```
{
        List_of_piter(MediaServer) slist(server_list);
        MediaServer *med = (MediaServer *) NULL;
        int dummy;

slist.reset();
        while (slist.next(med)){
                if (med->ServerId() == server_id)
``` med_serv.C

*...get_media_server*

```
                break;
        }
        return(med);
} int MediaServerMgr::AddServer(RequestClass *msg, CARD32 requester, int room_id,
            Media media, String& user_desc, List(int)& part_list)
{
        int serv;

// ADD SECURITY
        // if bad room, error. If server already in room, error. If cannot
        // contact server, error.
        if (!Iface->RoomManager()->is_valid_room(room_id))
                return(-ERR_BAD_ROOM_ID);
        return(init_media_server(msg, room_id, media, user_desc, part_list));
} int MediaServerMgr::DropServer(RequestClass *msg, CARD32 requester,
            int room_id, Media media, String& user_desc)
{
        MediaServer *serv;
        MedServRequestClass *req;

// ADD SECURITY
        if (!Iface->RoomManager()->is_valid_room(room_id))
                return(-ERR_BAD_ROOM_ID);
        if ((serv = get_media_server(media, user_desc)) == (MediaServer*)NULL)
                return(-ERR_CANNOT_CONTACT_MEDIA_SERVER);
        req = new DisassociateServer(msg, NULL, REQUEST_GEN_SERVER,
                    GEN_DISASSOCIATE_SERVER, next_seq_no(), 0, NULL, serv,
                    room_id, media, user_desc);
        if (!req) return(-ERR_NO_RESOURCES);
        if (serv->send_request_msg(req) < 0)
                return(-ERR_CANNOT_CONTACT_MEDIA_SERVER);
        return(0);
}
```

*DropServer*

```
void MediaServerMgr::DropServer(int room_id, int server_id)
{
        MediaServer *serv;
        MedServRequestClass *req;
        Media media;
        String user_desc;

serv = get_media_server(server_id);
        if (!serv) return;
        if (get_server_info(server_id, media, user_desc) < 0)
                return;
        req = new DisassociateServer((RequestClass*)NULL, NULL,
                    REQUEST_GEN_SERVER, GEN_DISASSOCIATE_SERVER, next_seq_no(),
                    0, NULL, serv, room_id, media, user_desc);
        if (!req) return;
        (void) serv->send_request_msg(req);
        return;
} int MediaServerMgr::SuspendServer(RequestClass *msg, CARD32 requester,
            int room_id, Media media, String& user_desc)
{
        MediaServer *serv;
        MedServRequestClass *req;

// ADD SECURITY
        if (!Iface->RoomManager()->is_valid_room(room_id))
                return(-ERR_BAD_ROOM_ID);
        if ((serv = get_media_server(media, user_desc)) == (MediaServer*)NULL)
                return(-ERR_CANNOT_CONTACT_MEDIA_SERVER);
``` med_serv.C

```
                req = new GenSuspendServer(msg, NULL, REQUEST_GEN_SERVER,
                        GEN_SUSPEND_SERVER, next_seq_no(), 0, NULL, serv,
                        room_id, media, user_desc);
                if (!req) return(-ERR_NO_RESOURCES);
                if (serv->send_request_msg(req) < 0)
                        return(-ERR_CANNOT_CONTACT_MEDIA_SERVER);
                return(0);
} int MediaServerMgr::ResumeServer(RequestClass *msg, CARD32 requester,
                int room_id, Media media, String& user_desc)
{
        MediaServer *serv;
        MedServRequestClass *req;

// ADD SECURITY
        if (!Iface->RoomManager()->is_valid_room(room_id))
                return(-ERR_BAD_ROOM_ID);
        if ((serv = get_media_server(media, user_desc)) == (MediaServer*)NULL)
                return(-ERR_CANNOT_CONTACT_MEDIA_SERVER);
        req = new GenResumeServer(msg, NULL, REQUEST_GEN_SERVER,
                GEN_RESUME_SERVER, next_seq_no(), 0, NULL, serv,
                room_id, media, user_desc);
        if (!req) return(-ERR_NO_RESOURCES);
        if (serv->send_request_msg(req) < 0)
                return(-ERR_CANNOT_CONTACT_MEDIA_SERVER);
        return(0);
} int MediaServerMgr::SetServerAccessList(RequestClass *msg,
                CARD32 requester, int room_id, Media media, String& user_desc,
                List(int)& part_list)
{
        MediaServer *serv;
        MedServRequestClass *req;

// ADD SECURITY
        if (!Iface->RoomManager()->is_valid_room(room_id))
                return(-ERR_BAD_ROOM_ID);
        if ((serv = get_media_server(media, user_desc)) == (MediaServer*)NULL)
                return(-ERR_CANNOT_CONTACT_MEDIA_SERVER);
        req = new SetAccessList(msg, NULL, REQUEST_GEN_SERVER,
                GEN_SET_ACCESS_LIST, next_seq_no(), 0, NULL, serv,
                room_id, part_list, media, user_desc);
        if (!req) return(-ERR_NO_RESOURCES);
        if (serv->send_request_msg(req) < 0)
                return(-ERR_CANNOT_CONTACT_MEDIA_SERVER);
        return(0);
} void MediaServerMgr::send(int m, char *data, int len)
{
        List_of_piter(MediaServer) slist(server_list);
        MediaServer *med = (MediaServer *) NULL;

slist.reset();
        while (slist.next(med)){
                if (med->ServerId() == m) {
                        med->send(data,len);
                        return;
                }
        }
} void MediaServerMgr::send_to_all_servers(char *data, int len)
{
        List_of_piter(MediaServer) slist(server_list);
        MediaServer *med = (MediaServer *) NULL;
```

*...DropServer*

*send*

*send_to_all_servers* med_serv.C

*...send_to_all_servers*

```
        slist.reset();
        while (slist.next(med))
                (void) med->send(data,len);
} void MediaServerMgr::garbage_collect()
{
        List_of_piter(MediaServer) clist(server_list);
        MediaServer *obj;

clist.reset();
        while (clist.next(obj)){
                if (!obj->is_alive()){
                        delete obj;
                        clist.remove_prev();
                }
        }
} int MediaServerMgr::get_server_connection(Media m, String& user_desc,
                                MediaServerConn& conn)
{
        List_of_piter(MediaServer) slist(server_list);
        MediaServer *med = (MediaServer *) NULL;
        int dummy;

slist.reset();
        while (slist.next(med)){
                dummy = (med->user_desc() == user_desc) ? 1 : 0;
                if (med->medium() == m && dummy)
                        return(med->get_server_connection(conn));
        }
        return(-1);
} int MediaServerMgr::get_manager_connection(Media m, String& user_desc,
                                MediaServerConn& conn)
{
        List_of_piter(MediaServer) slist(server_list);
        MediaServer *med = (MediaServer *) NULL;
        int dummy;

slist.reset();
        while (slist.next(med)){
                dummy = (med->user_desc() == user_desc) ? 1 : 0;
                if (med->medium() == m && dummy)
                        return(med->get_manager_connection(conn));
        }
        return(-1);
} void MediaServerMgr::set_manager_port(Media m, String& user_desc,
                                int port)
{
        List_of_piter(MediaServer) slist(server_list);
        MediaServer *med = (MediaServer *) NULL;
        int dummy;

slist.reset();
        while (slist.next(med)){
                dummy = (med->user_desc() == user_desc) ? 1 : 0;
                if (med->medium() == m && dummy)
                        med->set_manager_port(port);
        }
}
```

*garbage_collect* med_serv.C

```c
int MediaServerMgr::get_server_id(Media m, String& user_desc)
{
        List_of_piter(MediaServer) slist(server_list);
        MediaServer *med = (MediaServer *) NULL;
        int dummy;

slist.reset();
        while (slist.next(med)){
                dummy = (med->user_desc() == user_desc) ? 1 : 0;
                if (med->medium() == m && dummy)
                        return(med->ServerId());
        }
        return(-1);
} int MediaServerMgr::get_server_info(int server, Media& m,
                                                    String& user_desc)
{
        List_of_piter(MediaServer) slist(server_list);
        MediaServer *med = (MediaServer *) NULL;
        int dummy;

slist.reset();
        while (slist.next(med)){
                if (med->ServerId() == server) {
                        m = med->medium();
                        user_desc = med->user_desc();
                        return(0);
                }
        }
        return(-1);
}

MmConnection MediaServerMgr::ServerConnection(int server)
{
        List_of_piter(MediaServer) slist(server_list);
        MediaServer *med = (MediaServer *) NULL;

slist.reset();
        while (slist.next(med)){
                if (med->ServerId() == server) {
                        return(med->connection());
                }
        }
        return((MmConnection) NULL);
}
```

*get_server_id*

*ServerConnection* medserv_msg.C

```cpp
#include <iface.h>
include <client.h>
#include <iostream.h>
include <room.h>
include <med_serv.h> msg_obj_states AddServer::action()                                          action
{
        int room_id, participant, nbytes, pos = 0;
        CARD32 requester;
        Media media;
        String user_desc;
        List(int) part_list;
        int err, list_len, res_len = len;

#ifdef DEBUG
        cout << "AddServer called\n"; cout.flush();
endif (void)Conv->BufToCARD32(data+pos, res_len, nbytes, requester); pos += nbytes;
        (void)Conv->BufToCARD32(data+pos, res_len, nbytes, room_id); pos += nbytes;
        media = (Media)data[pos++];
        if (Conv->BufToString(data+pos, res_len, nbytes, user_desc) < 0)
                return(error->e_action(ERROR_MR_SERVER, opcode, seq_no, ERR_INCOMPLETE_MSG));
        pos += nbytes;

if (Conv->BufToCARD32(data+pos, res_len, nbytes, list_len) < 0)
                return(error->e_action(ERROR_MR_SERVER, opcode, seq_no, ERR_INCOMPLETE_MSG));
        pos += nbytes;

part_list.reset();
        for (int i = 0; i < list_len; i++){
                if (Conv->BufToCARD32(data+pos, res_len, nbytes, participant) < 0)
                        return(error->e_action(ERROR_MR_SERVER, opcode, seq_no, ERR_INCOMPLETE_MSG));
                pos += nbytes;
                part_list.insert_next(participant);
        } if ((err = MSMgr->AddServer(this, requester, room_id, media,
                                    user_desc, part_list)) < 0)
                return(error->e_action(ERROR_MR_SERVER, opcode, seq_no, -err));

return(e_MSG_PENDING);
} //AddServer::action void REP_AddServer::r_action(MediaServerConn& conn)                         r_action
{
        int rep_len, pos = MSG_HEADER_LEN;

rep_buf.reserve(conn.machine.length()+9);
        rep_buf[pos++] = INTERNET_CONNECTION;
        Conv->IntToBuf(conn.machine.length(), ((char *)rep_buf)+pos); pos += 4;
        strcpy(((char *)rep_buf)+pos, conn.machine); pos += conn.machine.length();
        Conv->IntToBuf(conn.port, ((char *)rep_buf)+pos); pos += 4;

rep_len = len_in_CARD32(pos-MSG_HEADER_LEN);
        fill_reply_header(type, opcode, seq_no, rep_len);
        (void) Invoker->send(rep_buf, MSG_HEADER_LEN+rep_len*4);
} msg_obj_states DropServer::action()                                         action
{
        int room_id, participant, nbytes, pos = 0;
        CARD32 requester;
        Media media;
        String user_desc;
``` medserv_msg.C

```
        int err, res_len = len;
#ifdef DEBUG                                                            ...action
        cout << "DropServer called\n"; cout.flush();
endif (void)Conv->BufToCARD32(data+pos, res_len, nbytes, requester); pos += nbytes;
        (void)Conv->BufToCARD32(data+pos, res_len, nbytes, room_id); pos += nbytes;
        media = (Media)data[pos++];
        if (Conv->BufToString(data+pos, res_len, nbytes, user_desc) < 0)
                return(error->e_action(ERROR_MR_SERVER, opcode, seq_no, ERR_INCOMPLETE_MSG));
        pos += nbytes;

if ((err = MSMgr->DropServer(this, requester, room_id, media,
                                              user_desc)) < 0)
                return(error->e_action(ERROR_MR_SERVER, opcode, seq_no, -err));

return(e_MSG_PENDING);
} //DropServer::action msg_obj_states SuspendServer::action()                                  action
{
        int room_id, participant, nbytes, pos = 0;
        CARD32 requester;
        Media media;
        String user_desc;
        int err, res_len = len;

#ifdef DEBUG
        cout << "SuspendServer called\n"; cout.flush();
endif (void)Conv->BufToCARD32(data+pos, res_len, nbytes, requester); pos += nbytes;
        (void)Conv->BufToCARD32(data+pos, res_len, nbytes, room_id); pos += nbytes;
        media = (Media)data[pos++];
        if (Conv->BufToString(data+pos, res_len, nbytes, user_desc) < 0)
                return(error->e_action(ERROR_MR_SERVER, opcode, seq_no, ERR_INCOMPLETE_MSG));
        pos += nbytes;

if ((err = MSMgr->SuspendServer(this, requester, room_id, media,
                                              user_desc)) < 0)
                return(error->e_action(ERROR_MR_SERVER, opcode, seq_no, -err));

return(e_MSG_PENDING);
} //SuspendServer::action msg_obj_states ResumeServer::action()                                   action
{
        int room_id, participant, nbytes, pos = 0;
        CARD32 requester;
        Media media;
        String user_desc;
        int err, res_len = len;

#ifdef DEBUG
        cout << "ResumeServer called\n"; cout.flush();
endif (void)Conv->BufToCARD32(data+pos, res_len, nbytes, requester); pos += nbytes;
        (void)Conv->BufToCARD32(data+pos, res_len, nbytes, room_id); pos += nbytes;
        media = (Media)data[pos++];
        if (Conv->BufToString(data+pos, res_len, nbytes, user_desc) < 0)
                return(error->e_action(ERROR_MR_SERVER, opcode, seq_no, ERR_INCOMPLETE_MSG));
        pos += nbytes;

if ((err = MSMgr->ResumeServer(this, requester, room_id, media,
                                              user_desc)) < 0)
                return(error->e_action(ERROR_MR_SERVER, opcode, seq_no, -err));
``` medserv_msg.C

```
        return(e_MSG_PENDING);
} //ResumeServer::action
```
...action

```
msg_obj_states SetServerAccessList::action()
{
        int room_id, participant, nbytes, pos = 0;
        CARD32 requester;
        Media media;
        String user_desc;
        List(int) part_list;
        int err, list_len, res_len = len;

#ifdef DEBUG
        cout << "SetServerAccessList called\n"; cout.flush();
endif (void)Conv->BufToCARD32(data+pos, res_len, nbytes, requester); pos += nbytes;
        (void)Conv->BufToCARD32(data+pos, res_len, nbytes, room_id); pos += nbytes;
        media = (Media)data[pos++];
        if (Conv->BufToString(data+pos, res_len, nbytes, user_desc) < 0)
                return(error->e_action(ERROR_MR_SERVER, opcode, seq_no, ERR_INCOMPLETE_MSG));
        pos += nbytes;

if (Conv->BufToCARD32(data+pos, res_len, nbytes, list_len) < 0)
                return(error->e_action(ERROR_MR_SERVER, opcode, seq_no, ERR_INCOMPLETE_MSG));
        pos += nbytes;

part_list.reset();
        for (int i = 0; i < list_len; i++){
                if (Conv->BufToCARD32(data+pos, res_len, nbytes, participant) < 0)
                return(error->e_action(ERROR_MR_SERVER, opcode, seq_no, ERR_INCOMPLETE_MSG));
                pos += nbytes;
                part_list.insert_next(participant);
        } if ((err = MSMgr->SetServerAccessList(this, requester, room_id, media,
                                        user_desc, part_list)) < 0)
                return(error->e_action(ERROR_MR_SERVER, opcode, seq_no, -err));

return(e_MSG_PENDING);
} //SetServerAccessList::action
```
action

```
msg_obj_states ListServers::action()
{
        int room_id, participant, nbytes, pos = 0;
        CARD32 requester;
        int err, res_len = len;
        List_of_p(FullMediaDesc) med_list;
        REP_ListServers *reply;

#ifdef DEBUG
        cout << "DropServer called\n"; cout.flush();
endif (void)Conv->BufToCARD32(data+pos, res_len, nbytes, requester); pos += nbytes;
        (void)Conv->BufToCARD32(data+pos, res_len, nbytes, room_id); pos += nbytes;

if ((err = RMgr->ListServers(requester, room_id, med_list)) < 0)
                return(error->e_action(ERROR_MR_SERVER, opcode, seq_no, -err));

reply = new REP_ListServers(NULL, REPLY_MR_SERVER, opcode, seq_no, 0,
                                        NULL, Invoker);
        if (!reply) {
                cout << "Fatal Mem Alloc. Error: " << __FILE__ << " " << __LINE__ << endl;
                return(e_MSG_SERVICED);
        }
        reply->r_action(med_list);
```
action medserv_msg.C

```
        delete reply;
        return(e_MSG_PENDING);
} //ListServers::action
```
...action

```
void REP_ListServers::r_action(List_of_p(FullMediaDesc)& med_list)
{
        int rep_len, pos = MSG_HEADER_LEN;
        FullMediaDesc *m;

rep_buf.reserve(1000); // CHANGE LATER med_list.reset();
        Conv->IntToBuf(med_list.length(), ((char *)rep_buf)+pos); pos += 4;
        while (med_list.next(m)){
                rep_buf[pos++] = (char) m->server;

Conv->IntToBuf(m->user_desc.length(), ((char *)rep_buf)+pos); pos += 4;
                strcpy(((char *)rep_buf)+pos, m->user_desc);
                pos += m->user_desc.length();

Conv->IntToBuf(m->machine.length(), ((char *)rep_buf)+pos); pos += 4;
                strcpy(((char *)rep_buf)+pos, m->machine);
                pos += m->machine.length();

Conv->IntToBuf(m->port, ((char *)rep_buf)+pos); pos += 4;

//              rep_buf[pos++] = (char) m->status;
                delete m; // since it was alloc'd for this
        } rep_len = len_in_CARD32(pos-MSG_HEADER_LEN);
        fill_reply_header(type, opcode, seq_no, rep_len);
        (void) Invoker->send(rep_buf, MSG_HEADER_LEN+rep_len*4);
}
```

List_of_p

```
msg_obj_states GetServerInfo::action()
{
        int room_id, participant, nbytes, pos = 0;
        CARD32 requester;
        int err, res_len = len;
        Media media;
        String user_desc;
        REP_GetServerInfo *reply;

#ifdef DEBUG
        cout << "GetServerInfo called\n"; cout.flush();
endif (void)Conv->BufToCARD32(data+pos, res_len, nbytes, requester); pos += nbytes;
        media = (Media)data[pos++];
        if (Conv->BufToString(data+pos, res_len, nbytes, user_desc) < 0)
                return(error->e_action(ERROR_MR_SERVER, opcode, seq_no, ERR_INCOMPLETE_MSG));
        pos += nbytes;

// Get manager conn info
        MediaServerConn conn;
        if (MSMgr->get_manager_connection(media, user_desc, conn) < 0)
                return(error->e_action(ERROR_MR_SERVER, opcode, seq_no, ERR_NON_EXISTENT));

reply = new REP_GetServerInfo(NULL, REPLY_MR_SERVER, opcode, seq_no, 0,
                                NULL, Invoker);
        if (!reply) {
                cout << "Fatal Mem Alloc. Error: " << __FILE__ << " " << __LINE__ << endl;
                return(e_MSG_SERVICED);
        }
        reply->r_action(conn);
        delete reply;
``` action medserv_msg.C                                                              medserv_msg.C

```
                                                                                    ...action
        return(e_MSG_PENDING);
} //GetServerInfo::action void REP_GetServerInfo::r_action(MediaServerConn& conn)                     r_action
{
        int rep_len, pos = MSG_HEADER_LEN;

rep_buf.reserve(conn.machine.length()+9);
        rep_buf[pos++] = INTERNET_CONNECTION;
        Conv->IntToBuf(conn.machine.length(), ((char *)rep_buf)+pos); pos += 4;
        strcpy(((char *)rep_buf)+pos, conn.machine); pos += conn.machine.length();
        Conv->IntToBuf(conn.port, ((char *)rep_buf)+pos); pos += 4;

rep_len = len_in_CARD32(pos-MSG_HEADER_LEN);
        fill_reply_header(type, opcode, seq_no, rep_len);
        (void) Invoker->send(rep_buf, MSG_HEADER_LEN+rep_len*4);
}

////////////////////////////////////////
// MedServRequest class methods
////////////////////////////////////////

AssociateServer::AssociateServer(RequestClass *stimulant,
                        char *header, CARD8 msg_typ,
                CARD8 msg_code, int msg_seq_no,
                int msg_len, char *msg_data, Connection *invoker,
                int proom, List(int)& plist,
                Media pmedia, String& puser_desc):
        MedServRequestClass(stimulant, header, msg_typ,
                msg_code,msg_seq_no, msg_len, msg_data, invoker,
                        proom, pmedia, puser_desc)
{
        part_list = plist;
        // should send part_list LATER
        common_build();
} void AssociateServer::special_action(Block(char)& reply_data,
                                                int rdata_len)
{
        REP_AddServer *reply;
        MediaServerConn conn;
        int server_port;
        int server_id;
        int err = -ERR_SERV_CONN_REJECT;

server_port = Conv->BufToInt(reply_data);
        // The Media Server would have returned the port number in which it
        // it is listening for connections from the Local Media Agents. The
        // MR Server would know about the machine name of the Media Server
        // as it was able to connect to the Media Server.
        (void) MSMgr->set_manager_port(media, user_desc, server_port);

server_id = MSMgr->get_server_id(media, user_desc);
        if (rdata_len == 4 && (err = RMgr->AddServer
                        (room, server_id, media, user_desc, part_list)) >= 0 &&
                stim_msg){
        reply = new REP_AddServer(NULL, REPLY_MR_SERVER,
                                stim_msg->msg_code(), stim_msg->msg_seq_no(),
                                0, NULL, stim_msg->MsgSource());
                (void) MSMgr->get_manager_connection(media, user_desc, conn);

reply->r_action(conn);
                stim_msg->MsgSource()->serviced_msg(stim_msg);
                delete reply;
        }
        if (err < 0 && stim_msg){
``` medserv_msg.C

```
              (void) stimulant()->error_obj()->e_action(ERROR_MR_SERVER,     ...r_action
                     (CARD32)stimulant()->msg_code(),
                     (CARD32)stimulant()->msg_seq_no(), -err);
              stim_msg->MsgSource()->serviced_msg(stim_msg);
        }
}

DisassociateServer::DisassociateServer(RequestClass *stimulant,
              char *header, CARD8 msg_typ,
        CARD8 msg_code, int msg_seq_no,
        int msg_len, char *msg_data, Connection *invoker,
        int proom, Media pmedia, String& puser_desc):
     MedServRequestClass(stimulant, header, msg_typ,
        msg_code,msg_seq_no, msg_len, msg_data, invoker,
              proom, pmedia, puser_desc)
{
        common_build();
} void DisassociateServer::special_action(Block(char)& reply_data,
                                        int rdata_len)
{
        int server_id, err;

server_id = MSMgr->get_server_id(media, user_desc);
        if ((err = RMgr->DropServer(room, server_id,
                  media, user_desc)) >= 0 && stim_msg){
              (void) stim_msg->error_obj()->success_return(REPLY_MR_SERVER,
                     (CARD32)stimulant()->msg_code(),
                     (CARD32)stimulant()->msg_seq_no());
        }
        if (err < 0 && stim_msg){
              (void) stimulant()->error_obj()->e_action(ERROR_MR_SERVER,
                     (CARD32)stimulant()->msg_code(),
                     (CARD32)stimulant()->msg_seq_no(), -err);
              stim_msg->MsgSource()->serviced_msg(stim_msg);
        }
}

GenSuspendServer::GenSuspendServer(RequestClass *stimulant,
              char *header, CARD8 msg_typ,
        CARD8 msg_code, int msg_seq_no,
        int msg_len, char *msg_data, Connection *invoker,
        int proom, Media pmedia, String& puser_desc):
     MedServRequestClass(stimulant, header, msg_typ,
        msg_code,msg_seq_no, msg_len, msg_data, invoker,
              proom, pmedia, puser_desc)
{
        common_build();
} void GenSuspendServer::special_action(Block(char)& reply_data,
                                      int rdata_len)
{
        int server_id, err;

server_id = MSMgr->get_server_id(media, user_desc);
        if ((err = RMgr->SuspendServer(room, server_id,
                  media, user_desc)) >= 0 && stim_msg){
              (void) stim_msg->error_obj()->success_return(REPLY_MR_SERVER,
                     (CARD32)stimulant()->msg_code(),
                     (CARD32)stimulant()->msg_seq_no());
              stim_msg->MsgSource()->serviced_msg(stim_msg);
        }
        if (err < 0 && stim_msg){
              (void) stimulant()->error_obj()->e_action(ERROR_MR_SERVER,
                     (CARD32)stimulant()->msg_code(),
                     (CARD32)stimulant()->msg_seq_no(), -err);
``` medserv_msg.C

```
                stim_msg->MsgSource()->serviced_msg(stim_msg);
        }
}

GenResumeServer::GenResumeServer(RequestClass *stimulant,
                char *header, CARD8 msg_typ,
                CARD8 msg_code, int msg_seq_no,
                int msg_len, char *msg_data, Connection *invoker,
                int proom, Media pmedia, String& puser_desc):
            MedServRequestClass(stimulant, header, msg_typ,
                msg_code,msg_seq_no, msg_len, msg_data, invoker,
                    proom, pmedia, puser_desc)
{
        common_build();
} void GenResumeServer::special_action(Block(char)& reply_data,
                                        int rdata_len)
{
        int server_id, err;

server_id = MSMgr->get_server_id(media, user_desc);
        if ((err = RMgr->ResumeServer(room, server_id,
                    media, user_desc)) >= 0 && stim_msg){
            (void) stim_msg->error_obj()->success_return(REPLY_MR_SERVER,
                    (CARD32)stimulant()->msg_code(),
                    (CARD32)stimulant()->msg_seq_no());
            stim_msg->MsgSource()->serviced_msg(stim_msg);
        }
        if (err < 0 && stim_msg){
            (void) stimulant()->error_obj()->e_action(ERROR_MR_SERVER,
                    (CARD32)stimulant()->msg_code(),
                    (CARD32)stimulant()->msg_seq_no(), -err);
            stim_msg->MsgSource()->serviced_msg(stim_msg);
        }
}

SetAccessList::SetAccessList(RequestClass *stimulant, char *header,
                CARD8 msg_typ, CARD8 msg_code, int msg_seq_no,
                int msg_len, char *msg_data, Connection *invoker,
                int proom, List(int)& plist,
                Media pmedia, String& puser_desc):
            MedServRequestClass(stimulant, header, msg_typ,
                msg_code,msg_seq_no, msg_len, msg_data, invoker,
                    proom, pmedia, puser_desc)
{
        int p;

part_list = plist;
        req_buf.reserve(MSG_HEADER_LEN+8+plist.length()*4);
        Conv->IntToBuf(room, ((char *)req_buf)+pos); pos += 4;
        Conv->IntToBuf(plist.length(), ((char *)req_buf)+pos); pos += 4;
        while (plist.next(p)){
            Conv->IntToBuf(p, ((char *)req_buf)+pos); pos += 4;
        }
        len = len_in_CARD32(pos) << 2;
        fill_request_header();
} void SetAccessList::special_action(Block(char)& reply_data,
                                        int rdata_len)
{
        int server_id, err;

server_id = MSMgr->get_server_id(media, user_desc);
        if ((err = RMgr->SetAccessList(room, server_id, media,
                    user_desc, part_list)) >= 0 && stim_msg){
            (void) stim_msg->error_obj()->success_return(REPLY_MR_SERVER,
``` medserv_msg.C

```
                (CARD32)stimulant()->msg_code(),
                (CARD32)stimulant()->msg_seq_no());
        stim_msg->MsgSource()->serviced_msg(stim_msg);
    }
    if (err < 0 && stim_msg){
        (void) stimulant()->error_obj()->e_action(ERROR_MR_SERVER,
                (CARD32)stimulant()->msg_code(),
                (CARD32)stimulant()->msg_seq_no(), -err);
        stim_msg->MsgSource()->serviced_msg(stim_msg);
    }
}
``` medserv_msg.C

...r_action mr_msg.C

```c
define DUMMY_CLIENT 1 include <iface.h>
include <client.h>
#include <iostream.h>
include <room.h> msg_obj_states CreateRoom::action()                                             action
{
        int id;
        RoomAttrib rattrib;
        CARD32 owner;
        String room_name;

if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, owner); pos += nbytes;
        (void)Conv->BufToCARD32(data+pos, res_len, nbytes, (int)rattrib); pos += nbytes;

if (Conv->BufToString(data+pos, res_len, nbytes, room_name) < 0)
                return(error->e_action(ERROR_MR_SERVER, opcode, seq_no, -err));

#ifdef DUMP_MSG
        cout << "REQUEST_MR_SERVER: CreateRoom/" << seq_no << "/"
                << len << "  Owner: " << owner << "   Attrib: " <<
                        (int)rattrib << "   Name: " << room_name << endl;
        cout.flush();
endif id = RMgr->CreateRoom(owner, rattrib, room_name);
        if (id < 0)
                return(error->e_action(ERROR_MR_SERVER, opcode, seq_no, -id));

#ifdef DEBUG
        cout << "NEW ID: " << id << endl; cout.flush();
endif reply = new REP_CreateRoom(NULL, REPLY_MR_SERVER, opcode, seq_no, 0,
                                    NULL, Invoker);
        if (!reply) {
                cout << "Fatal Mem Alloc. Error: " << __FILE__ << " " << __LINE__ << endl;
                return(e_MSG_SERVICED);
        }
        reply->r_action(id);
        delete reply;

return(e_MSG_SERVICED);
} //CreateRoom::action void REP_CreateRoom::r_action(int id)                                           r_action
{
        Conv->IntToBuf(id, ((char *)rep_buf)+pos); pos += 4;
        rep_len = 1;
        send_reply();
} msg_obj_states DestroyRoom::action()                                            action
{
        int room_id;
        int requester;

#ifdef DEBUG
        cout << "DestroyRoom called\n"; cout.flush();
#endif
``` mr_msg.C

```
        if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id); pos += nbytes;
#ifdef DUMP_MSG
        cout << "REQUEST_MR_SERVER: DestroyRoom/" << seq_no << "/"
                << len << "  RoomId: " << room_id << endl;
        cout.flush();
endif if ((err = RMgr->DestroyRoom(requester, room_id)) < 0)
                return(error->e_action(ERROR_MR_SERVER, opcode, seq_no, -err));
        return(error->success_return(REPLY_MR_SERVER, opcode, seq_no));
} msg_obj_states ListRooms::action()
{
        CARD32 requester;
        List(int) room_list;
        List(String) name_list;

#ifdef DEBUG
        cout << "ListRooms called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;

if ((err = RMgr->ListRooms(requester, room_list, name_list)) < 0)
                return(error->e_action(ERROR_MR_SERVER, opcode, seq_no, -err));

reply = new REP_ListRooms(NULL, REPLY_MR_SERVER, opcode, seq_no, 0,
                                  NULL, Invoker);
        if (!reply) {
                cout << "Fatal Mem Alloc. Error: " << __FILE__ << " " << __LINE__ << endl;
                return(e_MSG_SERVICED);
        }
        reply->r_action(room_list, name_list);
        delete reply;

return(e_MSG_SERVICED);
} //ListRooms::action void REP_ListRooms::r_action(List(int)& room_list,
                             List(String)& name_list)
{
        int id, list_len = room_list.length();

rep_buf.reserve(4+list_len*4);
        if (list_len) {
                room_list.reset();
                name_list.reset();
                Conv->IntToBuf(list_len, ((char *)rep_buf)+pos); pos += 4;
#ifdef DEBUG
                cout << "RoomList Len: " << list_len << "  :List "; cout.flush();
#endif
                while (room_list.next(id)){
                        String name;
``` mr_msg.C                                                                                                     mr_msg.C

```
                name_list.next(name);                                                          ...action
                Conv->IntToBuf(id, ((char *)rep_buf)+pos); pos += 4;
                Conv->IntToBuf(name.length(), ((char *)rep_buf)+pos); pos += 4;
                strcpy(((char*)rep_buf+pos), name);
                pos += name.length();
#ifdef DEBUG
                cout << " " << id << " ";
#endif
            }
        }
        rep_len = len_in_CARD32(pos-MSG_HEADER_LEN);
        send_reply();
} msg_obj_states ShowRoomStatus::action()                                                        action
{
        int room_id;
        CARD32 requester;
        RoomStatus stat;
        RoomLockStatus lock_stat;

#ifdef DEBUG
        cout << "ShowRoomStatus called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id); pos += nbytes;

if ((err = RMgr->ShowRoomStatus(requester, room_id, stat, lock_stat)) < 0)
                return(error->e_action(ERROR_MR_SERVER, opcode, seq_no, -err));

reply = new REP_ShowRoomStatus(NULL, REPLY_MR_SERVER, opcode, seq_no, 0,
                            NULL, Invoker);
        if (!reply) {
                cout << "Fatal Mem Alloc. Error: " << __FILE__ << " " << __LINE__ << endl;
                return(e_MSG_SERVICED);
        }
        reply->r_action(stat, lock_stat);
        delete reply;

return(e_MSG_SERVICED);
} //ShowRoomStatus::action void REP_ShowRoomStatus::r_action(RoomStatus stat, RoomLockStatus lock_stat)                   r_action
{
        rep_buf[pos++] = (char)stat;
        rep_buf[pos++] = (char)lock_stat;

#ifdef DEBUG
        cout << "RoomStatus: " << (int) stat << " LockStat: " << (int)lock_stat << endl; cout.flush();
#endif
        rep_len = 1;
        send_reply();
} msg_obj_states ShowRoomAttributes::action()                                                    action
{
        int room_id;
        CARD32 requester;
        RoomAttrib attrib;
``` mr_msg.C

```
#ifdef DEBUG
        cout << "ShowRoomAttributes called\n"; cout.flush();
#endif
                                                                                    ...action
        if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id); pos += nbytes;

if ((err = RMgr->ShowRoomAttributes(requester, room_id, attrib)) < 0)
                return(error->e_action(ERROR_MR_SERVER, opcode, seq_no, -err));

reply = new REP_ShowRoomAttributes(NULL, REPLY_MR_SERVER, opcode, seq_no, 0,
                                NULL, Invoker);
        if (!reply) {
                cout << "Fatal Mem Alloc. Error: " << __FILE__ << " " << __LINE__ << endl;
                return(e_MSG_SERVICED);
        }
        reply->r_action(attrib);
        delete reply;

return(e_MSG_SERVICED);
} //ShowRoomAttributes::action void REP_ShowRoomAttributes::r_action(RoomAttrib attrib)                            r_action
{
        rep_buf[pos++] = (char) attrib;
        rep_len = 1;
#ifdef DEBUG
        cout << "RoomAttributes: " << (int) attrib << endl; cout.flush();
#endif
        rep_len = 1;
        send_reply();
} msg_obj_states AlterRoomAttributes::action()                                        action
{
        int room_id;
        CARD32 requester;
        RoomAttrib attrib;

#ifdef DEBUG
        cout << "AlterRoomAttributes called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id); pos += nbytes;
        (void) Conv->BufToCARD32(data+pos, res_len, nbytes, (int)attrib); pos += nbytes;

if ((err = RMgr->AlterRoomAttributes(requester, room_id, attrib)) < 0)
                return(error->e_action(ERROR_MR_SERVER, opcode, seq_no, -err));
        return(error->success_return(REPLY_MR_SERVER, opcode, seq_no));
} //AlterRoomAttributes::action msg_obj_states LockRoom::action()                                                   action
{
        int room_id, nbytes, pos = 0;
        CARD32 requester;
``` mr_msg.C

```
        int err, res_len = len;
#ifdef DEBUG
        cout << "LockRoom called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id);   pos += nbytes;

if ((err = RMgr->LockRoom(requester, room_id)) < 0)
                return(error->e_action(ERROR_MR_SERVER, opcode, seq_no, -err));
        return(error->success_return(REPLY_MR_SERVER, opcode, seq_no));
} //LockRoom::action msg_obj_states UnlockRoom::action()
{
        int room_id;
        CARD32 requester;

#ifdef DEBUG
        cout << "UnlockRoom called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id);   pos += nbytes;

if ((err = RMgr->UnlockRoom(requester, room_id)) < 0)
                return(error->e_action(ERROR_MR_SERVER, opcode, seq_no, -err));
        return(error->success_return(REPLY_MR_SERVER, opcode, seq_no));
} //UnlockRoom::action msg_obj_states ShowAssociatedRoom::action()
{
        int meeting_id, room_id;
        CARD32 requester;

#ifdef DEBUG
        cout << "ShowAssociatedRoom called\n"; cout.flush();
endif if ((err = routing_action()) < 0
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester);  pos += nbytes;
        (void)Conv->BufToCARD32(data+pos, res_len, nbytes, meeting_id); pos += nbytes;

if ((err = RMgr->ShowAssociatedRoom(requester, meeting_id, room_id)) < 0)
                return(error->e_action(ERROR_MR_SERVER, opcode, seq_no, -err));

reply = new REP_ShowAssociatedRoom(NULL, REPLY_MR_SERVER, opcode, seq_no, 0,
                                        NULL, Invoker);
        if (!reply) {
                cout << "Fatal Mem Alloc. Error: " << __FILE__ << " " << __LINE__ << endl;
                return(e_MSG_SERVICED);
``` mr_msg.C

```
        }
        reply->r_action(room_id);                                                     ...action
        delete reply;

return(e_MSG_SERVICED);
} //ShowAssociatedRoom::action void REP_ShowAssociatedRoom::r_action(int room_id)                                    r_action
{
#ifdef DEBUG
        cout << "RoomId: " << room_id << endl; cout.flush();
#endif
        Conv->IntToBuf(room_id, ((char *)rep_buf)+pos); pos += 4;
        rep_len = 1;
        send_reply();
} msg_obj_states ShowAssociatedMeeting::action()                                        action
{
        int meeting_id, room_id;
        CARD32 requester;

#ifdef DEBUG
        cout << "ShowAssociatedMeeting called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id);   pos += nbytes;

if ((err = RMgr->ShowAssociatedMeeting(requester, room_id, meeting_id)) < 0)
                return(error->e_action(ERROR_MR_SERVER, opcode, seq_no, -err));

reply = new REP_ShowAssociatedMeeting(NULL, REPLY_MR_SERVER, opcode, seq_no, 0,
                                        NULL, Invoker);
        if (!reply) {
                cout << "Fatal Mem Alloc. Error: " << __FILE__ << " " << __LINE__ << endl;
                return(e_MSG_SERVICED);
        }
        reply->r_action(meeting_id);
        delete reply;

return(e_MSG_SERVICED);
} //ShowAssociatedMeeting::action void REP_ShowAssociatedMeeting::r_action(int meeting_id)                              r_action
{
#ifdef DEBUG
        cout << "meetingId: " << meeting_id << endl; cout.flush();
#endif
        Conv->IntToBuf(meeting_id, ((char *)rep_buf)+pos); pos += 4;
        rep_len = 1;
        send_reply();
} msg_obj_states CreateMeeting::action()                                                action
{
        int id;
        MeetingAttrib mattrib;
        CARD32 owner, room_id;

if ((err = routing_action()) < 0)
                return(error->e_action(ERROR_MR_SERVER, opcode, seq_no, -err));
``` mr_msg.C

```
        else if (err > 0)                                                              ...action
                return(e_MSG_PENDING);

(void)Conv->BufToCARD32(data+pos, res_len, nbytes, owner);    pos += nbytes;
        (void)Conv->BufToCARD32(data+pos, res_len, nbytes, room_id);  pos += nbytes;
        (void)Conv->BufToCARD32(data+pos, res_len, nbytes, (int)mattrib); pos += nbytes;
#ifdef DUMP_MSG
        cout << "REQUEST_MR_SERVER: CreateMeeting/" << seq_no << "/"
             << len << "  Owner: " << owner << endl;
        cout.flush();
endif id = RMgr->CreateMeeting(owner, room_id, mattrib);
        if (id < 0)
                return(error->e_action(ERROR_MR_SERVER, opcode, seq_no,
                                       -id));

#ifdef DEBUG
        cout << "NEW ID: " << id << endl; cout.flush();
endif reply = new REP_CreateMeeting(NULL, REPLY_MR_SERVER, opcode, seq_no, 0,
                                      NULL, Invoker);
        if (!reply) {
                cout << "Fatal Mem Alloc. Error: " << __FILE__ << " " << __LINE__ << endl;
                return(e_MSG_SERVICED);
        }
        reply->r_action(id);
        delete reply;

return(e_MSG_SERVICED);
} //CreateMeeting::action void REP_CreateMeeting::r_action(int id)                                           r_action
{
        Conv->IntToBuf(id, ((char *)rep_buf)+pos); pos += 4;
        rep_len = 1;
        send_reply();
} msg_obj_states DestroyMeeting::action()                                             action
{
        int meeting_id;
        int requester;

#ifdef DEBUG
        cout << "DestroyMeeting called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester);  pos += nbytes;
        (void)Conv->BufToCARD32(data+pos, res_len, nbytes, meeting_id); pos += nbytes;

#ifdef DUMP_MSG
        cout << "REQUEST_MR_SERVER: DestroyMeeting/" << seq_no << "/"
             << len << "  MeetingId: " << meeting_id << endl;
        cout.flush();
endif if ((err = RMgr->DestroyMeeting(requester, meeting_id)) < 0)
                return(error->e_action(ERROR_MR_SERVER, opcode, seq_no, -err));
        return(error->success_return(REPLY_MR_SERVER, opcode, seq_no));
}
``` mr_msg.C

...action
action

```
msg_obj_states ListMeetings::action()
{
        CARD32 requester;
        List(int) meeting_list;

#ifdef DEBUG
        cout << "ListMeetings called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;

if ((err = RMgr->ListMeetings(requester, meeting_list)) < 0)
                return(error->e_action(ERROR_MR_SERVER, opcode, seq_no, -err));

reply = new REP_ListMeetings(NULL, REPLY_MR_SERVER, opcode, seq_no, 0,
                                     NULL, Invoker);
        if (!reply) {
                cout << "Fatal Mem Alloc. Error: " << __FILE__ << " " << __LINE__ << endl;
                return(e_MSG_SERVICED);
        }
        reply->r_action(meeting_list);
        delete reply;

return(e_MSG_SERVICED);
} //ListMeetings::action
```

List

```
void REP_ListMeetings::r_action(List(int)& meeting_list)
{
        int id, list_len = meeting_list.length();

rep_buf.reserve(4+list_len*4);
        if (list_len) {
                meeting_list.reset();
                Conv->IntToBuf(list_len, ((char *)rep_buf)+pos); pos += 4;
#ifdef DEBUG
                cout << "MeetingList Len: " << list_len << "  :List "; cout.flush();
#endif
                while (meeting_list.next(id)){
                        Conv->IntToBuf(id, ((char *)rep_buf)+pos); pos += 4;
#ifdef DEBUG
                        cout << " " << id << " ";
#endif
                }
        }
        rep_len = len_in_CARD32(pos-MSG_HEADER_LEN);
        send_reply();
}
``` action

```
msg_obj_states ShowMeetingStatus::action()
{
        int room_id, meeting_id, owner;
        CARD32 requester;
        List(ParticipantInfo) info;
        MeetingStatus status;

#ifdef DEBUG
        cout << "ShowMeetingStatus called\n"; cout.flush();
endif if ((err = routing_action()) < 0)
``` mr_msg.C

```
                return(error->e_action(ERROR_MR_SERVER, opcode, seq_no, -err));    ...action
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;

if ((err = RMgr->ShowMeetingStatus(requester, meeting_id,
                        info, room_id, owner, status)) < 0){
                return(error->e_action(ERROR_MR_SERVER, opcode, seq_no, -err));
        } reply = new REP_ShowMeetingStatus(NULL, REPLY_MR_SERVER, opcode, seq_no, 0,
                                        NULL, Invoker);
        if (!reply) {
                cout << "Fatal Mem Alloc. Error: " << __FILE__ << " " << __LINE__ << endl;
                return(e_MSG_SERVICED);
        }
        reply->r_action(info, room_id, owner, status);
        delete reply;

return(e_MSG_SERVICED);
} //ShowMeetingStatus::action void REP_ShowMeetingStatus::r_action(List(ParticipantInfo)& info,
                                int room_id, int owner, MeetingStatus status)
{
        ParticipantInfo node;
        FullMediaDesc *m;
        List_of_p(FullMediaDesc) med_list;
        int list_len = info.length();

#ifdef DEBUG
#endif
        rep_buf.reserve(9+list_len*(8+MAX_MEDIA_TYPES));
        rep_buf[pos++] = (char) status;
        Conv->IntToBuf(room_id, ((char *)rep_buf)+pos); pos += 4;
        Conv->IntToBuf(owner, ((char *)rep_buf)+pos); pos += 4;
        Conv->IntToBuf(list_len, ((char *)rep_buf)+pos); pos += 4;
#ifdef DEBUG
        cout << "infolist len: " << list_len << "  :List ";
#endif
        if (list_len) {
                info.reset();
                while (info.next(node)){
                        Conv->IntToBuf(node.participant,
                                        ((char *)rep_buf)+pos); pos += 4;
                        med_list = node.media_list; med_list.reset();
                        Conv->IntToBuf(med_list.length(), ((char *)rep_buf)+pos); pos += 4;
                        while (med_list.next(m)){
                                rep_buf[pos++] = (char) m->server;
                                Conv->IntToBuf(m->user_desc.length(), ((char *)rep_buf)+pos); pos += 4;
                                strcpy(((char *)rep_buf)+pos, m->user_desc);
                                pos += m->user_desc.length();
                                rep_buf[pos++] = (char) m->status;
                        }
                }
        }
        rep_len = len_in_CARD32(pos-MSG_HEADER_LEN);
        send_reply();
} msg_obj_states ShowMeetRoomStatus::action()                                    action
{
        int room_id, meeting_id, owner;
        CARD32 requester;
        List(ParticipantInfo) info;
        MeetingStatus status;
``` mr_msg.C

...action

```
#ifdef DEBUG
        cout << "ShowMeetRoomStatus called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, room_id); pos += nbytes;

if ((err = RMgr->ShowMeetRoomStatus(requester, room_id,
                        info, meeting_id, owner, status)) < 0){
                return(error->e_action(ERROR_MR_SERVER, opcode, seq_no, -err));
        } reply = new REP_ShowMeetRoomStatus(NULL, REPLY_MR_SERVER, opcode, seq_no, 0,
                                NULL, Invoker);
        if (!reply) {
                cout << "Fatal Mem Alloc. Error: " << __FILE__ << " " << __LINE__ << endl;
                return(e_MSG_SERVICED);
        }
        reply->r_action(info, meeting_id, owner, status);
        delete reply;

return(e_MSG_SERVICED);
} //ShowMeetingStatus::action void REP_ShowMeetRoomStatus::r_action(List(ParticipantInfo)& info,
                                int meeting_id, int owner, MeetingStatus status)
{
        ParticipantInfo node;
        FullMediaDesc *m;
        List_of_p(FullMediaDesc) med_list;
        int list_len = info.length();

#ifdef DEBUG
#endif
        rep_buf.reserve(9+list_len*(8+MAX_MEDIA_TYPES));
        rep_buf[pos++] = (char) status;
        Conv->IntToBuf(meeting_id, ((char *)rep_buf)+pos); pos += 4;
        Conv->IntToBuf(owner, ((char *)rep_buf)+pos); pos += 4;
        Conv->IntToBuf(list_len, ((char *)rep_buf)+pos); pos += 4;
#ifdef DEBUG
        cout << "infolist len: " << list_len << "  :List ";
#endif
        if (list_len) {
                info.reset();
                while (info.next(node)){
                        Conv->IntToBuf(node.participant,
                                        ((char *)rep_buf)+pos); pos += 4;
                        med_list = node.media_list; med_list.reset();
                        Conv->IntToBuf(med_list.length(), ((char *)rep_buf)+pos); pos += 4;
                        while (med_list.next(m)){
                                rep_buf[pos++] = (char) m->server;
                                Conv->IntToBuf(m->user_desc.length(), ((char *)rep_buf)+pos); pos += 4;
                                strcpy(((char *)rep_buf)+pos, m->user_desc);
                                pos += m->user_desc.length();
                                rep_buf[pos++] = (char) m->status;
                        }
                }
        }
        rep_len = len_in_CARD32(pos-MSG_HEADER_LEN);
        send_reply();
}
``` mr_msg.C

```cpp
msg_obj_states ShowMeetingAttributes::action()                               ...action
{                                                                            action
        int meeting_id;
        CARD32 requester;
        MeetingAttrib attrib;

#ifdef DEBUG
        cout << "ShowMeetingAttributes called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;

if ((err = RMgr->ShowMeetingAttributes(requester, meeting_id, attrib)) < 0)
                return(error->e_action(ERROR_MR_SERVER, opcode, seq_no, -err));

reply = new REP_ShowMeetingAttributes(NULL, REPLY_MR_SERVER, opcode, seq_no, 0,
                                NULL, Invoker);
        if (!reply) {
                cout << "Fatal Mem Alloc. Error: " << __FILE__ << " " << __LINE__ << endl;
                return(e_MSG_SERVICED);
        }
        reply->r_action(attrib);
        delete reply;

return(e_MSG_SERVICED);
} //ShowMeetingAttributes::action void REP_ShowMeetingAttributes::r_action(MeetingAttrib attrib)               r_action
{
        rep_buf[pos++] = (char) attrib;
        rep_len = 1;
#ifdef DEBUG
        cout << "MeetingAttributes: " << (int) attrib << endl; cout.flush();
#endif
        rep_len = 1;
        send_reply();
} msg_obj_states AlterMeetingAttributes::action()                              action
{
        int meeting_id;
        CARD32 requester;
        MeetingAttrib attrib;

#ifdef DEBUG
        cout << "AlterMeetingAttributes called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;
        (void) Conv->BufToCARD32(data+pos, res_len, nbytes, (int)attrib); pos += nbytes;

if ((err = RMgr->AlterMeetingAttributes(requester, meeting_id, attrib)) < 0)
                return(error->e_action(ERROR_MR_SERVER, opcode, seq_no, -err));
        return(error->success_return(REPLY_MR_SERVER, opcode, seq_no));
``` mr_msg.C

```
} //AlterMeetingAttributes::action                                                          ...action msg_obj_states AddParticipant::action()                                                      action
{
        int meeting_id;
        CARD32 requester;
        int participant;

#ifdef DEBUG
        cout << "AddParticipant called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;
        (void)Conv->BufToCARD32(data+pos, res_len, nbytes, participant); pos += nbytes;

if ((err = RMgr->AddParticipant(requester, meeting_id, participant)) < 0)
                return(error->e_action(ERROR_MR_SERVER, opcode, seq_no, -err));
        return(error->success_return(REPLY_MR_SERVER, opcode, seq_no));
} //AddParticipant::action msg_obj_states DropParticipant::action()                                                     action
{
        int meeting_id;
        CARD32 requester;
        int participant;

#ifdef DEBUG
        cout << "DropParticipant called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;
        (void)Conv->BufToCARD32(data+pos, res_len, nbytes, participant); pos += nbytes;

if ((err = RMgr->DropParticipant(requester, meeting_id, participant)) < 0)
                return(error->e_action(ERROR_MR_SERVER, opcode, seq_no, -err));
        return(error->success_return(REPLY_MR_SERVER, opcode, seq_no));
} //DropParticipant::action msg_obj_states SuspendMeeting::action()                                                      action
{
        int meeting_id;
        CARD32 requester;

#ifdef DEBUG
        cout << "SuspendMeeting called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;

if ((err = RMgr->SuspendMeeting(requester, meeting_id)) < 0)
``` mr_msg.C

```
            return(error->e_action(ERROR_MR_SERVER, opcode, seq_no, -err));
        return(error->success_return(REPLY_MR_SERVER, opcode, seq_no));
} //SuspendMeeting::action
```
...action

```
msg_obj_states ResumeMeeting::action()
{
        int meeting_id;
        CARD32 requester;

#ifdef DEBUG
        cout << "ResumeMeeting called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;

if ((err = RMgr->ResumeMeeting(requester, meeting_id)) < 0)
                return(error->e_action(ERROR_MR_SERVER, opcode, seq_no, -err));
        return(error->success_return(REPLY_MR_SERVER, opcode, seq_no));
} //ResumeMeeting::action
```
action

```
msg_obj_states LeaveMeeting::action()
{
        int meeting_id;
        CARD32 requester;
        int list_len;
        int participant;
        List_of_p(MediaDesc) med_list;
        MediaDesc *m;

ifdef DEBUG
        cout << "LeaveMeeting called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester);   pos += nbytes;
        (void)Conv->BufToCARD32(data+pos, res_len, nbytes, meeting_id);  pos += nbytes;
        (void)Conv->BufToCARD32(data+pos, res_len, nbytes, participant); pos += nbytes;
        if ((err = RMgr->LeaveMeeting(requester, meeting_id, med_list)) < 0)
                return(error->e_action(ERROR_MR_SERVER, opcode, seq_no, -err));

return(error->success_return(REPLY_MR_SERVER, opcode, seq_no));
} //LeaveMeeting::action
```
action

```
msg_obj_states ReenterMeeting::action()
{
        int meeting_id;
        CARD32 requester;
        int list_len;
        int participant;
        List_of_p(MediaDesc) med_list;
        MediaDesc *m;

ifdef DEBUG
        cout << "ReenterMeeting called\n"; cout.flush();
endif if ((err = routing_action()) < 0)
                return(error->e_action(ERROR_MR_SERVER, opcode, seq_no, -err));
```
action mr_msg.C

```
                else if (err > 0)
                        return(e_MSG_PENDING);                                                    ...action (void)Conv->BufToCARD32(data+pos, res_len, nbytes, requester); pos += nbytes;
        (void)Conv->BufToCARD32(data+pos, res_len, nbytes, meeting_id); pos += nbytes;
        (void)Conv->BufToCARD32(data+pos, res_len, nbytes, participant); pos += nbytes;
        if ((err = RMgr->ReenterMeeting(requester, meeting_id, med_list)) < 0)
                return(error->e_action(ERROR_MR_SERVER, opcode, seq_no, -err));

med_list.reset();
        while (med_list.next(m) && m) delete m;
        return(error->success_return(REPLY_MR_SERVER, opcode, seq_no));
} //ReenterMeeting::action /**********
Finer Granularity: USe LATER
msg_obj_states LeaveMeeting::action()
{
        int meeting_id;
        CARD32 requester;
        int list_len;
        List_of_p(MediaDesc) med_list;
        MediaDesc *m;

ifdef DEBUG
        cout << "LeaveMeeting called\n"; cout.flush();
endif if ((err = routing_action()) < 0)
                return(error->e_action(ERROR_MR_SERVER, opcode, seq_no, -err));
        else if (err > 0)
                return(e_MSG_PENDING);

(void)Conv->BufToCARD32(data+pos, res_len, nbytes, requester); pos += nbytes;
        (void)Conv->BufToCARD32(data+pos, res_len, nbytes, meeting_id); pos += nbytes;
        (void)Conv->BufToCARD32(data+pos, res_len, nbytes, list_len); pos += nbytes;
        med_list.reset();
        for (int i = 0; i < list_len; i++) {
                m = new MediaDesc;
                if (m) {
                        m->server = (Media)data[pos++];
                        if (Conv->BufToString(data+pos, res_len, nbytes,
                                                m->user_desc) < 0)
                                return(error->e_action(ERROR_MR_SERVER, opcode,
                                                seq_no, -ERR_INCOMPLETE_MSG));
                        med_list.insert_next(m);
                }
                else
                        return(error->e_action(ERROR_MR_SERVER, opcode,
                                        seq_no, -ERR_NO_RESOURCES));
        } if ((err = RMgr->LeaveMeeting(requester, meeting_id, med_list)) < 0)
                return(error->e_action(ERROR_MR_SERVER, opcode, seq_no, -err));

med_list.reset();
        while (med_list.next(m) && m) delete m;
        return(error->success_return(REPLY_MR_SERVER, opcode, seq_no));
} //LeaveMeeting::action msg_obj_states ReenterMeeting::action()
{
        int meeting_id;
        CARD32 requester;
        int list_len;
        List_of_p(MediaDesc) med_list;
        MediaDesc *m;
``` mr_msg.C

```c
#ifdef DEBUG
    cout << "ReenterMeeting called\n"; cout.flush();
endif if ((err = routing_action()) < 0)
        return(error->e_action(ERROR_MR_SERVER, opcode, seq_no, -err));
    else if (err > 0)
        return(e_MSG_PENDING);

(void)Conv->BufToCARDS2(data+pos, res_len, nbytes, requester); pos += nbytes;
    (void)Conv->BufToCARDS2(data+pos, res_len, nbytes, meeting_id); pos += nbytes;
    (void)Conv->BufToCARDS2(data+pos, res_len, nbytes, list_len); pos += nbytes;
    med_list.reset();
    for (int i = 0; i < list_len; i++) {
        m = new MediaDesc;
        if (m) {
            m->server = (Media)data[pos++];
            if (Conv->BufToString(data+pos, res_len, nbytes,
                    m->user_desc) < 0)
                return(error->e_action(ERROR_MR_SERVER, opcode,
                    seq_no, -ERR_INCOMPLETE_MSG));
            med_list.insert_next(m);
        }
        else
            return(error->e_action(ERROR_MR_SERVER, opcode,
                seq_no, -ERR_NO_RESOURCES));
    } if ((err = RMgr->ReenterMeeting(requester, meeting_id, med_list)) < 0)
        return(error->e_action(ERROR_MR_SERVER, opcode, seq_no, -err));

med_list.reset();
    while (med_list.next(m) && m) delete m;
    return(error->success_return(REPLY_MR_SERVER, opcode, seq_no));
} //ReenterMeeting::action

**********/ msg_obj_states NameServerMsg::action()
{
    int err;

#ifdef DEBUG
    cout << "Routing NameServerMsg\n"; cout.flush();
endif if ((err = for_NameServer()) < 0)
        return(error->e_action(ERROR_MR_SERVER, opcode, seq_no, -err));
    return(e_MSG_PENDING);
}
``` msg.C

```c
#define DEBUG 1
define DUMMY_CLIENT 1 include <iface.h>
include <server_reg.h>
#include <obj_man.h>
#include <client.h>
#include <iostream.h>
include <room.h>

Block(char) GenericReplyClass::rep_buf(INIT_MAX_REPLYSIZE);
List_of_pimplement(Message)                                              List_of_pimplement Message::Message(char *m_header, CARD8 msg_typ, CARD8 msg_code, int msg_seq_no,
             int msg_len, char *msg_data, Connection *invoker)
{
    if (m_header) {
        for (int i = 0; i < MSG_HEADER_LEN; i++)
            header[i] = m_header[i];
    }
    type = msg_typ; opcode = msg_code;
    seq_no = msg_seq_no; len = msg_len;
    data = msg_data; Invoker = invoker;
    RMgr = Invoker->RoomManager();
    Conv = Invoker->Conv();
    MSMgr = Invoker->MRIface()->MediaServerManager();
    pos = 0;
} void Message::set_msg_seq_no(int s)                                      set_msg_seq_no
{
    seq_no = s;
    Conv->IntToBuf(seq_no, header+MSG_HOFFSET_SEQ);
} int Message::len_in_CARD32(int len_in_bytes)                             len_in_CARD32
{
    int rep_ceil;

rep_ceil = len_in_bytes%4;
    return((len_in_bytes/4) + (rep_ceil ? 1 : 0));
} int Message::for_NameServer()                                            for_NameServer
{
    if (Invoker->MRIface()->ReqNMManager()->send_to_NM(this) < 0)
        return(-ERR_MR_SERVER_DOWN);
} int Message::for_some_other_MR(int MR_id)                                for_some_other_MR
{
    String machine;
    int port;

//cout << "ID: " << MR_id << endl;
    if (Invoker->MRIface()->ServReg()->in_my_range(MR_id))
        return(0);

if (Invoker->MRIface()->ServReg()->server_for_id(MR_id,
                    machine, port) == 0){
        cerr << "Cannot find Server in Registry\n";
        return(-ERR_MR_SERVER_DOWN);
    }
ifdef DEBUG
    cout << "Mach: " << machine << "::" << port << endl; cout.flush();
endif if (Invoker->MRIface()->ReqMRManager()->send_to_MR
``` msg.C
msg.C

```
            (machine, port, this) < 0)
        return(-ERR_MR_SERVER_DOWN);
    return(1);
}
```
*...for_some_other_MR*

```
msg_obj_states Disconnect::action()
{
#ifdef DEBUG
        cout << "Disconnect received\n"; cout.flush();
#endif
        Invoker->deactivate_self();
        return(e_MSG_SERVICED);
}
```
*action*

```
void GenericReplyClass::fill_reply_header(CARD8 msg_type, CARD8 msg_opcode,
                                         CARD32 msg_seq_no, CARD32 msg_len)
{
    rep_buf[MSG_HOFFSET_TYPE] = msg_type;
    rep_buf[MSG_HOFFSET_CODE] = msg_opcode;
    Conv->IntToBuf(msg_seq_no, ((char *)rep_buf)+MSG_HOFFSET_SEQ);
    Conv->IntToBuf(msg_len, ((char *)rep_buf)+MSG_HOFFSET_LEN);
}
```

```
void GenericReplyClass::send_reply()
{
    fill_reply_header(type, opcode, seq_no, rep_len);
    (void) Invoker->send(rep_buf, MSG_HEADER_LEN+(rep_len<<2));
}
```
*send_reply*

```
msg_obj_states ErrorClass::success_return(CARD32 err_type,
                    CARD32 msg_code, CARD32 seq_no)
{
    fill_reply_header(err_type, msg_code, seq_no, 0);
    Invoker->send(rep_buf, MSG_HEADER_LEN);
    return(e_MSG_SERVICED);
}
```

```
void ErrorClass::send_error(CARD32 err_type, CARD32 msg_code,
                            CARD32 seq_no, CARD32 err_code)
{
    fill_reply_header(err_type, msg_code, seq_no, 1);
    Conv->IntToBuf(err_code, ((char *)rep_buf)+MSG_HEADER_LEN);
    if (Invoker->send(rep_buf, MSG_HEADER_LEN+4) == -1)
        return;
}
```

```
msg_obj_states ErrorClass::e_action(CARD32 err_type, CARD32 msg_code,
                                    CARD32 seq_no, CARD32 err_code)
{
    send_error(err_type, msg_code, seq_no, err_code);
    return(e_MSG_SERVICED);
}
```

```
msg_obj_states IllegalMessage::action()
{
    fill_reply_header(ERROR_MR_SERVER, opcode, seq_no, 1); //len
    Conv->IntToBuf(ERR_BAD_LENGTH, ((char *)rep_buf)+MSG_HEADER_LEN);
    (void) Invoker->send(rep_buf, MSG_HEADER_LEN+4);
    return(e_MSG_SERVICED);
}
```
*action*

```
int MRMRRequestClass::routing_action()
{
    int MR_id;

(void) Conv->BufToCARD32(data+pos, res_len, nbytes, MR_id); pos += nbytes;
    return(for_some_other_MR(MR_id));
}
```
*routing_action* msg.C

```
void MedServRequestClass::fill_request_header()
{
        header[MSG_HOFFSET_TYPE] = type;
        header[MSG_HOFFSET_CODE] = opcode;
        Conv->IntToBuf(seq_no, header+MSG_HOFFSET_SEQ);
        Conv->IntToBuf(len>>2, header+MSG_HOFFSET_LEN);
} void MedServRequestClass::common_build()
{
        req_buf.reserve(4);
        Conv->IntToBuf(room, ((char *)req_buf)+pos); pos += 4;
        len = len_in_CARD32(pos) << 2;
        fill_request_header();
} void EventClass::build(int src, int id1)
{
        len = 1;
        rep_buf.reserve(MSG_HEADER_LEN+len*4);
        fill_reply_header(type, opcode, seq_no, len);
        Conv->IntToBuf(id1, ((char *)rep_buf)+pos); pos += 4;
} void EventClass::build(int src, int id1, int id2, int participant)
{
        len = 3;
        rep_buf.reserve(MSG_HEADER_LEN+len*4);
        fill_reply_header(type, opcode, seq_no, len);
        Conv->IntToBuf(id1, ((char *)rep_buf)+pos); pos += 4;
        Conv->IntToBuf(id2, ((char *)rep_buf)+pos); pos += 4;
        Conv->IntToBuf(participant, ((char *)rep_buf)+pos); pos += 4;
} void EventClass::build(int src, int id1, int id2)
{
        len = 2;
        rep_buf.reserve(MSG_HEADER_LEN+len*4);
        fill_reply_header(type, opcode, seq_no, len);
        Conv->IntToBuf(id1, ((char *)rep_buf)+pos); pos += 4;
        Conv->IntToBuf(id2, ((char *)rep_buf)+pos); pos += 4;
} void EventClass::build(int src, int id1, int id2, List(int)& plist)
{
        int part;

len = 3+plist.length();
        rep_buf.reserve(MSG_HEADER_LEN+len*4);
        fill_reply_header(type, opcode, seq_no, len);
        Conv->IntToBuf(id1, ((char *)rep_buf)+pos); pos += 4;
        Conv->IntToBuf(id2, ((char *)rep_buf)+pos); pos += 4;
        Conv->IntToBuf(plist.length(), ((char *)rep_buf)+pos); pos += 4;
        plist.reset();
        while (plist.next(part)){
                Conv->IntToBuf(part, ((char *)rep_buf)+pos); pos += 4;
        }
} void EventClass::build(int src, int room_id, int meeting_id, Media med,
                       String& user_desc)
{
        int part;

len = len_in_CARD32(4+4+1+4+user_desc.length());
        rep_buf.reserve(MSG_HEADER_LEN+len*4);
        Conv->IntToBuf(room_id, ((char *)rep_buf)+pos); pos += 4;
```

*...routing_action*
*fill_request_header*

*common_build*

*build*

*build*

*build*

*List* msg.C

```
        Conv->IntToBuf(meeting_id, ((char *)rep_buf)+pos); pos += 4;
        rep_buf[pos++] = (char) med;
        Conv->IntToBuf(user_desc.length(), ((char *)rep_buf)+pos); pos += 4;
        strcpy(((char *)rep_buf)+pos, user_desc); pos += user_desc.length();
        fill_reply_header(type, opcode, seq_no, len);
} void EventClass::build(int src, int room_id, int meeting_id, Media med,
                       String& user_desc, List(int)& plist)
{
        int part;

len = len_in_CARD32(4+4+1+4+user_desc.length()+4+(4*plist.length()));
        rep_buf.reserve(MSG_HEADER_LEN+len*4);
        Conv->IntToBuf(room_id, ((char *)rep_buf)+pos); pos += 4;
        Conv->IntToBuf(meeting_id, ((char *)rep_buf)+pos); pos += 4;
        rep_buf[pos++] = (char) med;
        Conv->IntToBuf(user_desc.length(), ((char *)rep_buf)+pos); pos += 4;
        strcpy(((char *)rep_buf)+pos, user_desc); pos += user_desc.length();
        Conv->IntToBuf(plist.length(), ((char *)rep_buf)+pos); pos += 4;
        plist.reset();
        while (plist.next(part)){
                Conv->IntToBuf(part, ((char *)rep_buf)+pos); pos += 4;
        }
ifdef DEBUG
        cout << "NUMPART: " << plist.length(); cout.flush();
#endif
        fill_reply_header(type, opcode, seq_no, len);
} void EventClass::send_event()
{
        MmConnection conn;

slist.reset();
        while (slist.next(conn)){
                (void) NW->Write(conn, rep_buf, MSG_HEADER_LEN+(len<<2));
        }
}
```

*...List*

*send_event* obj_man.C

```
#include <obj_man.h>
#include <server_reg.h>

List_of_pimplement(LocalSession)
List_of_pimplement(FrontEnd)
List_of_pimplement(ReqMR)

CommObjMgr::CommObjMgr(MRInterface *iface)
{
        Iface = iface;
} void LocalSessionMgr::process(MmConnection cli)
{
        List_of_piter(LocalSession) clist(client_list);
        LocalSession *obj;

clist.reset();
        while (clist.next(obj)){
                // check creation
                if (obj->connection() == cli){
                        obj->process_msg();
                        garbage_collect();
                        return;
                }
        } if (strcmp(cli->NameTag(), ""))
                return;  // Not a new client if ((obj = new LocalSession(Iface, cli)) == NULL) {
                cout << "Fatal Mem. Allocation Error " << __FILE__ <<
                    " " << "__LINE__" << endl;
                return;
        }
        clist.insert_next(obj);
        obj->process_msg();
} void LocalSessionMgr::garbage_collect()
{
        List_of_piter(LocalSession) clist(client_list);
        LocalSession *obj;

clist.reset();
        while (clist.next(obj)){
                if (!obj->is_alive()){
                        delete obj;
                        clist.remove_prev();
                }
        }
}

////////////////////////////////
// FrontEndMgr methods
//////////////////////////////// void FrontEndMgr::process(MmConnection cli)
{
        List_of_piter(FrontEnd) clist(client_list);
        FrontEnd *obj;

clist.reset();
        while (clist.next(obj)){
                // check creation
                if (obj->connection() == cli){
                        obj->process_msg();
```

*List_of_pimplement*
*List_of_pimplement*
*List_of_pimplement*

*CommObjMgr*

*process*

*garbage_collect*

*process* obj_man.C

```
                garbage_collect();
                return;
            }
    }
    if ((obj = new FrontEnd(Iface, cli)) == NULL) {
            cout << "Fatal Mem. Allocation Error " << __FILE__ <<
                 " " << "__LINE__" << endl;
            return;
    }
    clist.insert_next(obj);
    obj->process_msg();
#ifdef DEBUG
    cout << "Got conn. from front end\n"; cout.flush();
#endif
} void FrontEndMgr::garbage_collect()
{
    List_of_piter(FrontEnd) clist(client_list);
    FrontEnd *obj;

clist.reset();
    while (clist.next(obj)){
            if (!obj->is_alive()){
                    delete obj;
                    clist.remove_prev();
            }
    }
}

///////////////////////////////
// ReqNMMgr methods
///////////////////////////////

ReqNMMgr::ReqNMMgr(MRInterface *iface) : CommObjMgr(iface)
{
    String machine;
    int port;
    MmConnection server;
    char host[HOST_NAME_LEN];

is_alive = 0;
    Iface->ServReg()->default_name_server(machine, port);
    server = NW->CallServer(machine.dump(host), port);
    server->NameTag("NM");
    // handle error here
    if (server->IsAssigned() == MmEnum::MmFalse) {
            cout << "Cannot connect to " << machine << "::" << port << endl;
            return;
    } if ((nm_obj = new ReqNM(Iface, server)) == NULL){
            cout << "Fatal Mem. Allocation Error " << __FILE__ <<
                 " " << __LINE__ << endl;
            return;
    } is_alive = 1;
} int ReqNMMgr::send_to_NM(Message *msg)
{
    return(nm_obj->send_request_msg(msg));
} void ReqNMMgr::process(MmConnection serv)
```

*...process*

*garbage_collect*

*CommObjMgr*

*send_to_NM*

*process* obj_man.C

```
{
        if (nm_obj->connection() == serv)
                nm_obj->process_msg();
}

/////////////////////////////////
// ReqMRMgr methods
///////////////////////////////// int ReqMRMgr::send_to_MR(String machine, int port, Message *msg)
{
        ReqMR *obj;
        MmConnection server;
        char host[HOST_NAME_LEN];
#ifdef DEBUG
        cout << "Sending msg to other MR " << machine << "::" << port << endl;
        cout.flush();
endif server = NW->CallServer(machine.dump(host), port);
        server->NameTag("MR");
        // handle error here
        if (server->IsAssigned() == MmEnum::MmFalse) {
                cout << "Cannot connect to " << machine << "::" << port << endl;
                return(-1);
        }
        if ((obj = new ReqMR(Iface, server)) == NULL){
                cout << "Fatal Mem. Allocation Error " << __FILE__ <<
                        " " << "__LINE__" << endl;
                return(-1);
        }
        server_list.insert_next(obj);
        return(obj->send_request_msg(msg));
} void ReqMRMgr::process(MmConnection serv)
{
        List_of_piter(ReqMR) clist(server_list);
        ReqMR *obj;

clist.reset();
        while (clist.next(obj)){
                if (obj->connection() == serv){
                        obj->process_msg();
                        garbage_collect();
                        return;
                }
        }
} void ReqMRMgr::garbage_collect()
{
        List_of_piter(ReqMR) clist(server_list);
        ReqMR *obj;

clist.reset();
        while (clist.next(obj)){
                if (!obj->is_alive()){
                        NW->HangUp(obj->connection());
                        delete obj;
                        clist.remove_prev();
                }
        }
}
```

*...process*

*send_to_MR*

*process*

*garbage_collect* proto.C

*Protocol*

```c
#include <iface.h>

Protocol::Protocol(MRInterface *iface)
{
        Iface = iface;
        Conv = Iface->Conv();
        for (int i = 0; i < MAX_MSG_TYPES; i++){
                for (int j = 0; j < MAX_MSGS; j++){
                        Gen_func_tab[i][j] = ProtoGenerator::default_generator;
                }
        }

Gen_func_tab[REQUEST_MR_SERVER][MR_CREATE_ROOM]             = ProtoGenerator::Gen_CreateRoom;
        Gen_func_tab[REQUEST_MR_SERVER][MR_DESTROY_ROOM]            = ProtoGenerator::Gen_DestroyRoom;
        Gen_func_tab[REQUEST_MR_SERVER][MR_LIST_ROOMS]              = ProtoGenerator::Gen_ListRooms;
        Gen_func_tab[REQUEST_MR_SERVER][MR_SHOW_ROOM_STATUS]        = ProtoGenerator::Gen_ShowRoomStatus
        Gen_func_tab[REQUEST_MR_SERVER][MR_SHOW_ROOM_ATTRIBUTES]    = ProtoGenerator::Gen_ShowRoomA
        Gen_func_tab[REQUEST_MR_SERVER][MR_ALTER_ROOM_ATTRIBUTES]   = ProtoGenerator::Gen_AlterRoom
        Gen_func_tab[REQUEST_MR_SERVER][MR_LOCK_ROOM]               = ProtoGenerator::Gen_LockRoom;
        Gen_func_tab[REQUEST_MR_SERVER][MR_UNLOCK_ROOM]             = ProtoGenerator::Gen_UnlockRoom;
        Gen_func_tab[REQUEST_MR_SERVER][MR_SHOW_ASSOCIATED_ROOM]    = ProtoGenerator::Gen_ShowAsso
        Gen_func_tab[REQUEST_MR_SERVER][MR_SHOW_ASSOCIATED_MEETING] = ProtoGenerator::Gen_ShowA Gen_func_tab[REQUEST_MR_SERVER][MR_CREATE_MEETING]          = ProtoGenerator::Gen_CreateMeeting;
        Gen_func_tab[REQUEST_MR_SERVER][MR_DESTROY_MEETING]         = ProtoGenerator::Gen_DestroyMeeting;
        Gen_func_tab[REQUEST_MR_SERVER][MR_LIST_MEETINGS]           = ProtoGenerator::Gen_ListMeetings;
        Gen_func_tab[REQUEST_MR_SERVER][MR_SHOW_MEETING_STATUS]     = ProtoGenerator::Gen_ShowMeetings
        Gen_func_tab[REQUEST_MR_SERVER][MR_SHOW_MEETROOM_STATUS]    = ProtoGenerator::Gen_ShowMeetF
        Gen_func_tab[REQUEST_MR_SERVER][MR_SHOW_MEETING_ATTRIBUTES] = ProtoGenerator::Gen_ShowMe
        Gen_func_tab[REQUEST_MR_SERVER][MR_ALTER_MEETING_ATTRIBUTES]= ProtoGenerator::Gen_AlterM
        Gen_func_tab[REQUEST_MR_SERVER][MR_ADD_PARTICIPANT]         = ProtoGenerator::Gen_AddParticipant;
        Gen_func_tab[REQUEST_MR_SERVER][MR_DROP_PARTICIPANT]        = ProtoGenerator::Gen_DropParticipant;
        Gen_func_tab[REQUEST_MR_SERVER][MR_LEAVE_MEETING]           = ProtoGenerator::Gen_LeaveMeeting;
        Gen_func_tab[REQUEST_MR_SERVER][MR_REENTER_MEETING]         = ProtoGenerator::Gen_ReenterMeeting;
        Gen_func_tab[REQUEST_MR_SERVER][MR_SUSPEND_MEETING]         = ProtoGenerator::Gen_SuspendMeeting;
        Gen_func_tab[REQUEST_MR_SERVER][MR_RESUME_MEETING]          = ProtoGenerator::Gen_ResumeMeeting;

Gen_func_tab[REQUEST_MR_SERVER][MR_ADD_SERVER]              = ProtoGenerator::Gen_AddServer;
        Gen_func_tab[REQUEST_MR_SERVER][MR_DROP_SERVER]             = ProtoGenerator::Gen_DropServer;
        Gen_func_tab[REQUEST_MR_SERVER][MR_SET_SERVER_ACCESS_LIST]  = ProtoGenerator::Gen_SetServer
        Gen_func_tab[REQUEST_MR_SERVER][MR_LIST_SERVERS]            = ProtoGenerator::Gen_ListServers;
        Gen_func_tab[REQUEST_MR_SERVER][MR_SUSPEND_SERVER]          = ProtoGenerator::Gen_SuspendServer;
        Gen_func_tab[REQUEST_MR_SERVER][MR_RESUME_SERVER]           = ProtoGenerator::Gen_ResumeServer;
        Gen_func_tab[REQUEST_MR_SERVER][MR_GET_SERVER_INFO]         = ProtoGenerator::Gen_GetServerInfo;

for (int j = 0; j < MAX_REGISTRY_SERVER_MSGS; j++)
                Gen_func_tab[REQUEST_REGISTRY_SERVER][j] = ProtoGenerator::Gen_NameServerMsg;

Gen_func_tab[REQUEST_MR_SERVER][MR_DISCONNECT] = ProtoGenerator::Gen_Disconnect;

} void Protocol::interpret_header(char *header, CARD8& type,
                CARD8& opcode, CARD32& seq, CARD32& len)
{
        int tmp;

type = header[MSG_HOFFSET_TYPE];
        opcode = header[MSG_HOFFSET_CODE];
        if (type < 0 || type > MAX_MSG_TYPES) type = 0;
        if (opcode < 0 || opcode > MAX_MSGS) opcode = 0;
        seq = Conv->BufToInt(header+MSG_HOFFSET_SEQ);
#ifdef DEBUG
//        cout << "IN PROTO SEQ: " << seq << endl;
#endif
``` proto.C                                                                                            proto.C

```
        tmp = Conv->BufToInt(header+MSG_HOFFSET_LEN);                                    ...Protocol
        len = tmp<<MSG_UNIT;
}

Message * Protocol::construct_msg(char *header, CARD8 type, CARD8 opcode,
                                  CARD32 seq, CARD32 len, char *data, Connection *conn)
{
        if (type >= MAX_MSG_TYPES || opcode >= MAX_MSGS){
                cout << "Illegal Type/Opcode: " << (int)type << " " << (int)opcode << endl;
                type = REQUEST_MR_SERVER; opcode = MAX_MSGS-1;
        }
        return(Gen_func_tab[(int)type][(int)opcode](header, type, opcode,
                                                    seq, len, data, conn));
}
``` room.C

```c
#include <obj_man.h>
#include <room.h>
#include <iface.h>
include <med_serv.h> define DEFAULT_ROOMS 1000

Listimplement(int)
Listimplement(String)
List_of_pimplement(Room)
List_of_pimplement(Conferee)
Listimplement(ParticipantInfo)
List_of_pimplement(MediaDesc)
List_of_pimplement(FullMediaDesc)
List_of_pimplement(MediaServerInfoInRoom)

////////////////////////////////////////////////////
// Room Methods
////////////////////////////////////////////////////

Room::Room(int room_id, CARD32 rowner, RoomAttrib rattr,
           String& rname, RoomMgr *rRMgr)
{
    id = room_id;
    attrib = rattr;
    MR_id = owner = rowner;
    status = e_EMPTY_ROOM;
    lock_status = e_UNLOCKED;
    meeting = (Meeting *)NULL;
    if (rname == "")
        room_name = "NoName";
    else
        room_name = rname;
    RMgr = rRMgr;
    MSMgr = RMgr->MRIface()->MediaServerManager();
    EveNot = RMgr->MRIface()->EveNotifier();
    EveNot->RoomCreated(RoomId(), 0); // src is 0 (MR)
} int Room::lock()
{
    if (lock_status == e_LOCKED)
        return(-ERR_ROOM_LOCKED);
    lock_status = e_LOCKED;
    EveNot->RoomLocked(RoomId(), 0);
    return(SUCCESS);
} void Room::meeting_created(Meeting *m)
{
    set_meeting(m);
    if (m) {
        if (server_list.length() > 0)
            status = e_ROOM_W_MEETING_RESOURCES;
        else
            status = e_ROOM_W_MEETING;
    }
} void Room::meeting_destroyed()
{
    MediaServerInfoInRoom *info;

server_list.reset();
    while (server_list.next(info)) {
        if (info->scope == e_MEETING_SCOPE) {
            MSMgr->DropServer(RoomId(), info->server);
``` room.C

*...meeting_destroyed*

```
                        delete info;
                        server_list.remove_prev();
                }
        } if (server_list.length() > 0)
                status = e_ROOM_W_RESOURCES;
        else
                status = e_EMPTY_ROOM;
        set_meeting((Meeting *) NULL);
} int Room::unlock()
{
        if (lock_status == e_UNLOCKED)
                return(-ERR_ROOM_ALREADY_UNLOCKED);
        lock_status = e_UNLOCKED;
        EveNot->RoomUnlocked(RoomId(), 0);
        return(SUCCESS);
} void Room::set_meeting(Meeting *m)
{
        meeting = m;
}

Room::~Room()
{
        int m;

if (meeting) delete meeting;
#ifdef DEBUG
        cout << "Room " << id << " Deleted\n"; cout.flush();
#endif
        // Should send room destroyed event to all servers
        EveNot->RoomDestroyed(RoomId(), 0); // src is 0 (MR)

} void Room::MediaServerDied(int id)
{
        MediaServerInfoInRoom *info;

server_list.reset();
        while (server_list.next(info)) {
                if (info->server == id) {
                        delete info;
                        server_list.remove_prev();
                }
        }
} int Room::is_server_present(int server_id)
{
        List_of_piter(MediaServerInfoInRoom) slist(server_list);
        MediaServerInfoInRoom *info;

slist.reset();
        while (slist.next(info)){
                if (info->server  == server_id)
                        return(1);
        }
        return(0);
} int Room::add_server(int server_id, Media media, String& user_desc,
                        List(int)& part_list)
{
```

*unlock*

*set_meeting*

*Room*

*MediaServerDied*

*is_server_present* room.C

```c
        int p;
        MediaDesc med;
        MediaServerInfoInRoom *info;

server_list.reset();
        while (server_list.next(info)){
                if (info->server == server_id){
                        return(-1);
                }
        } info = new MediaServerInfoInRoom;
        info->server = server_id; info->status = e_SERV_NORMAL;
        info->scope = (has_meeting()) ? e_MEETING_SCOPE : e_ROOM_SCOPE;
        server_list.insert_next(info);
        EveNot->ServerAdded(0, RoomId(),
                        has_meeting() ? meeting->MeetingId() : 0,
                        media, user_desc, part_list);

med.server = media;
        med.user_desc = user_desc;
        if (has_meeting()) {
                part_list.reset();
                while (part_list.next(p)){
                        meeting->add_media(p, med);
                }
                EveNot->MeetingInfo(RoomId(), 0, meeting->MeetingId());
                status = e_ROOM_W_MEETING_RESOURCES;
        }
        else
                status = e_ROOM_W_RESOURCES;
        return(0);
} int Room::set_access_list(int server_id, Media media, String& user_desc,
                        List(int)& part_list)
{
        int p;
        MediaDesc med;

med.server = media;
        med.user_desc = user_desc;
        if (has_meeting()) {
                meeting->restrict_media_access(part_list, med);
                EveNot->ServerAccessListSet(0, RoomId(),
                        has_meeting() ? meeting->MeetingId() : 0,
                        media, user_desc, part_list);
        }
        return(0);
} int Room::drop_server(int server_id, Media media, String& user_desc)
{
        MediaDesc med;
        MediaServerInfoInRoom *info;

server_list.reset();
        while (server_list.next(info)){
                if (info->server == server_id){
                        delete info;
                        server_list.remove_prev();
                }
        } med.server = media;
        med.user_desc = user_desc;
        if (has_meeting())
                meeting->drop_media(med);
```

*...is_server_present*

*drop_server* room.C room.C
...drop_server

```
        EveNot->ServerDropped(0, RoomId(),
                                has_meeting() ? meeting->MeetingId() : 0,
                                media, user_desc);
        if (server_list.length() == 0)
                status = (has_meeting()) ? e_ROOM_W_MEETING : e_EMPTY_ROOM;
        return(0);
} int Room::suspend_server(int server_id, Media media, String& user_desc)              suspend_server
{
        MediaDesc med;
        int s;
        MediaServerInfoInRoom *info;
        List_of_piter(MediaServerInfoInRoom) slist(server_list);

slist.reset();
        while (slist.next(info)){
                if (info->server == server_id)
                        info->status = e_SERV_SUSPENDED;
        } med.server = media;
        med.user_desc = user_desc;
        if (has_meeting())
                meeting->suspend_media(med);
        return(0);
} int Room::resume_server(int server_id, Media media, String& user_desc)               resume_server
{
        MediaDesc med;
        int s;
        MediaServerInfoInRoom *info;
        List_of_piter(MediaServerInfoInRoom) slist(server_list);

slist.reset();
        while (slist.next(info)){
                if (info->server == server_id)
                        info->status = e_SERV_NORMAL;
        } med.server = media;
        med.user_desc = user_desc;
        if (has_meeting())
                meeting->resume_media(med);
        return(0);
} int Room::list_servers(List_of_p(FullMediaDesc)& media_list)                         List_of_p
{
        int s;
        List_of_piter(MediaServerInfoInRoom) slist(server_list);
        FullMediaDesc *m;
        MediaServerInfoInRoom *info;
        MediaServerConn conn_info;
        Media media;
        String user_desc;

media_list.reset();
        slist.reset();
        while (slist.next(info)){
                if (MSMgr->get_server_info(info->server, media, user_desc) >= 0){
                        m = new FullMediaDesc;
                        m->server = media;
                        m->user_desc = user_desc;
                        m->status = info->status;
``` room.C

```
                if (MSMgr->get_manager_connection(media, user_desc,
                                                  conn_info) >= 0) {
                        m->machine = conn_info.machine;
                        m->port = conn_info.port;
                }
                media_list.insert_next(m);
            }
        }
        return(0);
} void Room::associated_servers(List(int)& serv_list)
{
        List_of_piter(MediaServerInfoInRoom) slist(server_list);
        MediaServerInfoInRoom *info;

serv_list.reset();
        slist.reset();
        while (slist.next(info)){
                serv_list.insert_next(info->server);
        }
}

///////////////////////////////////////////////////
// Meeting Methods
///////////////////////////////////////////////////

Meeting::Meeting(int meeting_id, CARD32 mowner, RoomAttrib mattr,
                Room *mroom, RoomMgr *mRMgr)
{
        id = meeting_id;
        attrib = mattr;
        owner = mowner;
        RMgr = mRMgr;
        EveNot = RMgr->MRIface()->EveNotifier();
        room = mroom;
        status = e_MNORMAL;

EveNot->MeetingCreated(room->RoomId(),0,MeetingId());
        // Add the owner as a participant
        (void) add_participant(owner);
}

Meeting::~Meeting()
{
        drop_all_participants();
        // Should send meeting destroyed event to all servers
        EveNot->MeetingDestroyed(room->RoomId(),0,MeetingId());
} int Meeting::state_check()
{
        if (status == e_MSUSPENDED)
                return(-ERR_MEETING_SUSPENDED);
        if (room->room_lock_status() == e_LOCKED)
                return(-ERR_ROOM_LOCKED);
} void Meeting::get_meeting_info(List(ParticipantInfo)& info)
{
        List_of_piter(Conferee) clist(conf_list);
        Conferee *c;
        ParticipantInfo p;

clist.reset();
        info.reset();
        while (clist.next(c)){
                p.participant = c->ID();
``` room.C

```
                p.media_list = c->get_media_list();         ...List
                info.insert_next(p);
        }
} void Meeting::get_meeting_participants(List(int)& plist)    List
{
        List_of_piter(Conferee) clist(conf_list);
        Conferee *c;

clist.reset();
        plist.reset();
        while (clist.next(c)){
                if (c)
                        plist.insert_next(c->ID());
        }
} int Meeting::add_participant(int participant)               add_participant
{
        Conferee *c;

if ((err = state_check()) < 0) return(err);
        conf_list.reset();
        while (conf_list.next(c)){
                if (c->ID() == participant)
                        return(-ERR_PARTICIPANT_ALREADY_PRESENT);
        }
        if (c = new Conferee(participant))
                conf_list.insert_next(c);
        else{
                cout << "Fatal mem alloc error: " << __FILE__ << " " << __LINE__;
                cout.flush();
                return(-ERR_NO_RESOURCES);
        }
        EveNot->AddedParticipant(room->RoomId(),0,MeetingId(), participant);
        return(SUCCESS);
} int Meeting::drop_participant(int participant)              drop_participant
{
        Conferee *c;

if ((err = state_check()) < 0) return(err);
        conf_list.reset();
        while (conf_list.next(c)){
                if (c->ID() == participant){
                        delete c;
                        conf_list.remove_prev();
                        EveNot->DroppedParticipant(room->RoomId(),0,
                                                  MeetingId(), participant);
                        change_owner();
                        return(SUCCESS);
                }
        }
        return(-ERR_PARTICIPANT_NOT_PRESENT);
} void Meeting::change_owner()                                change_owner
{
        Conferee *c;

conf_list.reset();
        if (conf_list.next(c)){
                if (c) {
                        owner = c->ID();
#ifdef DEBUG
                        cout << "New Meeting Owner: " << owner << endl;
``` room.C            room.C

```
#endif                                                          ...change_owner
        }
} int Meeting::suspend_meeting()                                  suspend_meeting
{
        if (status == e_MSUSPENDED) return(-ERR_MEETING_SUSPENDED);
        status = e_MSUSPENDED;
        EveNot->MeetingSuspended(room->RoomId(),0, MeetingId());
        return(SUCCESS);
} int Meeting::resume_meeting()                                   resume_meeting
{
        status = e_MNORMAL;
        EveNot->MeetingResumed(room->RoomId(),0, MeetingId());
        return(SUCCESS);
} void Meeting::drop_all_participants()                           drop_all_participants
{
        Conferee *c;

conf_list.reset();
        while (conf_list.next(c)){
                EveNot->DroppedParticipant(room->RoomId(),0,
                                           MeetingId(), c->ID());
                delete c;
                conf_list.remove_prev();
        }
} void Meeting::add_media(CARD32 participant, MediaDesc med)      add_media
{
        List_of_piter(Conferee) clist(conf_list);
        Conferee *c;

clist.reset();
        while (clist.next(c)){
                if (c->ID() == participant){
                        c->add_media(med);
                        break;
                }
        }
} void Meeting::drop_media(CARD32 participant, MediaDesc med)     drop_media
{
        List_of_piter(Conferee) clist(conf_list);
        Conferee *c;

clist.reset();
        while (clist.next(c)){
                if (c->ID() == participant){
                        c->drop_media(med);
                        break;
                }
        }
} void Meeting::drop_media(MediaDesc med)                         drop_media
{
        List_of_piter(Conferee) clist(conf_list);
        Conferee *c;

clist.reset();
        while (clist.next(c)){
``` room.C

```
                c->drop_media(med);
        }
} void Meeting::suspend_media(MediaDesc med)
{
        List_of_piter(Conferee) clist(conf_list);
        Conferee *c;

clist.reset();
        while (clist.next(c)){
                c->suspend_media(med);
        }
} void Meeting::resume_media(MediaDesc med)
{
        List_of_piter(Conferee) clist(conf_list);
        Conferee *c;

clist.reset();
        while (clist.next(c)){
                c->resume_media(med);
        }
} void Meeting::restrict_media_access(List(int)& part_list, MediaDesc med)
{
        List_of_piter(Conferee) clist(conf_list);
        Conferee *c;

clist.reset();
        while (clist.next(c)){
                part_list.reset();
                if (part_list.find_next(c->ID()))
                        c->add_media(med);
                else
                        c->drop_media(med);
        }
} int Meeting::leave_meeting(int participant,
                           List_of_p(MediaDesc)& media_list)
{
        List_of_piter(Conferee) clist(conf_list);
        Conferee *c;

clist.reset();
        while (clist.next(c)){
                if (c->ID() == participant){
                        c->suspend_media(media_list);
                        EveNot->LeftMeeting(room->RoomId(),0,MeetingId(),
                                                            participant);
                        return(0);
                }
        }
        return(-ERR_PARTICIPANT_NOT_PRESENT);
} int Meeting::reenter_meeting(int participant,
                             List_of_p(MediaDesc)& media_list)
{
        List_of_piter(Conferee) clist(conf_list);
        Conferee *c;

clist.reset();
        while (clist.next(c)){
                if (c->ID() == participant){
``` room.C

```
                c->resume_media(media_list);
                EveNot->ReenterMeeting(room->RoomId(),0,MeetingId(),
                                                            participant);
                return(0);
            }
        }
        return(-ERR_PARTICIPANT_NOT_PRESENT);
}

///////////////////////////////////////////////////////
// Conferee Methods
///////////////////////////////////////////////////////
Conferee::~Conferee()
{
        FullMediaDesc *m;

media_list.reset();
        while (media_list.next(m)){
                delete m;
        }
} void Conferee::add_media(MediaDesc med)
{
        FullMediaDesc *m;

media_list.reset();
        while (media_list.next(m)){
                if (m->server == med.server && m->user_desc == med.user_desc)
                        return;
        }
        if (m = new FullMediaDesc) {
                m->server = med.server; m->user_desc = med.user_desc;
                m->status = e_SERV_NORMAL;
                media_list.insert_next(m);
        }
} void Conferee::drop_media(MediaDesc med)
{
        FullMediaDesc *m;

media_list.reset();
        while (media_list.next(m)){
                if (m->server == med.server && m->user_desc == med.user_desc){
                        media_list.remove_prev();
                        delete m;
                        return;
                }
        }
} void Conferee::suspend_media(MediaDesc med)
{
        FullMediaDesc *m;

media_list.reset();
        while (media_list.next(m)){
                if (m->server == med.server && m->user_desc == med.user_desc){
                        m->status = e_SERV_SUSPENDED;
                        return;
                }
        }
} void Conferee::suspend_media(List_of_p(MediaDesc)& med_list)
{
```

*...List*

*Conferee*

*add_media*

*drop_media*

*suspend_media*

*List_of_p* room.C

```
        FullMediaDesc *m;
        MediaDesc *mdesc;

med_list.reset();
        while (med_list.next(mdesc)){
                media_list.reset();
                while (media_list.next(m)){
                        if (m->server == mdesc->server &&
                                m->user_desc == mdesc->user_desc){
                                m->status = e_SERV_SUSPENDED;
                        }
                }
        }
} void Conferee::resume_media(List_of_p(MediaDesc)& med_list)
{
        FullMediaDesc *m;
        MediaDesc *mdesc;

med_list.reset();
        while (med_list.next(mdesc)){
                media_list.reset();
                while (media_list.next(m)){
                        if (m->server == mdesc->server &&
                                m->user_desc == mdesc->user_desc){
                                m->status = e_SERV_NORMAL;
                        }
                }
        }
} void Conferee::resume_media(MediaDesc med)
{
        FullMediaDesc *m;

media_list.reset();
        while (media_list.next(m)){
                if (m->server == med.server && m->user_desc == med.user_desc){
                        m->status = e_SERV_NORMAL;
                        return;
                }
        }
}

///////////////////////////////////////////////
//  RoomMgr Methods
///////////////////////////////////////////////

RoomMgr::RoomMgr(MRInterface *MRIface, Range r)
{
        Iface = MRIface;
        if (r.start <= r.end)
                r.end = r.start + DEFAULT_ROOMS;
        for (int i = r.end-r.start; i >= 0; i--) {
                free_room_id_list.insert_next(r.start+i);
                free_meeting_id_list.insert_next(r.start+i);
        }
        range = r;
}

RoomMgr::~RoomMgr()
{
        Room *r;

room_list.reset();
        while (room_list.next(r))
                if (r) delete r;
```

*...List_of_p*

*List_of_p*

*resume_media*

*RoomMgr*

*RoomMgr* room.C

```
}
int RoomMgr::is_valid_room(int room_id)                                   ...RoomMgr
{                                                                         is_valid_room
        Room *r;
        List_of_piter(Room) riter(room_list);

riter.reset();
        while (riter.next(r)){
                if (r->RoomId() == room_id)
                        return(1);
        }
        return(0);
} int RoomMgr::generate_room_id()                                           generate_room_id
{
        int id;

free_room_id_list.reset();
        used_room_id_list.reset();
        if (free_room_id_list.next(id)) {
                free_room_id_list.remove_prev();
                used_room_id_list.insert_next(id);
                return(id);
        } return(-1);
}

// LATER: SOme bug in list deletion; check later
void RoomMgr::free_room_id(int id)                                        free_room_id
{
        used_room_id_list.reset();
        free_room_id_list.reset();
        if (used_room_id_list.find_next(id)) {
                used_room_id_list.remove_prev();
                free_room_id_list.insert_next(id);
        }
} int RoomMgr::generate_meeting_id()                                        generate_meeting_id
{
        int id;

free_meeting_id_list.reset();
        used_meeting_id_list.reset();
        if (free_meeting_id_list.next(id)) {
                free_meeting_id_list.remove_prev();
                used_meeting_id_list.insert_next(id);
                return(id);
        } return(-1);
}

// LATER: SOme bug in list deletion; check later
void RoomMgr::free_meeting_id(int id)                                     free_meeting_id
{
        used_meeting_id_list.reset();
        free_meeting_id_list.reset();
        if (used_meeting_id_list.find_next(id)) {
                used_meeting_id_list.remove_prev();
                free_meeting_id_list.insert_next(id);
        }
} int RoomMgr::CreateRoom(CARD32 owner, RoomAttrib attrib, String& rname)   CreateRoom
``` room.C room.C

*...CreateRoom*

```
{
        Room *r;

// ADD SECURITY LATER int id = generate_room_id();
        if (id < 0)
                return(-ERR_NO_RESOURCES);
        if ((r = new Room(id, owner,attrib, rname, this)) == NULL)
                return(-ERR_NO_RESOURCES);

room_list.insert_next(r);
        return(id);
} int RoomMgr::DestroyRoom(CARD32 requester, int room_id)
{
        Room *r;

room_list.reset();
        while (room_list.next(r)){
                if (r->RoomId() == room_id){
                        // ADD SECURITY LATER
                        free_room_id(room_id);
                        delete r;
                        room_list.remove_prev();
                        return(SUCCESS);
                }
        }
        return(-ERR_BAD_ROOM_ID);
} int RoomMgr::ListRooms(CARD32 requester, List(int)& rlist,
                        List(String)& name_list)
{
        Room *r;
        List_of_piter(Room) riter(room_list);

// ADD SECURITY LATER
        rlist.reset();
        riter.reset();
        name_list.reset();
        while (riter.next(r)){
                rlist.insert_next(r->RoomId());
                name_list.insert_next(r->RoomName());
        }
        return(SUCCESS);
} int RoomMgr::ShowRoomStatus(CARD32 requester, int room_id,
                        RoomStatus& stat, RoomLockStatus& lock_stat)
{
        Room *r;
        List_of_piter(Room) riter(room_list);

// ADD SECURITY LATER
        riter.reset();
        while (riter.next(r)){
                if (r->RoomId() == room_id){
                        stat = r->room_status();
                        lock_stat = r->room_lock_status();
                        return(SUCCESS);
                }
        }
        return(-ERR_BAD_ROOM_ID);
} int RoomMgr::ShowRoomAttributes(CARD32 requester,
```

*DestroyRoom* room.C room.C

...DestroyRoom

```
                          int room_id, RoomAttrib& attrib)
{
        Room *r;
        List_of_piter(Room) riter(room_list);

// ADD SECURITY LATER
        riter.reset();
        while (riter.next(r)){
                if (r->RoomId() == room_id){
                        attrib = r->room_attrib();
                        return(SUCCESS);
                }
        }
        return(-ERR_BAD_ROOM_ID);
} int RoomMgr::AlterRoomAttributes(CARD32 requester, int room_id,
                        RoomAttrib attrib)
{
        Room *r;
        List_of_piter(Room) riter(room_list);

// ADD SECURITY LATER
        riter.reset();
        while (riter.next(r)){
                if (r->RoomId() == room_id){
                        r->set_room_attrib(attrib);
                        return(SUCCESS);
                }
        }
        return(-ERR_BAD_ROOM_ID);
} int RoomMgr::LockRoom(CARD32 requester, int room_id)
{
        Room *r;
        List_of_piter(Room) riter(room_list);

// ADD SECURITY LATER
        riter.reset();
        while (riter.next(r)){
                if (r->RoomId() == room_id)
                        return(r->lock());
        }
        return(-ERR_BAD_ROOM_ID);
} int RoomMgr::UnlockRoom(CARD32 requester, int room_id)
{
        Room *r;
        List_of_piter(Room) riter(room_list);

// ADD SECURITY LATER
        riter.reset();
        while (riter.next(r)){
                if (r->RoomId() == room_id)
                        return(r->unlock());
        }
        return(-ERR_BAD_ROOM_ID);
} int RoomMgr::CreateMeeting(CARD32 owner, CARD32 room_id,
                                MeetingAttrib attrib)
{
        Room *r;
        Meeting *m;
```

*LockRoom*

*UnlockRoom* room.C

*...UnlockRoom*

```
        List_of_piter(Room) riter(room_list);

riter.reset();
    while (riter.next(r)){
        if (r->RoomId() == room_id){
            if (r->has_meeting())
                return(-ERR_ROOM_HAS_MEETING);
            else{
                int id = generate_meeting_id();
                if (id < 0)
                    return(-ERR_NO_RESOURCES);
                if ((m = new Meeting(id, owner,
                                        attrib, r, this)) == NULL)
                    return(ERR_NO_RESOURCES);
                r->meeting_created(m);
                return(id);
            }
        }
    }
    return(-ERR_BAD_ROOM_ID);
} int RoomMgr::DestroyMeeting(CARD32 requester, int meeting_id)
{
    Room *r;
    Meeting *m;
    List_of_piter(Room) riter(room_list);

// ADD SECURITY LATER
    riter.reset();
    while (riter.next(r)){
        if ((m = r->get_meeting()) != (Meeting *)NULL &&
            m->MeetingId() == meeting_id){
            free_meeting_id(meeting_id);
            delete m;
            r->meeting_destroyed();
            return(SUCCESS);
        }
    }
    return(-ERR_BAD_MEETING_ID);
} int RoomMgr::ListMeetings(CARD32 requester, List(int)& rlist)
{
    Room *r;
    Meeting *m;
    List_of_piter(Room) riter(room_list);

// ADD SECURITY LATER
    rlist.reset();
    riter.reset();
    while (riter.next(r)){
        if (m = r->get_meeting())
            rlist.insert_next(m->MeetingId());
    }
    return(SUCCESS);
} int RoomMgr::ShowMeetingStatus(CARD32 requester, int meeting_id,
        List(ParticipantInfo)& info, int& p_room_id,
        int& owner, MeetingStatus& status)
{
    Room *r;
    Meeting *m;
    List_of_piter(Room) riter(room_list);

// ADD SECURITY LATER
    riter.reset();
```

*DestroyMeeting*

*List* room.C

```
        while (riter.next(r)){
            if ((m = r->get_meeting()) != (Meeting *)NULL &&
                    m->MeetingId() == meeting_id){
                m->get_meeting_info(info);
                p_room_id = r->RoomId();
                owner = m->get_meeting_owner();
                status = m->get_meeting_status();
                return(SUCCESS);
            }
        }
        return(-ERR_BAD_MEETING_ID);
} int RoomMgr::ShowMeetRoomStatus(CARD32 requester, int room_id,
        List(ParticipantInfo)& info, int& p_meeting_id,
        int& owner, MeetingStatus& status)
{
    Room *r;
    Meeting *m;
    List_of_piter(Room) riter(room_list);

// ADD SECURITY LATER
    riter.reset();
    while (riter.next(r)){
        if (r->RoomId() == room_id) {
            if (m = r->get_meeting()){
                m->get_meeting_info(info);
                p_meeting_id = m->MeetingId();
                owner = m->get_meeting_owner();
                status = m->get_meeting_status();
                return(SUCCESS);
            }
            else {
                p_meeting_id = owner = -1;
                return(SUCCESS);
            }
        }
    }
    return(-ERR_BAD_MEETING_ID);
} int RoomMgr::ListMeetingParticipants(int meeting_id, List(int)& plist)
{
    Room *r;
    Meeting *m;
    List_of_piter(Room) riter(room_list);

// ADD SECURITY LATER
    riter.reset();
    while (riter.next(r)){
        if ((m = r->get_meeting()) != (Meeting *)NULL &&
                m->MeetingId() == meeting_id){
            m->get_meeting_participants(plist);
            return(SUCCESS);
        }
    }
    return(-ERR_BAD_MEETING_ID);
} int RoomMgr::ShowMeetingAttributes(CARD32 requester, int meeting_id,
                                    MeetingAttrib& attrib)
{
    Room *r;
    Meeting *m;
    List_of_piter(Room) riter(room_list);

// ADD SECURITY LATER
    riter.reset();
``` room.C room.C

...List

```
        while (riter.next(r)){
            if ((m = r->get_meeting()) != (Meeting *)NULL &&
                    m->MeetingId() == meeting_id){
                attrib = m->get_meeting_attrib();
                return(SUCCESS);
            }
        }
        return(-ERR_BAD_MEETING_ID);
} int RoomMgr::ShowAssociatedMeeting(CARD32 requester, int room_id,
                                    int& meeting_id)
{
        Room *r;
        Meeting *m;
        List_of_piter(Room) riter(room_list);

// ADD SECURITY LATER
        riter.reset();
        while (riter.next(r)){
            if (r->RoomId() == room_id) {
                if (r->has_meeting() && (m = r->get_meeting())){
                    meeting_id = m->MeetingId();
                    return(SUCCESS);
                }
                else
                    return(-ERR_ROOM_HAS_NO_MEETING);
            }
        }
        return(-ERR_BAD_ROOM_ID);
} int RoomMgr::ShowAssociatedRoom(CARD32 requester, int meeting_id,
                                 int& room_id)
{
        Room *r;
        Meeting *m;
        List_of_piter(Room) riter(room_list);

// ADD SECURITY LATER
        riter.reset();
        while (riter.next(r)){
            if (r->has_meeting() && (m = r->get_meeting()) &&
                    m->MeetingId() == meeting_id){
                room_id = r->RoomId();
                return(SUCCESS);
            }
        }
        return(-ERR_BAD_MEETING_ID);
} int RoomMgr::AlterMeetingAttributes(CARD32 requester, int meeting_id,
                                     MeetingAttrib attrib)
{
        Room *r;
        Meeting *m;
        List_of_piter(Room) riter(room_list);

// ADD SECURITY LATER
        riter.reset();
        while (riter.next(r)){
            if ((m = r->get_meeting()) != (Meeting *)NULL &&
                    m->MeetingId() == meeting_id){
                m->set_meeting_attrib(attrib);
                return(SUCCESS);
            }
        }
        return(-ERR_BAD_MEETING_ID);
``` room.C

*...List*

```c
} int RoomMgr::AddParticipant(CARD32 requester, int meeting_id,
                                                int participant)
{
        Room *r;
        Meeting *m;
        List_of_piter(Room) riter(room_list);

// ADD SECURITY LATER
        riter.reset();
        while (riter.next(r)){
                if ((m = r->get_meeting()) != (Meeting *)NULL &&
                        m->MeetingId() == meeting_id){
                        return(m->add_participant(participant));
                }
        }
        return(-ERR_BAD_MEETING_ID);
} int RoomMgr::DropParticipant(CARD32 requester, int meeting_id,
                                                 int participant)
{
        Room *r;
        Meeting *m;
        int err;
        List_of_piter(Room) riter(room_list);

// ADD SECURITY LATER
        riter.reset();
        while (riter.next(r)){
                if ((m = r->get_meeting()) != (Meeting *)NULL &&
                        m->MeetingId() == meeting_id){
                        err = m->drop_participant(participant);
                        if (m->num_conferees() == 0) {
                                delete m;
                                r->meeting_destroyed();
                        }
                        return(err);
                }
        }
        return(-ERR_BAD_MEETING_ID);
}
```

*SuspendMeeting*

```c
int RoomMgr::SuspendMeeting(CARD32 requester, int meeting_id)
{
        Room *r;
        Meeting *m;
        List_of_piter(Room) riter(room_list);

// ADD SECURITY LATER
        riter.reset();
        while (riter.next(r)){
                if ((m = r->get_meeting()) != (Meeting *)NULL &&
                        m->MeetingId() == meeting_id){
                        return(m->suspend_meeting());
                }
        }
        return(-ERR_BAD_MEETING_ID);
}
```

*ResumeMeeting*

```c
int RoomMgr::ResumeMeeting(CARD32 requester, int meeting_id)
{
        Room *r;
        Meeting *m;
        List_of_piter(Room) riter(room_list);

// ADD SECURITY LATER
``` room.C room.C

*...ResumeMeeting*

```
            riter.reset();
            while (riter.next(r)){
                    if ((m = r->get_meeting()) != (Meeting *)NULL   &&
                                m->MeetingId() == meeting_id){
                            return(m->resume_meeting());
                    }
            }
            return(-ERR_BAD_MEETING_ID);
    } int RoomMgr::AddServer(int room_id, int server_id,
                    Media media, String& user_desc, List(int)& part_list)
    {
            Room *r;
            List_of_piter(Room) riter(room_list);

riter.reset();
            while (riter.next(r)){
                    if (r->RoomId() == room_id)
                            return(r->add_server(server_id, media, user_desc, part_list));
            }
            return(-ERR_BAD_ROOM_ID);
    } int RoomMgr::DropServer(int room_id, int server_id, Media media,
                    String& user_desc)
    {
            Room *r;
            List_of_piter(Room) riter(room_list);

riter.reset();
            while (riter.next(r)){
                    if (r->RoomId() == room_id)
                            return(r->drop_server(server_id, media, user_desc));
            }
            return(-ERR_BAD_ROOM_ID);
    } int RoomMgr::SuspendServer(int room_id, int server_id, Media media,
                    String& user_desc)
    {
            Room *r;
            List_of_piter(Room) riter(room_list);

riter.reset();
            while (riter.next(r)){
                    if (r->RoomId() == room_id)
                            return(r->suspend_server(server_id, media, user_desc));
            }
            return(-ERR_BAD_ROOM_ID);
    } int RoomMgr::ResumeServer(int room_id, int server_id, Media media,
                    String& user_desc)
    {
            Room *r;
            List_of_piter(Room) riter(room_list);

riter.reset();
            while (riter.next(r)){
                    if (r->RoomId() == room_id)
                            return(r->resume_server(server_id, media, user_desc));
            }
            return(-ERR_BAD_ROOM_ID);
    } int RoomMgr::SetAccessList(int room_id, int server_id,
``` room.C

```
                        Media media, String& user_desc, List(int)& part_list)          ...ResumeMeeting
{
        Room *r;
        List_of_piter(Room) riter(room_list);

riter.reset();
        while (riter.next(r)){
                if (r->RoomId() == room_id)
                        return(r->set_access_list(server_id, media, user_desc, part_list));
        }
        return(-ERR_BAD_ROOM_ID);
} int RoomMgr::ListServers(CARD32 requester, int room_id,
                                List_of_p(FullMediaDesc)& media_list)
{
        Room *r;
        List_of_piter(Room) riter(room_list);

riter.reset();
        while (riter.next(r)){
                if (r->RoomId() == room_id)
                        return(r->list_servers(media_list));
        }
        return(-ERR_BAD_ROOM_ID);
} int RoomMgr::LeaveMeeting(CARD32 requester, int meeting_id,
                                List_of_p(MediaDesc)& media_list)
{
        Room *r;
        Meeting *m;
        List_of_piter(Room) riter(room_list);

riter.reset();
        while (riter.next(r)){
                if (r->has_meeting() && (m = r->get_meeting()) &&
                                m->MeetingId() == meeting_id){
                        return(m->leave_meeting(requester, media_list));
                }
        }
        return(-ERR_BAD_MEETING_ID);
} int RoomMgr::ReenterMeeting(CARD32 requester, int meeting_id,
                                List_of_p(MediaDesc)& media_list)
{
        Room *r;
        Meeting *m;
        List_of_piter(Room) riter(room_list);

riter.reset();
        while (riter.next(r)){
                if (r->has_meeting() && (m = r->get_meeting()) &&
                                m->MeetingId() == meeting_id){
                        return(m->reenter_meeting(requester, media_list));
                }
        }
        return(-ERR_BAD_MEETING_ID);
} void RoomMgr::MediaServerDied(int m)                                                    MediaServerDied
{
        Room *r;
        List_of_piter(Room) riter(room_list);

riter.reset();
        while (riter.next(r)){
``` room.C

```
                r->MediaServerDied(m);
        }
} int RoomMgr::IsServerPresent(int room_id, int server_id)
{
        Room *r;
        List_of_piter(Room) riter(room_list);

riter.reset();
        while (riter.next(r)){
                if (r->RoomId() == room_id)
                        return(r->is_server_present(server_id));
        }
        return(0);
} void RoomMgr::AssociatedServersInRoom(int room_id, List(int)& slist)
{
        Room *r;
        List_of_piter(Room) riter(room_list);

riter.reset();
        while (riter.next(r)){
                if (r->RoomId() == room_id)
                        r->associated_servers(slist);
        }
} int ParticipantInfo::operator==(const ParticipantInfo& p)
{
        return(participant == p.participant &&
                media_list == p.media_list);
}
``` server_reg.C           server_reg.C

```
define DEBUG 1 define MAX_ARBIT_STRING 500 int INET_ADDR = 1;

include <server_reg.h>
#include <common.h>

List_of_pimplement(MediaServerInfo)                             List_of_pimplement
List_of_pimplement(MRServerConnInfo)                            List_of_pimplement MediaServerInfo::MediaServerInfo(Media pType, String& pUserDesc,
            MediaServerConn& pConn, String& pInitializer,
            String& pOtherInfo)
{
    MediaType = pType; UserDesc = pUserDesc; Initializer = pInitializer;
    OtherInfo = pOtherInfo; Conn = pConn;
}

ServerRegistry::ServerRegistry(MRInterface *iface, String p_in_file)   ServerRegistry
{
    char host[HOST_NAME_LEN+1];

Iface = iface;
    in_file = p_in_file;
    read_file();
    if (gethostname(host, HOST_NAME_LEN) < 0){
        cout << "gethostname failed: " << __FILE__ << " " << __LINE__;
    }
    if (INET_ADDR) {
        struct hostent *hp;
        struct in_addr inet_a;
        if ((hp=gethostbyname(host))==NULL) {
            fprintf(stderr, "gethostbyname failed: %s %d\n",__FILE__,__LINE__);
        }
        else {
            bzero((char *)&inet_a,sizeof(struct in_addr));
            bcopy(hp->h_addr,(char *)&inet_a,
                (hp->h_length > 4) ? 4 : hp->h_length);
            strcpy(host,inet_ntoa(inet_a));
        }
    }
    MyName = host;
    my_range();
} void ServerRegistry::read_file()                                       read_file
{
    int num_entries;
    ifstream data_file(in_file, ios::in);
    int MediaType;
    int ch;
    String UserDesc, Machine, header;
    MediaServerConn Conn;
    char Initializer[MAX_ARBIT_STRING], OtherInfo[MAX_ARBIT_STRING];
    int Port, StartRange, EndRange, cnt1, cnt2;
    MediaServerInfo *pers;
    MRServerConnInfo *serv;

if (!data_file) {
        cout << "Can't open file " << in_file;
        exit(1);
    }

// Read default name server
    data_file >> header;
    if (header != "NameServer"){
``` server_reg.C  server_reg.C

...read_file

```
                cout << "NameServer not defined\n";
                exit(1);
        }
        data_file >> name_server_machine >> name_server_port;

// Read MediaServerInfo
        data_file >> num_entries;
        for (int i = 0; i < num_entries; i++) {
                data_file >> MediaType >> UserDesc >> Conn.conn_type;
                switch (Conn.conn_type) {
                        case INTERNET_CONNECTION:
                                data_file >> Conn.machine >> Conn.port >> cnt1 ;
                                break;

case GENERIC_CONNECTION:
                        default:
                                data_file >> Conn.generic >> cnt1;
                                break;
                }
                while((ch = data_file.get()) == ' ' || ch == '\t');
                data_file.putback(ch);
                data_file.getline(Initializer, cnt1+1);
                data_file >> cnt2;
                while((ch = data_file.get()) == ' ' || ch == '\t');
                data_file.putback(ch);
                data_file.getline(OtherInfo, cnt2+1);
                pers = new MediaServerInfo((Media)MediaType, UserDesc,
                                Conn, String(Initializer), String(OtherInfo));
#ifdef DEBUG
                cout << MediaType << " " << UserDesc << " " <<
                        cnt1 << " " << Initializer << " " << cnt2 << " " << OtherInfo << endl;
                cout.flush();
endif
                if (pers)
                        MediaServerList.insert_next(pers);
        }

// Read MRServerConnInfo
        data_file >> num_entries;
        for (i = 0; i < num_entries; i++) {
                data_file >> Machine >> Port >> StartRange >> EndRange;
                serv = new MRServerConnInfo(Machine, Port, StartRange, EndRange);
                if (serv)
                        MRServerList.insert_next(serv);
        }
} void ServerRegistry::ListAllMediaServerInfo(List_of_p(MediaServerInfo)& plist)      List_of_p
{
        plist = MediaServerList;
} void ServerRegistry::ListAllMRServerConnInfo(List_of_p(MRServerConnInfo)& slist)    List_of_p
{
        slist = MRServerList;
}

MediaServerInfo* ServerRegistry::ListMediaServerInfo(Media med,
                                String& key)
{
        MediaServerInfo *t;
        List_of_piter(MediaServerInfo) mlist(MediaServerList);

mlist.reset();
        while (mlist.next(t)){
        //      cout << "t->UserDesc: " << t->UserDesc << endl;
``` server_reg.C  server_reg.C

```
                if (t->MediaType == med && t->UserDesc == key){
                        return(t);
                }
        }
//      cout.flush();
        return((MediaServerInfo *)NULL);
} void ServerRegistry::my_range()                                                  my_range
{
        MRServerConnInfo *s;
        List_of_piter(MRServerConnInfo) slist(MRServerList);

MyStartRange = MyEndRange = -1;
        slist.reset();
        while (slist.next(s)){
                if (s->Machine == MyName) {
                        MyStartRange = s->StartRange;
                        MyEndRange = s->EndRange;
                }
        }
ifdef DEBUG
        cout << "\nMY RANGE: " << MyStartRange << " " << MyEndRange << endl;
#endif
} int ServerRegistry::server_for_id(int id, String& mach, int& port)               server_for_id
{
        MRServerConnInfo *s;
        int found = 0;
        List_of_piter(MRServerConnInfo) slist(MRServerList);

slist.reset();
        while (slist.next(s)){
                if (id >= s->StartRange && id <= s->EndRange) {
                        port = s->Port;
                        mach = s->Machine;
                        found = 1;
                        break;
                }
        }
ifdef DEBUG
        //cout << "Server_for_id: " << mach << "::" << port << endl;
#endif
        return(found);
} void ServerRegistry::default_name_server(String& mach, int& port)                default_name_server
{
        mach = name_server_machine;
        port = name_server_port;
}
```

```
name              stdin
spooldate         Thu Jan 14 09:52:47
owner             rapport (Sid Ahuja2, 4f601, x5569)

at (0 0 cc)
window (0 0 0)
imagesize (0 0)
imagespace (0 0 0 0)
jobheader on
jamresistance on
language impress System Version TURBO UltraScript 6.0T Rev. A IP/II, Serial #91:12:17
Page images processed: 82
Pages printed: 82

Paper size (width, height):
  2560, 3328
Document length:
  249729 bytes
```

APPENDIX 3

```
#ifndef __CM_MSG_H
define __CM_MSG_H include <msg.h>

// Replies from MR class IR_CreateRoom : public IncomingReply {
public:
        IR_CreateRoom(CARD8 msg_typ, CARD8 msg_code, int msg_seq_no,
                                int msg_len, char *msg_data, Connection *invoker) :
                IncomingReply( msg_typ, msg_code,msg_seq_no,
                        msg_len, msg_data, invoker) {}
        void action();
};

class IR_DestroyRoom : public IncomingReply {
public:
        IR_DestroyRoom(CARD8 msg_typ, CARD8 msg_code, int msg_seq_no,
                                int msg_len, char *msg_data, Connection *invoker) :
                IncomingReply( msg_typ, msg_code,msg_seq_no,
                        msg_len, msg_data, invoker) {}
        void action() {}
};

class IR_CreateMeeting : public IncomingReply {
public:
        IR_CreateMeeting(CARD8 msg_typ, CARD8 msg_code, int msg_seq_no,
                                int msg_len, char *msg_data, Connection *invoker) :
                IncomingReply( msg_typ, msg_code,msg_seq_no,
                        msg_len, msg_data, invoker) {}
        void action();
};

class IR_DestroyMeeting : public IncomingReply {
public:
        IR_DestroyMeeting(CARD8 msg_typ, CARD8 msg_code, int msg_seq_no,
                                int msg_len, char *msg_data, Connection *invoker) :
                IncomingReply( msg_typ, msg_code,msg_seq_no,
                        msg_len, msg_data, invoker) {}
        void action() {}
};

class IR_AddServer : public IncomingReply {
public:
        IR_AddServer(CARD8 msg_typ, CARD8 msg_code, int msg_seq_no,
                                int msg_len, char *msg_data, Connection *invoker) :
                IncomingReply( msg_typ, msg_code,msg_seq_no,
                        msg_len, msg_data, invoker) {}
        void action();
};

class IR_DropServer : public IncomingReply {
public:
        IR_DropServer(CARD8 msg_typ, CARD8 msg_code, int msg_seq_no,
                                int msg_len, char *msg_data, Connection *invoker) :
                IncomingReply( msg_typ, msg_code,msg_seq_no,
                        msg_len, msg_data, invoker) {}
};

class IR_AddParticipant : public IncomingReply {
public:
        IR_AddParticipant(CARD8 msg_typ, CARD8 msg_code, int msg_seq_no,
                                int msg_len, char *msg_data, Connection *invoker) :
                IncomingReply( msg_typ, msg_code,msg_seq_no,
                        msg_len, msg_data, invoker) {}
```

};

```cpp
class IR_DropParticipant : public IncomingReply {
public:
        IR_DropParticipant(CARD8 msg_typ, CARD8 msg_code, int msg_seq_no,
                                        int msg_len, char *msg_data, Connection *invoker) :
                IncomingReply( msg_typ, msg_code,msg_seq_no,
                        msg_len, msg_data, invoker) {}
};

class IR_ListRooms : public IncomingReply {
public:
        IR_ListRooms(CARD8 msg_typ, CARD8 msg_code, int msg_seq_no,
                                        int msg_len, char *msg_data, Connection *invoker) :
                IncomingReply( msg_typ, msg_code,msg_seq_no,
                        msg_len, msg_data, invoker) {}
        void action();
};

class IR_ListMeetings : public IncomingReply {
public:
        IR_ListMeetings(CARD8 msg_typ, CARD8 msg_code, int msg_seq_no,
                                        int msg_len, char *msg_data, Connection *invoker) :
                IncomingReply( msg_typ, msg_code,msg_seq_no,
                        msg_len, msg_data, invoker) {}
        void action();
};

class IR_ListServers : public IncomingReply {
public:
        IR_ListServers(CARD8 msg_typ, CARD8 msg_code, int msg_seq_no,
                                        int msg_len, char *msg_data, Connection *invoker) :
                IncomingReply( msg_typ, msg_code,msg_seq_no,
                        msg_len, msg_data, invoker) {}
        void action();
};

class IR_LeaveMeeting : public IncomingReply {
public:
        IR_LeaveMeeting(CARD8 msg_typ, CARD8 msg_code, int msg_seq_no,
                                        int msg_len, char *msg_data, Connection *invoker) :
                IncomingReply( msg_typ, msg_code,msg_seq_no,
                        msg_len, msg_data, invoker) {}
};

class IR_ReenterMeeting : public IncomingReply {
public:
        IR_ReenterMeeting(CARD8 msg_typ, CARD8 msg_code, int msg_seq_no,
                                        int msg_len, char *msg_data, Connection *invoker) :
                IncomingReply( msg_typ, msg_code,msg_seq_no,
                        msg_len, msg_data, invoker) {}
};

class IR_SuspendMeeting : public IncomingReply {
public:
        IR_SuspendMeeting(CARD8 msg_typ, CARD8 msg_code, int msg_seq_no,
                                        int msg_len, char *msg_data, Connection *invoker) :
                IncomingReply( msg_typ, msg_code,msg_seq_no,
                        msg_len, msg_data, invoker) {}
};

class IR_ResumeMeeting : public IncomingReply {
public:
        IR_ResumeMeeting(CARD8 msg_typ, CARD8 msg_code, int msg_seq_no,
                                        int msg_len, char *msg_data, Connection *invoker) :
                IncomingReply( msg_typ, msg_code,msg_seq_no,
```

```
                                msg_len, msg_data, invoker) {}
};

class IR_GetPersonInfo : public IncomingReply {
public:
        IR_GetPersonInfo(CARD8 msg_typ, CARD8 msg_code, int msg_seq_no,
                                int msg_len, char *msg_data, Connection *invoker) :
                        IncomingReply( msg_typ, msg_code,msg_seq_no,
                                msg_len, msg_data, invoker) {}
        void action();
};

class IR_ShowMeetingStatus : public IncomingReply {
public:
        IR_ShowMeetingStatus(CARD8 msg_typ, CARD8 msg_code, int msg_seq_no,
                                int msg_len, char *msg_data, Connection *invoker) :
                        IncomingReply( msg_typ, msg_code,msg_seq_no,
                                msg_len, msg_data, invoker) {}
        void action();
};

class IR_ShowMeetRoomStatus : public IncomingReply {
public:
        IR_ShowMeetRoomStatus(CARD8 msg_typ, CARD8 msg_code, int msg_seq_no,
                                int msg_len, char *msg_data, Connection *invoker) :
                        IncomingReply( msg_typ, msg_code,msg_seq_no,
                                msg_len, msg_data, invoker) {}
        void action();
};

class IR_VIMeetingInvitation: public IncomingReply {
public:
        IR_VIMeetingInvitation(CARD8 msg_typ, CARD8 msg_code, int msg_seq_no,
                                int msg_len, char *msg_data, Connection *invoker) :
                        IncomingReply( msg_typ, msg_code,msg_seq_no,
                                msg_len, msg_data, invoker) {}
        void action();
};
///////////////////// EVENTS from VI class IE_EveCreateMeeting :  public IncomingEvent {
public:
        IE_EveCreateMeeting(CARD8 msg_typ, CARD8 msg_code, int msg_seq_no,
                                int msg_len, char *msg_data, Connection *invoker) :
                        IncomingEvent( msg_typ, msg_code,msg_seq_no,
                                msg_len, msg_data, invoker) {}
        void action();
};

class IE_EveCreatePersistentMeeting:  public IncomingEvent {
public:
        IE_EveCreatePersistentMeeting(CARD8 msg_typ, CARD8 msg_code, int msg_seq_no,
                                int msg_len, char *msg_data, Connection *invoker) :
                        IncomingEvent( msg_typ, msg_code,msg_seq_no,
                                msg_len, msg_data, invoker) {}
        void action();
};

class IE_EveVICreateMeetInERoom:  public IncomingEvent {
public:
        IE_EveVICreateMeetInERoom(CARD8 msg_typ, CARD8 msg_code, int msg_seq_no,
                                int msg_len, char *msg_data, Connection *invoker) :
                        IncomingEvent( msg_typ, msg_code,msg_seq_no,
                                msg_len, msg_data, invoker) {}
        void action();
};
```

193

```
class IE_EveVIAddParticipant: public IncomingEvent {
public:
        IE_EveVIAddParticipant(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIDropParticipant : public IncomingEvent {
public:
        IE_EveVIDropParticipant(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVISuspendMeeting : public IncomingEvent {
public:
        IE_EveVISuspendMeeting(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIResumeMeeting : public IncomingEvent {
public:
        IE_EveVIResumeMeeting(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIReenterMeeting : public IncomingEvent {
public:
        IE_EveVIReenterMeeting(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVILeaveMeeting : public IncomingEvent {
public:
        IE_EveVILeaveMeeting(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIAddServer : public IncomingEvent {
public:
        IE_EveVIAddServer(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIDropServer : public IncomingEvent {
public:
```

```
        IE_EveVIDropServer(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIDestroyMeeting : public IncomingEvent {
public:
        IE_EveVIDestroyMeeting(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIListRooms : public IncomingEvent {
public:
        IE_EveVIListRooms(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIListMeetings : public IncomingEvent {
public:
        IE_EveVIListMeetings(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIShowMeetingStatus : public IncomingEvent {
public:
        IE_EveVIShowMeetingStatus(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIShowMeetRoomStatus : public IncomingEvent {
public:
        IE_EveVIShowMeetRoomStatus(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIJoinMeeting : public IncomingEvent {
public:
        IE_EveVIJoinMeeting(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveVIJoinMeetingRejected : public IncomingEvent {
public:
        IE_EveVIJoinMeetingRejected(CARD8 msg_typ, CARD8 msg_code, int msg_seq_no,
                                        int msg_len, char *msg_data, Connection *invoker) :
                        IncomingEvent( msg_typ, msg_code,msg_seq_no,
```

```
                                        msg_len, msg_data, invoker) {}
        void action();
};

class IE_EveVIJoinMeetingAccepted : public IncomingEvent {
public:
        IE_EveVIJoinMeetingAccepted(CARD8 msg_typ, CARD8 msg_code, int msg_seq_no,
                                    int msg_len, char *msg_data, Connection *invoker) :
                    IncomingEvent( msg_typ, msg_code,msg_seq_no,
                                    msg_len, msg_data, invoker) {}
        void action(){}
};

class IE_EveVIGetPersonName : public IncomingEvent {
public:
        IE_EveVIGetPersonName(CARD8 msg_typ, CARD8 msg_code, int msg_seq_no,
                                    int msg_len, char *msg_data, Connection *invoker) :
                    IncomingEvent( msg_typ, msg_code,msg_seq_no,
                                    msg_len, msg_data, invoker) {}
        void action() {}
};

class IE_EveVIGetPersonImage : public IncomingEvent {
public:
        IE_EveVIGetPersonImage(CARD8 msg_typ, CARD8 msg_code, int msg_seq_no,
                                    int msg_len, char *msg_data, Connection *invoker)
                    IncomingEvent( msg_typ, msg_code,msg_seq_no,
                                    msg_len, msg_data, invoker) {}
        void action() {}
};

class IE_EveVIGetPersonId : public IncomingEvent {
public:
        IE_EveVIGetPersonId(CARD8 msg_typ, CARD8 msg_code, int msg_seq_no,
                                    int msg_len, char *msg_data, Connection *invoker) :
                    IncomingEvent( msg_typ, msg_code,msg_seq_no,
                                    msg_len, msg_data, invoker) {}
        void action() {}
};

class IE_EveVIUp : public IncomingEvent {
public:
        IE_EveVIUp(CARD8 msg_typ, CARD8 msg_code, int msg_seq_no,
                                    int msg_len, char *msg_data, Connection *invoker) :
                    IncomingEvent( msg_typ, msg_code,msg_seq_no,
                                    msg_len, msg_data, invoker) {}
        void action() {}
};

class IE_EveVIDown : public IncomingEvent {
public:
        IE_EveVIDown(CARD8 msg_typ, CARD8 msg_code, int msg_seq_no,
                                    int msg_len, char *msg_data, Connection *invoker) :
                    IncomingEvent( msg_typ, msg_code,msg_seq_no,
                                    msg_len, msg_data, invoker) {}
        void action();
};

class IE_EveVIShowAssocRoom: public IncomingEvent {
public:
        IE_EveVIShowAssocRoom(CARD8 msg_typ, CARD8 msg_code, int msg_seq_no,
                                    int msg_len, char *msg_data, Connection *invoker) :
                    IncomingEvent( msg_typ, msg_code,msg_seq_no,
                                    msg_len, msg_data, invoker) {}
        void action() {}
};
```

```
//////////////////// EVENTS from EN class IE_EveMeetingInvite : public IncomingEvent {
public:
        IE_EveMeetingInvite(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveAcceptInvitation : public IncomingEvent {
public:
        IE_EveAcceptInvitation(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveRejectInvitation : public IncomingEvent {
public:
        IE_EveRejectInvitation(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveJoinMeeting : public IncomingEvent {
public:
        IE_EveJoinMeeting(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveJoinMeetingRejected : public IncomingEvent {
public:
        IE_EveJoinMeetingRejected(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveRoomDestroyed: public IncomingEvent {
public:
        IE_EveRoomDestroyed(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};

class IE_EveMeetingDestroyed: public IncomingEvent {
public:
        IE_EveMeetingDestroyed(CARD8 msg_typ, CARD8 msg_code, int msg_seq_no,
                                        int msg_len, char *msg_data, Connection *invoker) :
                        IncomingEvent( msg_typ, msg_code,msg_seq_no,
                                msg_len, msg_data, invoker) {}
        void action();
};
```

197

```
class IE_EveAddedParticipant : public IncomingEvent {
public:
        IE_EveAddedParticipant(CARD8 msg_typ, CARD8 msg_code, int msg_seq_no,
                                       int msg_len, char *msg_data, Connection *invoker) :
                        IncomingEvent( msg_typ, msg_code,msg_seq_no,
                                 msg_len, msg_data, invoker) {}
        void action();
};

class IE_EveDroppedParticipant: public IncomingEvent {
public:
        IE_EveDroppedParticipant(CARD8 msg_typ, CARD8 msg_code, int msg_seq_no,
                                       int msg_len, char *msg_data, Connection *invoker) :
                        IncomingEvent( msg_typ, msg_code,msg_seq_no,
                                 msg_len, msg_data, invoker) {}
        void action();
};

class IE_EveRoomLocked : public IncomingEvent {
public:
        IE_EveRoomLocked(CARD8 msg_typ, CARD8 msg_code, int msg_seq_no,
                                       int msg_len, char *msg_data, Connection *invoker) :
                        IncomingEvent( msg_typ, msg_code,msg_seq_no,
                                 msg_len, msg_data, invoker) {}
        void action() {}
};

class IE_EveRoomUnlocked: public IncomingEvent {
public:
        IE_EveRoomUnlocked(CARD8 msg_typ, CARD8 msg_code, int msg_seq_no,
                                       int msg_len, char *msg_data, Connection *invoker) :
                        IncomingEvent( msg_typ, msg_code,msg_seq_no,
                                 msg_len, msg_data, invoker) {}
        void action() {}
};

class IE_EveLeftMeeting : public IncomingEvent {
public:
        IE_EveLeftMeeting(CARD8 msg_typ, CARD8 msg_code, int msg_seq_no,
                                       int msg_len, char *msg_data, Connection *invoker) :
                        IncomingEvent( msg_typ, msg_code,msg_seq_no,
                                 msg_len, msg_data, invoker) {}
        void action();
};

class IE_EveReenterMeeting: public IncomingEvent {
public:
        IE_EveReenterMeeting(CARD8 msg_typ, CARD8 msg_code, int msg_seq_no,
                                       int msg_len, char *msg_data, Connection *invoker) :
                        IncomingEvent( msg_typ, msg_code,msg_seq_no,
                                 msg_len, msg_data, invoker) {}
        void action();
};

class IE_EveMeetingSuspended: public IncomingEvent {
public:
        IE_EveMeetingSuspended(CARD8 msg_typ, CARD8 msg_code, int msg_seq_no,
                                       int msg_len, char *msg_data, Connection *invoker) :
                        IncomingEvent( msg_typ, msg_code,msg_seq_no,
                                 msg_len, msg_data, invoker) {}
        void action();
};

class IE_EveMeetingResumed: public IncomingEvent {
public:
                                                    198
```

```
        IE_EveMeetingResumed(CARD8 msg_typ, CARD8 msg_code, int msg_seq_no,
                            int msg_len, char *msg_data, Connection *invoker) :
                    IncomingEvent( msg_typ, msg_code,msg_seq_no,
                            msg_len, msg_data, invoker) {}
        void action();
};

class IE_EveServerAdded : public IncomingEvent {
public:
        IE_EveServerAdded(CARD8 msg_typ, CARD8 msg_code, int msg_seq_no,
                            int msg_len, char *msg_data, Connection *invoker) :
                    IncomingEvent( msg_typ, msg_code,msg_seq_no,
                            msg_len, msg_data, invoker) {}
        void action();
};

class IE_EveServerDropped : public IncomingEvent {
public:
        IE_EveServerDropped(CARD8 msg_typ, CARD8 msg_code, int msg_seq_no,
                            int msg_len, char *msg_data, Connection *invoker) :
                    IncomingEvent( msg_typ, msg_code,msg_seq_no,
                            msg_len, msg_data, invoker) {}
        void action();
};

class IllegalMessage: public IncomingRequest {
public:
        IllegalMessage(CARD8 msg_typ, CARD8 msg_code, int msg_seq_no,
                            int msg_len, char *msg_data, Connection *invoker):
                    IncomingRequest(msg_typ, msg_code, msg_seq_no,
                            msg_len, msg_data, invoker) {}
        void action() {}
};

// Events from Local Media Managers class IE_EveLMUp: public IncomingEvent {
public:
        IE_EveLMUp(CARD8 msg_typ, CARD8 msg_code, int msg_seq_no,
                            int msg_len, char *msg_data, Connection *invoker) :
                    IncomingEvent( msg_typ, msg_code,msg_seq_no,
                            msg_len, msg_data, invoker) {}
        void action();
};

class IE_EveLMStateChange : public IncomingEvent {
public:
        IE_EveLMStateChange(CARD8 msg_typ, CARD8 msg_code, int msg_seq_no,
                            int msg_len, char *msg_data, Connection *invoker) :
                    IncomingEvent( msg_typ, msg_code,msg_seq_no,
                            msg_len, msg_data, invoker) {}
        void action();
};

endif ifndef __COMMON_H
define __COMMON_H 1 define HOLMDEL 1 ifdef HOLMDEL
include <sys/types.h>
include <sys/time.h>
#include <netdb.h>        //For struct hostent
```

```
#include <sys/socket.h>      //For AF_INET
#include <cc/netinet/in.h>   //For struct in_addr
#include <arpa/inet.h>       //For inet_ntoa
#define USHORT u_short
endif class Controller;
class Protocol;
class Connection;
class LocalMedia;
class MRServer;
class EventNotifier;
class VisualInterface;
class CommObjMgr;
class MRServerManager;
class LocalMediaManager;
class EventNotifierManager;
class VisualInterfaceManager;
class RoomFsm;
class Conferee;
class RoomFsmMgr;
class Convert;
class Message;

#define HOST_NAME_LEN 1024
define DUMMY_STR_SIZE 1024 include <Mm/MmNetworkMan.h>
include <Mm/MmEnum.h>
#include <Mm/MmConnection.h>
#include <FE_types.h>
include <convert.h> include <List.h>
include <String.h>
#include <Block.h>
#include <pcpp/pString.h>
#include <iostream.h>
include <fstream.h> define NW (MmNetworkManager::NetworkManager())

Listdeclare(int)

#define ROOM_UNASSIGNED -1
#define TRANSIENT_MEETING 0
define PERSISTENT_MEETING 1 endif
ifndef __CONN_H
define __CONN_H 1 define INIT_MAX_BUFLEN 65536 include <controller.h>
include <obj_man.h>
#include <common.h>

Blockdeclare(char)

/******
        This is the base class for all communication objects. It maintains the
        communication state (MmConnection object).
******/ enum ConnectionObjectTypes { e_MR, e_EN, e_LM, e_VI };
```

```
class Connection {
public:
        Connection(Controller *ctrl, MmConnection pconn,
                                ConnectionObjectTypes otype);
        ~Connection();
        MmConnection connection() { return(conn); }
        int send(char *data, int len);
        int send(Message *msg);
        Controller *Control() { return(Ctrl); }
        int is_alive() { return(alive); }
        RoomFsmMgr *RoomManager() { return(Ctrl->RoomManager()); }
        void deactivate_self() { client_dead(); }
        void serviced_msg(Message *msg) { delete msg; }
        virtual void process_msg() = 0;
        ConnectionObjectTypes object_type() { return obj_type; } protected:
        void client_process_msg();
        void client_dead();
        int alive;
        ConnectionObjectTypes obj_type;
        Controller *Ctrl;
        char header[MSG_HEADER_LEN];
        static int header_len;
        Block(char) buf;
        MmConnection conn;
};

enum LocalMediaState { e_LM_INACTIVE, e_LM_ACTIVE };

class LocalMedia : public Connection {
public:
        LocalMedia(Controller *ctrl, MmConnection pCli) :
                        Connection(ctrl, pCli, e_LM)
                {
                        media_state = e_LM_ACTIVE;
                } void process_msg() { client_process_msg(); }
        Media get_media() { return m; }
        String get_udesc() { return udesc; }
        int is_match(Media p_m, String& p_udesc)
                {
                        int tmp = (udesc == p_udesc) ? 1 : 0;
                        return ((tmp && (m == p_m)) ? 1 : 0);
                }
        int is_match(Media p_m)
                {
                        return ((m == p_m) ? 1 : 0);
                }
        void update(Media p_med, String& p_udesc)
                {
                        m = p_med; p_udesc = udesc;
                }
        LocalMediaState state() { return media_state; }
        void set_active() { media_state = e_LM_ACTIVE; }
        void set_inactive() { media_state = e_LM_INACTIVE; } private:
        Media m;
        String udesc;
        LocalMediaState media_state;
};
```

```cpp
class MRServer : public Connection {
public:
        MRServer(Controller *ctrl, MmConnection pCli) :
                        Connection(ctrl, pCli, e_MR) {}
        void process_msg() { client_process_msg(); }
};

class VisualInterface : public Connection {
public:
        VisualInterface (Controller *ctrl, MmConnection pCli) :
                        Connection(ctrl, pCli, e_VI) {}
        void process_msg() { client_process_msg(); }
};

class EventNotifier : public Connection {
public:
        EventNotifier(Controller *ctrl, MmConnection pCli) :
                        Connection(ctrl, pCli, e_EN) {}
        void process_msg() { client_process_msg(); }
};

endif ifndef __CONTROLLER_H_
define __CONTROLLER_H_ 1 include <proto.h>
include <msg.h>
include <ports.h> void CM_shutdown();

class Controller {
public:
        Controller() {};
        ~Controller();

// Parse cmd line arguments, create other objects in the system
        virtual void startup(int argc, char *argv[]);

// an infinite loop with a select statement (default polling on four
        // ports. When a message arrives in one of these ports,
        // the corresponding objects manager's processing method is invoked.
        virtual void main_loop();

// Starts four listening ports - one for the VI and three for the
        // local media managers
        virtual void listen();

// Sets the listening port for the MRServer. To be effective, this method
        // should be invoked before listen() is invoked.
        void set_VI_port(int port) { VI_port = port; }

// Sets the listening port for the local media managers. To be effective,
        // this method should be invoked before listen() is invoked.
        void set_LocalMediaPort(int port) { LM_port = port; }

// Returns the listening port where the VI connects
        int VIPort() { return VI_port; }

// Returns the listening port where the local media managers connect
        int LocalMediaPort() { return LM_port; }

// Handle for the RoomManager object
        RoomFsmMgr *RoomManager() { return(RMgr); }
```

```
        String MyName() { return my_name; }
        int MyId() { return my_id; }

// Handle for the Protocol object
        Protocol *Proto() { return(Prot); }

// Handle for the Convert object (which is used for network to host
        // conversion and vice versa.
        Convert *Conv() { return(ConvMethods); }

MRServerManager* MRMgr() { return _MRMgr; }
        EventNotifierManager* ENMgr() { return _ENMgr; }
        LocalMediaManager* LMMgr() { return _LMMgr; }
        VisualInterfaceManager* VIMgr() { return _VIMgr; } protected:

Protocol *Prot;
        Convert *ConvMethods;
        RoomFsmMgr *RMgr;

MRServerManager *_MRMgr;
        EventNotifierManager *_ENMgr;
        LocalMediaManager *_LMMgr;
        VisualInterfaceManager *_VIMgr;

String MR_machine;
        String EN_machine;
        int MR_port;
        int EN_port;
        int VI_port;
        int LM_port;

int my_id;
        String my_name;
};

endif ifndef __GENERATOR_H
define __GENERATOR_H 1 include <msg.h>
include <cm_msg.h>

/*
        prototypes of the functions which create message objects
*/

IncomingMessage *default_generator( CARD8, CARD8, CARD32, CARD32, char *, Connection *);
IncomingMessage *Gen_ErrMsg( CARD8, CARD8, CARD32, CARD32, char *, Connection *);
IncomingMessage *Gen_IR_CreateRoom( CARD8, CARD8, CARD32, CARD32, char *, Connection *);
IncomingMessage *Gen_IR_DestroyRoom( CARD8, CARD8, CARD32, CARD32, char *, Connection *);
IncomingMessage *Gen_IR_CreateMeeting( CARD8, CARD8, CARD32, CARD32, char *, Connection *);
IncomingMessage *Gen_IR_DestroyMeeting( CARD8, CARD8, CARD32, CARD32, char *, Connection *);
IncomingMessage *Gen_IR_AddServer( CARD8, CARD8, CARD32, CARD32, char *, Connection *);
IncomingMessage *Gen_IR_DropServer( CARD8, CARD8, CARD32, CARD32, char *, Connection *);
IncomingMessage *Gen_IR_AddParticipant( CARD8, CARD8, CARD32, CARD32, char *, Connection *);
IncomingMessage *Gen_IR_DropParticipant( CARD8, CARD8, CARD32, CARD32, char *, Connection *);
IncomingMessage *Gen_IR_ListRooms( CARD8, CARD8, CARD32, CARD32, char *, Connection *);
IncomingMessage *Gen_IR_ListMeetings( CARD8, CARD8, CARD32, CARD32, char *, Connection *);
IncomingMessage *Gen_IR_ListServers( CARD8, CARD8, CARD32, CARD32, char *, Connection *);
IncomingMessage *Gen_IR_LeaveMeeting( CARD8, CARD8, CARD32, CARD32, char *, Connection *);
IncomingMessage *Gen_IR_ReenterMeeting( CARD8, CARD8, CARD32, CARD32, char *, Connection *);
IncomingMessage *Gen_IR_SuspendMeeting( CARD8, CARD8, CARD32, CARD32, char *, Connection *);
IncomingMessage *Gen_IR_ResumeMeeting( CARD8, CARD8, CARD32, CARD32, char *, Connection *);
```

```c
IncomingMessage *Gen_IR_GetPersonInfo( CARD8, CARD8, CARD32, CARD32, char *, Connection *);
IncomingMessage *Gen_IR_ShowMeetingStatus( CARD8, CARD8, CARD32, CARD32, char *, Connection *)
IncomingMessage *Gen_IR_ShowMeetRoomStatus( CARD8, CARD8, CARD32, CARD32, char *, Connection IncomingMessage *Gen_IR_VIMeetingInvitation( CARD8, CARD8, CARD32, CARD32, char *, Connection IncomingMessage *Gen_IE_EveCreateMeeting( CARD8, CARD8, CARD32, CARD32, char *, Connection *);
IncomingMessage *Gen_IE_EveCreatePersistentMeeting( CARD8, CARD8, CARD32, CARD32, char *, Conr
IncomingMessage *Gen_IE_EveVICreateMeetInERoom( CARD8, CARD8, CARD32, CARD32, char *, Connect
IncomingMessage *Gen_IE_EveVIShowMeetRoomStatus( CARD8, CARD8, CARD32, CARD32, char *, Connect
IncomingMessage *Gen_IE_EveVIShowMeetingStatus( CARD8, CARD8, CARD32, CARD32, char *, Connect
IncomingMessage *Gen_IE_EveVIJoinMeeting( CARD8, CARD8, CARD32, CARD32, char *, Connection *);
IncomingMessage *Gen_IE_EveVIAddParticipant( CARD8, CARD8, CARD32, CARD32, char *, Connection
IncomingMessage *Gen_IE_EveVIDropParticipant( CARD8, CARD8, CARD32, CARD32, char *, Connectior
IncomingMessage *Gen_IE_EveVISuspendMeeting( CARD8, CARD8, CARD32, CARD32, char *, Connection
IncomingMessage *Gen_IE_EveVIResumeMeeting( CARD8, CARD8, CARD32, CARD32, char *, Connection
IncomingMessage *Gen_IE_EveVIReenterMeeting( CARD8, CARD8, CARD32, CARD32, char *, Connection
IncomingMessage *Gen_IE_EveVILeaveMeeting( CARD8, CARD8, CARD32, CARD32, char *, Connection *)
IncomingMessage *Gen_IE_EveVIAddServer( CARD8, CARD8, CARD32, CARD32, char *, Connection *);
IncomingMessage *Gen_IE_EveVIDropServer( CARD8, CARD8, CARD32, CARD32, char *, Connection *);
IncomingMessage *Gen_IE_EveVIDestroyRoom( CARD8, CARD8, CARD32, CARD32, char *, Connection *);
IncomingMessage *Gen_IE_EveVIDestroyMeeting( CARD8, CARD8, CARD32, CARD32, char *, Connection
IncomingMessage *Gen_IE_EveVIListRooms( CARD8, CARD8, CARD32, CARD32, char *, Connection *);
IncomingMessage *Gen_IE_EveVIListMeetings( CARD8, CARD8, CARD32, CARD32, char *, Connection *)
IncomingMessage *Gen_IE_EveVIGetPersonName( CARD8, CARD8, CARD32, CARD32, char *, Connection
IncomingMessage *Gen_IE_EveVIGetPersonImage( CARD8, CARD8, CARD32, CARD32, char *, Connection
IncomingMessage *Gen_IE_EveVIGetPersonId( CARD8, CARD8, CARD32, CARD32, char *, Connection *);
IncomingMessage *Gen_IE_EveVIUp( CARD8, CARD8, CARD32, CARD32, char *, Connection *);
IncomingMessage *Gen_IE_EveVIDown( CARD8, CARD8, CARD32, CARD32, char *, Connection *);
IncomingMessage *Gen_IE_EveVIShowAssocRoom( CARD8, CARD8, CARD32, CARD32, char *, Connection
IncomingMessage *Gen_IE_EveVIJoinMeetingAccepted( CARD8, CARD8, CARD32, CARD32, char *, Conne
IncomingMessage *Gen_IE_EveVIJoinMeetingRejected( CARD8, CARD8, CARD32, CARD32, char *, Conne IncomingMessage *Gen_IE_EveMeetingInvite( CARD8, CARD8, CARD32, CARD32, char *, Connection *);
IncomingMessage *Gen_IE_EveAcceptInvitation( CARD8, CARD8, CARD32, CARD32, char *, Connection
IncomingMessage *Gen_IE_EveRejectInvitation( CARD8, CARD8, CARD32, CARD32, char *, Connection
IncomingMessage *Gen_IE_EveServerAdded( CARD8, CARD8, CARD32, CARD32, char *, Connection *);
IncomingMessage *Gen_IE_EveServerDropped( CARD8, CARD8, CARD32, CARD32, char *, Connection *);
IncomingMessage *Gen_IE_EveJoinMeeting( CARD8, CARD8, CARD32, CARD32, char *, Connection *);
IncomingMessage *Gen_IE_EveJoinMeetingRejected( CARD8, CARD8, CARD32, CARD32, char *, Connect IncomingMessage *Gen_IE_EveRoomDestroyed( CARD8, CARD8, CARD32, CARD32, char *, Connection *);
IncomingMessage *Gen_IE_EveMeetingDestroyed( CARD8, CARD8, CARD32, CARD32, char *, Connection
IncomingMessage *Gen_IE_EveAddedParticipant( CARD8, CARD8, CARD32, CARD32, char *, Connection
IncomingMessage *Gen_IE_EveDroppedParticipant( CARD8, CARD8, CARD32, CARD32, char *, Connect
IncomingMessage *Gen_IE_EveRoomLocked( CARD8, CARD8, CARD32, CARD32, char *, Connection *);
IncomingMessage *Gen_IE_EveRoomUnlocked( CARD8, CARD8, CARD32, CARD32, char *, Connection *);
IncomingMessage *Gen_IE_EveLeftMeeting( CARD8, CARD8, CARD32, CARD32, char *, Connection *);
IncomingMessage *Gen_IE_EveReenterMeeting( CARD8, CARD8, CARD32, CARD32, char *, Connection *)
IncomingMessage *Gen_IE_EveMeetingSuspended( CARD8, CARD8, CARD32, CARD32, char *, Connection *)
IncomingMessage *Gen_IE_EveMeetingResumed( CARD8, CARD8, CARD32, CARD32, char *, Connection *),
IncomingMessage *Gen_IE_EveLMStateChange( CARD8, CARD8, CARD32, CARD32, char *, Connection *),
IncomingMessage *Gen_IE_EveLMUp( CARD8, CARD8, CARD32, CARD32, char *, Connection *);

#endif
#ifndef __IOC_H__
define __IOC_H__ define MEDIA_UNSET 0
define MEDIA_SET 1 include <system_proto.h>
include <FE_types.h>
#include <String.h>
#include <List.h>
```

```
struct MediaBridgeDesc {
        Media m;
        String udesc;
        String machine;
        int port;
        int req_done;
        int active;
/*
        int operator==(const MediaBridgeDesc& p)
                {
                        return (m == p.m && udesc == p.udesc);
                }
*/
};

List_of_pdeclare(MediaBridgeDesc)

class MediaBridgeDescList {
public:
        MediaBridgeDescList();
        ~MediaBridgeDescList();

// copy constructor
        MediaBridgeDescList(const MediaBridgeDescList& rhs);

// assign constructor
        MediaBridgeDescList& operator=(const MediaBridgeDescList& rhs);

int length() { return (list.length()); }
        int num_yet_to_service() { return (yet_to_service); }
        int next_bridge_to_service(MediaBridgeDesc*& bridge);
        void add(Media m, String& user_desc);
        void add(MediaBridgeDesc& med);
        void remove(Media m);
        void update(Media m, String& machine, int port, int is_active = 0);
        void update_prev_request(String& machine, int port, int is_active);
        void update_applicable_media(MediaBridgeDescList& mdesc);
        int is_present(MediaBridgeDesc *b);
        List_of_p(MediaBridgeDesc)& media_list() { return list; }
        MediaBridgeDesc* LastMedia() { return last_media; } private:
        MediaBridgeDesc* node_present(MediaBridgeDesc *node);
        void assign_or_copy(const MediaBridgeDescList& rhs);
        List_of_p(MediaBridgeDesc) list;
        MediaBridgeDesc *last_media;
                        // media specified in the last MR_ADD_SERVER msg
        int yet_to_service;
};

class PartMediaBridgeDescList {
public:
        PartMediaBridgeDescList(int p, MediaBridgeDescList& pmed)
                        { participant = p; med = pmed; }
        int Participant() { return participant; }
        MediaBridgeDescList& MediaList() { return med; } private:
        int     participant;
        MediaBridgeDescList med;
};

List_of_pdeclare(PartMediaBridgeDescList)

struct InterObjectBuffer {
        CARD8   msg_type;
```

205

```
CARD8    msg_code;

struct s1 {
        CARD32          pseudo_id;
        CARD32          participant;
        String          room_name;
        CARD32          attrib;
        MediaBridgeDescList med;
} eve_create_meeting;

struct s2 {
        CARD32          room_id;
        MediaBridgeDescList med;
} eve_accept_invitation;

struct s3 {
        CARD32          pseudo_id;
        CARD32          real_id;
        CARD32          participant;
} eve_create_meeting_in_eroom;

struct s4 {
        CARD32          room_id;
} Rep_mr_create_room;

struct s5 {
        CARD32          meeting_id;
} Rep_mr_create_meeting;

struct s6 {
        String machine;
        int port;
} Rep_mr_add_server;

struct s7 {
        String machine;
        int port;
} Rep_reg_get_person_info;

struct s8 {
        CARD32          pseudo_id;
} eter1;

struct s9 {
        CARD32          err_code;
} err;

struct s11 {
        CARD32          participant;
        String          part_name;
        CARD32          room_id;
        CARD32          meeting_id;
        MediaBridgeDescList med;
        List_of_p(PartMediaBridgeDescList) part_med;
} eve_meeting_invite;

struct s12 {
        CARD32          vi_room_id;
        MediaBridgeDescList med;
} Rep_vi_meeting_invitation;
// Note that right now the VI send the reject also as a REP instead
// of an ERR - change VI struct s13 {
        CARD32          room_id;
        CARD32          meeting_id;
```

```
            CARD32          participant;
            MediaBridgeDescList med;
} eve_added_participant;

struct s14 {
            CARD32          vi_room_id;
            CARD32          participant;
            MediaBridgeDescList med;
} eve_vi_add_participant;

struct s15 {
            CARD32          vi_room_id;
            CARD32          participant;
} eve_vi_drop_participant;

struct s16 {

} Rep_drop_participant;

struct s18 {
            CARD32          room_id;
            CARD32          participant;
} eve_dropped_participant;

struct s21 {
            CARD32          src_part;
            CARD32          room_id;
            CARD32          meeting_id;
} template2;

struct s22 {
            CARD32          vi_room_id;
} eve_vi_suspend_meeting;

struct s23 {
            CARD32          room_id;
            CARD32          meeting_id;
            CARD32          participant;
} template1;

struct s25 {
            CARD32          room_id;
} template5;

struct s26 {
            CARD32          room_id;
            CARD32          meeting_id;
            CARD32          participant;
            MediaBridgeDescList med;
} template6;

struct s19 {
            CARD32          room_id;
            MediaBridgeDesc med;
            //List(int) part_list;
} template7;

struct s27 {
            CARD32          vi_room_id;
            CARD32          participant;
} eve_vi_template2 ;

struct s28 {
            MediaBridgeDescList med;
} Rep_list_servers;
```

```c
        struct s29 {
                CARD32          real_room_id;
                CARD32          meet_id;
                CARD32          owner;
        } eve_vi_join_meeting;

struct s30 {
                CARD32  vi_room_id;
                MediaBridgeDesc med;
                //List(int) part_list;
        } eve_vi_add_server;

struct s31 {
                CARD32  vi_room_id;
                MediaBridgeDesc med;
        } eve_vi_drop_server;

};

endif
#ifndef __MSG_H
define __MSG_H  1 include <common.h>
include <system_proto.h>
#include <List.h>
include <ioc.h> define INIT_MAX_REPLYSIZE 4096 enum msg_obj_states { e_MSG_IN_SERVICE, e_MSG_READY,
                                        e_MSG_PENDING, e_MSG_SERVICED };

class Message {
public:
        Message(CARD8 msg_typ, CARD8 msg_code, int msg_seq_no,
                        int msg_len, char *msg_data, Connection *invoker);

CARD8 msg_type() { return type; }
        CARD8 msg_code() { return opcode; }
        int msg_seq_no() { return seq_no; }
        int msg_len() { return len; }
        char *msg_data() { return data; }
        char *msg_header() { return header; }
        int msg_header_len() { return MSG_HEADER_LEN; } void set_msg_type(CARD8 typ)
                { type = typ; header[MSG_HOFFSET_TYPE] = type; } void set_msg_code(CARD8 cod)
                { opcode = cod; header[MSG_HOFFSET_CODE] = opcode; } void set_msg_seq_no(int seq)
                {
                        seq_no = seq;
                        Conv->IntToBuf(seq_no, header+MSG_HOFFSET_SEQ);
                } void set_msg_len(int l)   // l should be a multiple of 4
                {
                        len = l;
                        Conv->IntToBuf((len>>2), header+MSG_HOFFSET_LEN);
                } void set_msg_header(CARD8 typ, CARD8 cod, int seq, int l)
                                        // l should be a multiple of 4
```

```
                {
                        type = typ; opcode = cod; seq_no = seq;
                        len = 1;
                        header[MSG_HOFFSET_TYPE] = type;
                        header[MSG_HOFFSET_CODE] = opcode;
                        Conv->IntToBuf(seq_no, header+MSG_HOFFSET_SEQ);
                        Conv->IntToBuf((len>>2), header+MSG_HOFFSET_LEN);
                } void set_msg_data(char *dat) { data = dat; }

Connection *MsgSource() { return Invoker; }
        void send();

protected:
        int len_in_CARD32(int len_in_bytes);

CARD8           type;      // message type (the class of message)
        CARD8           opcode;    // message code (the particular message in the class)
        int             seq_no;    // sequence number (for handling asynchronous msgs)
        int             len;       // length in bytes
        char            header[MSG_HEADER_LEN]; // message header (contains the above
                                                                // 4 fields
        char            *data;     // the message data
        Connection      *Invoker;  // the communication object associated with the msg
        Convert         *Conv;
        RoomFsmMgr      *RMgr;

// temp vars
        int err, nbytes;
        int pos; // position in data to start processing
};

List_of_pdeclare(Message)

////////////////////////////////////////////////////////////////
// Classes of Message: Incoming & Outgoing
//////////////////////////////////////////////////////////////// class OutgoingMessage : public Message {
public:
        OutgoingMessage(CARD8 msg_typ, CARD8 msg_code, int msg_seq_no,
                        int msg_len, char *msg_data, Connection *invoker):
                Message(msg_typ, msg_code,msg_seq_no, msg_len,
                        msg_data, invoker) { rep_len = 0;} protected:
        void comm_template1(int vi_room_id, int participant,
                                        MediaBridgeDescList& med);

// Later make it dynamic
        char rep_buf[INIT_MAX_REPLYSIZE];
                                        // buffer for constructing the data part
                                        // of an outgoing message
        int rep_len;    // length (in bytes) of the data part of an outgoing msg
};

class OutgoingRequest : public OutgoingMessage {
public:
        OutgoingRequest(CARD8 msg_typ, CARD8 msg_code, int msg_seq_no,
                        int msg_len, char *msg_data, Connection *invoker):
                OutgoingMessage(msg_typ, msg_code,msg_seq_no,
                                msg_len, msg_data, invoker) {} protected:
```

209

```cpp
        void template1(int id);
        void template2(int id, int part);
        void template3(int id, Media m, String& udesc);
        void template4(int id, MediaBridgeDescList& med);
        void template5();
};

class OutgoingReply : public OutgoingMessage {
public:
        OutgoingReply(CARD8 msg_typ, CARD8 msg_code, int msg_seq_no,
                                int msg_len, char *msg_data, Connection *invoker):
                OutgoingMessage(msg_typ, msg_code,msg_seq_no,
                                msg_len, msg_data, invoker) {}
};

class OutgoingEvent : public OutgoingMessage {
public:
        OutgoingEvent(CARD8 msg_typ, CARD8 msg_code, int msg_seq_no,
                                int msg_len, char *msg_data, Connection *invoker):
                OutgoingMessage(msg_typ, msg_code,msg_seq_no,
                                msg_len, msg_data, invoker) {} protected:
        void template1(int room_id, int meeting_id, int participant);
        void template2(int room_id, int meeting_id);
        void template3(char status, int vi_room_id);
        void template4(char status, int vi_room_id, int participant);
        void template5(int room_id);
        void template6(int room_id, int meeting_id, int participant,
                                        MediaBridgeDescList& med);
        void template7(int room_id, String& machine, int port);
        void template8(char *packet, int len);
        void template9(int room_id, MediaBridgeDesc& med);
        void template10(char status, int vi_room_id, MediaBridgeDesc& med);
};

class OutgoingError : public OutgoingMessage {
public:
        OutgoingError(Connection *invoker) :
                OutgoingMessage(0, 0, 0, 0, NULL, invoker) {}
        void connection(Connection *invoker)
                { Invoker = invoker; }
        void e_action(CARD32 err_type, CARD32 msg_code,
                                        CARD32 seq_no, CARD32 err_code);
        void success_return(CARD32 err_type, CARD32 msg_code,
                                        CARD32 seq_no);
};

class IncomingMessage : public Message {
public:
        IncomingMessage(CARD8 msg_typ, CARD8 msg_code, int msg_seq_no,
                                int msg_len, char *msg_data, Connection *invoker):
                Message(msg_typ, msg_code, msg_seq_no, msg_len,
                                        msg_data, invoker)
                {
                        res_len = len;
                        iob.msg_type = msg_typ;
                        iob.msg_code = msg_code;
                } virtual void action() = 0;

protected:
        void common_action1();

InterObjectBuffer iob;
```

```
        int res_len; // residue length of data   (for processing an incoming msg)
};

class IncomingRequest : public IncomingMessage {
public:
        IncomingRequest(CARD8 msg_typ, CARD8 msg_code, int msg_seq_no,
                                int msg_len, char *msg_data, Connection *invoker):
                IncomingMessage(msg_typ, msg_code, msg_seq_no, msg_len,
                                        msg_data, invoker)
                {
                        error = new OutgoingError(invoker);
                }

~IncomingRequest() { delete error; }

OutgoingError *error_obj() { return error; }
        virtual void action() = 0;

protected:
        OutgoingError *error; // Error object for sending  error replies
};

class IncomingEvent : public IncomingMessage {
public:
        IncomingEvent(CARD8 msg_typ, CARD8 msg_code, int msg_seq_no,
                                int msg_len, char *msg_data, Connection *invoker):
                IncomingMessage(msg_typ, msg_code, msg_seq_no, msg_len,
                                        msg_data, invoker) { }

~IncomingEvent() { } virtual void action() = 0;
        void vi_template1(); // add_part
        void vi_template2(); // leave, reenter
        void template1();
        void template2();
        void template5();
        void template6();
        void template7();

};

class IncomingReply: public IncomingMessage {
public:
        IncomingReply(CARD8 msg_typ, CARD8 msg_code, int msg_seq_no,
                                int msg_len, char *msg_data, Connection *invoker):
                IncomingMessage(msg_typ, msg_code, msg_seq_no, msg_len,
                                        msg_data, invoker) { }

~IncomingReply() { } virtual void action();

protected:
};

class IncomingError: public IncomingMessage {
public:
        IncomingError(CARD8 msg_typ, CARD8 msg_code, int msg_seq_no,
                                int msg_len, char *msg_data, Connection *invoker):
                IncomingMessage(msg_typ, msg_code, msg_seq_no, msg_len,
                                        msg_data, invoker) { }

~IncomingError() { } void action();
};

typedef Message * MessagePtr;                    211
```

```
/pedef IncomingMessage * IncomingMessagePtr;

endif ifndef __OBJ_MAN_H
define __OBJ_MAN_H 1 include <common.h>
include <controller.h>
#include <conn.h>
#include <ioc.h>

List_of_pdeclare(LocalMedia)

/******
        This is an abstract base class for communication object managers.  A
        communication object manager provides methods to manage a set of
        Connection objects.
******/
class CommObjMgr {
public:
        CommObjMgr(Controller *ctrl) { Ctrl = ctrl; }
        ~CommObjMgr() {}
        virtual void process(MmConnection pconn) = 0;
        int IsAlive() { return(is_alive); } protected:
        Controller *Ctrl;
        int is_alive;
        int next_id;
};

class LocalMediaManager : public CommObjMgr {
public:
        LocalMediaManager(Controller *ctrl) : CommObjMgr(ctrl)
                                { is_alive = 1; }
        ~LocalMediaManager();
        void process(MmConnection pconn);

void ConnectToBridge(int room_id, Media m, String& udesc,
                                                String& machine, int port);
        void DisconnectFromBridge(int room_id, Media m, String& udesc,
                                                String& machine, int port);

private:
        void garbage_collect();
        LocalMedia* find_matching_LM(Media m, String& udesc);
        List_of_p(LocalMedia) client_list;
};

class VisualInterfaceManager : public CommObjMgr {
public:
        VisualInterfaceManager (Controller *ctrl) : CommObjMgr(ctrl)
                                { is_alive = 1; }
        ~VisualInterfaceManager();
        void process(MmConnection pconn);

void MeetingInvite(int seq_no, int room_id, int meeting_id, int participant,
                                MediaBridgeDescList& med,
                                List_of_p(PartMediaBridgeDescList)& part_med,
                                String& part_name);
        void JoinMeeting(int vi_room_id, int participant);
        void AddedParticipant(char status, int real_room_id,
                                int real_meeting_id, int vi_room_id, int participant,
                                MediaBridgeDescList& med);
```

212

```
        void DroppedParticipant(char status, int vi_room_id,
                                            int participant);
        void MeetingDestroyed(char status, int vi_room_id);
        void MeetingSuspended(char status, int vi_room_id);
        void MeetingResumed(char status, int vi_room_id);
        void MeetingLeft(char status, int vi_room_id,
                                int participant, MediaBridgeDescList& med);
        void MeetingReentered(char status, int vi_room_id,
                                int participant, MediaBridgeDescList& med);
        void ListRooms(char *packet, int pkt_len);
        void ListMeetings(char *packet, int pkt_len);
        void ShowMeetingStatus(char *packet, int pkt_len);
        void ShowMeetRoomStatus(char *packet, int pkt_len);
        void ServerAdded(char status, int vi_room_id,
                                MediaBridgeDesc& med);
        void ServerDropped(char status, int vi_room_id,
                                MediaBridgeDesc& med);

private:
        void garbage_collect();
        VisualInterface *client;
};

class MRServerManager : public CommObjMgr {
public:
    MRServerManager(Controller *ctrl, String machine, int port);
        ~MRServerManager();
    void process(MmConnection pconn);
    MmConnection conn();

void CreateRoom(int seq_no, int attrib, String& room_name);
        void ListRooms(int seq_no);
        void ListMeetings(int seq_no);
        void ShowMeetingStatus(int seq_no, int meeting_id);
        void ShowMeetRoomStatus(int seq_no, int meeting_id);
        void CreateMeeting(int seq_no, int room_id);
        void DestroyMeeting(int seq_no, int meeting_id);
        void SuspendMeeting(int seq_no, int meeting_id);
        void ResumeMeeting(int seq_no, int meeting_id);
        void DestroyRoom(int seq_no, int room_id);
        void AddServer(int seq_no, int room_id, Media m, String& udesc);
        void DropServer(int seq_no, int room_id, Media m, String& udesc);
        void ListServers(int seq_no, int room_id);
        void GetPersonInfo(int seq_no, int part_id);
        void AddParticipant(int seq_no, int meeting_id, int part_id);
        void DropParticipant(int seq_no, int meeting_id, int part_id);
        void LeaveMeeting(int seq_no, int meeting_id,
                                        MediaBridgeDescList& med);
        void ReenterMeeting(int seq_no, int meeting_id,
                                        MediaBridgeDescList& med);

private:
    MRServer *mr_server;
};

class EventNotifierManager : public CommObjMgr {
public:
    EventNotifierManager(Controller *ctrl, String machine, int port);
        ~EventNotifierManager();
    void process(MmConnection pconn);
    MmConnection conn();

void MeetingInvite(int room_id, int meeting_id,
                            MediaBridgeDescList& med, List(int)& plist,
                            List_of_p(PartMediaBridgeDescList)& pmed);
```

```
                JoinMeeting(int room_id, int meeting_id, List(int)& plist);
        void JoinMeetingRejected(int room_id, List(int)& plist);
        void AddedParticipant(int room_id, int meeting_id, int participant,
                                MediaBridgeDescList& med, List(int)& plist);
        void DroppedParticipant(int room_id, int meeting_id, int participant,
                                List(int)& plist);
        void MeetingLeft(int room_id, int meeting_id, int participant,
                                MediaBridgeDescList& med, List(int)& plist);
        void MeetingReentered(int room_id, int meeting_id, int participant,
                                MediaBridgeDescList& med, List(int)& plist);
        void AcceptInvitation(int room_id, int meeting_id,
                                MediaBridgeDescList& med, List(int)& plist);
        void RejectInvitation(int room_id, int meeting_id, List(int)& plist);
        void MeetingDestroyed(int room_id, int meeting_id, List(int)& plist);
        void MeetingSuspended(int room_id, int meeting_id, List(int)& plist);
        void MeetingResumed(int room_id, int meeting_id, List(int)& plist);
        void RoomDestroyed(int room_id, List(int)& plist);
        void ServerAdded(int room_id, MediaBridgeDesc& med,
                                                        List(int)& plist);
        void ServerDropped(int room_id, MediaBridgeDesc& med,
                                                        List(int)& plist);

private:
        void multicast(List(int)& plist, OutgoingMessage *msg);
    void send_start_msg();
    EventNotifier *eve_not;
};

endif
#ifndef __OUTGOING_H_
define __OUTGOING_H_ include <msg.h>

// OUTGOING REQUESTS from CM to MR class OQ_CreateRoom : public OutgoingRequest {
public:
        OQ_CreateRoom(int msg_seq_no, int msg_len,
                        char *msg_data, Connection *invoker) :
                        OutgoingRequest(REQUEST_MR_SERVER, MR_CREATE_ROOM,
                                msg_seq_no, msg_len, msg_data, invoker) {}
        void action(int attrib, String& room_name);
};

class OQ_CreateMeeting : public OutgoingRequest {
public:
        OQ_CreateMeeting (int msg_seq_no, int msg_len,
                        char *msg_data, Connection *invoker) :
                        OutgoingRequest(REQUEST_MR_SERVER, MR_CREATE_MEETING,
                                msg_seq_no, msg_len, msg_data, invoker) {}
        void action(int room_id);
};

class OQ_DestroyRoom : public OutgoingRequest {
public:
        OQ_DestroyRoom(int msg_seq_no, int msg_len,
                        char *msg_data, Connection *invoker) :
                        OutgoingRequest(REQUEST_MR_SERVER, MR_DESTROY_ROOM,
                                msg_seq_no, msg_len, msg_data, invoker) {}
        void action(int room_id);
};

class OQ_DestroyMeeting : public OutgoingRequest {
public:
        OQ_DestroyMeeting(int msg_seq_no, int msg_len,
```

```cpp
                    char *msg_data, Connection *invoker) :
                    OutgoingRequest(REQUEST_MR_SERVER, MR_DESTROY_MEETING,
                            msg_seq_no, msg_len, msg_data, invoker) {}
        void action(int meeting_id);
};

class OQ_ListRooms : public OutgoingRequest {
public:
        OQ_ListRooms(int msg_seq_no, int msg_len,
                    char *msg_data, Connection *invoker) :
                    OutgoingRequest(REQUEST_MR_SERVER, MR_LIST_ROOMS,
                            msg_seq_no, msg_len, msg_data, invoker) {}
        void action();
};

class OQ_ListMeetings : public OutgoingRequest {
public:
        OQ_ListMeetings(int msg_seq_no, int msg_len,
                    char *msg_data, Connection *invoker) :
                    OutgoingRequest(REQUEST_MR_SERVER, MR_LIST_MEETINGS,
                            msg_seq_no, msg_len, msg_data, invoker) {}
        void action();
};

class OQ_ShowMeetingStatus: public OutgoingRequest {
public:
        OQ_ShowMeetingStatus(int msg_seq_no, int msg_len,
                    char *msg_data, Connection *invoker) :
                    OutgoingRequest(REQUEST_MR_SERVER, MR_SHOW_MEETING_STATUS,
                            msg_seq_no, msg_len, msg_data, invoker) {}
        void action(int meeting_id);
};

class OQ_ShowMeetRoomStatus: public OutgoingRequest {
public:
        OQ_ShowMeetRoomStatus(int msg_seq_no, int msg_len,
                    char *msg_data, Connection *invoker) :
                    OutgoingRequest(REQUEST_MR_SERVER, MR_SHOW_MEETROOM_STATUS,
                            msg_seq_no, msg_len, msg_data, invoker) {}
        void action(int meeting_id);
};

class OQ_AddServer : public OutgoingRequest {
public:
        OQ_AddServer (int msg_seq_no, int msg_len,
                    char *msg_data, Connection *invoker) :
                    OutgoingRequest(REQUEST_MR_SERVER, MR_ADD_SERVER,
                            msg_seq_no, msg_len, msg_data, invoker) {}
        void action(int room_id, Media m, String& udesc);
};

class OQ_DropServer : public OutgoingRequest {
public:
        OQ_DropServer (int msg_seq_no, int msg_len,
                    char *msg_data, Connection *invoker) :
                    OutgoingRequest(REQUEST_MR_SERVER, MR_DROP_SERVER,
                            msg_seq_no, msg_len, msg_data, invoker) {}
        void action(int room_id, Media m, String& udesc);
};

class OQ_ListServers : public OutgoingRequest {
public:
        OQ_ListServers(int msg_seq_no, int msg_len,
                    char *msg_data, Connection *invoker) :
                    OutgoingRequest(REQUEST_MR_SERVER, MR_LIST_SERVERS,
                            msg_seq_no, msg_len, msg_data, invoker) {}
```

```
                void action(int room_id);
};

class OQ_AddParticipant : public OutgoingRequest {
public:
        OQ_AddParticipant(int msg_seq_no, int msg_len,
                        char *msg_data, Connection *invoker) :
                        OutgoingRequest(REQUEST_MR_SERVER, MR_ADD_PARTICIPANT,
                                msg_seq_no, msg_len, msg_data, invoker) {}
        void action(int meeting_id, int part_id);
};

class OQ_DropParticipant : public OutgoingRequest {
public:
        OQ_DropParticipant(int msg_seq_no, int msg_len,
                        char *msg_data, Connection *invoker) :
                        OutgoingRequest(REQUEST_MR_SERVER, MR_DROP_PARTICIPANT,
                                msg_seq_no, msg_len, msg_data, invoker) {}
        void action(int meeting_id, int part_id);
};

class OQ_SuspendMeeting: public OutgoingRequest {
public:
        OQ_SuspendMeeting(int msg_seq_no, int msg_len,
                        char *msg_data, Connection *invoker) :
                        OutgoingRequest(REQUEST_MR_SERVER, MR_SUSPEND_MEETING,
                                msg_seq_no, msg_len, msg_data, invoker) {}
        void action(int meeting_id);
};

class OQ_ResumeMeeting: public OutgoingRequest {
public:
        OQ_ResumeMeeting(int msg_seq_no, int msg_len,
                        char *msg_data, Connection *invoker) :
                        OutgoingRequest(REQUEST_MR_SERVER, MR_RESUME_MEETING,
                                msg_seq_no, msg_len, msg_data, invoker) {}
        void action(int meeting_id);
};

class OQ_LeaveMeeting : public OutgoingRequest {
public:
        OQ_LeaveMeeting(int msg_seq_no, int msg_len,
                        char *msg_data, Connection *invoker) :
                        OutgoingRequest(REQUEST_MR_SERVER, MR_LEAVE_MEETING,
                                msg_seq_no, msg_len, msg_data, invoker) {}
        void action(int meeting_id, MediaBridgeDescList& med);
};

class OQ_ReenterMeeting : public OutgoingRequest {
public:
        OQ_ReenterMeeting(int msg_seq_no, int msg_len,
                        char *msg_data, Connection *invoker) :
                        OutgoingRequest(REQUEST_MR_SERVER, MR_REENTER_MEETING,
                                msg_seq_no, msg_len, msg_data, invoker) {}
        void action(int meeting_id, MediaBridgeDescList& med);
};

class OQ_GetPersonInfo : public OutgoingRequest {
public:
        OQ_GetPersonInfo (int msg_seq_no, int msg_len,
                        char *msg_data, Connection *invoker) :
                        OutgoingRequest(REQUEST_REGISTRY_SERVER, REG_GET_PERSON_INFO,
                                msg_seq_no, msg_len, msg_data, invoker) {}
        void action(int part_id);
};
```

```cpp
// OUTGOING EVENTS from CM to EN and VI class OE_EveMeetingDestroyed: public OutgoingEvent {
public:
        OE_EveMeetingDestroyed(int msg_seq_no,
                                int msg_len, char *msg_data, Connection *invoker) :
                        OutgoingEvent(EVENT_CM, EVE_MEETING_DESTROYED, msg_seq_no,
                                msg_len, msg_data, invoker) {}
        void action(int room_id, int meeting_id);
};

class OE_EveVIMeetingDestroyed: public OutgoingEvent {
public:
        OE_EveVIMeetingDestroyed(int msg_seq_no,
                                int msg_len, char *msg_data, Connection *invoker) :
                        OutgoingEvent(EVENT_CM, EVE_VI_MEETING_DESTROYED,
                                msg_seq_no, msg_len, msg_data, invoker) {}
        void action(char status, int vi_room_id);
};

class OE_EveVIJoinMeeting : public OutgoingEvent {
public:
        OE_EveVIJoinMeeting(int msg_seq_no,
                                int msg_len, char *msg_data, Connection *invoker) :
                        OutgoingEvent(EVENT_CM, EVE_VI_JOIN_MEETING,
                                msg_seq_no, msg_len, msg_data, invoker) {}
        void action(int vi_room_id, int participant);
};

class OE_EveRoomDestroyed: public OutgoingEvent {
public:
        OE_EveRoomDestroyed(int msg_seq_no,
                                int msg_len, char *msg_data, Connection *invoker) :
                        OutgoingEvent(EVENT_CM, EVE_ROOM_DESTROYED, msg_seq_no,
                                msg_len, msg_data, invoker) {}
        void action(int room_id);
};

class OE_EveJoinMeetingRejected : public OutgoingEvent {
public:
        OE_EveJoinMeetingRejected(int msg_seq_no,
                                int msg_len, char *msg_data, Connection *invoker) :
                OutgoingEvent(EVENT_CM, EVE_JOIN_MEETING_REJECTED, msg_seq_no,
                                msg_len, msg_data, invoker) {}
        void action(int room_id);
};

class OE_EveAddedParticipant : public OutgoingEvent {
public:
        OE_EveAddedParticipant(int msg_seq_no, int msg_len,
                                char *msg_data, Connection *invoker) :
                        OutgoingEvent(EVENT_CM, EVE_ADDED_PARTICIPANT, msg_seq_no,
                                msg_len, msg_data, invoker) {}
        void action(int room_id, int meeting_id, int participant,
                                        MediaBridgeDescList& med);
};

class OE_EveVIAddedParticipant: public OutgoingEvent {
public:
        OE_EveVIAddedParticipant(int msg_seq_no, int msg_len,
                                char *msg_data, Connection *invoker) :
                        OutgoingEvent(EVENT_CM, EVE_VI_ADDED_PARTICIPANT,
                                msg_seq_no, msg_len, msg_data, invoker) {}
        void action(char status, int real_room_id,
                                        int real_meeting_id, int vi_room_id, int participant,
```

```
                                                  MediaBridgeDescList& med);

class OE_EveDroppedParticipant: public OutgoingEvent {
public:
        OE_EveDroppedParticipant(int msg_seq_no,
                                int msg_len, char *msg_data, Connection *invoker) :
                        OutgoingEvent(EVENT_CM, EVE_DROPPED_PARTICIPANT,
                                        msg_seq_no, msg_len, msg_data, invoker) {}
        void action(int room_id, int meeting_id, int participant);
};

class OE_EveVIDroppedParticipant: public OutgoingEvent {
public:
        OE_EveVIDroppedParticipant(int msg_seq_no,
                                int msg_len, char *msg_data, Connection *invoker) :
                        OutgoingEvent(EVENT_CM, EVE_VI_PARTICIPANT_DROPPED,
                                        msg_seq_no, msg_len, msg_data, invoker) {}
        void action(char status, int vi_room_id, int participant);
};

class OE_EveRoomLocked : public OutgoingEvent {
public:
        OE_EveRoomLocked(CARD8 msg_typ, CARD8 msg_code, int msg_seq_no,
                                int msg_len, char *msg_data, Connection *invoker) :
                        OutgoingEvent( msg_typ, msg_code,msg_seq_no,
                                msg_len, msg_data, invoker) {}
};

class OE_EveRoomUnlocked: public OutgoingEvent {
public:
        OE_EveRoomUnlocked(CARD8 msg_typ, CARD8 msg_code, int msg_seq_no,
                                int msg_len, char *msg_data, Connection *invoker) :
                        OutgoingEvent( msg_typ, msg_code,msg_seq_no,
                                msg_len, msg_data, invoker) {}
};

class OE_EveLeftMeeting : public OutgoingEvent {
public:
        OE_EveLeftMeeting(int msg_seq_no,
                                int msg_len, char *msg_data, Connection *invoker) :
                        OutgoingEvent(EVENT_CM, EVE_LEFT_MEETING, msg_seq_no,
                                msg_len, msg_data, invoker) {}
        void action(int room_id, int meeting_id, int participant,
                                        MediaBridgeDescList& med);
};

class OE_EveServerAdded: public OutgoingEvent {
public:
        OE_EveServerAdded(int msg_seq_no,
                                int msg_len, char *msg_data, Connection *invoker) :
                        OutgoingEvent(EVENT_CM, EVE_SERVER_ADDED, msg_seq_no,
                                msg_len, msg_data, invoker) {}
        void action(int room_id, MediaBridgeDesc& med);
};

class OE_EveServerDropped: public OutgoingEvent {
public:
        OE_EveServerDropped(int msg_seq_no,
                                int msg_len, char *msg_data, Connection *invoker) :
                        OutgoingEvent(EVENT_CM, EVE_SERVER_DROPPED, msg_seq_no,
                                msg_len, msg_data, invoker) {}
        void action(int room_id, MediaBridgeDesc& med);
};

class OE_EveVIServerAdded: public OutgoingEvent {
```

```
    -ic:
        OE_EveVIServerAdded(int msg_seq_no,
                            int msg_len, char *msg_data, Connection *invoker) :
                OutgoingEvent(EVENT_CM, EVE_VI_SERVER_ADDED, msg_seq_no,
                        msg_len, msg_data, invoker) {}
        void action(char status, int vi_room_id, MediaBridgeDesc& med);
};

class OE_EveVIServerDropped: public OutgoingEvent {
public:
        OE_EveVIServerDropped(int msg_seq_no,
                            int msg_len, char *msg_data, Connection *invoker) :
                OutgoingEvent(EVENT_CM, EVE_VI_SERVER_DROPPED, msg_seq_no,
                        msg_len, msg_data, invoker) {}
        void action(char status, int vi_room_id, MediaBridgeDesc& med);
};

class OE_EveVILeftMeeting : public OutgoingEvent {
public:
        OE_EveVILeftMeeting(int msg_seq_no,
                            int msg_len, char *msg_data, Connection *invoker) :
                OutgoingEvent(EVENT_CM, EVE_VI_MEETING_LEFT, msg_seq_no,
                        msg_len, msg_data, invoker) {}
        void action(char status, int vi_room_id, int participant,
                                        MediaBridgeDescList& med);
};

class OE_EveReenterMeeting : public OutgoingEvent {
public:
        OE_EveReenterMeeting(int msg_seq_no,
                            int msg_len, char *msg_data, Connection *invoker) :
                OutgoingEvent(EVENT_CM, EVE_REENTER_MEETING, msg_seq_no,
                        msg_len, msg_data, invoker){}
        void action(int room_id, int meeting_id, int participant,
                                        MediaBridgeDescList& med);
};

class OE_EveVIReenterMeeting : public OutgoingEvent {
public:
        OE_EveVIReenterMeeting(int msg_seq_no,
                            int msg_len, char *msg_data, Connection *invoker) :
                OutgoingEvent(EVENT_CM, EVE_VI_MEETING_REENTERED, msg_seq_no,
                        msg_len, msg_data, invoker) {}
        void action(char status, int vi_room_id, int participant,
                                        MediaBridgeDescList& med);
};

class OE_EveMeetingSuspended: public OutgoingEvent {
public:
        OE_EveMeetingSuspended(int msg_seq_no,
                            int msg_len, char *msg_data, Connection *invoker) :
                OutgoingEvent(EVENT_CM, EVE_MEETING_SUSPENDED, msg_seq_no,
                        msg_len, msg_data, invoker) {}
        void action(int room_id, int meeting_id);
};

class OE_EveVIMeetingSuspended: public OutgoingEvent {
public:
        OE_EveVIMeetingSuspended(int msg_seq_no,
                            int msg_len, char *msg_data, Connection *invoker) :
                OutgoingEvent(EVENT_CM, EVE_VI_MEETING_SUSPENDED, msg_seq_no,
                        msg_len, msg_data, invoker) {}
        void action(char status, int vi_room_id);
};

class OE_EveVIListRooms: public OutgoingEvent {
```

```cpp
public:
        OE_EveVIListRooms(int msg_seq_no,
                                        int msg_len, char *msg_data, Connection *invoker) :
                        OutgoingEvent(EVENT_CM, EVE_VI_LIST_ROOMS, msg_seq_no,
                                msg_len, msg_data, invoker) {}
        void action(char *packet, int len);
};

class OE_EveVIShowMeetingStatus: public OutgoingEvent {
public:
        OE_EveVIShowMeetingStatus(int msg_seq_no,
                                        int msg_len, char *msg_data, Connection *invoker) :
                        OutgoingEvent(EVENT_CM, EVE_VI_SHOW_MEETING_STATUS, msg_seq_no,
                                msg_len, msg_data, invoker) {}
        void action(char *packet, int len);
};

class OE_EveVIShowMeetRoomStatus: public OutgoingEvent {
public:
        OE_EveVIShowMeetRoomStatus(int msg_seq_no,
                                        int msg_len, char *msg_data, Connection *invoker) :
                        OutgoingEvent(EVENT_CM, EVE_VI_SHOW_MEETROOM_STATUS, msg_seq_no,
                                msg_len, msg_data, invoker) {}
        void action(char *packet, int len);
;

class OE_EveVIListMeetings: public OutgoingEvent {
public:
        OE_EveVIListMeetings(int msg_seq_no,
                                        int msg_len, char *msg_data, Connection *invoker) :
                        OutgoingEvent(EVENT_CM, EVE_VI_LIST_MEETINGS, msg_seq_no,
                                msg_len, msg_data, invoker) {}
        void action(char *packet, int len);
;

class OE_EveMeetingResumed: public OutgoingEvent {
public:
        OE_EveMeetingResumed(int msg_seq_no,
                                        int msg_len, char *msg_data, Connection *invoker) :
                        OutgoingEvent(EVENT_CM, EVE_MEETING_RESUMED, msg_seq_no,
                                msg_len, msg_data, invoker) {}
        void action(int room_id, int meeting_id);
};

class OE_EveVIMeetingResumed: public OutgoingEvent {
public:
        OE_EveVIMeetingResumed(int msg_seq_no,
                                        int msg_len, char *msg_data, Connection *invoker) :
                        OutgoingEvent(EVENT_CM, EVE_VI_MEETING_RESUMED, msg_seq_no,
                                msg_len, msg_data, invoker) {}
        void action(char status, int vi_room_id);
;

class OE_EveCMStart : public OutgoingEvent {
public:
        OE_EveCMStart(int msg_seq_no,
                                        int msg_len, char *msg_data, Connection *invoker) :
                        OutgoingEvent(EVENT_CM, EVE_START_COMMUNICATION,
                                msg_seq_no, msg_len, msg_data, invoker) {}
        void action();
};

class OE_EveMulticast : public OutgoingEvent {
public:
        OE_EveMulticast(int msg_seq_no, int msg_len,
                        char *msg_data, Connection *invoker) :
```

```
                OutgoingEvent(EVENT_CM, EVE_MULTICAST,
                              msg_seq_no, msg_len, msg_data, invoker) {}
        void action(List(int)& plist, OutgoingMessage *msg);
};

class OE_EveMeetingInvite : public OutgoingEvent {
public:
        OE_EveMeetingInvite(int msg_seq_no, int msg_len,
                        char *msg_data, Connection *invoker) :
                        OutgoingEvent(EVENT_CM, EVE_MEETING_INVITE,
                              msg_seq_no, msg_len, msg_data, invoker) {}
        void action(int room_id, int meeting_id, MediaBridgeDescList& med,
                                        List_of_p(PartMediaBridgeDescList)& pmed);
};

class OE_EveAcceptInvitation: public OutgoingEvent {
public:
        OE_EveAcceptInvitation(int msg_seq_no, int msg_len,
                        char *msg_data, Connection *invoker) :
                        OutgoingEvent(EVENT_CM, EVE_ACCEPT_INVITATION,
                              msg_seq_no, msg_len, msg_data, invoker) {}
        void action(int room_id, int meeting_id, MediaBridgeDescList& med);
};

class OE_EveRejectInvitation: public OutgoingEvent {
public:
        OE_EveRejectInvitation(int msg_seq_no, int msg_len,
                        char *msg_data, Connection *invoker) :
                        OutgoingEvent(EVENT_CM, EVE_REJECT_INVITATION,
                              msg_seq_no, msg_len, msg_data, invoker) {}
        void action(int room_id, int meeting_id);
};

class OE_EveJoinMeeting: public OutgoingEvent {
public:
        OE_EveJoinMeeting(int msg_seq_no,
                                        int msg_len, char *msg_data, Connection *invoker) :
                        OutgoingEvent(EVENT_CM, EVE_JOIN_MEETING, msg_seq_no,
                              msg_len, msg_data, invoker) {}
        void action(int room_id, int meeting_id);
};

class OQ_VIMeetingInvite : public OutgoingRequest {
public:
        OQ_VIMeetingInvite(int msg_seq_no, int msg_len,
                        char *msg_data, Connection *invoker) :
                        OutgoingRequest(REQUEST_VI, VI_MEETING_INVITATION,
                              msg_seq_no, msg_len, msg_data, invoker) {}
        void action(int room_id, int meeting_id, int participant, String& part_name,
                                        MediaBridgeDescList& med,
                                        List_of_p(PartMediaBridgeDescList)& pmed);
};

// OUTGOING EVENTS TO Local Media Managers class OE_EveConnectToBridge : public OutgoingEvent {
public:
        OE_EveConnectToBridge(int msg_seq_no, int msg_len,
                        char *msg_data, Connection *invoker) :
                        OutgoingEvent(EVENT_CM, MAN_CONNECT_TO_BRIDGE,
                              msg_seq_no, msg_len, msg_data, invoker) {}
        void action(int room_id, String& machine, int port);
};

class OE_EveDisconnectFromBridge : public OutgoingEvent {
public:
```

221

```
        OE_EveDisconnectFromBridge(int msg_seq_no, int msg_len,
                     char *msg_data, Connection *invoker) :
                     OutgoingEvent(EVENT_CM, MAN_DISCONNECT_FROM_BRIDGE,
                         msg_seq_no, msg_len, msg_data, invoker) {}
        void action(int room_id, String& machine, int port);
};

endif ifndef __MR_PROTO_H__
define __MR_PROTO_H__ 1 include <common.h>
include <msg.h>
#include <generator.h>

/**********

This class provides methods for interpreting message headers, constructing
        appropriate message objects based on the type/opcode. If new messages
        are added or existing messages are changed, then the new message
        handling procedure has to be registered with this class (as this class
        is used for the construction of any message object). There should be only
        one instance of this class.

**********/

IncomingMessage *default_generator( CARD8, CARD8, CARD32, CARD32, char *, Connection *);

class Protocol {
public:
        Protocol(Controller *ctrl);
        ~Protocol() {};

// registers a new message handler (action() routine) for the message
        // specified by type/opcode.
        int register_msg_proc(CARD8 type, CARD8 opcode,
                                IncomingMessagePtr (*msg_proc)(CARD8 type, CARD8 opco
                                CARD32 seq, CARD32 len, char *data, Connectio // interprets the 'header' of the message: type, opcode, seq and len
        // parameters will contain the typ, opcode, sequence number and the
        // length (in bytes) of the message.
        void interpret_header(char *header, CARD8& type, CARD8& opcode,
                                CARD32& seq, CARD32& len);

// returns the appropriate message object after constructing it. the
        // object is allocated in the heap.
        IncomingMessage *construct_msg(CARD8 type, CARD8 opcode,
                CARD32 seq, CARD32 len, char *data, Connection *conn);

private:
        // a table to maintain the message creation procs
        // for all the messages in the system.
        IncomingMessagePtr (*Gen_func_tab[MAX_MSG_TYPES][MAX_MSGS])(
                CARD8, CARD8, CARD32, CARD32, char *, Connection *);

Controller *Ctrl;
        Convert *Conv;
};

endif ifndef __STATE_H__
define __STATE_H__
```

```
#define INVITE_TIMEOUT (60)

#include <List.h>
#include <iostream.h>
#include <system_proto.h>
include <FE_types.h>
#include <common.h>
#include <ioc.h>
include <sysent.h> define ST_Ground                   0
define ST_ExistingMeet             1
#define ST_NewRoom                  2
#define ST_MeetInvitation           3
#define ST_RoomCreated              4
#define ST_RoomWithServers          5
#define ST_MeetRoomNServers         6
#define ST_WaitForPeerCMAdd         7
#define ST_MeetCreatedWait          8
#define ST_PersonInfoWait           9
#define ST_MeetCreated              10
#define ST_MeetAddPartWait1         11
#define ST_MeetInProgress           12
#define ST_SelfOnHold               13
#define ST_MeetAddPartWait2         14
#define ST_MeetAddPartWait3         15
#define ST_MeetSuspendedWait        16
#define ST_MeetSuspended            17
#define ST_MeetResumeWait           18
#define ST_ReenterAttempt           19
#define ST_AddServerWait            20
#define ST_DropServerWait           21
#define ST_Terminate                22
#define ST_MeetAcceptWait           23
#define ST_PersonInfoWait2          24
#define ST_DropPartWait             25
#define ST_ListServersWait          26
define ST_JoinMeetWait             27 define MAX_NUM_FSM_STATES          200
define MAX_NUM_FSM_TRANSITIONS 300

/* TRIGGERS */
#define T0    0
#define T1    1    /* EVENT_VI && EVE_CREATE_MEETING                           */
#define T2    2    /* EVENT_VI && EVE_VI_CREATE_MEET_IN_EROOM                  */
#define T3    3    /* EVENT_VI && EVE_VI_JOIN_MEETING                          */
#define T4    4    /* EVENT_CM && accepted EVE_MEETING_INVITE                  */
#define T5    5    /* REPLY_MR_SERVER && MR_CREATE_ROOM && NS>0                */
#define T6    6    /* ERROR_MR_SERVER && MR_CREATE_ROOM                        */
#define T7    7    /* REPLY_MR_SERVER && MR_ADD_SERVER && NS>0                 */
#define T8    8    /* REPLY_MR_SERVER && MR_ADD_SERVER && NS=0                 */
#define T9    9    /* REPLY_MR_SERVER && MR_CREATE_MEETING                     */
#define T10   10   /* REPLY_MR_SERVER && MR_ADD_PARTICIPANT                    */
#define T11   11   /* EVENT_CM && EVE_DROPPED_PARTICIPANT && SELF              */
#define T12   12   /* EVENT_VI && EVE_VI_ADD_PARTICIPANT                       */
#define T13   13   /* EVENT_CM && EVE_ACCEPT_INVITATION                        */
#define T14   14   /* EVENT_VI && EVE_VI_SUSPEND_MEETING                       */
#define T15   15   /* ERROR_MR_SERVER && MR_SUSPEND_MEETING                    */
#define T16   16   /* REPLY_MR_SERVER && MR_SUSPEND_MEETING                    */
#define T17   17   /* EVENT_CM && EVE_MEETING_SUSPENDED                        */
#define T18   18   /* EVENT_CM && EVE_MEETING_RESUMED                          */
#define T19   19   /* REPLY_VI && VI_MEETING_INVITATION                        */
#define T20   20   /* EVENT_CM && EVE_ADDED_PARTICIPANT && SELF                */
#define T21   21   /* ERROR_VI && VI_MEETING_INVITATION                        */
#define T22   22   /* EVENT_CM && EVE_JOIN_MEETING_REJECTED                    */
```

```
#define T23      23      /* REPLY_MR_SERVER && MR_CREATE_ROOM && NS=0           */
#define T24      24      /* ERROR_MR_SERVER && MR_CREATE_MEETING                */
#define T25      25      /* ERROR_MR_SERVER && MR_ADD_PARTICIPANT               */
#define T26      26      /* EVENT_CM && EVE_REJECT_INVITATION                   */
#define T27      27      /* EVENT_VI    && EVE_VI_LEAVE_MEETING
#define T28      28      /* EVENT_VI && EVE_VI_REENTER_MEETING                  */
#define T29      29      /* REPLY_MR_SERVER && MR_REENTER_MEETING               */
#define T30      30      /* ERROR_MR_SERVER && MR_REENTER_MEETING               */
#define T31      31      /* EVENT_VI && EVE_VI_RESUME_MEETING
#define T32      32      /* REPLY_MR_SERVER && MR_RESUME_MEETING                */
#define T33      33      /* ERROR_MR_SERVER && MR_RESUME_MEETING                */
#define T34      34      /* EVENT_VI && EVE_VI_ADD_SERVER
#define T35      35      /* REPLY_MR_SERVER && MR_ADD_SERVER
#define T36      36      /* ERROR_MR_SERVER && MR_ADD_SERVER
#define T37      37      /* EVENT_VI && EVE_VI_DROP_SERVER
#define T38      38      /* REPLY_MR_SERVER && MR_DROP_SERVER                   */
#define T39      39      /* ERROR_MR_SERVER && MR_DROP_SERVER                   */
#define T40      40      /* REPLY_MR_SERVER && MR_GET_PERSON_INFO               */
#define T41      41      /* ERROR_MR_SERVER && MR_GET_PERSON_INFO               */
#define T42      42      /* EVENT_CM && EVE_ADDED_PARTICIPANT && NOT SELF       */
#define T43      43      /* EVENT_CM && EVE_DROPPED_PARTICIPANT && NOT SELF     */
#define T44      44      /* EVENT_CM && EVE_LEFT_MEETING
#define T45      45      /* EVENT_CM && EVE_REENTER_MEETING
#define T46      46      /* EVENT_CM && EVE_SERVER_ADDED
#define T47      47      /* EVENT_CM && EVE_SERVER_DROPPED
#define T48      48      /* TIMEOUT && TIMEOUT
#define T49 49   /* EVENT_CM && EVE_MEETING_DESTROYED                  */
#define T50 50   /* EVENT_CM && EVE_ROOM_DESTROYED                            */
#define T51 51   /* EVENT_VI && EVE_VI_DROP_PARTICIPANT                */
#define T52 52   /* REPLY_MR && MR_DROP_PARTICIPANT                           */
#define T53 53   /* ERROR_MR && MR_DROP_PARTICIPANT                           */
#define T55 55   /* EVENT_VI && EVE_VI_DESTROY_ROOM                           */
#define T56 56   /* EVENT_VI && EVE_VI_DESTROY_MEETING                 */
#define T57      57         /* ERROR_MR_SERVER && MR_ADD_SERVER   && NS>0     */
#define T58      58         /* ERROR_MR_SERVER && MR_ADD_SERVER   && NS=0     */
#define T59 59   /* REPLY_MR && MR_DROP_PARTICIPANT && part = SELF    */
#define T60 60   /* REPLY_MR && MR_LIST_SERVERS                               */
#define T61 61   /* ERROR_MR && MR_LIST_SERVERS                               */
#define T62 62   /* EVENT_CM && EVE_JOIN_MEETING                              */
#define T63 63   /* EVENT_VI && EVE_VI_JOIN_MEETING                           */
#define T64 64   /* EVENT_CM && EVE_JOIN_MEETING_REJECTED             */
#define T65 65   /* EVENT_VI && EVE_VI_JOIN_MEETING_REJECTED          */
#define T66 66   /* EVENT_VI && EVE_JOIN_MEETING_ACCEPTED             */
#define T67      67         /* REPLY_MR_SERVER && MR_CREATE_MEETING &&
                                              last_part = SELF List_of_pdeclare(Conferee)

class Conferee {
public:
        Conferee(int c_id, MediaBridgeDescList& mlist)
                {
                        id = c_id;
                        media_list = mlist;
                        status = e_PRESENT_IN_MEET;
                }
        ~Conferee() { cout << "\nConferee " << id << " deleted" << endl; }
        int Id() { return(id); }
        ConfereeStatus Status() { return status; }
        void add_media(MediaBridgeDesc& med);
        void drop_media(MediaBridgeDesc& med);
        void leave() { status = e_ABSENT_IN_MEET; }
        void reenter() { status = e_PRESENT_IN_MEET;  }
        MediaBridgeDescList& MediaList() { return media_list; } private:
                                 224
```

```
            i-    ;
        ConfereeStatus status;
        MediaBridgeDescList media_list;
};

class Meeting {
public:
        Meeting(int meeting_id, RoomFsm *proom, RoomFsmMgr *pRMgr);
        ~Meeting();
        int Id() { return(id); }
        int num_conferees() { return(conf_list.length()); }
        MeetingStatus get_meeting_status() { return status; }
        int add_participant(int participant, MediaBridgeDescList mlist);
        int drop_participant(int participant);
        void add_media(int participant, MediaBridgeDesc med);
        void drop_media(int participant, MediaBridgeDesc med);
        void drop_media(MediaBridgeDesc med);
        int suspend_meeting();
        int resume_meeting();
        int leave_meeting(int participant);
        int reenter_meeting(int participant);
        List(int)& PartListWithoutMe() { return(conf_wo_me_list); }
        List_of_p(Conferee)& ConfereeList() { return conf_list; } private:
        void drop_all_participants();
        void drop_conf_wo_me_list(int participant);

int id;
        RoomFsm *room;
        MeetingStatus status;
        RoomFsmMgr *RMgr;
        List_of_p(Conferee) conf_list;
        List(int) conf_wo_me_list;
        int err;
};

class RoomFsm {
public:
        RoomFsm(int p_vi_room_id, int p_real_room_id,
                    InterObjectBuffer& iob, RoomFsmMgr* mgr);
        ~RoomFsm();

int VIRoomId() { return vi_room_id; }
        int RealRoomId() { return real_room_id; }
        Meeting* Meet() { return meeting; }
        int LastSeqNo() { return last_seq; }
        int LastPartId() { return last_part_id; }
        unsigned state() { return current_state; }
        int fire(InterObjectBuffer& iob);
        void timer_tick() { check_update_invite_timer(); } private:
        void set_invite_timer(int timer_val)
                { invite_timeout = timer_val; alarm(1); }
        void reset_invite_timer() { invite_timeout = -1; }
        void check_update_invite_timer();
        int fire(unsigned input, InterObjectBuffer& iob);
        struct Transition {
                int (RoomFsm::*action)(InterObjectBuffer&);
                unsigned dest;
        } transitions[MAX_NUM_FSM_STATES][MAX_NUM_FSM_TRANSITIONS];

void register_transition(unsigned src, unsigned input,
                    unsigned dest, int (RoomFsm::*action)(InterObjectBuffer&))
```

```
                {
                        transitions[src][input].dest = dest;
                        transitions[src][input].action = action;
                } int default_action(InterObjectBuffer& iob) { return(0); }
int E1_action(InterObjectBuffer& iob);
int E2_action(InterObjectBuffer& iob);
int E3_action(InterObjectBuffer& iob);
int E4_action(InterObjectBuffer& iob);
int E5_action(InterObjectBuffer& iob);
int E6_action(InterObjectBuffer& iob);
int E7_action(InterObjectBuffer& iob);
int E8_action(InterObjectBuffer& iob);
int E9_action(InterObjectBuffer& iob);
int E10_action(InterObjectBuffer& iob);
int E11_action(InterObjectBuffer& iob) { return(0); }
int E12_action(InterObjectBuffer& iob);
int E13_action(InterObjectBuffer& iob);
int E14_action(InterObjectBuffer& iob);
int E15_action(InterObjectBuffer& iob);
int E16_action(InterObjectBuffer& iob);
int E17_action(InterObjectBuffer& iob);
int E18_action(InterObjectBuffer& iob) { return(0); }
int E19_action(InterObjectBuffer& iob);
int E20_action(InterObjectBuffer& iob) { return(0); }
int E21_action(InterObjectBuffer& iob) { return(0); }
int E22_action(InterObjectBuffer& iob) { return(0); }
int E23_action(InterObjectBuffer& iob) { return(0); }
int E24_action(InterObjectBuffer& iob) { return(0); }
int E25_action(InterObjectBuffer& iob);
int E26_action(InterObjectBuffer& iob);
int E27_action(InterObjectBuffer& iob);
int E28_action(InterObjectBuffer& iob)   { return(0); }
int E29_action(InterObjectBuffer& iob);
int E30_action(InterObjectBuffer& iob) { return(0); }
int E31_action(InterObjectBuffer& iob);
int E32_action(InterObjectBuffer& iob);
int E33_action(InterObjectBuffer& iob);
int E34_action(InterObjectBuffer& iob) ;
int E35_action(InterObjectBuffer& iob) { return(0); }
int E36_action(InterObjectBuffer& iob) { return(0); }
int E37_action(InterObjectBuffer& iob);
int E38_action(InterObjectBuffer& iob);
int E39_action(InterObjectBuffer& iob);
int E40_action(InterObjectBuffer& iob);
int E41_action(InterObjectBuffer& iob);
int E42_action(InterObjectBuffer& iob);
int E43_action(InterObjectBuffer& iob);
int E44_action(InterObjectBuffer& iob);
int E45_action(InterObjectBuffer& iob);
int E46_action(InterObjectBuffer& iob);
int E47_action(InterObjectBuffer& iob);
int E48_action(InterObjectBuffer& iob);
int E49_action(InterObjectBuffer& iob);
int E50_action(InterObjectBuffer& iob);
int E51_action(InterObjectBuffer& iob);
int E52_action(InterObjectBuffer& iob);
int E53_action(InterObjectBuffer& iob);
int E54_action(InterObjectBuffer& iob) { return(0); }
int E55_action(InterObjectBuffer& iob) { return(0); }
int E56_action(InterObjectBuffer& iob);
int E57_action(InterObjectBuffer& iob);
int E58_action(InterObjectBuffer& iob);
int E59_action(InterObjectBuffer& iob);
int E60_action(InterObjectBuffer& iob);
```

```cpp
        int E61_action(InterObjectBuffer& iob);
        int E62_action(InterObjectBuffer& iob);
        int E63_action(InterObjectBuffer& iob);
        int E64_action(InterObjectBuffer& iob);
        int E65_action(InterObjectBuffer& iob);
        int E66_action(InterObjectBuffer& iob);
        int E67_action(InterObjectBuffer& iob) { return(0); }
        int E68_action(InterObjectBuffer& iob);
        int E69_action(InterObjectBuffer& iob);
        int E70_action(InterObjectBuffer& iob);
        int E71_action(InterObjectBuffer& iob) { return(0); }
        int E72_action(InterObjectBuffer& iob) { return(0); }
        int E73_action(InterObjectBuffer& iob) { return(0); }
        int E74_action(InterObjectBuffer& iob) { return(0); }
        int E75_action(InterObjectBuffer& iob);
        int E76_action(InterObjectBuffer& iob);
        int E77_action(InterObjectBuffer& iob);
        int E78_action(InterObjectBuffer& iob);
        int E79_action(InterObjectBuffer& iob);
        int E80_action(InterObjectBuffer& iob);
        int E81_action(InterObjectBuffer& iob);
        int E82_action(InterObjectBuffer& iob);
        int E83_action(InterObjectBuffer& iob);
        int E84_action(InterObjectBuffer& iob);
        int E85_action(InterObjectBuffer& iob) { return(0); }
        int E86_action(InterObjectBuffer& iob);
        int E87_action(InterObjectBuffer& iob);
        int E88_action(InterObjectBuffer& iob);
        int E90_action(InterObjectBuffer& iob);
        int E91_action(InterObjectBuffer& iob);
        int terminate_action(InterObjectBuffer& iob);
        void next_msg_prepare();

RoomFsmMgr *RMgr;
        int vi_room_id;
        int real_room_id;
        Meeting *meeting;
        int peer_part_id;
        int my_room;

int invite_timeout;
        unsigned current_state;
        MediaBridgeDescList req_media;
        MediaBridgeDescList full_media;
        MediaBridgeDescList accepted_media;
        MediaBridgeDescList leave_media;
        MediaBridgeDesc last_med;
        int scenario;
        int last_seq; // seq_no of the last message sent by this fsm
        int last_part_id; // id of the last person called

};

List_of_pdeclare(RoomFsm)

class RoomFsmMgr {
public:
        RoomFsmMgr(Controller *ctrl, int self)
            {
                    self_id = self; global_seq_no = 0;
                    Ctrl = ctrl;
            }
        ~RoomFsmMgr() {}
        void alarm_handler();

Controller* Control() { return Ctrl; }
```

```
        int MySelf() { return self_id; }
        int NextSeqNo() { return global_seq_no++; }
                // later find a waay to reuse seqnos int CreateNewFSM(int vi_room_id, int actual_room_id,
                                                InterObjectBuffer& iob);
        int fire_VI(int vi_room_id, InterObjectBuffer& iob);
        int fire(int actual_room_id, InterObjectBuffer& iob);
        int fire_using_seqno(int seq_no, InterObjectBuffer& iob);
        int GetRoomInfo_VI(int vi_room_id) { return(SUCCESS);}
        int GetRoomInfo(int actual_room_id) { return(SUCCESS);} private:
        int self_id;
        Controller *Ctrl;
        void garbage_collect(RoomFsm *r);
        void garbage_collect();
        List_of_p(RoomFsm) room_list;
        int global_seq_no;
};

endif
```

Heading: cm_msg.h
Date: Tue Jan 26 18:03:54 EST 1993
Job-Id: z-581
Printer: lwt2

```
#define PBRIDGE "Phone"
#define XBRIDGE "X"
#define VBRIDGE "Video"

#include <cm_msg.h>
#include <conn.h>
include <state.h> void IncomingError::action()
{
        (void) Conv->BufToCARD32(data+pos, res_len, nbytes,
                                            iob.err.err_code);
                pos += nbytes;
        RMgr->fire_using_seqno(msg_seq_no(), iob);
} void IncomingMessage::common_action1()
{
        String rname;

(void) Conv->BufToCARD32(data+pos, res_len, nbytes,
                                            iob.eve_create_meeting.pseudo_id);
                pos += nbytes;
        (void) Conv->BufToCARD32(data+pos, res_len, nbytes,
                                            iob.eve_create_meeting.participant);
                pos += nbytes;
        (void) Conv->BufToCARD32(data+pos, res_len, nbytes,
                                            iob.eve_create_meeting.attrib);
                pos += nbytes;
        (void) Conv->BufToString(data+pos, res_len, nbytes,
                                            iob.eve_create_meeting.room_name);
                pos += nbytes;

int list_len = 0;
        Media m;
        String udesc;

(void) Conv->BufToCARD32(data+pos, res_len, nbytes, list_len);
                pos += nbytes;

#ifdef DEBUG
        cout << "Received IE_CreateMeet: Part: " <<
                iob.eve_create_meeting.participant << "  Attrib: " <<
                iob.eve_create_meeting.attrib << "  Listlen: " << list_len <<endl;
endif for (int i = 0; i < list_len; i++) {
                m = (Media) data[pos++];
                (void) Conv->BufToString(data+pos, res_len, nbytes, udesc);
                pos += nbytes;
#ifdef DEBUG
        cout << "Requested med: " << (int)m << "  Udesc: " << udesc << endl;
#endif
                iob.eve_create_meeting.med.add(m, udesc);
        }

RMgr->CreateNewFSM(iob.eve_create_meeting.pseudo_id,
                                            ROOM_UNASSIGNED, iob);
} void IncomingEvent::vi_template1()
{
        (void) Conv->BufToCARD32(data+pos, res_len, nbytes,
                                            iob.eve_vi_add_participant.vi_room_id);
                pos += nbytes;
        (void) Conv->BufToCARD32(data+pos, res_len, nbytes,
```

```
                                        iob.eve_vi_add_participant.participant);
            pos += nbytes;
        int list_len = 0;
        Media m;
        String udesc;

(void) Conv->BufToCARD32(data+pos, res_len, nbytes, list_len);
            pos += nbytes;

for (int i = 0; i < list_len; i++) {
            m = (Media) data[pos++];
            (void) Conv->BufToString(data+pos, res_len, nbytes, udesc);
            pos += nbytes;
            iob.eve_vi_add_participant.med.add(m, udesc);
        } ifdef DEBUG
        cout << "vi_template1: vi_room: " <<
                iob.eve_vi_add_participant.vi_room_id << "   Part: " <<
                iob.eve_vi_add_participant.participant << endl;
endif RMgr->fire_VI(iob.eve_vi_add_participant.vi_room_id, iob);
} void IncomingEvent::vi_template2()
{
        (void) Conv->BufToCARD32(data+pos, res_len, nbytes,
                                        iob.eve_vi_template2.vi_room_id);
            pos += nbytes;
        iob.eve_vi_template2.participant = RMgr->MySelf();

RMgr->fire_VI(iob.eve_vi_template2.vi_room_id, iob);
} void IncomingEvent::template1()
{
        int src;

(void) Conv->BufToCARD32(data+pos, res_len, nbytes, src);
            pos += nbytes;
        (void) Conv->BufToCARD32(data+pos, res_len, nbytes,
                                        iob.template1.room_id);
            pos += nbytes;
        (void) Conv->BufToCARD32(data+pos, res_len, nbytes,
                                        iob.template1.meeting_id);
            pos += nbytes;
        (void) Conv->BufToCARD32(data+pos, res_len, nbytes,
                                        iob.template1.participant);
            pos += nbytes;

#ifdef DEBUG
        cout << "IE_template1:  Room: " << iob.template1.room_id <<
                " Meet: " << iob.template1.meeting_id <<
                " Part: " << iob.template1.participant << endl;
#endif
        RMgr->fire(iob.template1.room_id, iob);
} void IncomingEvent::template2()
{
        (void) Conv->BufToCARD32(data+pos, res_len, nbytes,
                                        iob.template2.src_part);
            pos += nbytes;
        (void) Conv->BufToCARD32(data+pos, res_len, nbytes,
                                        iob.template2.room_id);
```

```
                pos += nbytes;
        (void) Conv->BufToCARD32(data+pos, res_len, nbytes,
                                        iob.template2.meeting_id);
                pos += nbytes;

RMgr->fire(iob.template2.room_id, iob);
} void IncomingEvent::template5()
{
        int src;

(void) Conv->BufToCARD32(data+pos, res_len, nbytes, src);
                pos += nbytes;
        (void) Conv->BufToCARD32(data+pos, res_len, nbytes,
                                        iob.template5.room_id);
                pos += nbytes;

RMgr->fire(iob.template5.room_id, iob);
} void IncomingEvent::template6()
{
        int src;

(void) Conv->BufToCARD32(data+pos, res_len, nbytes, src);
                pos += nbytes;
        (void) Conv->BufToCARD32(data+pos, res_len, nbytes,
                                        iob.template6.room_id);
                pos += nbytes;
        (void) Conv->BufToCARD32(data+pos, res_len, nbytes,
                                        iob.template6.meeting_id);
                pos += nbytes;
        (void) Conv->BufToCARD32(data+pos, res_len, nbytes,
                                        iob.template6.participant);
                pos += nbytes;

int list_len = 0;
        Media m;
        String udesc;

(void) Conv->BufToCARD32(data+pos, res_len, nbytes, list_len);
                pos += nbytes;

for (int i = 0; i < list_len; i++) {
                m = (Media) data[pos++];
                (void) Conv->BufToString(data+pos, res_len, nbytes, udesc);
                pos += nbytes;
                iob.template6.med.add(m, udesc);
        }
        RMgr->fire(iob.template6.room_id, iob);
} void IncomingEvent::template7()
{
        (void) Conv->BufToCARD32(data+pos, res_len, nbytes,
                                        iob.template7.room_id);
                pos += nbytes;

iob.template7.med.m = (Media) data[pos++];
        (void) Conv->BufToString(data+pos, res_len, nbytes,
                                        iob.template7.med.udesc);
        pos += nbytes;
        (void) Conv->BufToString(data+pos, res_len, nbytes,
                                        iob.template7.med.machine);
        pos += nbytes;
```

```
                (void) Conv->BufToCARD32(data+pos, res_len, nbytes,
                                                        iob.template7.med.port);
        pos += nbytes;
#ifdef DEBUG
        cout << "template7:  Mach: " << iob.template7.med.machine<< " "
                                        << iob.template7.med.port << endl;
endif /* LATER:
        int list_len = 0;
        (void) Conv->BufToCARD32(data+pos, res_len, nbytes, list_len);
                pos += nbytes;
        for (int i = 0; i < list_len; i++) {
                int part;
                (void) Conv->BufToCARD32(data+pos, res_len, nbytes, part);
                pos += nbytes;
                iob.template7.part_list.insert_next(part);
        }
*/

RMgr->fire(iob.template7.room_id, iob);
}

///////////// EVENTS FROM VI TO CM void IE_EveVIDown::action()
{
        cout << "VI went down. Shutting down..." << endl;
        CM_shutdown();
} void IE_EveCreateMeeting::action()
{
        common_action1();
} void IE_EveCreatePersistentMeeting::action()
{
        common_action1();
} void IE_EveVICreateMeetInERoom::action()

(void) Conv->BufToCARD32(data+pos, res_len, nbytes,
                                                iob.eve_create_meeting_in_eroom.pseudo_id);
                pos += nbytes;
        (void) Conv->BufToCARD32(data+pos, res_len, nbytes,
                                                iob.eve_create_meeting_in_eroom.real_id);
                pos += nbytes;
        (void) Conv->BufToCARD32(data+pos, res_len, nbytes,
                                                iob.eve_create_meeting_in_eroom.participant);
                pos += nbytes;

RMgr->CreateNewFSM(iob.eve_create_meeting_in_eroom.pseudo_id,
                                                iob.eve_create_meeting_in_eroom.real_id, iob);
} void IE_EveVIJoinMeeting::action()
{
        (void) Conv->BufToCARD32(data+pos, res_len, nbytes,
                                                iob.eve_vi_join_meeting.real_room_id);
                pos += nbytes;
        (void) Conv->BufToCARD32(data+pos, res_len, nbytes,
                                                iob.eve_vi_join_meeting.meet_id);
                pos += nbytes;
        (void) Conv->BufToCARD32(data+pos, res_len, nbytes,
```

```
                                                        iob.eve_vi_join_meeting.owner);
        pos += nbytes;

RMgr->CreateNewFSM(ROOM_UNASSIGNED,
                                        iob.eve_vi_join_meeting.real_room_id, iob);
} void IE_EveVIJoinMeetingRejected::action()
{
        vi_template2();
} void IE_EveVIAddParticipant::action()
{
        vi_template1();
} void IE_EveVILeaveMeeting::action()
{
        vi_template2();
} void IE_EveVIReenterMeeting::action()
{
        vi_template2();
} void IE_EveVIDropParticipant::action()
{
        (void) Conv->BufToCARD32(data+pos, res_len, nbytes,
                                        iob.eve_vi_drop_participant.vi_room_id);
        pos += nbytes;
        (void) Conv->BufToCARD32(data+pos, res_len, nbytes,
                                        iob.eve_vi_drop_participant.participant);
        pos += nbytes;

RMgr->fire_VI(iob.eve_vi_drop_participant.vi_room_id, iob);
} void IE_EveVIDestroyMeeting::action()
{
        (void) Conv->BufToCARD32(data+pos, res_len, nbytes,
                                        iob.eter1.pseudo_id);
        pos += nbytes;

RMgr->fire_VI(iob.eter1.pseudo_id, iob);
} void IE_EveVISuspendMeeting::action()
{
        (void) Conv->BufToCARD32(data+pos, res_len, nbytes,
                                        iob.eve_vi_suspend_meeting.vi_room_id);
        pos += nbytes;

RMgr->fire_VI(iob.eve_vi_suspend_meeting.vi_room_id, iob);
} void IE_EveVIResumeMeeting::action()
{
        (void) Conv->BufToCARD32(data+pos, res_len, nbytes,
                                        iob.eve_vi_suspend_meeting.vi_room_id);
        pos += nbytes;

RMgr->fire_VI(iob.eve_vi_suspend_meeting.vi_room_id, iob);
}
```

234

```cpp
void IE_EveVIListRooms::action()
{
        RMgr->Control()->MRMgr()->ListRooms(RMgr->NextSeqNo());
} void IE_EveVIListMeetings::action()
{
        RMgr->Control()->MRMgr()->ListMeetings(RMgr->NextSeqNo());
} void IE_EveVIShowMeetingStatus::action()
{
        int meet_id;

(void) Conv->BufToCARD32(data+pos, res_len, nbytes, meet_id);
                pos += nbytes;
        RMgr->Control()->MRMgr()->ShowMeetingStatus(RMgr->NextSeqNo(),

} void IE_EveVIShowMeetRoomStatus::action()
{
        int meet_id;

(void) Conv->BufToCARD32(data+pos, res_len, nbytes, meet_id);
                pos += nbytes;
        RMgr->Control()->MRMgr()->ShowMeetRoomStatus(RMgr->NextSeqNo(),

} void IE_EveVIAddServer::action()
{
        (void) Conv->BufToCARD32(data+pos, res_len, nbytes,
                                                iob.eve_vi_add_server.vi_room_id);

pos += nbytes;

iob.eve_vi_add_server.med.m = (Media) data[pos++];
        (void) Conv->BufToString(data+pos, res_len, nbytes,
                                                iob.eve_vi_add_server.med.udesc);

pos += nbytes;
#ifdef DEBUG
        cout << "IE_EveVIAddServer: " << (int)iob.eve_vi_add_server.med.m
                    << " Udesc: " << iob.eve_vi_add_server.med.udesc << endl;
endif /* FOR THE MOMENT ADD_SERVER to ALL
        int list_len = 0;
        (void) Conv->BufToCARD32(data+pos, res_len, nbytes, list_len);
                pos += nbytes;
        for (int i = 0; i < list_len; i++) {
                int part;
                (void) Conv->BufToCARD32(data+pos, res_len, nbytes, part);
                pos += nbytes;
                iob.eve_vi_add_server.part_list.insert_next(part);
        }
*/
        RMgr->fire_VI(iob.eve_vi_add_server.vi_room_id, iob);
} void IE_EveVIDropServer::action()
{
        (void) Conv->BufToCARD32(data+pos, res_len, nbytes,
                                                iob.eve_vi_drop_server.vi_room_id);
                pos += nbytes;
```

```cpp
        iob.eve_vi_drop_server.med.m = (Media) data[pos++];
        (void) Conv->BufToString(data+pos, res_len, nbytes,
                                        iob.eve_vi_drop_server.med.udesc);
        pos += nbytes;
#ifdef DEBUG
        cout << "IR_EveVIDropServer: " << (int)iob.eve_vi_drop_server.med.m
                 << " Udesc: " << iob.eve_vi_drop_server.med.udesc << endl;
endif RMgr->fire_VI(iob.eve_vi_drop_server.vi_room_id, iob);
} void IR_VIMeetingInvitation::action()
{
        (void) Conv->BufToCARD32(data+pos, res_len, nbytes,
                                        iob.Rep_vi_meeting_invitation.vi_room_id);
        pos += nbytes;

int list_len = 0;
        Media m;
        String udesc;

(void) Conv->BufToCARD32(data+pos, res_len, nbytes, list_len);
            pos += nbytes;
        for (int i = 0; i < list_len; i++) {
                m = (Media) data[pos++];
                (void) Conv->BufToString(data+pos, res_len, nbytes, udesc);
                pos += nbytes;
                iob.Rep_vi_meeting_invitation.med.add(m, udesc);
        }

RMgr->fire_using_seqno(msg_seq_no(), iob);
}

///////////// REPLIES FROM MR TO CM void IR_CreateRoom::action()
{
        (void) Conv->BufToCARD32(data+pos, res_len, nbytes,
                                        iob.Rep_mr_create_room.room_id);
            pos += nbytes;

RMgr->fire_using_seqno(msg_seq_no(), iob);
} void IR_CreateMeeting::action()
{
        (void) Conv->BufToCARD32(data+pos, res_len, nbytes,
                                        iob.Rep_mr_create_meeting.meeting_id);
            pos += nbytes;

RMgr->fire_using_seqno(msg_seq_no(), iob);
} void IR_AddServer::action()
{
        pos++; // ignore first field
    if (Conv->BufToString(data+pos, res_len, nbytes,
                    iob.Rep_mr_add_server.machine) < 0){
            return;
        }
            pos += nbytes;

(void) Conv->BufToCARD32(data+pos, res_len, nbytes,
                                        iob.Rep_mr_add_server.port);
            pos += nbytes;
```

236

```
        RMgr->fire_using_seqno(msg_seq_no(), iob);
} void IR_ListServers::action()
{
        int list_len;
        Media m;
        String machine, udesc;
        int port;

(void) Conv->BufToCARD32(data+pos, res_len, nbytes, list_len);
                pos += nbytes;

for (int i = 0; i < list_len; i++) {
                m = (Media) data[pos++];
                (void) Conv->BufToString(data+pos, res_len, nbytes, udesc);
                pos += nbytes;
                (void) Conv->BufToString(data+pos, res_len, nbytes, machine);
                pos += nbytes;
                (void) Conv->BufToCARD32(data+pos, res_len, nbytes, port);
                pos += nbytes;
                iob.Rep_list_servers.med.add(m, udesc);
                iob.Rep_list_servers.med.update(m, machine, port);
        }

RMgr->fire_using_seqno(msg_seq_no(), iob);
} void IR_GetPersonInfo::action()
{
        int l1, id;
        String part_name, dummy;

(void) Conv->BufToCARD32(data+pos, res_len, nbytes, id); pos += nbytes;

if (Conv->BufToString(data+pos, res_len, nbytes, part_name) < 0){
                return;
        }
        pos += nbytes;

// list length1
        (void) Conv->BufToCARD32(data+pos, res_len, nbytes, l1); pos += nbytes;

if (l1 <= 0) return;
        // right now read just the first record if (Conv->BufToString(data+pos, res_len, nbytes,
                                iob.Rep_reg_get_person_info.machine) < 0){
                return;
        }
        pos += nbytes;

(void) Conv->BufToCARD32(data+pos, res_len, nbytes,
                                        iob.Rep_reg_get_person_info.port);
                pos += nbytes;

RMgr->fire_using_seqno(msg_seq_no(), iob);
} void IR_ListRooms::action()
{
        RMgr->Control()->VIMgr()->ListRooms(data, msg_len());
}
```

237

```
i IR_ListMeetings::action()
        RMgr->Control()->VIMgr()->ListMeetings(data, msg_len());
} void IR_ShowMeetingStatus::action()
{
        RMgr->Control()->VIMgr()->ShowMeetingStatus(data, msg_len());
} void IR_ShowMeetRoomStatus::action()
{
        RMgr->Control()->VIMgr()->ShowMeetRoomStatus(data, msg_len());
}

/////////// EVENTS FROM EVE_NOTIFIER TO CM void IE_EveMeetingInvite::action()
{

(void) Conv->BufToCARD32(data+pos, res_len, nbytes,
                                        iob.eve_meeting_invite.participant);
                pos += nbytes;
        (void) Conv->BufToString(data+pos, res_len, nbytes,
                                        iob.eve_meeting_invite.part_name);
                pos += nbytes;

(void) Conv->BufToCARD32(data+pos, res_len, nbytes,
                                        iob.eve_meeting_invite.room_id);
                pos += nbytes;
        (void) Conv->BufToCARD32(data+pos, res_len, nbytes,
                                        iob.eve_meeting_invite.meeting_id);
                pos += nbytes;

int list_len = 0;
        Media m;
        String udesc;

(void) Conv->BufToCARD32(data+pos, res_len, nbytes, list_len);
                pos += nbytes;

#ifdef DEBUG
        cout << "Received IE_EveMeetingInvite : Part: " <<
                iob.eve_meeting_invite.participant << "  Room: " <<
                iob.eve_meeting_invite.room_id << "  Listlen: " << list_len <<endl;
endif for (int i = 0; i < list_len; i++) {
                m = (Media) data[pos++];
                (void) Conv->BufToString(data+pos, res_len, nbytes, udesc);
                pos += nbytes;
#ifdef DEBUG
        cout << "Requested med: " << (int)m << "  Udesc: " << udesc << endl;
#endif
                iob.eve_meeting_invite.med.add(m, udesc);
        }

PartMediaBridgeDescList *p;
        int pmed_len = 0;
        (void) Conv->BufToCARD32(data+pos, res_len, nbytes, pmed_len);
                pos += nbytes;
        for (i = 0; i < pmed_len; i++) {
                int part, med_len = 0;
                MediaBridgeDescList tmp_med;
```

```
                (void) Conv->BufToCARD32(data+pos, res_len, nbytes, part);
                pos += nbytes;

(void) Conv->BufToCARD32(data+pos, res_len, nbytes, med_len);
                pos += nbytes;
                for (int j = 0; j < med_len; j++) {
                        m = (Media) data[pos++];
                        (void) Conv->BufToString(data+pos, res_len, nbytes, udesc);
                        pos += nbytes;
                        tmp_med.add(m, udesc);
                } p = new PartMediaBridgeDescList(part, tmp_med);
                iob.eve_meeting_invite.part_med.insert_next(p);
        }
ifdef DEBUG
        cout << "Going to CreateNewFSM" << endl;
endif RMgr->CreateNewFSM(ROOM_UNASSIGNED, iob.eve_meeting_invite.room_id,
                                           iob);

if (pmed_len > 0) {
        iob.eve_meeting_invite.part_med.reset();
                while (iob.eve_meeting_invite.part_med.next(p)) {
                        if (p) {
                                iob.eve_meeting_invite.part_med.remove_prev();
                                delete p;
                        }
                }
        }
} void IE_EveServerAdded::action()
{
        template7();
} void IE_EveServerDropped::action()
{
        template7();
} void IE_EveAddedParticipant::action()
{
        int src;
#ifdef DEBUG
        cout << "Received IE_EveAddedParticipant" << endl;
endif (void) Conv->BufToCARD32(data+pos, res_len, nbytes, src);
                pos += nbytes;
        (void) Conv->BufToCARD32(data+pos, res_len, nbytes,
                                        iob.eve_added_participant.room_id);
                pos += nbytes;
        (void) Conv->BufToCARD32(data+pos, res_len, nbytes,
                                        iob.eve_added_participant.meeting_id);
                pos += nbytes;
        (void) Conv->BufToCARD32(data+pos, res_len, nbytes,
                                        iob.eve_added_participant.participant);
                pos += nbytes;

int list_len = 0;
        Media m;
        String udesc, machine;
```

```cpp
        int port;

(void) Conv->BufToCARD32(data+pos, res_len, nbytes, list_len);
            pos += nbytes;
        for (int i = 0; i < list_len; i++) {
                m = (Media) data[pos++];
                (void) Conv->BufToString(data+pos, res_len, nbytes, udesc);
                pos += nbytes;
                (void) Conv->BufToString(data+pos, res_len, nbytes, machine);
                pos += nbytes;
                (void) Conv->BufToCARD32(data+pos, res_len, nbytes, port);
                pos += nbytes;
#ifdef DEBUG
        cout << "IE_EveAddedPart: Mach: " << machine << " " << port <<
            endl;
#endif
                iob.eve_added_participant.med.add(m, udesc);
                iob.eve_added_participant.med.update(m, machine, port);
        }

RMgr->fire(iob.eve_added_participant.room_id, iob);
} void IE_EveAcceptInvitation::action()
{
        int src, meeting_id;

#ifdef DEBUG
        cout << "Received IE_EveAcceptInvitation" << endl;
endif (void) Conv->BufToCARD32(data+pos, res_len, nbytes, src);
            pos += nbytes;
        (void) Conv->BufToCARD32(data+pos, res_len, nbytes,
                                        iob.eve_accept_invitation.room_id);
            pos += nbytes;
        (void) Conv->BufToCARD32(data+pos, res_len, nbytes,
                                        meeting_id);
            pos += nbytes;

int list_len = 0;
        Media m;
        String udesc;

(void) Conv->BufToCARD32(data+pos, res_len, nbytes, list_len);
            pos += nbytes;
        for (int i = 0; i < list_len; i++) {
                m = (Media) data[pos++];
                (void) Conv->BufToString(data+pos, res_len, nbytes, udesc);
                pos += nbytes;
                iob.eve_accept_invitation.med.add(m, udesc);
        }

RMgr->fire(iob.eve_accept_invitation.room_id, iob);
} void IE_EveMeetingDestroyed::action()
{
        template2();
} void IE_EveMeetingResumed::action()
{
        template2();
}
```

```cpp
void IE_EveJoinMeeting::action()
{
        template2();
} void IE_EveMeetingSuspended::action()
{
        template2();
} void IE_EveRejectInvitation::action()
{
        template2();
} void IE_EveDroppedParticipant::action()
{
        template1();
} void IE_EveRoomDestroyed::action()
{
        template5();
} void IE_EveJoinMeetingRejected::action()
{
        template5();
} void IE_EveReenterMeeting::action()
{
//      template6();
        template1();
} void IE_EveLeftMeeting::action()
{
//      template6();
        template1();
}

// Events from Local Media Managers void IE_EveLMUp::action()
{
        Media m;
        String udesc;

m = (Media) data[pos++];
        (void) Conv->BufToString(data+pos, res_len, nbytes, udesc);
        pos += nbytes;

#ifdef DEBUG
        cout << "Recevd from LM: " << (int) m << " Desc: " << udesc << endl;
#endif
        if (Invoker->object_type() != e_LM)
                return;

LocalMedia *lm = (LocalMedia*)Invoker;
        lm->update(m, udesc);
} void IE_EveLMStateChange::action()
{
        int state;
```

241

```
                (void) Conv->BufToCARD32(data+pos, res_len, nbytes, state);
                        pos += nbytes;
                if (Invoker->object_type() != e_LM)
                        return;

LocalMedia *lm = (LocalMedia*)Invoker;
                if (state)
                        lm->set_active();
                else
                        lm->set_inactive();
        } define DEBUG 1 include <controller.h>
include <state.h>
#include <conn.h>

Blockimplement(char)

int Connection::header_len = MSG_HEADER_LEN;

Connection::Connection(Controller *ctrl, MmConnection pconn,
                                                                ConnectionObjectTypes otype)
        {
                Ctrl = ctrl;
                alive = 1;
                conn = pconn;
                obj_type = otype;
        } void Connection::client_dead()
        {
                alive = 0;
        } int Connection::send(char *data, int len)
        {
                if (conn->IsAssigned() == MmEnum::MmFalse) {
                        deactivate_self();
                        return(-1);
                }
                if (NW->Write(conn, data, len) < len) {
                        deactivate_self();
                        return(-1);
                }
                return(0);
        } int Connection::send(Message *msg)
        {
                if (conn->IsAssigned() == MmEnum::MmFalse) {
                        deactivate_self();
                        return(-1);
                }
                if (NW->Write(conn, msg->msg_header(), msg->msg_header_len()) <
                        msg->msg_header_len()){
                        deactivate_self();
                        return(-1);
                }
                if (NW->Write(conn, msg->msg_data(), msg->msg_len()) < msg->msg_len()){
                        deactivate_self();
                        return(-1);
                }
                return(0);
```

242

```
} void Connection::client_process_msg()
{
        CARD8 type, opcode;
        CARD32 msg_seq, msg_len;
        IncomingMessage *msg;

if (NW->Read(header, header_len) < header_len){
#ifdef DEBUG
                cerr << "CM: Read Error:: " << __FILE__ << " " << (int)__LINE__ << endl;
#endif
                deactivate_self();
                return;
        }

Ctrl->Proto()->interpret_header(header, type, opcode, msg_seq, msg_len);
#ifdef DEBUG
        cerr << "  CM:  Len:" << msg_len << "   Seq:" << msg_seq << " Type: "
                        << (int)type << "  Opcode: " << (int)opcode << endl;
        cerr.flush();
endif if (msg_len > 0) {
                buf.reserve(msg_len);
                if (NW->Read(buf, msg_len) < msg_len){
#ifdef DEBUG
                        cerr << "CM:  Read Error:: " << __FILE__ << " " << (int)__LINE__ << 
#endif
                        deactivate_self();
                        return;
                }
        } msg = Ctrl->Proto()->construct_msg(type, opcode, msg_seq,
                                                                                        msg_len, buf,
        if (msg) {
                msg->action();
                delete msg;
        }
} // client_process_msg Connection::~Connection()
{
        (void) NW->HangUp(connection());
} define DEBUG 1 define DEFAULT_HOST "spider"

include <controller.h>
#include <conn.h>
#include <sysent.h>
#include <stdlib.h>
#include <state.h>
include <obj_man.h>
#include <signal.h>

Controller *G_Controller;

void alarm_handler()
{
        if (G_Controller && G_Controller->RoomManager()) {
                G_Controller->RoomManager()->alarm_handler();
        }
```

243

```
} main(int argc, char *argv[])
{
        G_Controller = new Controller();
        (void) signal(SIGALRM, (SIG_TYP)alarm_handler);
        G_Controller->startup(argc, argv);
        G_Controller->listen();
        G_Controller->main_loop();
} void Controller::startup (int argc, char **argv)
{
        int c;
        extern char *optarg;
    extern int optind;
    char name[DUMMY_STR_SIZE];

my_id = -1; my_name = "";
        MR_machine = DEFAULT_HOST;
        EN_machine = DEFAULT_HOST;
        VI_port = CM_VI_PORT;
        MR_port = MR_CLIFACE_PORT;
        LM_port = CM_LMAN_PORT;
        EN_port = EN_CM_PORT;
        while ((c = getopt(argc, argv, "M:m:v:l:E:e:i:N:")) != -1){
            switch (c) {
                case 'v':
                VI_port = atoi(optarg);
                break;

case 'i':
                                my_id = atoi(optarg);
                                break;

case 'N':
                    strcpy(name, optarg);
                    my_name = name;
                    break;

case 'M':
                    strcpy(name, optarg);
                    MR_machine = name;
                    break;

case 'E':
                    strcpy(name, optarg);
                    EN_machine = name;
                    break;

case 'm':
                    MR_port = atoi(optarg);
                    break;

case 'l':
                    LM_port = atoi(optarg);
                    break;

case 'e':
                    EN_port = atoi(optarg);
                    break;

default:
                                cout << "Usage: cm [-N <name>] [-i <id>] [-v <VI_port>] [-M <
                                exit(1);
            }
```

```cpp
        } if (!(RMgr = new RoomFsmMgr(this, MyId()))){
                cout << "Fatal Memory Alloc. Error: " << __FILE__ << ":"
                                << __LINE__ << endl;
                exit(1);
        } if (!(ConvMethods = new Convert())){
                cout << "Fatal Memory Alloc. Error: " << __FILE__ << ":"
                                << __LINE__ << endl;
                exit(1);
        }
        if (!(Prot = new Protocol(this))){
                cout << "Fatal Memory Alloc. Error: " << __FILE__ << ":"
                                << __LINE__ << endl;
                exit(1);
        } if (!(_MRMgr = new MRServerManager(this, MR_machine, MR_port))) {
      cout << "Fatal Memory Alloc. Error: " << __FILE__ << ":"
        << __LINE__ << endl;
      exit(1);
    } if (!(_ENMgr = new EventNotifierManager(this, EN_machine, EN_port))) {
      cout << "Fatal Memory Alloc. Error: " << __FILE__ << ":"
        << __LINE__ << endl;
      exit(1);
    } if (!(_VIMgr = new VisualInterfaceManager(this))) {
      cout << "Fatal Memory Alloc. Error: " << __FILE__ << ":"
        << __LINE__ << endl;
      exit(1);
    } if (!(_LMMgr = new LocalMediaManager(this))) {
      cout << "Fatal Memory Alloc. Error: " << __FILE__ << ":"
        << __LINE__ << endl;
      exit(1);
    }

} void Controller::listen()
{
        if (NW->ActivateServerPort(VI_port) != MmEnum::MmOK){
                cout << "Cannot open VI listening port...\n"; cout.flush();
                exit(1);
        } if (NW->ActivateServerPort(LM_port) != MmEnum::MmOK){
                cout << "Cannot open Local Media Managers' port...\n"; cout.flush();
                exit(1);
        }
} void Controller::main_loop ()
{
        for (;;) {
            if (NW->Select() != MmEnum::MmOK)
                continue;

if (NW->CurrentConnection()->ServerPort() == MR_port)
                    _MRMgr->process(NW->CurrentConnection());
```

```
                else if (NW->CurrentConnection()->ServerPort() == VI_port)
                        _VIMgr->process(NW->CurrentConnection());
                else if (NW->CurrentConnection()->ServerPort() == LM_port)
                        _LMMgr->process(NW->CurrentConnection());
                else if (NW->CurrentConnection()->ServerPort() == EN_port)
                        _ENMgr->process(NW->CurrentConnection());
        }
}

Controller::~Controller()
{
        if (Prot) delete Prot ;
        if (RMgr) delete RMgr;
        if (_MRMgr) delete _MRMgr;
        if (_LMMgr) delete _LMMgr;
        if (_ENMgr) delete _ENMgr;
        if (_VIMgr) delete _VIMgr;
} void CM_shutdown()
{
        if (G_Controller) delete G_Controller;
        exit(1);
} include <iostream.h>
include <generator.h>

IncomingMessage * default_generator(CARD8 type, CARD8 opcode, CARD32 seq,
                CARD32 len, char *data, Connection *invoker)
{
        cerr << "Illegal  Message or Message not implemented: Type:" << (int)type
                << " Code:" << (int)opcode << endl;
        cerr.flush();
        return(new IllegalMessage(type, opcode, seq, len, data, invoker));
}

IncomingMessage* Gen_ErrMsg( CARD8 type, CARD8 opcode, CARD32 seq,
                CARD32 len, char *data, Connection *invoker)
{
        return(new IncomingError(type, opcode, seq, len, data, invoker));
}

IncomingMessage* Gen_IR_CreateRoom( CARD8 type, CARD8 opcode, CARD32 seq,
                CARD32 len, char *data, Connection *invoker)
{
        return(new IR_CreateRoom(type, opcode, seq, len, data, invoker));
}

IncomingMessage* Gen_IR_DestroyRoom( CARD8 type, CARD8 opcode, CARD32 seq,
                CARD32 len, char *data, Connection *invoker)
{
        return(new IR_DestroyRoom(type, opcode, seq, len, data, invoker));
}

IncomingMessage* Gen_IR_CreateMeeting( CARD8 type, CARD8 opcode, CARD32 seq,
                CARD32 len, char *data, Connection *invoker)
{
        return(new IR_CreateMeeting(type, opcode, seq, len, data, invoker));
}

IncomingMessage* Gen_IR_DestroyMeeting( CARD8 type, CARD8 opcode, CARD32 seq,
                CARD32 len, char *data, Connection *invoker)
{
        return(new IR_DestroyMeeting(type, opcode, seq, len, data, invoker));
}
```

```
IncomingMessage* Gen_IR_AddServer( CARD8 type, CARD8 opcode, CARD32 seq,
                CARD32 len, char *data, Connection *invoker)
{
        return(new IR_AddServer(type, opcode, seq, len, data, invoker));
}

IncomingMessage* Gen_IR_DropServer( CARD8 type, CARD8 opcode, CARD32 seq,
                CARD32 len, char *data, Connection *invoker)
{
        return(new IR_DropServer(type, opcode, seq, len, data, invoker));
}

IncomingMessage* Gen_IR_AddParticipant( CARD8 type, CARD8 opcode, CARD32 seq,
                CARD32 len, char *data, Connection *invoker)
{
        return(new IR_AddParticipant(type, opcode, seq, len, data, invoker));
}

IncomingMessage* Gen_IR_DropParticipant( CARD8 type, CARD8 opcode, CARD32 seq,
                CARD32 len, char *data, Connection *invoker)
{
        return(new IR_DropParticipant(type, opcode, seq, len, data, invoker));
}

IncomingMessage* Gen_IR_ListRooms( CARD8 type, CARD8 opcode, CARD32 seq,
                CARD32 len, char *data, Connection *invoker)
{
        return(new IR_ListRooms(type, opcode, seq, len, data, invoker));
}

IncomingMessage* Gen_IR_ListMeetings( CARD8 type, CARD8 opcode, CARD32 seq,
                CARD32 len, char *data, Connection *invoker)
{
        return(new IR_ListMeetings(type, opcode, seq, len, data, invoker));
}

IncomingMessage* Gen_IR_ListServers( CARD8 type, CARD8 opcode, CARD32 seq,
                CARD32 len, char *data, Connection *invoker)
{
        return(new IR_ListServers(type, opcode, seq, len, data, invoker));
}

IncomingMessage* Gen_IR_LeaveMeeting( CARD8 type, CARD8 opcode, CARD32 seq,
                CARD32 len, char *data, Connection *invoker)
{
        return(new IR_LeaveMeeting(type, opcode, seq, len, data, invoker));
}

IncomingMessage* Gen_IR_ReenterMeeting( CARD8 type, CARD8 opcode, CARD32 seq,
                CARD32 len, char *data, Connection *invoker)
{
        return(new IR_ReenterMeeting(type, opcode, seq, len, data, invoker));
}

IncomingMessage* Gen_IR_SuspendMeeting( CARD8 type, CARD8 opcode, CARD32 seq,
                CARD32 len, char *data, Connection *invoker)
{
        return(new IR_SuspendMeeting(type, opcode, seq, len, data, invoker));
}

IncomingMessage* Gen_IR_ResumeMeeting( CARD8 type, CARD8 opcode, CARD32 seq,
                CARD32 len, char *data, Connection *invoker)
{
        return(new IR_ResumeMeeting(type, opcode, seq, len, data, invoker));
}
```

247

```
IncomingMessage* Gen_IR_GetPersonInfo( CARD8 type, CARD8 opcode, CARD32 seq,
                CARD32 len, char *data, Connection *invoker)
{
        return(new IR_GetPersonInfo(type, opcode, seq, len, data, invoker));
}

IncomingMessage* Gen_IR_VIMeetingInvitation( CARD8 type, CARD8 opcode, CARD32 seq,
                CARD32 len, char *data, Connection *invoker)
{
        return(new IR_VIMeetingInvitation(type, opcode, seq, len, data, invoker));
}

IncomingMessage* Gen_IE_EveCreateMeeting( CARD8 type, CARD8 opcode, CARD32 seq,
                CARD32 len, char *data, Connection *invoker)
{
        return(new IE_EveCreateMeeting(type, opcode, seq, len, data, invoker));
}

IncomingMessage* Gen_IE_EveCreatePersistentMeeting( CARD8 type, CARD8 opcode, CARD32 seq,
                CARD32 len, char *data, Connection *invoker)
{
        return(new IE_EveCreatePersistentMeeting(type, opcode, seq, len, data, invoker));
}

IncomingMessage* Gen_IE_EveVICreateMeetInERoom( CARD8 type, CARD8 opcode, CARD32 seq,
                CARD32 len, char *data, Connection *invoker)
{
        return(new IE_EveVICreateMeetInERoom(type, opcode, seq, len, data, invoker));
}

IncomingMessage* Gen_IE_EveVIJoinMeeting( CARD8 type, CARD8 opcode, CARD32 seq,
                CARD32 len, char *data, Connection *invoker)
{
        return(new IE_EveVIJoinMeeting(type, opcode, seq, len, data, invoker));
}

IncomingMessage* Gen_IE_EveVIShowMeetingStatus( CARD8 type, CARD8 opcode, CARD32 seq,
                CARD32 len, char *data, Connection *invoker)
{
        return(new IE_EveVIShowMeetingStatus(type, opcode, seq, len, data, invoker));
}

IncomingMessage* Gen_IE_EveVIShowMeetRoomStatus( CARD8 type, CARD8 opcode, CARD32 seq,
                CARD32 len, char *data, Connection *invoker)
{
        return(new IE_EveVIShowMeetRoomStatus(type, opcode, seq, len, data, invoker));
}

IncomingMessage* Gen_IR_ShowMeetingStatus( CARD8 type, CARD8 opcode, CARD32 seq,
                CARD32 len, char *data, Connection *invoker)
{
        return(new IR_ShowMeetingStatus(type, opcode, seq, len, data, invoker));
}

IncomingMessage* Gen_IR_ShowMeetRoomStatus( CARD8 type, CARD8 opcode, CARD32 seq,
                CARD32 len, char *data, Connection *invoker)
{
        return(new IR_ShowMeetRoomStatus(type, opcode, seq, len, data, invoker));
}

IncomingMessage* Gen_IE_EveVIAddParticipant( CARD8 type, CARD8 opcode, CARD32 seq,
                CARD32 len, char *data, Connection *invoker)
{
        return(new IE_EveVIAddParticipant(type, opcode, seq, len, data, invoker));
}
```

248

```cpp
IncomingMessage* Gen_IE_EveVIDropParticipant( CARD8 type, CARD8 opcode, CARD32 seq,
                CARD32 len, char *data, Connection *invoker)
{
        return(new IE_EveVIDropParticipant(type, opcode, seq, len, data, invoker));
}

IncomingMessage* Gen_IE_EveVISuspendMeeting( CARD8 type, CARD8 opcode, CARD32 seq,
                CARD32 len, char *data, Connection *invoker)
{
        return(new IE_EveVISuspendMeeting(type, opcode, seq, len, data, invoker));
}

IncomingMessage* Gen_IE_EveVIReenterMeeting( CARD8 type, CARD8 opcode, CARD32 seq,
                CARD32 len, char *data, Connection *invoker)
{
        return(new IE_EveVIReenterMeeting(type, opcode, seq, len, data, invoker));
}

IncomingMessage* Gen_IE_EveVILeaveMeeting( CARD8 type, CARD8 opcode, CARD32 seq,
                CARD32 len, char *data, Connection *invoker)
{
        return(new IE_EveVILeaveMeeting(type, opcode, seq, len, data, invoker));
}

IncomingMessage* Gen_IE_EveVIAddServer( CARD8 type, CARD8 opcode, CARD32 seq,
                CARD32 len, char *data, Connection *invoker)
{
        return(new IE_EveVIAddServer(type, opcode, seq, len, data, invoker));
}

IncomingMessage* Gen_IE_EveVIDropServer( CARD8 type, CARD8 opcode, CARD32 seq,
                CARD32 len, char *data, Connection *invoker)
{
        return(new IE_EveVIDropServer(type, opcode, seq, len, data, invoker));
}

IncomingMessage* Gen_IE_EveVIDestroyMeeting( CARD8 type, CARD8 opcode, CARD32 seq,
                CARD32 len, char *data, Connection *invoker)
{
        return(new IE_EveVIDestroyMeeting(type, opcode, seq, len, data, invoker));
}

IncomingMessage* Gen_IE_EveVIListRooms( CARD8 type, CARD8 opcode, CARD32 seq,
                CARD32 len, char *data, Connection *invoker)
{
        return(new IE_EveVIListRooms(type, opcode, seq, len, data, invoker));
}

IncomingMessage* Gen_IE_EveVIListMeetings( CARD8 type, CARD8 opcode, CARD32 seq,
                CARD32 len, char *data, Connection *invoker)
{
        return(new IE_EveVIListMeetings(type, opcode, seq, len, data, invoker));
}

IncomingMessage* Gen_IE_EveVIGetPersonName( CARD8 type, CARD8 opcode, CARD32 seq,
                CARD32 len, char *data, Connection *invoker)
{
        return(new IE_EveVIGetPersonName(type, opcode, seq, len, data, invoker));
}

IncomingMessage* Gen_IE_EveVIGetPersonImage( CARD8 type, CARD8 opcode, CARD32 seq,
                CARD32 len, char *data, Connection *invoker)
{
        return(new IE_EveVIGetPersonImage(type, opcode, seq, len, data, invoker));
}
```

```
IncomingMessage* Gen_IE_EveVIGetPersonId( CARD8 type, CARD8 opcode, CARD32 seq,
                 CARD32 len, char *data, Connection *invoker)
{
        return(new IE_EveVIGetPersonId(type, opcode, seq, len, data, invoker));
}

IncomingMessage* Gen_IE_EveVIUp( CARD8 type, CARD8 opcode, CARD32 seq,
                 CARD32 len, char *data, Connection *invoker)
{
        return(new IE_EveVIUp(type, opcode, seq, len, data, invoker));
}

IncomingMessage* Gen_IE_EveVIDown( CARD8 type, CARD8 opcode, CARD32 seq,
                 CARD32 len, char *data, Connection *invoker)
{
        return(new IE_EveVIDown(type, opcode, seq, len, data, invoker));
}

IncomingMessage* Gen_IE_EveVIJoinMeetingAccepted( CARD8 type, CARD8 opcode, CARD32 seq,
                 CARD32 len, char *data, Connection *invoker)
{
        return(new IE_EveVIJoinMeetingAccepted(type, opcode, seq, len, data, invoker));
}

IncomingMessage* Gen_IE_EveVIJoinMeetingRejected( CARD8 type, CARD8 opcode, CARD32 seq,
                 CARD32 len, char *data, Connection *invoker)
{
        return(new IE_EveVIJoinMeetingRejected(type, opcode, seq, len, data, invoker));
}

IncomingMessage* Gen_IE_EveVIShowAssocRoom( CARD8 type, CARD8 opcode, CARD32 seq,
                 CARD32 len, char *data, Connection *invoker)
{
        return(new IE_EveVIShowAssocRoom(type, opcode, seq, len, data, invoker));
}

IncomingMessage* Gen_IE_EveVIResumeMeeting( CARD8 type, CARD8 opcode, CARD32 seq,
                 CARD32 len, char *data, Connection *invoker)
{
        return(new IE_EveVIResumeMeeting(type, opcode, seq, len, data, invoker));
}

IncomingMessage* Gen_IE_EveMeetingInvite( CARD8 type, CARD8 opcode, CARD32 seq,
                 CARD32 len, char *data, Connection *invoker)
{
        return(new IE_EveMeetingInvite(type, opcode, seq, len, data, invoker));
}

IncomingMessage* Gen_IE_EveAcceptInvitation( CARD8 type, CARD8 opcode, CARD32 seq,
                 CARD32 len, char *data, Connection *invoker)
{
        return(new IE_EveAcceptInvitation(type, opcode, seq, len, data, invoker));
}

IncomingMessage* Gen_IE_EveRejectInvitation( CARD8 type, CARD8 opcode, CARD32 seq,
                 CARD32 len, char *data, Connection *invoker)
{
        return(new IE_EveRejectInvitation(type, opcode, seq, len, data, invoker));
}

IncomingMessage* Gen_IE_EveServerAdded( CARD8 type, CARD8 opcode, CARD32 seq,
                 CARD32 len, char *data, Connection *invoker)
{
        return(new IE_EveServerAdded(type, opcode, seq, len, data, invoker));
}
```

```c
IncomingMessage* Gen_IE_EveServerDropped( CARD8 type, CARD8 opcode, CARD32 seq,
                CARD32 len, char *data, Connection *invoker)
{
        return(new IE_EveServerDropped(type, opcode, seq, len, data, invoker));
}

IncomingMessage * Gen_IE_EveRoomDestroyed( CARD8 type, CARD8 opcode, CARD32 seq,
                CARD32 len, char *data, Connection *invoker)
{
        return(new IE_EveRoomDestroyed(type, opcode, seq, len, data, invoker));
}

IncomingMessage * Gen_IE_EveMeetingDestroyed( CARD8 type, CARD8 opcode, CARD32 seq,
                CARD32 len, char *data, Connection *invoker)
{
        return(new IE_EveMeetingDestroyed(type, opcode, seq, len, data, invoker));
}

IncomingMessage * Gen_IE_EveAddedParticipant( CARD8 type, CARD8 opcode, CARD32 seq,
                CARD32 len, char *data, Connection *invoker)
{
        return(new IE_EveAddedParticipant(type, opcode, seq, len, data, invoker));
}

IncomingMessage * Gen_IE_EveDroppedParticipant( CARD8 type, CARD8 opcode, CARD32 seq,
                CARD32 len, char *data, Connection *invoker)
{
        return(new IE_EveDroppedParticipant(type, opcode, seq, len, data, invoker));
}

IncomingMessage * Gen_IE_EveRoomLocked( CARD8 type, CARD8 opcode, CARD32 seq,
                CARD32 len, char *data, Connection *invoker)
{
        return(new IE_EveRoomLocked(type, opcode, seq, len, data, invoker));
}

IncomingMessage * Gen_IE_EveRoomUnlocked( CARD8 type, CARD8 opcode, CARD32 seq,
                CARD32 len, char *data, Connection *invoker)
{
        return(new IE_EveRoomUnlocked(type, opcode, seq, len, data, invoker));
}

IncomingMessage * Gen_IE_EveLeftMeeting( CARD8 type, CARD8 opcode, CARD32 seq,
                CARD32 len, char *data, Connection *invoker)
{
        return(new IE_EveLeftMeeting(type, opcode, seq, len, data, invoker));
}

IncomingMessage * Gen_IE_EveReenterMeeting( CARD8 type, CARD8 opcode, CARD32 seq,
                CARD32 len, char *data, Connection *invoker)
{
        return(new IE_EveReenterMeeting(type, opcode, seq, len, data, invoker));
}

IncomingMessage * Gen_IE_EveMeetingSuspended( CARD8 type, CARD8 opcode, CARD32 seq,
                CARD32 len, char *data, Connection *invoker)
{
        return(new IE_EveMeetingSuspended(type, opcode, seq, len, data, invoker));
}

IncomingMessage * Gen_IE_EveMeetingResumed( CARD8 type, CARD8 opcode, CARD32 seq,
                CARD32 len, char *data, Connection *invoker)
{
        return(new IE_EveMeetingResumed(type, opcode, seq, len, data, invoker));
}
```

```
IncomingMessage * Gen_IE_EveJoinMeeting( CARD8 type, CARD8 opcode, CARD32 seq,
                CARD32 len, char *data, Connection *invoker)
{
        return(new IE_EveJoinMeeting(type, opcode, seq, len, data, invoker));
}

IncomingMessage* Gen_IE_EveJoinMeetingRejected( CARD8 type, CARD8 opcode, CARD32 seq,
                CARD32 len, char *data, Connection *invoker)
{
        return(new IE_EveJoinMeetingRejected(type, opcode, seq, len, data, invoker));
}

IncomingMessage * Gen_IE_EveLMUp( CARD8 type, CARD8 opcode, CARD32 seq,
                CARD32 len, char *data, Connection *invoker)
{
        return(new IE_EveLMUp(type, opcode, seq, len, data, invoker));
}

IncomingMessage * Gen_IE_EveLMStateChange( CARD8 type, CARD8 opcode, CARD32 seq,
                CARD32 len, char *data, Connection *invoker)
{
        return(new IE_EveLMStateChange(type, opcode, seq, len, data, invoker));
} include <iostream.h>
include <ioc.h>
#include <common.h>

Listimplement(int)
List_of_pimplement(MediaBridgeDesc)
List_of_pimplement(PartMediaBridgeDescList)

MediaBridgeDescList::MediaBridgeDescList()
{
        yet_to_service = 0;
}

MediaBridgeDescList::~MediaBridgeDescList()
{
        MediaBridgeDesc *b;

list.reset();
        while (list.next(b)){
                if (b) {
                        delete b;
                }
        }
} void MediaBridgeDescList::assign_or_copy(const MediaBridgeDescList& rhs)
{
        yet_to_service = rhs.yet_to_service;
        List_of_piter(MediaBridgeDesc) tlist(rhs.list);
        MediaBridgeDesc *tmp, *tmp2;

// delete if there was anything already on the list
        list.reset();
        while (list.next(tmp)) {
                if (tmp) {
                        list.remove_prev();
                        delete tmp;
                }
        }
```

252

```
                tlist.reset();
                while (tlist.next(tmp)) {
                        tmp2 = new MediaBridgeDesc;
                        tmp2->m = tmp->m;
                        tmp2->udesc = tmp->udesc;
                        tmp2->port = tmp->port;
                        tmp2->machine = tmp->machine;
                        tmp2->req_done = 0; // or should it be tmp->req_done???
                        if (tmp == rhs.last_media) {
                                last_media = tmp2;
                        }
                        list.insert_next(tmp2);
                }
}

MediaBridgeDescList& MediaBridgeDescList::operator=(
                                                const MediaBridgeDescList& rhs)
{
        assign_or_copy(rhs);
        return (*this);
}

MediaBridgeDescList::MediaBridgeDescList(const MediaBridgeDescList& rhs)
{
        assign_or_copy(rhs);
} void MediaBridgeDescList::add(Media m, String& user_desc)
{
        MediaBridgeDesc *n = new MediaBridgeDesc;
        if (!n) {
                cout << "Fatal Mem Alloc. problems : " << __FILE__ << ":" <<
                                        (int)__LINE__ << endl;
        } n->m = m; n->udesc = user_desc; n->req_done = 0; n->active = 0;
        yet_to_service++;
        list.insert_next(n);

} void MediaBridgeDescList::add(MediaBridgeDesc& med)
{
        MediaBridgeDesc *n = new MediaBridgeDesc;
        if (!n) {
                cout << "Fatal Mem Alloc. problems : " << __FILE__ << ":" <<
                                        (int)__LINE__ << endl;
        } n->m = med.m; n->udesc = med.udesc; n->req_done = med.req_done;
        n->port = med.port; n->machine = med.machine; n->active = med.active;
        yet_to_service++;
        list.insert_next(n);
} void MediaBridgeDescList::remove(Media m)
{
        MediaBridgeDesc *b;

list.reset();
        while (list.next(b)){
                if (b->m == m) {
                        yet_to_service--;
                        list.remove_prev();
                        delete b;
                        return;
```

253

```
int MediaBridgeDescList::is_present(MediaBridgeDesc *b)
{
        MediaBridgeDesc *t;

list.reset();
        while (list.next(t)){
//              if (t->m == b->m && t->udesc == b->udesc) {
                if (t->m == b->m) {
                        return (1);
                }
        }
        return(0);
} void MediaBridgeDescList::update(Media m, String& machine, int port,
                                                                int is_active)
{
        MediaBridgeDesc *b;

list.reset();
        while (list.next(b)){
                if (b->m == m) {
                        b->machine = machine;
                        b->port = port;
                        b->active = is_active;
                        return;
                }
        }
} void MediaBridgeDescList::update_prev_request(String& machine, int port,
                                                                int is_active)
{
        if (last_media) {
                last_media->machine = machine;
                last_media->port = port;
                last_media->active = is_active;
        }
} int MediaBridgeDescList::next_bridge_to_service(MediaBridgeDesc*& bridge)
{
        MediaBridgeDesc *b;
        List_of_piter(MediaBridgeDesc) blist(list);

blist.reset();
        while (blist.next(b)){
                if (!b->req_done) {
                        b->req_done = 1;
                        bridge = b;
                        yet_to_service--;
                        last_media = b;
                        return(SUCCESS);
                }
        }
        return(-1);
} void MediaBridgeDescList::update_applicable_media(
                                        MediaBridgeDescList& mdesc)
{
        List_of_piter(MediaBridgeDesc) tlist(mdesc.list);
```

```
              MediaBridgeDesc *tmp, *tmp2, *node;

tlist.reset();
              while (tlist.next(tmp)) {
                      if ((node = node_present(tmp))) {
                              tmp->udesc = node->udesc;
                              tmp->port = node->port;
                              tmp->machine = node->machine;
                      }
              }
      }

MediaBridgeDesc* MediaBridgeDescList::node_present(MediaBridgeDesc *b)
{
        MediaBridgeDesc *t;

list.reset();
        while (list.next(t)){
                if (t->m == b->m) {
                        return (t);
                }
        }
        return(NULL);
} define DEBUG 1
define DUMMY_CLIENT 1 include <controller.h>
include <obj_man.h>
#include <conn.h>
#include <iostream.h>
#include <state.h>

List_of_pimplement(Message)

Message::Message(CARD8 msg_typ, CARD8 msg_code, int msg_seq_no,
                 int msg_len, char *msg_data, Connection *invoker)
{
        set_msg_header(msg_typ, msg_code, msg_seq_no, msg_len);
        set_msg_data(msg_data);
        Invoker = invoker;
        RMgr = Invoker->Control()->RoomManager();
        Conv = Invoker->Control()->Conv();
        pos = 0;
} int Message::len_in_CARD32(int len_in_bytes)
{
    int rep_ceil;

rep_ceil = len_in_bytes%4;
    return((len_in_bytes/4) + (rep_ceil ? 1 : 0));
} void Message::send()
{
        (void) Invoker->send(header, msg_header_len());
        if (len) (void) Invoker->send(data, len);
} void OutgoingError::success_return(CARD32 err_type,
                     CARD32 msg_code, CARD32 seq_no)
{
        set_msg_header(err_type, msg_code, seq_no, 0);
```

```
        send();
} void OutgoingError::e_action(CARD32 err_type, CARD32 msg_code,
                                              CARD32 seq_no, CARD32 err_code)
{
        set_msg_header(err_type, msg_code, seq_no, sizeof(int));
        Conv->IntToBuf(err_code, ((char *)rep_buf));
        set_msg_data((char *)rep_buf);
        send();
} void IncomingReply::action()
{
        RMgr->fire_using_seqno(msg_seq_no(), iob);
} include <obj_man.h>
include <cm_msg.h>
#include <outgoing.h>

List_of_pimplement(LocalMedia)

///////////////// LocalMediaManager Methods void LocalMediaManager::process(MmConnection pconn)
{
        List_of_piter(LocalMedia) clist(client_list);
        LocalMedia *obj;

clist.reset();
        while (clist.next(obj)){
                // check creation
                if (obj->connection() == pconn){
                        obj->process_msg();
                        garbage_collect();
                        return;
                }
        } if (strcmp(pconn->NameTag(), ""))
                return; // Not a new client if ((obj = new LocalMedia(Ctrl, pconn)) == NULL) {
                cout << "Fatal Mem. Allocation Error " << __FILE__ <<
                        " " << "__LINE__" << endl;
                return;
        }
        clist.insert_next(obj);
        obj->process_msg();
}

LocalMedia* LocalMediaManager::find_matching_LM(Media m, String& udesc)
{
        LocalMedia *lm;
        List_of_piter(LocalMedia) clist(client_list);

clist.reset();
        while (clist.next(lm)){
        //      if (lm->is_match(m, udesc))
                if (lm->is_match(m))
                        return lm;
        }
        return(NULL);
}
```

256

```
oid LocalMediaManager::ConnectToBridge(int room_id, Media m,
                    String& udesc, String& machine, int port)
{
        LocalMedia *lm;

#ifdef DEBUG
        cout << "Before sending ConnectToBridge msg: " << (int)m << " desc: " <<
                    udesc << " bridge_addr is " << machine << "::" << port << endl;
endif if ((lm = find_matching_LM(m, udesc))) {
                OE_EveConnectToBridge *eve;

eve = new OE_EveConnectToBridge(0, 0, NULL, lm);
                if (!eve) return;
                eve->action(room_id, machine, port);
#ifdef DEBUG
        cout << "Sent ConnectToBridge msg: " << (int)m << " desc: " <<
                    udesc << " bridge_addr is " << machine << "::" << port << endl;
endif
                delete eve;
        }
} void LocalMediaManager::DisconnectFromBridge(int room_id, Media m,
                    String& udesc, String& machine, int port)
{
        LocalMedia *lm;

if ((lm = find_matching_LM(m, udesc))) {
                OE_EveDisconnectFromBridge *m;

m = new OE_EveDisconnectFromBridge(0, 0, NULL, lm);
                if (!m) return;
                m->action(room_id, machine, port);
                delete m;
        }
} void LocalMediaManager::garbage_collect()
{
        List_of_piter(LocalMedia) clist(client_list);
        LocalMedia *obj;

clist.reset();
        while (clist.next(obj)){
                if (!obj->is_alive()){
                        delete obj;
                        clist.remove_prev();
                }
        }
}

LocalMediaManager::~LocalMediaManager()
{
        List_of_piter(LocalMedia) clist(client_list);
        LocalMedia *obj;

clist.reset();
        while (clist.next(obj)){
                if (obj){
                        delete obj;
                        clist.remove_prev();
                }
        }
}
```

257

```
//////////////// VisualInterfaceManager Methods

VisualInterfaceManager::~VisualInterfaceManager()
{
        if (client) delete client;
} void VisualInterfaceManager::process(MmConnection pconn)
{
        if ((client = new VisualInterface(Ctrl, pconn)) == NULL) {
                cout << "Fatal Mem. Allocation Error " << __FILE__ <<
                        " " << "__LINE__" << endl;
                return;
        }
        client->process_msg();
} void VisualInterfaceManager::MeetingInvite(int seq_no, int room_id,
                        int meeting_id,
                        int participant, MediaBridgeDescList& med,
                        List_of_p(PartMediaBridgeDescList)& part_med,
                        String& part_name)
{
        OQ_VIMeetingInvite *m;

m = new OQ_VIMeetingInvite(seq_no, 0, NULL, client);
        if (!m) return;
        m->action(room_id, meeting_id, participant, part_name, med, part_med);
        delete m;
} void VisualInterfaceManager::AddedParticipant(char status,
                        int real_room_id, int real_meeting_id, int vi_room_id,
                        int participant, MediaBridgeDescList& med)
{
        OE_EveVIAddedParticipant *m;

m = new OE_EveVIAddedParticipant(0, 0, NULL, client);
        if (!m) return;
        m->action(status, real_room_id, real_meeting_id,
                        vi_room_id, participant, med);

delete m;
} void VisualInterfaceManager::DroppedParticipant(char status,
                        int vi_room_id, int participant)
{
        OE_EveVIDroppedParticipant *m;

m = new OE_EveVIDroppedParticipant(0, 0, NULL, client);
        if (!m) return;
        m->action(status, vi_room_id, participant);
        delete m;
} void VisualInterfaceManager::MeetingDestroyed(char status,
                                                int vi_room_id)
{
        OE_EveVIMeetingDestroyed *m;

m = new OE_EveVIMeetingDestroyed(0, 0, NULL, client);
        if (!m) return;
        m->action(status, vi_room_id);
        delete m;
}
```

258

```
void VisualInterfaceManager::MeetingSuspended(char status, int vi_room_id)
{
        OE_EveVIMeetingSuspended *m;

m = new OE_EveVIMeetingSuspended(0, 0, NULL, client);
        if (!m) return;
        m->action(status, vi_room_id);
        delete m;
} void VisualInterfaceManager::MeetingResumed(char status, int vi_room_id)
{
        OE_EveVIMeetingResumed *m;

m = new OE_EveVIMeetingResumed(0, 0, NULL, client);
        if (!m) return;
        m->action(status, vi_room_id);
        delete m;
} void VisualInterfaceManager::MeetingLeft(char status, int vi_room_id,
                                int participant, MediaBridgeDescList& med)
{
        OE_EveVILeftMeeting *m;

m = new OE_EveVILeftMeeting(0, 0, NULL, client);
        if (!m) return;
        m->action(status, vi_room_id, participant, med);
        delete m;
} void VisualInterfaceManager::JoinMeeting(int vi_room_id,
                                int participant)
{
        OE_EveVIJoinMeeting *m;

m = new OE_EveVIJoinMeeting(0, 0, NULL, client);
        if (!m) return;
        m->action(vi_room_id, participant);
        delete m;
} void VisualInterfaceManager::MeetingReentered(char status, int vi_room_id,
                                int participant, MediaBridgeDescList& med)
{
        OE_EveVIReenterMeeting *m;

m = new OE_EveVIReenterMeeting(0, 0, NULL, client);
        if (!m) return;
        m->action(status, vi_room_id, participant, med);
        delete m;
} void VisualInterfaceManager::ServerAdded(char status, int vi_room_id,
                                        MediaBridgeDesc& med)
{
        OE_EveVIServerAdded *m;

m = new OE_EveVIServerAdded(0, 0, NULL, client);
        if (!m) return;
        m->action(status, vi_room_id, med);
        delete m;
} void VisualInterfaceManager::ServerDropped(char status, int vi_room_id,
```

MediaBridgeDesc& med)

```
        OE_EveVIServerDropped *m;

m = new OE_EveVIServerDropped(0, 0, NULL, client);
        if (!m) return;
        m->action(status, vi_room_id, med);
        delete m;
} void VisualInterfaceManager::ListRooms(char *packet, int pkt_len)
{
        OE_EveVIListRooms *m;

m = new OE_EveVIListRooms(0, 0, NULL, client);
        if (!m) return;
        m->action(packet, pkt_len);
        delete m;
} void VisualInterfaceManager::ListMeetings(char *packet, int pkt_len)
{
        OE_EveVIListMeetings *m;

m = new OE_EveVIListMeetings(0, 0, NULL, client);
        if (!m) return;
        m->action(packet, pkt_len);
        delete m;
} void VisualInterfaceManager::ShowMeetingStatus(char *packet, int pkt_len)
{
        OE_EveVIShowMeetingStatus *m;

m = new OE_EveVIShowMeetingStatus(0, 0, NULL, client);
        if (!m) return;
        m->action(packet, pkt_len);
        delete m;
} void VisualInterfaceManager::ShowMeetRoomStatus(char *packet, int pkt_len)
{
        OE_EveVIShowMeetRoomStatus *m;

m = new OE_EveVIShowMeetRoomStatus(0, 0, NULL, client);
        if (!m) return;
        m->action(packet, pkt_len);
        delete m;
}

////////////////// MRServerManager Methods

MRServerManager::MRServerManager(Controller *cont,
            String machine, int port) : CommObjMgr(cont)
{
  MmConnection server;
  char host[HOST_NAME_LEN];

is_alive = 0;

server = NW->CallServer(machine.dump(host), port);
  server->NameTag("CM");
  // handle error here
     if (server->IsAssigned() == MmEnum::MmFalse) {
```

```cpp
      cout << "Cannot connect to " << machine << "::" << port << endl;
      return;
    } if ((mr_server = new MRServer(cont, server)) == NULL){
    cout << "Fatal Mem. Allocation Error " << __FILE__ <<
      " " << __LINE__ << endl;
    return;
  } is_alive = 1;

}

MRServerManager::~MRServerManager()
{
        if (mr_server) delete mr_server;
} void MRServerManager::process(MmConnection serv)
{
  if (mr_server->connection() == serv)
      mr_server->process_msg();
}

MmConnection MRServerManager::conn()
{
  return(mr_server->connection());
} void MRServerManager::CreateRoom(int seq_no, int attrib,
                                                String& room_name)
{
        OQ_CreateRoom *m;

m = new OQ_CreateRoom(seq_no, 0, NULL, mr_server);
        if (!m) return;
        m->action(attrib, room_name);
        delete m;
} void MRServerManager::ListRooms(int seq_no)
{
        OQ_ListRooms *m;

m = new OQ_ListRooms(seq_no, 0, NULL, mr_server);
        if (!m) return;
        m->action();
        delete m;
} void MRServerManager::ListMeetings(int seq_no)
{
        OQ_ListMeetings *m;

m = new OQ_ListMeetings(seq_no, 0, NULL, mr_server);
        if (!m) return;
        m->action();
        delete m;
} void MRServerManager::ShowMeetingStatus(int seq_no, int meeting_id)
{
        OQ_ShowMeetingStatus *m;

m = new OQ_ShowMeetingStatus(seq_no, 0, NULL, mr_server);
```

```cpp
        if (!m) return;
        m->action(meeting_id);
        delete m;
} void MRServerManager::ShowMeetRoomStatus(int seq_no, int meeting_id)
{
        OQ_ShowMeetRoomStatus *m;

m = new OQ_ShowMeetRoomStatus(seq_no, 0, NULL, mr_server);
        if (!m) return;
        m->action(meeting_id);
        delete m;
} void MRServerManager::CreateMeeting(int seq_no, int room_id)
{
        OQ_CreateMeeting *m;

m = new OQ_CreateMeeting(seq_no, 0, NULL, mr_server);
        if (!m) return;
        m->action(room_id);
        delete m;
} void MRServerManager::DestroyMeeting(int seq_no, int meeting_id)
{
        OQ_DestroyMeeting *m;

m = new OQ_DestroyMeeting(seq_no, 0, NULL, mr_server);
        if (!m) return;
        m->action(meeting_id);
        delete m;
} void MRServerManager::SuspendMeeting(int seq_no, int meeting_id)
{
        OQ_SuspendMeeting *m;

m = new OQ_SuspendMeeting(seq_no, 0, NULL, mr_server);
        if (!m) return;
        m->action(meeting_id);
        delete m;
} void MRServerManager::ResumeMeeting(int seq_no, int meeting_id)
{
        OQ_ResumeMeeting *m;

m = new OQ_ResumeMeeting(seq_no, 0, NULL, mr_server);
        if (!m) return;
        m->action(meeting_id);
        delete m;
} void MRServerManager::DestroyRoom(int seq_no, int room_id)
{
        OQ_DestroyRoom *m;

m = new OQ_DestroyRoom(seq_no, 0, NULL, mr_server);
        if (!m) return;
        m->action(room_id);
        delete m;
} void MRServerManager::AddServer(int seq_no, int room_id, Media m,
```

```
                                                         String& udesc)
{
        OQ_AddServer *msg;

msg = new OQ_AddServer(seq_no, 0, NULL, mr_server);
        if (!msg) return;
        msg->action(room_id, m, udesc);
        delete msg;
} void MRServerManager::DropServer(int seq_no, int room_id, Media m,
                                                         String& udesc)
{
        OQ_DropServer *msg;

msg = new OQ_DropServer(seq_no, 0, NULL, mr_server);
        if (!msg) return;
        msg->action(room_id, m, udesc);
        delete msg;
} void MRServerManager::ListServers(int seq_no, int room_id)
{
        OQ_ListServers *msg;

msg = new OQ_ListServers(seq_no, 0, NULL, mr_server);
        if (!msg) return;
        msg->action(room_id);
        delete msg;
} void MRServerManager::GetPersonInfo(int seq_no, int part_id)
{
        OQ_GetPersonInfo *m;

m = new OQ_GetPersonInfo(seq_no, 0, NULL, mr_server);
        if (!m) return;
        m->action(part_id);
        delete m;
} void MRServerManager::AddParticipant(int seq_no, int meeting_id, int part_id)
{
        OQ_AddParticipant *m;

m = new OQ_AddParticipant(seq_no, 0, NULL, mr_server);
        if (!m) return;
        m->action(meeting_id, part_id);
        delete m;
} void MRServerManager::DropParticipant(int seq_no, int meeting_id, int part_id)
{
        OQ_DropParticipant *m;

m = new OQ_DropParticipant(seq_no, 0, NULL, mr_server);
        if (!m) return;
        m->action(meeting_id, part_id);
        delete m;
} void MRServerManager::LeaveMeeting(int seq_no, int meeting_id,
                                                         MediaBridgeDescList& med)
{
        OQ_LeaveMeeting *m;
```

```cpp
        m = new OQ_LeaveMeeting(seq_no, 0, NULL, mr_server);
        if (!m) return;
        m->action(meeting_id, med);
        delete m;
} void MRServerManager::ReenterMeeting(int seq_no, int meeting_id,
                                            MediaBridgeDescList& med)
{
        OQ_ReenterMeeting *m;

m = new OQ_ReenterMeeting(seq_no, 0, NULL, mr_server);
        if (!m) return;
        m->action(meeting_id, med);
        delete m;
}

///////////////// EventNotifierManager Methods

EventNotifierManager::EventNotifierManager(Controller *cont,
            String machine, int port) : CommObjMgr(cont)
{
  MmConnection server;
  char host[HOST_NAME_LEN];

is_alive = 0;

server = NW->CallServer(machine.dump(host), port);
  server->NameTag("CM");
  // handle error here
    if (server->IsAssigned() == MmEnum::MmFalse) {
       cout << "Cannot connect to " << machine << "::" << port << endl;
       return;
    } if ((eve_not = new EventNotifier(cont, server)) == NULL){
     cout << "Fatal Mem. Allocation Error " << __FILE__ <<
       " " << __LINE__ << endl;
     return;
  } is_alive = 1;
  send_start_msg();
}

EventNotifierManager::~EventNotifierManager()
{
        if (eve_not) delete eve_not;
} void EventNotifierManager::process(MmConnection serv)
{
  if (eve_not->connection() == serv)
      eve_not->process_msg();
}

MmConnection EventNotifierManager::conn()
{
  return(eve_not->connection());
} void EventNotifierManager::send_start_msg()
{
  OE_EveCMStart* sm = new OE_EveCMStart(0, 0, NULL, eve_not);
  sm->action();
  delete sm;
```

```
void EventNotifierManager::multicast(List(int)& plist,
                                                OutgoingMessage *msg)
{
        OE_EveMulticast* eve = new OE_EveMulticast(0, 0, NULL, eve_not);
        eve->action(plist, msg);
        delete eve;
} void EventNotifierManager::MeetingInvite(int room_id, int meeting_id,
                        MediaBridgeDescList& med, List(int)& plist,
                        List_of_p(PartMediaBridgeDescList)& pmed)
{
        OE_EveMeetingInvite* eve = new OE_EveMeetingInvite(0, 0, NULL,
                                                eve_not);
        eve->action(room_id, meeting_id, med, pmed);
        multicast(plist, eve);
        delete eve;
} void EventNotifierManager::AcceptInvitation(int room_id, int meeting_id,
                        MediaBridgeDescList& med, List(int)& plist)
{
        OE_EveAcceptInvitation* eve = new OE_EveAcceptInvitation(0, 0, NULL,
                                                eve_not);
        eve->action(room_id, meeting_id, med);
        multicast(plist, eve);
        delete eve;
} void EventNotifierManager::RejectInvitation(int room_id, int meeting_id,
                                                List(int)& plist)
{
        OE_EveRejectInvitation* eve = new OE_EveRejectInvitation(0, 0, NULL,
                                                eve_not);
        eve->action(room_id, meeting_id);
        multicast(plist, eve);
        delete eve;
} void EventNotifierManager::AddedParticipant(int room_id, int meeting_id,
                int participant, MediaBridgeDescList& med, List(int)& plist)
{
        OE_EveAddedParticipant* eve = new OE_EveAddedParticipant(0, 0, NULL,
                                                eve_not);
        eve->action(room_id, meeting_id, participant, med);
        multicast(plist, eve);
        delete eve;
} void EventNotifierManager::DroppedParticipant(int room_id, int meeting_id,
                int participant, List(int)& plist)
{
        OE_EveDroppedParticipant* eve = new OE_EveDroppedParticipant(0, 0, NULL,
                                                eve_not);
        eve->action(room_id, meeting_id, participant);
        multicast(plist, eve);
        delete eve;
} void EventNotifierManager::MeetingLeft(int room_id, int meeting_id,
                int participant, MediaBridgeDescList& med, List(int)& plist)
{
        OE_EveLeftMeeting* eve = new OE_EveLeftMeeting(0, 0, NULL,
                                                eve_not);
```

```
        eve->action(room_id, meeting_id, participant, med);
        multicast(plist, eve);
        delete eve;
} void EventNotifierManager::MeetingReentered(int room_id, int meeting_id,
            int participant, MediaBridgeDescList& med, List(int)& plist)
{
        OE_EveReenterMeeting* eve = new OE_EveReenterMeeting(0, 0, NULL,
                                                            eve_not);
        eve->action(room_id, meeting_id, participant, med);
        multicast(plist, eve);
        delete eve;
} void EventNotifierManager::MeetingDestroyed(int room_id, int meeting_id,
                                            List(int)& plist)
{
        OE_EveMeetingDestroyed* eve = new OE_EveMeetingDestroyed(0, 0, NULL,
                                                            eve_not);
        eve->action(room_id, meeting_id);
        multicast(plist, eve);
        delete eve;
} void EventNotifierManager::JoinMeetingRejected(int room_id,
                                            List(int)& plist)
{
        OE_EveJoinMeetingRejected* eve = new OE_EveJoinMeetingRejected(0, 0, NULL, eve eve->action(room_id);
        multicast(plist, eve);
        delete eve;
} void EventNotifierManager::RoomDestroyed(int room_id, List(int)& plist)
{
        OE_EveRoomDestroyed* eve = new OE_EveRoomDestroyed(0, 0, NULL,
                                                            eve_not);
        eve->action(room_id);
        multicast(plist, eve);
        delete eve;
} void EventNotifierManager::MeetingSuspended(int room_id, int meeting_id,
                                            List(int)& plist)
{
        OE_EveMeetingSuspended* eve = new OE_EveMeetingSuspended(0, 0, NULL,
                                                            eve_not);
        eve->action(room_id, meeting_id);
        multicast(plist, eve);
        delete eve;
} void EventNotifierManager::ServerAdded(int room_id,
                        MediaBridgeDesc& med, List(int)& plist)
{
        OE_EveServerAdded* eve = new OE_EveServerAdded(0, 0, NULL, eve_not);
        eve->action(room_id, med);
        multicast(plist, eve);
        delete eve;
} void EventNotifierManager::ServerDropped(int room_id,
                        MediaBridgeDesc& med, List(int)& plist)
{
                                266
```

```cpp
        OE_EveServerDropped* eve = new OE_EveServerDropped(0, 0, NULL, eve_not);
        eve->action(room_id, med);
        multicast(plist, eve);
        delete eve;
} void EventNotifierManager::MeetingResumed(int room_id, int meeting_id,
                                                        List(int)& plist)
{
        OE_EveMeetingResumed* eve = new OE_EveMeetingResumed(0, 0, NULL,
                                                        eve_not);
        eve->action(room_id, meeting_id);
        multicast(plist, eve);
        delete eve;
} void EventNotifierManager::JoinMeeting(int room_id, int meeting_id,
                                                        List(int)& plist)
{
        OE_EveJoinMeeting* eve = new OE_EveJoinMeeting(0, 0, NULL,
                                                        eve_not);
        eve->action(room_id, meeting_id);
        multicast(plist, eve);
        delete eve;
} include <outgoing.h>
include <conn.h>
include <state.h>

// OUTGOING REQUESTS void OutgoingRequest::template1(int id)
{
        Conv->IntToBuf(RMgr->MySelf(), (((char *)rep_buf)+rep_len));
        rep_len += 4;
        Conv->IntToBuf(RMgr->MySelf(), (((char *)rep_buf)+rep_len));
        rep_len += 4;
        Conv->IntToBuf(id, (((char *)rep_buf)+rep_len));
        rep_len += 4;

rep_len = (len_in_CARD32(rep_len))<<2;
        set_msg_len(rep_len);
        set_msg_data((char *)rep_buf);
        send();
} void OutgoingRequest::template2(int id, int part_id)
{
        Conv->IntToBuf(RMgr->MySelf(), (((char *)rep_buf)+rep_len));
        rep_len += 4;
        Conv->IntToBuf(RMgr->MySelf(), (((char *)rep_buf)+rep_len));
        rep_len += 4;
        Conv->IntToBuf(id, (((char *)rep_buf)+rep_len));
        rep_len += 4;
        Conv->IntToBuf(part_id, (((char *)rep_buf)+rep_len));
        rep_len += 4;

rep_len = (len_in_CARD32(rep_len))<<2;
        set_msg_len(rep_len);
        set_msg_data((char *)rep_buf);
        send();
}
```

```
void OutgoingRequest::template3(int room_id, Media m, String& udesc)
{
        Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;

rep_buf[rep_len++] = (char)m;

Conv->IntToBuf(udesc.length(), (((char *)rep_buf)+rep_len));
        rep_len += 4;
        strcpy((((char *)rep_buf)+rep_len), udesc);
        rep_len += udesc.length();

Conv->IntToBuf(0, (((char *)rep_buf)+rep_len));  // no parts
        rep_len += 4;

rep_len = (len_in_CARD32(rep_len))<<2;
        set_msg_len(rep_len);
        set_msg_data((char *)rep_buf);
        send();
} void OutgoingRequest::template4(int room_id, MediaBridgeDescList& med)
{
        List_of_piter(MediaBridgeDesc) mlist(med.media_list());
        MediaBridgeDesc* mdesc;

Conv->IntToBuf(RMgr->MySelf(), (((char *)rep_buf)+rep_len));
        rep_len += 4;
        Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;

Conv->IntToBuf(med.length(), (((char *)rep_buf)+rep_len));
        rep_len += 4;
        mlist.reset();
        while (mlist.next(mdesc)) {
                rep_buf[rep_len++] = (char)mdesc->m;
                Conv->IntToBuf(mdesc->udesc.length(),
                                        (((char *)rep_buf)+rep_len));
                rep_len += 4;
                strcpy((((char *)rep_buf)+rep_len), mdesc->udesc);
                rep_len += mdesc->udesc.length();
        } rep_len = (len_in_CARD32(rep_len))<<2;
        set_msg_len(rep_len);
        set_msg_data((char *)rep_buf);
        send();
} void OutgoingRequest::template5()
{
        Conv->IntToBuf(RMgr->MySelf(), (((char *)rep_buf)+rep_len));
        rep_len += 4;
        Conv->IntToBuf(RMgr->MySelf(), (((char *)rep_buf)+rep_len));
        rep_len += 4;

rep_len = (len_in_CARD32(rep_len))<<2;
        set_msg_len(rep_len);
        set_msg_data((char *)rep_buf);
        send();
}
```

```
// OUTGOING EVENTS void OutgoingEvent::template1(int room_id, int meeting_id, int participant)
{
#ifdef DEBUG
        cout << "OutgoingEvent Template1: Room: " << room_id <<
                        " Meet: " << meeting_id << " Part: " << participant << endl;
endif Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;
        Conv->IntToBuf(meeting_id, (((char *)rep_buf)+rep_len));
        rep_len += 4;
        Conv->IntToBuf(participant, (((char *)rep_buf)+rep_len));
        rep_len += 4;

rep_len = (len_in_CARD32(rep_len))<<2;
        set_msg_len(rep_len);
        set_msg_data((char *)rep_buf);
} void OutgoingEvent::template2(int room_id, int meeting_id)
{
        Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;
        Conv->IntToBuf(meeting_id, (((char *)rep_buf)+rep_len));
        rep_len += 4;

rep_len = (len_in_CARD32(rep_len))<<2;
        set_msg_len(rep_len);
        set_msg_data((char *)rep_buf);
} void OutgoingEvent::template3(char status, int vi_room_id)
{
        rep_buf[rep_len++] = status;
        Conv->IntToBuf(vi_room_id, (((char *)rep_buf)+rep_len));
        rep_len += 4;

rep_len = (len_in_CARD32(rep_len))<<2;
        set_msg_len(rep_len);
        set_msg_data((char *)rep_buf);
        send();
} void OutgoingEvent::template4(char status, int vi_room_id,
                                                int participant)
{
        rep_buf[rep_len++] = status;
        Conv->IntToBuf(vi_room_id, (((char *)rep_buf)+rep_len));
        rep_len += 4;
        Conv->IntToBuf(participant, (((char *)rep_buf)+rep_len));
        rep_len += 4;

rep_len = (len_in_CARD32(rep_len))<<2;
        set_msg_len(rep_len);
        set_msg_data((char *)rep_buf);
        send();
} void OutgoingEvent::template5(int room_id) 269
```

```
        Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;

rep_len = (len_in_CARD32(rep_len))<<2;
        set_msg_len(rep_len);
        set_msg_data((char *)rep_buf);
} void OutgoingEvent::template6(int room_id, int meeting_id,
                              int participant, MediaBridgeDescList& med)
{
        List_of_piter(MediaBridgeDesc) mlist(med.media_list());
        MediaBridgeDesc* mdesc;

Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;
        Conv->IntToBuf(meeting_id, (((char *)rep_buf)+rep_len));
        rep_len += 4;
        Conv->IntToBuf(participant, (((char *)rep_buf)+rep_len));
        rep_len += 4;

Conv->IntToBuf(med.length(), (((char *)rep_buf)+rep_len));
        rep_len += 4;
        mlist.reset();
        while (mlist.next(mdesc)) {
                rep_buf[rep_len++] = (char)mdesc->m;
                Conv->IntToBuf(mdesc->udesc.length(),
                                    (((char *)rep_buf)+rep_len));
                rep_len += 4;
                strcpy((((char *)rep_buf)+rep_len), mdesc->udesc);
                rep_len += mdesc->udesc.length();
        } rep_len = (len_in_CARD32(rep_len))<<2;
        set_msg_len(rep_len);
        set_msg_data((char *)rep_buf);
} void OutgoingMessage::comm_template1(int vi_room_id,
                              int participant, MediaBridgeDescList& med)
{
        List_of_piter(MediaBridgeDesc) mlist(med.media_list());
        MediaBridgeDesc* mdesc;

Conv->IntToBuf(vi_room_id, (((char *)rep_buf)+rep_len));
        rep_len += 4;
        Conv->IntToBuf(participant, (((char *)rep_buf)+rep_len));
        rep_len += 4;

Conv->IntToBuf(med.length(), (((char *)rep_buf)+rep_len));
        rep_len += 4;
        mlist.reset();
        while (mlist.next(mdesc)) {
                rep_buf[rep_len++] = (char)mdesc->m;
                // may have to send udesc : LATER??
        } rep_len = (len_in_CARD32(rep_len))<<2;
        set_msg_len(rep_len);
        set_msg_data((char *)rep_buf);
        send();
```

```
void OutgoingEvent::template7(int room_id, String& machine, int port)
{
        Conv->IntToBuf(room_id, rep_buf+rep_len);
        rep_len += 4;
        Conv->IntToBuf(machine.length(), rep_buf+rep_len);
        rep_len += 4;
        strcpy(rep_buf+rep_len, machine);
        rep_len += machine.length();
        Conv->IntToBuf(port, rep_buf+rep_len);
        rep_len += 4;

rep_len = (len_in_CARD32(rep_len))<<2;
        set_msg_len(rep_len);
        set_msg_data((char *)rep_buf);
        send();
} void OutgoingEvent::template8(char *packet, int pkt_len)
{
        rep_len = (len_in_CARD32(pkt_len))<<2;
        set_msg_len(rep_len);
        set_msg_data(packet);
        send();
} void OutgoingEvent::template9(int room_id, MediaBridgeDesc& mdesc)
{

Conv->IntToBuf(room_id, rep_buf+rep_len);
        rep_len += 4;

rep_buf[rep_len++] = (char)mdesc.m;
        Conv->IntToBuf(mdesc.udesc.length(),
                                (((char *)rep_buf)+rep_len));
        rep_len += 4;
        strcpy((((char *)rep_buf)+rep_len), mdesc.udesc);
        rep_len += mdesc.udesc.length();
        Conv->IntToBuf(mdesc.machine.length(),
                                (((char *)rep_buf)+rep_len));
        rep_len += 4;
        strcpy((((char *)rep_buf)+rep_len), mdesc.machine);
        rep_len += mdesc.machine.length();
        Conv->IntToBuf(mdesc.port, (((char *)rep_buf)+rep_len));
        rep_len += 4;

rep_len = (len_in_CARD32(rep_len))<<2;
        set_msg_len(rep_len);
        set_msg_data((char *)rep_buf);
} void OutgoingEvent::template10(char status,
                                int vi_room_id, MediaBridgeDesc& mdesc)
{ rep_buf[rep_len++] = status;
        Conv->IntToBuf(vi_room_id, rep_buf+rep_len);
        rep_len += 4;

rep_buf[rep_len++] = (char)mdesc.m;
        Conv->IntToBuf(mdesc.udesc.length(),
                                (((char *)rep_buf)+rep_len));
        rep_len += 4;
        strcpy((((char *)rep_buf)+rep_len), mdesc.udesc);
        rep_len += mdesc.udesc.length();
```

```
        rep_len = (len_in_CARD32(rep_len))<<2;
        set_msg_len(rep_len);
        set_msg_data((char *)rep_buf);
        send();
}

// OUTGOING REQUESTS from CM to MR void OQ_CreateRoom::action(int attrib, String& room_name)
{
        Conv->IntToBuf(RMgr->MySelf(), (((char *)rep_buf)+rep_len));
        rep_len += 4;
        Conv->IntToBuf(RMgr->MySelf(), (((char *)rep_buf)+rep_len));
        rep_len += 4;
        Conv->IntToBuf(attrib, (((char *)rep_buf)+rep_len));
        rep_len += 4;
        Conv->IntToBuf(room_name.length(), (((char *)rep_buf)+rep_len));
        rep_len += 4;
        strcpy((((char *)rep_buf)+rep_len), room_name);
        rep_len += room_name.length();

rep_len = (len_in_CARD32(rep_len))<<2;
        set_msg_len(rep_len);
        set_msg_data((char *)rep_buf);
        send();
} void OQ_CreateMeeting::action(int room_id)
{
        Conv->IntToBuf(RMgr->MySelf(), (((char *)rep_buf)+rep_len));
        rep_len += 4;
        Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;
        rep_buf[rep_len++] = 0; // No attribs for now rep_len = (len_in_CARD32(rep_len))<<2;
        set_msg_len(rep_len);
        set_msg_data((char *)rep_buf);
        send();
} void OQ_ListRooms::action()
{
        template5();
} void OQ_ListMeetings::action()
{
        template5();
} void OQ_ShowMeetingStatus::action(int meeting_id)
{
        template1(meeting_id);
} void OQ_ShowMeetRoomStatus::action(int meeting_id)
{
        template1(meeting_id);
} void OQ_DestroyRoom::action(int room_id)
{
```

```
        template1(room_id);
} void OQ_DestroyMeeting::action(int meeting_id)
{
        template1(meeting_id);
} void OQ_AddServer::action(int room_id, Media m, String& udesc)
{
        template3(room_id, m, udesc);
} void OQ_DropServer::action(int room_id, Media m, String& udesc)
{
        template3(room_id, m, udesc);
} void OQ_ListServers::action(int room_id)
{
        Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;

rep_len = (len_in_CARD32(rep_len))<<2;
        set_msg_len(rep_len);
        set_msg_data((char *)rep_buf);
        send();
} void OQ_LeaveMeeting::action(int meeting_id, MediaBridgeDescList& med)
{
//      template4(meeting_id, med);
        template2(meeting_id, RMgr->MySelf());
} void OQ_ReenterMeeting::action(int meeting_id, MediaBridgeDescList& med)
{
//      template4(meeting_id, med);
        template2(meeting_id, RMgr->MySelf());
} void OQ_SuspendMeeting::action(int meeting_id)
{
        template1(meeting_id);
} void OQ_ResumeMeeting::action(int meeting_id)
{
        template1(meeting_id);
} void OQ_GetPersonInfo::action(int part_id)
{
        Conv->IntToBuf(part_id, (((char *)rep_buf)+rep_len));
        rep_len += 4;

rep_len = (len_in_CARD32(rep_len))<<2;
        set_msg_len(rep_len);
        set_msg_data((char *)rep_buf);
        send();
} void OQ_AddParticipant::action(int meeting_id, int part_id)
{
```

273

```
        template2(meeting_id, part_id);
} void OQ_DropParticipant::action(int meeting_id, int part_id)
{
        template2(meeting_id, part_id);
}

// OUTGOING EVENTS from CM to EN and VI void OE_EveCMStart::action()
{
        Conv->IntToBuf(RMgr->MySelf(), (((char *)rep_buf)+rep_len));
        rep_len += 4;

rep_len = (len_in_CARD32(rep_len))<<2;
        set_msg_len(rep_len);
        set_msg_data((char *)rep_buf);
        send();
} void OE_EveMeetingInvite::action(int room_id, int meeting_id,
                                MediaBridgeDescList& med,
                                List_of_p(PartMediaBridgeDescList)& pmed)
{
        List_of_piter(MediaBridgeDesc) mlist(med.media_list());
        MediaBridgeDesc* mdesc;
        PartMediaBridgeDescList* pmdesc;

Conv->IntToBuf(RMgr->MySelf(), (((char *)rep_buf)+rep_len));
        rep_len += 4;

Conv->IntToBuf(RMgr->Control()->MyName().length(),
                        (((char *)rep_buf)+rep_len));
        rep_len += 4;
        strcpy(rep_buf+rep_len, RMgr->Control()->MyName());
        rep_len += RMgr->Control()->MyName().length();

Conv->IntToBuf(room_id, (((char *)rep_buf)+rep_len));
        rep_len += 4;
        Conv->IntToBuf(meeting_id, (((char *)rep_buf)+rep_len));
        rep_len += 4;

Conv->IntToBuf(med.length(), (((char *)rep_buf)+rep_len));
        rep_len += 4;

mlist.reset();
        while (mlist.next(mdesc)) {
                rep_buf[rep_len++] = (char)mdesc->m;
                Conv->IntToBuf(mdesc->udesc.length(),
                                        (((char *)rep_buf)+rep_len));
                rep_len += 4;
                strcpy((((char *)rep_buf)+rep_len), mdesc->udesc);
                rep_len += mdesc->udesc.length();
#ifdef DEBUG
                cout << "Requesting: Med: " << (int)mdesc->m << "  Udesc: " <<
                                        mdesc->udesc << endl;
#endif
        }

Conv->IntToBuf(pmed.length(), (((char *)rep_buf)+rep_len));
        rep_len += 4;
        pmed.reset();
        while (pmed.next(pmdesc)) {
                Conv->IntToBuf(pmdesc->Participant(),
```

```
                                       (((char *)rep_buf)+rep_len));
            rep_len += 4;
            MediaBridgeDescList& medlist = pmdesc->MediaList();
            Conv->IntToBuf(medlist.length(), (((char *)rep_buf)+rep_len));
            rep_len += 4;
            List_of_piter(MediaBridgeDesc) tlist(medlist.media_list());
            tlist.reset();
            while (tlist.next(mdesc)) {
                    rep_buf[rep_len++] = (char)mdesc->m;
                    Conv->IntToBuf(mdesc->udesc.length(),
                                            (((char *)rep_buf)+rep_len));
                    rep_len += 4;
                    strcpy((((char *)rep_buf)+rep_len), mdesc->udesc);
                    rep_len += mdesc->udesc.length();
            }
    } rep_len = (len_in_CARD32(rep_len))<<2;
    set_msg_len(rep_len);
    set_msg_data((char *)rep_buf);
} void OE_EveAddedParticipant::action(int room_id, int meeting_id,
            int participant, MediaBridgeDescList& med)
{
    List_of_piter(MediaBridgeDesc) mlist(med.media_list());
    MediaBridgeDesc* mdesc;

Conv->IntToBuf(RMgr->MySelf(), (((char *)rep_buf)+rep_len));
    rep_len += 4;
    Conv->IntToBuf(room_id, (((char *)rep_buf)+rep_len));
    rep_len += 4;
    Conv->IntToBuf(meeting_id, (((char *)rep_buf)+rep_len));
    rep_len += 4;
    Conv->IntToBuf(participant, (((char *)rep_buf)+rep_len));
    rep_len += 4;

Conv->IntToBuf(med.length(), (((char *)rep_buf)+rep_len));
    rep_len += 4;
    mlist.reset();
    while (mlist.next(mdesc)) {
            rep_buf[rep_len++] = (char)mdesc->m;
            Conv->IntToBuf(mdesc->udesc.length(),
                                    (((char *)rep_buf)+rep_len));
            rep_len += 4;
            strcpy((((char *)rep_buf)+rep_len), mdesc->udesc);
            rep_len += mdesc->udesc.length();
            Conv->IntToBuf(mdesc->machine.length(),
                                    (((char *)rep_buf)+rep_len));
            rep_len += 4;
            strcpy((((char *)rep_buf)+rep_len), mdesc->machine);
            rep_len += mdesc->machine.length();
            Conv->IntToBuf(mdesc->port, (((char *)rep_buf)+rep_len));
            rep_len += 4;
    } rep_len = (len_in_CARD32(rep_len))<<2;
    set_msg_len(rep_len);
    set_msg_data((char *)rep_buf);
} void OE_EveAcceptInvitation::action(int room_id, int meeting_id,
                                    MediaBridgeDescList& med)
{
    List_of_piter(MediaBridgeDesc) mlist(med.media_list());
    MediaBridgeDesc* mdesc;
```

```
        Conv->IntToBuf(RMgr->MySelf(), (((char *)rep_buf)+rep_len));
        rep_len += 4;
        Conv->IntToBuf(room_id, (((char *)rep_buf)+rep_len));
        rep_len += 4;
        Conv->IntToBuf(meeting_id, (((char *)rep_buf)+rep_len));
        rep_len += 4;

Conv->IntToBuf(med.length(), (((char *)rep_buf)+rep_len));
        rep_len += 4;
        mlist.reset();
        while (mlist.next(mdesc)) {
                rep_buf[rep_len++] = (char)mdesc->m;
                Conv->IntToBuf(mdesc->udesc.length(),
                                        (((char *)rep_buf)+rep_len));
                rep_len += 4;
                strcpy((((char *)rep_buf)+rep_len), mdesc->udesc);
                rep_len += mdesc->udesc.length();
        } rep_len = (len_in_CARD32(rep_len))<<2;
        set_msg_len(rep_len);
        set_msg_data((char *)rep_buf);
} void OE_EveRejectInvitation::action(int room_id, int meeting_id)
{
        template2(room_id, meeting_id);
} void OQ_VIMeetingInvite::action(int room_id, int meeting_id, int participant,
                        String& part_name, MediaBridgeDescList& med,
                        List_of_p(PartMediaBridgeDescList)& pmed)
{
        List_of_piter(MediaBridgeDesc) mlist(med.media_list());
        MediaBridgeDesc* mdesc;
        PartMediaBridgeDescList* pmdesc;

Conv->IntToBuf(room_id, (((char *)rep_buf)+rep_len));
        rep_len += 4;
        Conv->IntToBuf(meeting_id, (((char *)rep_buf)+rep_len));
        rep_len += 4;
        Conv->IntToBuf(participant, (((char *)rep_buf)+rep_len));
        rep_len += 4;
        Conv->IntToBuf(part_name.length(), (((char *)rep_buf)+rep_len));
        rep_len += 4;
        strcpy((((char *)rep_buf)+rep_len), part_name);
        rep_len += part_name.length();

#ifdef DEBUG
        cout << "OQ_VIMeetingInvite: " << part_name << endl;
endif Conv->IntToBuf(med.length(), (((char *)rep_buf)+rep_len));
        rep_len += 4;
        mlist.reset();
        while (mlist.next(mdesc)) {
                rep_buf[rep_len++] = (char)mdesc->m;
#ifdef DEBUG
        cout << "VIMeetInvite: Media: " << (int)mdesc->m << endl;
#endif
                // may have to send udesc : LATER??
        }

Conv->IntToBuf(pmed.length(), (((char *)rep_buf)+rep_len));
        rep_len += 4;
```

```
                pmed.reset();
                while (pmed.next(pmdesc)) {
                        Conv->IntToBuf(pmdesc->Participant(),
                                        (((char *)rep_buf)+rep_len));
                        rep_len += 4;
                        MediaBridgeDescList& medlist = pmdesc->MediaList();
                        Conv->IntToBuf(medlist.length(), (((char *)rep_buf)+rep_len));
                        rep_len += 4;
                        List_of_piter(MediaBridgeDesc) tlist(medlist.media_list());
                        tlist.reset();
                        while (tlist.next(mdesc)) {
                                rep_buf[rep_len++] = (char)mdesc->m;
                                // may have to send udesc : LATER??
                                /*
                                Conv->IntToBuf(mdesc->udesc.length(),
                                                        (((char *)rep_buf)+rep_len));
                                rep_len += 4;
                                strcpy((((char *)rep_buf)+rep_len), mdesc->udesc);
                                rep_len += mdesc->udesc.length();
                                */
                        }
                } rep_len = (len_in_CARD32(rep_len))<<2;
                set_msg_len(rep_len);
                set_msg_data((char *)rep_buf);
                send();
} void OE_EveRoomDestroyed::action(int room_id)
{
        template5(room_id);
} void OE_EveJoinMeetingRejected::action(int room_id)
{
        template5(room_id);
} void OE_EveDroppedParticipant::action(int room_id, int meeting_id,
                                        int participant)
{
        template1(room_id, meeting_id, participant);
} void OE_EveVIDroppedParticipant::action(char status, int vi_room_id,
                                                                                int participant)
{
        template4(status, vi_room_id, participant);
} void OE_EveLeftMeeting::action(int room_id, int meeting_id,
                                int participant, MediaBridgeDescList& med)
{
//      template6(room_id, meeting_id, participant, med);
        template1(room_id, meeting_id, participant);
} void OE_EveReenterMeeting::action(int room_id, int meeting_id,
                                int participant, MediaBridgeDescList& med)
{
//      template6(room_id, meeting_id, participant, med);
        template1(room_id, meeting_id, participant);
} void OE_EveMeetingSuspended::action(int room_id, int meeting_id)
```

```
        template2(room_id, meeting_id);

void OE_EveVIMeetingSuspended::action(char status, int vi_room_id)
{
        template3(status, vi_room_id);
} void OE_EveMeetingResumed::action(int room_id, int meeting_id)
{
        template2(room_id, meeting_id);
} void OE_EveJoinMeeting::action(int room_id, int meeting_id)
{
        template2(room_id, meeting_id);
} void OE_EveServerAdded::action(int room_id, MediaBridgeDesc& med)
{
        template9(room_id, med);
} void OE_EveServerDropped::action(int room_id, MediaBridgeDesc& med)
{
        template9(room_id, med);
} void OE_EveVIServerAdded::action(char status, int vi_room_id,
                                              MediaBridgeDesc& med)
{
        template10(status, vi_room_id, med);
} void OE_EveVIServerDropped::action(char status, int vi_room_id,
                                              MediaBridgeDesc& med)
{
        template10(status, vi_room_id, med);
} void OE_EveVIMeetingResumed::action(char status, int vi_room_id)
{
        template3(status, vi_room_id);
} void OE_EveVILeftMeeting::action(char status, int vi_room_id,
                                              int participant, MediaBridgeDescList& med)
{
        template4(status, vi_room_id, participant);
} void OE_EveVIReenterMeeting::action(char status, int vi_room_id,
                                              int participant, MediaBridgeDescList& med)
{
        template4(status, vi_room_id, participant);
} void OE_EveMeetingDestroyed::action(int room_id, int meeting_id)
{
        template2(room_id, meeting_id);
} void OE_EveVIMeetingDestroyed::action(char status, int vi_room_id)
{
        template3(status, vi_room_id);
```

```cpp
void OE_EveVIAddedParticipant::action(char status, int real_room_id,
                    int real_meeting_id, int vi_room_id,
                    int participant, MediaBridgeDescList& med)
{
        rep_buf[rep_len++] = status;
        Conv->IntToBuf(real_room_id, (((char *)rep_buf)+rep_len));
        rep_len += 4;
        Conv->IntToBuf(real_meeting_id, (((char *)rep_buf)+rep_len));
        rep_len += 4;
        comm_template1(vi_room_id, participant, med);
} void OE_EveVIJoinMeeting::action(int vi_room_id, int participant)
{
        Conv->IntToBuf(vi_room_id, (((char *)rep_buf)+rep_len));
        rep_len += 4;
        Conv->IntToBuf(participant, (((char *)rep_buf)+rep_len));
        rep_len += 4;

rep_len = (len_in_CARD32(rep_len))<<2;
        set_msg_len(rep_len);
        set_msg_data((char *)rep_buf);
        send();
} void OE_EveMulticast::action(List(int)& plist, OutgoingMessage *msg)
{
        int p;

// event len
        Conv->IntToBuf((msg->msg_header_len() + msg->msg_len()),
                                (((char *)rep_buf)+rep_len));
        rep_len += 4;

// list length
        Conv->IntToBuf(plist.length(), (((char *)rep_buf)+rep_len));
        rep_len += 4;

plist.reset();
        while (plist.next(p)){
                Conv->IntToBuf(p, (((char *)rep_buf)+rep_len));
                rep_len += 4;
        } bcopy(msg->msg_header(), (((char *)rep_buf)+rep_len),
                        msg->msg_header_len());
        rep_len += msg->msg_header_len();
        bcopy(msg->msg_data(), (((char *)rep_buf)+rep_len), msg->msg_len());
        rep_len += msg->msg_len();

rep_len = (len_in_CARD32(rep_len))<<2;
        set_msg_len(rep_len);
        set_msg_data((char *)rep_buf);
        send();
} void OE_EveVIListRooms::action(char *packet, int len)
{
        template8(packet, len);
} void OE_EveVIListMeetings::action(char *packet, int len)
{
        template8(packet, len);
```

```
   OE_EveVIShowMeetingStatus::action(char *packet, int len)
        template8(packet, len);
} void OE_EveVIShowMeetRoomStatus::action(char *packet, int len)
{
        template8(packet, len);
}

// Events to Local Media Managers void OE_EveConnectToBridge::action(int room_id, String& machine, int port)
{
        template7(room_id, machine, port);
} void OE_EveDisconnectFromBridge::action(int room_id, String& machine, int port)
{
        template7(room_id, machine, port);
} include <controller.h>
include <proto.h>

Protocol::Protocol(Controller *ctrl)
{
        Ctrl = ctrl;
        Conv = Ctrl->Conv();
        for (int i = 0; i < MAX_MSG_TYPES; i++){
                for (int j = 0; j < MAX_MSGS; j++){
                        switch (i) {
                        case ERROR_MR_SERVER:
                        case ERROR_REGISTRY_SERVER:
                        case ERROR_MAN:
                        case ERROR_CM:
                        case ERROR_VI:
                                Gen_func_tab[i][j] = Gen_ErrMsg;
                                break;

default:
                                Gen_func_tab[i][j] = default_generator;
                                break;
                        }
                }
        }

Gen_func_tab[REPLY_MR_SERVER][MR_CREATE_ROOM] = Gen_IR_CreateRoom;
        Gen_func_tab[REPLY_MR_SERVER][MR_CREATE_MEETING] = Gen_IR_CreateMeeting;
        Gen_func_tab[REPLY_MR_SERVER][MR_ADD_SERVER] = Gen_IR_AddServer;
        Gen_func_tab[REPLY_MR_SERVER][MR_DROP_SERVER] = Gen_IR_DropServer;
        Gen_func_tab[REPLY_MR_SERVER][MR_ADD_PARTICIPANT] = Gen_IR_AddParticipant;
        Gen_func_tab[REPLY_MR_SERVER][MR_DROP_PARTICIPANT] = Gen_IR_DropParticipant;
        Gen_func_tab[REPLY_MR_SERVER][MR_SUSPEND_MEETING] = Gen_IR_SuspendMeeting;
        Gen_func_tab[REPLY_MR_SERVER][MR_REENTER_MEETING] = Gen_IR_ReenterMeeting;
        Gen_func_tab[REPLY_MR_SERVER][MR_RESUME_MEETING] = Gen_IR_ResumeMeeting;
        Gen_func_tab[REPLY_MR_SERVER][MR_LIST_ROOMS] = Gen_IR_ListRooms;
        Gen_func_tab[REPLY_MR_SERVER][MR_LIST_MEETINGS] = Gen_IR_ListMeetings;
        Gen_func_tab[REPLY_MR_SERVER][MR_LIST_SERVERS] = Gen_IR_ListServers;
        Gen_func_tab[REPLY_MR_SERVER][MR_SHOW_MEETING_STATUS] = Gen_IR_ShowMeetingStatus;
        Gen_func_tab[REPLY_MR_SERVER][MR_SHOW_MEETROOM_STATUS] = Gen_IR_ShowMeetRoomStatus;
        Gen_func_tab[REPLY_MR_SERVER][MR_DESTROY_MEETING] = Gen_IR_DestroyMeeting;
```

```
    Gen_func_tab[REPLY_MR_SERVER][MR_DESTROY_ROOM] = Gen_IR_DestroyRoom;
    Gen_func_tab[REPLY_REGISTRY_SERVER][REG_GET_PERSON_INFO] = Gen_IR_GetPersonInfo;

Gen_func_tab[REPLY_VI][VI_MEETING_INVITATION] = Gen_IR_VIMeetingInvitation;
    Gen_func_tab[EVENT_VI][EVE_CREATE_MEETING] = Gen_IE_EveCreateMeeting;
    Gen_func_tab[EVENT_VI][EVE_CREATE_PERSISTENT_MEETING] = Gen_IE_EveCreatePersistentMeeting;
    Gen_func_tab[EVENT_VI][EVE_VI_CREATE_MEET_IN_EROOM] = Gen_IE_EveVICreateMeetInERoom;
    Gen_func_tab[EVENT_VI][EVE_VI_JOIN_MEETING] = Gen_IE_EveVIJoinMeeting;
    Gen_func_tab[EVENT_VI][EVE_JOIN_MEETING_REJECTED] = Gen_IE_EveVIJoinMeetingRejected;
    Gen_func_tab[EVENT_VI][EVE_VI_ADD_PARTICIPANT] = Gen_IE_EveVIAddParticipant;
    Gen_func_tab[EVENT_VI][EVE_VI_DROP_PARTICIPANT] = Gen_IE_EveVIDropParticipant;
    Gen_func_tab[EVENT_VI][EVE_VI_SUSPEND_MEETING] = Gen_IE_EveVISuspendMeeting;
    Gen_func_tab[EVENT_VI][EVE_VI_RESUME_MEETING] = Gen_IE_EveVIResumeMeeting;
    Gen_func_tab[EVENT_VI][EVE_VI_REENTER_MEETING] = Gen_IE_EveVIReenterMeeting;
    Gen_func_tab[EVENT_VI][EVE_VI_LEAVE_MEETING] = Gen_IE_EveVILeaveMeeting;
    Gen_func_tab[EVENT_VI][EVE_VI_ADD_SERVER] = Gen_IE_EveVIAddServer;
    Gen_func_tab[EVENT_VI][EVE_VI_DROP_SERVER] = Gen_IE_EveVIDropServer;
    Gen_func_tab[EVENT_VI][EVE_VI_DESTROY_MEETING] = Gen_IE_EveVIDestroyMeeting;
    Gen_func_tab[EVENT_VI][EVE_VI_LIST_ROOMS] = Gen_IE_EveVIListRooms;
    Gen_func_tab[EVENT_VI][EVE_VI_LIST_MEETINGS] = Gen_IE_EveVIListMeetings;
    Gen_func_tab[EVENT_VI][EVE_VI_SHOW_ASSOC_MEETING] = Gen_IE_EveVIShowAssocRoom;
    Gen_func_tab[EVENT_VI][EVE_VI_GET_PERSON_NAME] = Gen_IE_EveVIGetPersonName;
    Gen_func_tab[EVENT_VI][EVE_VI_GET_PERSON_ID] = Gen_IE_EveVIGetPersonId;
    Gen_func_tab[EVENT_VI][EVE_VI_GET_PERSON_ID] = Gen_IE_EveVIGetPersonId;
    Gen_func_tab[EVENT_VI][EVE_VI_UP] = Gen_IE_EveVIUp;
    Gen_func_tab[EVENT_VI][EVE_VI_DOWN] = Gen_IE_EveVIDown;
    Gen_func_tab[EVENT_VI][EVE_VI_SHOW_MEETING_STATUS] = Gen_IE_EveVIShowMeetingStatus;
    Gen_func_tab[EVENT_VI][EVE_VI_SHOW_MEETROOM_STATUS] = Gen_IE_EveVIShowMeetRoomStatus;

Gen_func_tab[EVENT_CM][EVE_MEETING_INVITE] = Gen_IE_EveMeetingInvite;
    Gen_func_tab[EVENT_CM][EVE_ACCEPT_INVITATION] = Gen_IE_EveAcceptInvitation;
    Gen_func_tab[EVENT_CM][EVE_REJECT_INVITATION] = Gen_IE_EveRejectInvitation;
    Gen_func_tab[EVENT_CM][EVE_SERVER_ADDED] = Gen_IE_EveServerAdded;
    Gen_func_tab[EVENT_CM][EVE_SERVER_DROPPED] = Gen_IE_EveServerDropped;
    Gen_func_tab[EVENT_CM][EVE_ROOM_DESTROYED] = Gen_IE_EveRoomDestroyed;
    Gen_func_tab[EVENT_CM][EVE_MEETING_DESTROYED] = Gen_IE_EveMeetingDestroyed;
    Gen_func_tab[EVENT_CM][EVE_ADDED_PARTICIPANT] = Gen_IE_EveAddedParticipant;
    Gen_func_tab[EVENT_CM][EVE_DROPPED_PARTICIPANT] = Gen_IE_EveDroppedParticipant;
    Gen_func_tab[EVENT_CM][EVE_ROOM_LOCKED] = Gen_IE_EveRoomLocked;
    Gen_func_tab[EVENT_CM][EVE_ROOM_UNLOCKED] = Gen_IE_EveRoomUnlocked;
    Gen_func_tab[EVENT_CM][EVE_LEFT_MEETING] = Gen_IE_EveLeftMeeting;
    Gen_func_tab[EVENT_CM][EVE_REENTER_MEETING] = Gen_IE_EveReenterMeeting;
    Gen_func_tab[EVENT_CM][EVE_MEETING_SUSPENDED] = Gen_IE_EveMeetingSuspended;
    Gen_func_tab[EVENT_CM][EVE_MEETING_RESUMED] = Gen_IE_EveMeetingResumed;
    Gen_func_tab[EVENT_CM][EVE_JOIN_MEETING] = Gen_IE_EveJoinMeeting;
    Gen_func_tab[EVENT_CM][EVE_JOIN_MEETING_REJECTED] = Gen_IE_EveJoinMeetingRejected;

Gen_func_tab[EVENT_MAN][EVE_MAN_UP] = Gen_IE_EveLMUp;
    Gen_func_tab[EVENT_MAN][EVE_STATE_CHANGE] = Gen_IE_EveLMStateChange;

} void Protocol::interpret_header(char *header, CARD8& type,
            CARD8& opcode, CARD32& seq, CARD32& len)
{
    int tmp;

type = header[MSG_HOFFSET_TYPE];
    opcode = header[MSG_HOFFSET_CODE];
    if (type < 0 || type > MAX_MSG_TYPES) type = 0;
    if (opcode < 0 || opcode > MAX_MSGS) opcode = 0;
    seq = Conv->BufToInt(header+MSG_HOFFSET_SEQ);
    tmp = Conv->BufToInt(header+MSG_HOFFSET_LEN);
    len = tmp<<MSG_UNIT;
}
```

```
IncomingMessage * Protocol::construct_msg(CARD8 type, CARD8 opcode,
                                CARD32 seq, CARD32 len, char *data, Connection *conn)
{
        if (type >= MAX_MSG_TYPES || opcode >= MAX_MSGS){
                cout << "Illegal Type/Opcode: " << (int)type << " " << (int)opcode << endl;
                type = REQUEST_GEN_SERVER; opcode = MAX_MSGS-1;
        }
        return(Gen_func_tab[(int)type][(int)opcode](type, opcode, seq,
} int Protocol::register_msg_proc(CARD8 type, CARD8 opcode,
                IncomingMessagePtr (*msg_proc)(CARD8 type, CARD8 opcode,
                    CARD32 seq, CARD32 len, char *data, Connection *conn))
{
        if (type >= MAX_MSG_TYPES || opcode >= MAX_MSGS)
                return(-1);

Gen_func_tab[(int)type][(int)opcode] = msg_proc;
        return(0);
} define STATE_MACH_TEST include <state.h>
include <obj_man.h> int RoomFsm::terminate_action(InterObjectBuffer& iob)
{
        return(E6_action(iob));
} int RoomFsm::E1_action(InterObjectBuffer& iob)
{
        next_msg_prepare();
        req_media = iob.eve_create_meeting.med;
        last_part_id = iob.eve_create_meeting.participant;
        scenario = (iob.msg_code == EVE_CREATE_MEETING) ?
                                TRANSIENT_MEETING : PERSISTENT_MEETING;

#ifdef STATE_MACH_TEST
        cout << "                        ********   LAST SEQ: " << last_seq << endl;
        cout << "Room: " << vi_room_id << " " << real_room_id << " E1_action:   " << endl;
        cout << "Send MR_CREATE_ROOM to MR: NS = " <<
                req_media.length() << "  Scene: " << scenario << endl;
endif RMgr->Control()->MRMgr()->CreateRoom(last_seq,
                                                iob.eve_create_meeting.attrib
                                                iob.eve_create_meeting.room_n
        return(SUCCESS);
} int RoomFsm::E2_action(InterObjectBuffer& iob)
{
        next_msg_prepare();
        last_part_id = iob.eve_create_meeting_in_eroom.participant;
        scenario = PERSISTENT_MEETING;

#ifdef STATE_MACH_TEST
        cout << "                        ********   LAST SEQ: " << last_seq << endl;
        cout << "Room: " << vi_room_id << " " << real_room_id << " E2_action:   " << endl;
        cout << "Send MR_LIST_SERVERS to MR: NS = " <<
```

```cpp
                    req_media.length() << "   Scene: " << scenario << endl;
endif RMgr->Control()->MRMgr()->ListServers(last_seq, real_room_id);
        return(SUCCESS);
} int RoomFsm::E3_action(InterObjectBuffer& iob)
{
        List(int) plist;
        next_msg_prepare();

#ifdef STATE_MACH_TEST
        cout << "                         ********  LAST SEQ: " << last_seq << endl;
        cout << "Room: " << vi_room_id << " " << real_room_id << " E3_action: " << endl;
        cout << "Send EVE_JOIN_MEETING to owner CM: " <<
                        iob.eve_vi_join_meeting.owner  << endl;
endif plist.insert_next(iob.eve_vi_join_meeting.owner);
        RMgr->Control()->ENMgr()->JoinMeeting(real_room_id,
                                        iob.eve_vi_join_meeting.meet_id, plist);
        set_invite_timer(INVITE_TIMEOUT);
        return(SUCCESS);
} int RoomFsm::E4_action(InterObjectBuffer& iob)
{
        next_msg_prepare();
        real_room_id = iob.eve_meeting_invite.room_id;
        req_media = iob.eve_meeting_invite.med;
        peer_part_id = iob.eve_meeting_invite.participant;
        meeting = new Meeting(iob.eve_meeting_invite.meeting_id, this, RMgr);
        if (!meeting) {
                cout << "Fatal Mem Alloc Error: " << __FILE__ << (int)__LINE__ << endl;
        }
        meeting->add_participant(RMgr->MySelf(), req_media);

List_of_piter(PartMediaBridgeDescList) plist(iob.eve_meeting_invite.part_med);
        PartMediaBridgeDescList *p;
        plist.reset();
        while (plist.next(p)){
#ifdef DEBUG
        cout << "Recvd. EveMeetingInvite: Part: " << p->Participant() << endl;
#endif
                meeting->add_participant(p->Participant(), p->MediaList());
        } ifdef STATE_MACH_TEST
        cout << "                         ********  LAST SEQ: " << last_seq << endl;
        cout << "Room: " << vi_room_id << " " << real_room_id << " E4_action: " << endl;
        cout << "Send REQ_VI_MEETING_INVITATION to VI: NumServers: " <<
                        req_media.num_yet_to_service() << endl;
endif RMgr->Control()->VIMgr()->MeetingInvite(last_seq, real_room_id,
                        meeting->Id(), peer_part_id, req_media,
                        iob.eve_meeting_invite.part_med,
                        iob.eve_meeting_invite.part_name);
        return(SUCCESS);
} int RoomFsm::E5_action(InterObjectBuffer& iob)
{
        next_msg_prepare();
```

```cpp
                real_room_id = iob.Rep_mr_create_room.room_id;

#ifdef STATE_MACH_TEST
        cout << "                                ********  LAST SEQ: " << last_seq << endl;
        cout << "Room: " << vi_room_id << " " << real_room_id << " E5_action: " << endl;
        cout << "Send MR_ADD_SERVER to MR: NumServers: " << req_media.num_yet_to_service() <<
        cout << "Yet to service: " << req_media.num_yet_to_service() << endl;
endif MediaBridgeDesc *b;
        if (req_media.next_bridge_to_service(b) == SUCCESS) {
#ifdef STATE_MACH_TEST
            cout << "Media: " << (int)b->m << " Udesc: " << b->udesc << endl;
#endif
                RMgr->Control()->MRMgr()->AddServer(last_seq, real_room_id,
                                                                                  b->m,
        }
        return(SUCCESS);
} int RoomFsm::E6_action(InterObjectBuffer& iob)
{ ifdef STATE_MACH_TEST
        cout << "                                ********  LAST SEQ: " << last_seq << endl;
        cout << "Room: " << vi_room_id << " " << real_room_id << " E6/E33/E56/E37: " << endl.
        cout << "Send DestroyMeeting " << endl;
        cout << "Terminating FSM..." << endl;
endif if (scenario == PERSISTENT_MEETING) {
                if (meeting) {
                        next_msg_prepare();
                        RMgr->Control()->MRMgr()->DestroyMeeting(last_seq, meeting->Id());
                        RMgr->Control()->ENMgr()->MeetingDestroyed(real_room_id,
                                meeting->Id(), meeting->PartListWithoutMe());
                }
        }
        else {
                MediaBridgeDesc *b;
                if (full_media.next_bridge_to_service(b) == SUCCESS) {
                        next_msg_prepare();
                        RMgr->Control()->MRMgr()->DropServer(last_seq, real_room_id,
                                                                b->m, b->udesc);
                        RMgr->Control()->LMMgr()->DisconnectFromBridge(
                                                real_room_id, b->m, b->udesc,
                                                b->machine, b->port);
                }
                if (meeting) {
                        next_msg_prepare();
                        if (my_room) {
                                RMgr->Control()->MRMgr()->DestroyRoom(last_seq, real_room_id);
                                RMgr->Control()->ENMgr()->RoomDestroyed(real_room_id,
                                                                meeting->PartListWith(
                        }
                        else {
                                RMgr->Control()->MRMgr()->DestroyMeeting(last_seq,
                                                meeting->Id());
                                RMgr->Control()->ENMgr()->MeetingDestroyed(real_room_id,
                                                meeting->Id(), meeting->PartListWithoutMe())''
                        }
                }
        }
        RMgr->Control()->VIMgr()->MeetingDestroyed(1, vi_room_id);
        // Actually we should have some state bef. terminate to wait
        // for the success reply of MR??   284
```

```
                return(SUCCESS);
} int RoomFsm::E68_action(InterObjectBuffer& iob)
{
ifdef STATE_MACH_TEST
        cout << "                        ********  LAST SEQ: " << last_seq << endl;
        cout << "Room: " << vi_room_id << " " << real_room_id << " E68: " << endl;
        cout << "Send DestroyRoom" << endl;
        cout << "Terminating FSM..." << endl;
endif MediaBridgeDesc *b;
        if (full_media.next_bridge_to_service(b) == SUCCESS) {
                next_msg_prepare();
                RMgr->Control()->MRMgr()->DropServer(last_seq, real_room_id,
                                                                b->m, b->udesc);
                RMgr->Control()->LMMgr()->DisconnectFromBridge(
                                                real_room_id, b->m, b->udesc,
                                                b->machine, b->port);
        }
        next_msg_prepare();
        List(int) plist;
        plist.insert_next(last_part_id);
        RMgr->Control()->MRMgr()->DestroyRoom(last_seq, real_room_id);
        RMgr->Control()->ENMgr()->RoomDestroyed(real_room_id, plist);

RMgr->Control()->VIMgr()->MeetingDestroyed(1, vi_room_id);

return(SUCCESS);
} int RoomFsm::E7_action(InterObjectBuffer& iob)
{
        next_msg_prepare();
        req_media.update_prev_request(iob.Rep_mr_add_server.machine,
                                        iob.Rep_mr_add_server.port, MEDIA_SET);

#ifdef STATE_MACH_TEST
        cout << "                        ********  LAST SEQ: " << last_seq << endl;
        cout << "Room: " << vi_room_id << " " << real_room_id << " E60/E7_action: " << endl;
        cout << "Send MAN_CONNECT_TO_BRIDGE: " << iob.Rep_mr_add_server.machine << " " <<
                        iob.Rep_mr_add_server.port << endl;
        cout << "Send MR_ADD_SERVER to MR: NumServers: " << req_media.num_yet_to_service() <<
endif RMgr->Control()->LMMgr()->ConnectToBridge(
                                real_room_id,
                                req_media.LastMedia()->m,
                                req_media.LastMedia()->udesc,
                                req_media.LastMedia()->machine,
                                req_media.LastMedia()->port);

MediaBridgeDesc *b;
        if (req_media.next_bridge_to_service(b) == SUCCESS) {
#ifdef STATE_MACH_TEST
                cout << "Media: " << (int)b->m << " Udesc: " << b->udesc << endl;
#endif
                RMgr->Control()->MRMgr()->AddServer(last_seq, real_room_id,
                                                                                        b->m
        }
        return(SUCCESS);
} int RoomFsm::E8_action(InterObjectBuffer& iob)
```

```
              full_media = req_media;

meeting = new Meeting(iob.Rep_mr_create_meeting.meeting_id,
                                                       this, RMgr);
              if (!meeting) {
                      cout << "Fatal Mem Alloc Error: " << __FILE__ << (int)__LINE__ << endl;
              }
              meeting->add_participant(RMgr->MySelf(), req_media);
#ifdef STATE_MACH_TEST
              cout << "                              ********  LAST SEQ: " << last_seq << endl;
              cout << "Room: " << vi_room_id << " " << real_room_id << " Meet: "
                   << meeting->Id() << " E8_action: " << endl;
              cout << "MEETING IN PROGRESS....";
endif
              RMgr->Control()->VIMgr()->AddedParticipant(1, real_room_id,
                                                        meeting->Id(), vi_room_id,
                                                        last_part_id, req_media);

return(SUCCESS);
} int RoomFsm::E12_action(InterObjectBuffer& iob)
{
ifdef STATE_MACH_TEST
        cout << "Room: " << vi_room_id << " " << real_room_id << " E12_action: " << endl;
        cout << "Send EVE_DROPPED_PARTICIPANT to VI" <<
                      iob.template1.participant << endl;
endif RMgr->Control()->VIMgr()->DroppedParticipant(1, vi_room_id,
                                                    iob.template1.participant);
        RMgr->Control()->ENMgr()->DroppedParticipant(real_room_id,
                                       meeting->Id(), iob.template1.participant,
                                       meeting->PartListWithoutMe());

return(SUCCESS);
} int RoomFsm::E15_action(InterObjectBuffer& iob)
{
ifdef STATE_MACH_TEST
        cout << "                              ********  LAST SEQ: " << last_seq << endl;
        cout << "Room: " << vi_room_id << " " << real_room_id << " E15_action: " << endl;
        cout << "Send MR_SUSPEND_MEETING to MR" << endl;
endif next_msg_prepare();
        RMgr->Control()->MRMgr()->SuspendMeeting(last_seq, meeting->Id());

return(SUCCESS);
} int RoomFsm::E16_action(InterObjectBuffer& iob)
{
ifdef STATE_MACH_TEST
        cout << "                              ********  LAST SEQ: " << last_seq << endl;
        cout << "Room: " << vi_room_id << " " << real_room_id << " E16_action: " << endl;
        cout << "Send EVE_MEETING_SUSPENDED fail to VI" << endl;
endif RMgr->Control()->VIMgr()->MeetingSuspended(0, vi_room_id);

return(SUCCESS);
} int RoomFsm::E17_action(InterObjectBuffer& iob)
```

```
{
ifdef STATE_MACH_TEST
        cout << "                                    ********   LAST SEQ: " << last_seq << endl;
        cout << "Room: " << vi_room_id << " " << real_room_id << " E17_action: " << endl;
        cout << "Send EVE_MEETING_SUSPENDED to peer CMs/VI" << endl;
endif RMgr->Control()->VIMgr()->MeetingSuspended(1, vi_room_id);
        RMgr->Control()->ENMgr()->MeetingSuspended(real_room_id,
                            meeting->Id(), meeting->PartListWithoutMe());

return(SUCCESS);
} int RoomFsm::E19_action(InterObjectBuffer& iob)
{
ifdef STATE_MACH_TEST
        cout << "                                    ********   LAST SEQ: " << last_seq << endl;
        cout << "Room: " << vi_room_id << " " << real_room_id << " E19_action: " << endl;
        cout << "Send EVE_MEETING_RESUMED to VI" << endl;
endif RMgr->Control()->VIMgr()->MeetingResumed(1, vi_room_id);

return(SUCCESS);
} int RoomFsm::E13_action(InterObjectBuffer& iob)
{
        return(E57_action(iob));
} int RoomFsm::E14_action(InterObjectBuffer& iob)
{
        return(E34_action(iob));
} int RoomFsm::E29_action(InterObjectBuffer& iob)
{
ifdef STATE_MACH_TEST
        cout << "                                    ********   LAST SEQ: " << last_seq << endl;
        cout << "Room: " << vi_room_id << " " << real_room_id << " E29_action: " << endl;
        cout << "Send EVE_JOIN_MEETING_REJECTED to VI : " << endl;
#endif
//      RMgr->Control()->VIMgr()->JoinMeetingRejected(vi_room_id);
        return(SUCCESS);
} int RoomFsm::E33_action(InterObjectBuffer& iob)
{
        return(E6_action(iob));
} int RoomFsm::E37_action(InterObjectBuffer& iob)
{
        return(E6_action(iob));
} int RoomFsm::E38_action(InterObjectBuffer& iob)
{
        return(E59_action(iob));
} int RoomFsm::E39_action(InterObjectBuffer& iob)
{
#ifdef STATE_MACH_TEST                  287
```

```
                cout << "                         ********   LAST SEQ: " << last_seq << endl;
                cout << "Room: " << vi_room_id << " " << real_room_id << " E39/E40/E76: " << endl;
                cout << "Send EVE_VI_ADDED_PARTICIPANT failed" << endl;
endif RMgr->Control()->VIMgr()->AddedParticipant(0, -1, -1, vi_room_id,
                                                                        last_part_id, return(SUCCESS);
} int RoomFsm::E40_action(InterObjectBuffer& iob)
{
        return(E39_action(iob));
} int RoomFsm::E45_action(InterObjectBuffer& iob)
{
ifdef STATE_MACH_TEST
        cout << "                         ********   LAST SEQ: " << last_seq << endl;
        cout << "Room: " << vi_room_id << " " << real_room_id << " E45_action: " << endl;
        cout << "Send MR_RESUME_MEETING to MR" << endl;
endif next_msg_prepare();
        RMgr->Control()->MRMgr()->ResumeMeeting(last_seq, meeting->Id());

return(SUCCESS);
} int RoomFsm::E46_action(InterObjectBuffer& iob)
{
ifdef STATE_MACH_TEST
        cout << "                         ********   LAST SEQ: " << last_seq << endl;
        cout << "Room: " << vi_room_id << " " << real_room_id << " E46_action: " << endl;
        cout << "Send EVE_MEETING_RESUMED to peer CMs/VI" << endl;
endif RMgr->Control()->VIMgr()->MeetingResumed(1, vi_room_id);
        RMgr->Control()->ENMgr()->MeetingResumed(real_room_id,
                                meeting->Id(), meeting->PartListWithoutMe());

return(SUCCESS);
} int RoomFsm::E47_action(InterObjectBuffer& iob)
{
ifdef STATE_MACH_TEST
        cout << "                         ********   LAST SEQ: " << last_seq << endl;
        cout << "Room: " << vi_room_id << " " << real_room_id << " E47_action: " << endl;
        cout << "Send EVE_MEETING_RESUMED failed to VI" << endl;
endif RMgr->Control()->VIMgr()->MeetingResumed(0, vi_room_id);

return(SUCCESS);
} int RoomFsm::E56_action(InterObjectBuffer& iob)
{
        return(E6_action(iob));
} int RoomFsm::E58_action(InterObjectBuffer& iob)
{
        return(E68_action(iob));
```

288

```cpp
int RoomFsm::E9_action(InterObjectBuffer& iob)
{
        return(E32_action(iob));
} int RoomFsm::E10_action(InterObjectBuffer& iob)
{
        next_msg_prepare();

// this is the time to fill full_media as we would have
        // added all needed servers. Note that full_media should
        // also be updated whenever we add a new server
        full_media = req_media;

meeting = new Meeting(iob.Rep_mr_create_meeting.meeting_id,
                                                this, RMgr);
        if (!meeting) {
                cout << "Fatal Mem Alloc Error: " << __FILE__ << (int)__LINE__ << endl;
        }
        meeting->add_participant(RMgr->MySelf(), req_media);

#ifdef STATE_MACH_TEST
        cout << "                        ********   LAST SEQ: " << last_seq << endl;
        cout << "Room: " << vi_room_id << " " << real_room_id << " E10_action: " << endl;
        cout << "Send MR_GET_PERSON_INFO to MR for meeting: " << meeting->Id() << endl;
#endif
        RMgr->Control()->MRMgr()->GetPersonInfo(last_seq, last_part_id);
        return(SUCCESS);
} int RoomFsm::E25_action(InterObjectBuffer& iob)
{
        vi_room_id = iob.Rep_vi_meeting_invitation.vi_room_id;
        accepted_media = iob.Rep_vi_meeting_invitation.med;
        req_media.update_applicable_media(accepted_media);
        my_room = 0;

#ifdef STATE_MACH_TEST
        cout << "                        ********   LAST SEQ: " << last_seq << endl;
        cout << "Room: " << vi_room_id << " " << real_room_id << " E25_action: " << endl;
        cout << "Send EVE_ACCEPT_INVITATION to calling CM: NumServers: " << accepted_media.le
        cout << "*** WAIT STATE ***" << endl;
endif List(int) plist;
        plist.insert_next(peer_part_id);
        RMgr->Control()->ENMgr()->AcceptInvitation(real_room_id,
                                meeting->Id(), accepted_media, plist);
        set_invite_timer(INVITE_TIMEOUT);
        return(SUCCESS);
} int RoomFsm::E26_action(InterObjectBuffer& iob)
{
        next_msg_prepare();
#ifdef STATE_MACH_TEST
        cout << "                        ********   LAST SEQ: " << last_seq << endl;
        cout << "Room: " << vi_room_id << " " << real_room_id << " E26_action: " << endl;
        cout << "MEETING IN PROGRESS ... " << endl;
endif MediaBridgeDesc *b;
        int nserv = iob.eve_added_participant.med.length();
```

```cpp
            for (;nserv; nserv--) {
                if (iob.eve_added_participant.med.next_bridge_to_service(b) == SUCCESS) {
                    if (accepted_media.is_present(b)) {
#ifdef STATE_MACH_TEST
                        cout << "Send MAN_CONNECT_TO_BRIDGE for Media: " << (int)b->m
                             << " Udesc: " << b->udesc << " Addr: " <<
                             b->machine << "::" << b->port << endl;
#endif
                        RMgr->Control()->LMMgr()->ConnectToBridge(
                                real_room_id, b->m, b->udesc, b->machine, b->port);
                    }
                }
        }
        return(SUCCESS);
} int RoomFsm::E27_action(InterObjectBuffer& iob)
{ ifdef STATE_MACH_TEST
        cout << "                                ********* LAST SEQ: " << last_seq << endl;
        cout << "Room: " << vi_room_id << " " << real_room_id << " E27_action: " << endl;
        cout << "Send EVE_REJECT_INVITATION to calling CM" << endl;
endif RMgr->Control()->ENMgr()->RejectInvitation(real_room_id,
                        meeting->Id(), meeting->PartListWithoutMe());

return(SUCCESS);
} int RoomFsm::E31_action(InterObjectBuffer& iob)
{
        next_msg_prepare();
        real_room_id = iob.Rep_mr_create_room.room_id;

#ifdef STATE_MACH_TEST
        cout << "                                ********* LAST SEQ: " << last_seq << endl;
        cout << "Room: " << vi_room_id << " " << real_room_id << " E31_action: " << endl;
        cout << "Send MR_CREATE_MEETING to MR " << endl;
endif
        RMgr->Control()->MRMgr()->CreateMeeting(last_seq, real_room_id);
        return(SUCCESS);
} int RoomFsm::E32_action(InterObjectBuffer& iob)
{
        next_msg_prepare();
        req_media.update_prev_request(iob.Rep_mr_add_server.machine,
                                        iob.Rep_mr_add_server.port, MEDIA_SET)

#ifdef STATE_MACH_TEST
        cout << "                                ********* LAST SEQ: " << last_seq << endl;
        cout << "Room: " << vi_room_id << " " << real_room_id << " E9/E32_action: " << endl;
        cout << "Send MAN_CONNECT_TO_BRIDGE: " << iob.Rep_mr_add_server.machine << " " <<
                        iob.Rep_mr_add_server.port << endl;
        cout << "Send MR_CREATE_MEETING to MR " << endl;
endif
        RMgr->Control()->LMMgr()->ConnectToBridge(
                        real_room_id,
                        req_media.LastMedia()->m,
                        req_media.LastMedia()->udesc,
                        req_media.LastMedia()->machine,
                        req_media.LastMedia()->port);

RMgr->Control()->MRMgr()->CreateMeeting(last_seq, real_room_id);
```

```
            return(SUCCESS);
} int RoomFsm::E34_action(InterObjectBuffer& iob)
{
        meeting->add_participant(last_part_id, accepted_media);
        full_media.update_applicable_media(accepted_media);
#ifdef STATE_MACH_TEST
        cout << "                              ********  LAST SEQ: " << last_seq << endl;
        cout << "Room: " << vi_room_id << " " << real_room_id << " Meet: "
                << meeting->Id() << " E14/E34_action:  " << endl;
        cout << "Send EVE_ADDED_PARTICIPANT to all peer CMs: NumServers: "
                << accepted_media.length() << endl;
        cout << "Send EVE_VI_ADDED_PARTICIPANT success to VI" <<
                                last_part_id << endl;
        cout << "MEETING IN PROGRESS....";
endif RMgr->Control()->VIMgr()->AddedParticipant(1,
                                                real_room_id, meeting->Id(), vi_room_:
                                                last_part_id, accepted_media);
        RMgr->Control()->ENMgr()->AddedParticipant(real_room_id, meeting->Id(),
                        last_part_id, accepted_media, meeting->PartListWithoutMe());
        return(SUCCESS);
} int RoomFsm::E41_action(InterObjectBuffer& iob)

ifdef STATE_MACH_TEST
        cout << "                              ********  LAST SEQ: " << last_seq << endl;
        cout << "Room: " << vi_room_id << " " << real_room_id << " E41_action:  " << endl;
        cout << "Send MR_LEAVE_MEETING to MR" << endl;
endif next_msg_prepare();
        RMgr->Control()->MRMgr()->LeaveMeeting(last_seq, meeting->Id(),
                                                        req_media); // last par. is d
        RMgr->Control()->ENMgr()->MeetingLeft(real_room_id, meeting->Id(),
                                RMgr->MySelf(), req_media,
                                meeting->PartListWithoutMe());

return(SUCCESS);
} int RoomFsm::E42_action(InterObjectBuffer& iob)
{
ifdef STATE_MACH_TEST
        cout << "                              ********  LAST SEQ: " << last_seq << endl;
        cout << "Room: " << vi_room_id << " " << real_room_id << " E41_action:  " << endl;
        cout << "Send MR_REENTER_MEETING to MR" << endl;
endif //      leave_media = iob.eve_vi_add_participant.med;

next_msg_prepare();
        RMgr->Control()->MRMgr()->ReenterMeeting(last_seq, meeting->Id(),
                                                        leave_media);

return(SUCCESS);
} int RoomFsm::E43_action(InterObjectBuffer& iob)
{
ifdef STATE_MACH_TEST
        cout << "                              ********  LAST SEQ: " << last_seq << endl;
        cout << "Room: " << vi_room_id << " " << real_room_id << " E41_action:  " << endl;
```

291

```
                cout << "Send EVE_REENTER MEETING to all peer CMs and VI" << endl;
endif RMgr->Control()->VIMgr()->MeetingReentered(1, vi_room_id,
                                        RMgr->MySelf(), leave_media);
        RMgr->Control()->ENMgr()->MeetingReentered(real_room_id,
                                        meeting->Id(), RMgr->MySelf(), leave_media,
                                        meeting->PartListWithoutMe());

return(SUCCESS);
} int RoomFsm::E44_action(InterObjectBuffer& iob)
{
ifdef STATE_MACH_TEST
        cout << "                         ********  LAST SEQ: " << last_seq << endl;
        cout << "Room: " << vi_room_id << " " << real_room_id << " E41_action: " << endl;
        cout << "Send EVE_REENTER MEETING fail to VI" << endl;
endif RMgr->Control()->VIMgr()->MeetingReentered(0, vi_room_id,
                                        RMgr->MySelf(), leave_media);

return(SUCCESS);
} int RoomFsm::E48_action(InterObjectBuffer& iob)
{
        next_msg_prepare();

#ifdef STATE_MACH_TEST
        cout << "                         ********  LAST SEQ: " << last_seq << endl;
        cout << "Room: " << vi_room_id << " " << real_room_id << " E48_action: " << endl;
        cout << "Send MR_ADD_SERVER : " << iob.eve_vi_add_server.med.udesc << " " << iob.eve_
endif last_med = iob.eve_vi_add_server.med;
        RMgr->Control()->MRMgr()->AddServer(last_seq, real_room_id,
                                        last_med.m, last_med.udesc);

set_invite_timer(INVITE_TIMEOUT);
        return(SUCCESS);
} int RoomFsm::E49_action(InterObjectBuffer& iob)
{
ifdef STATE_MACH_TEST
        cout << "                         ********  LAST SEQ: " << last_seq << endl;
        cout << "Room: " << vi_room_id << " " << real_room_id << " E49_action: " << endl;
        cout << "Send MAN_CONNECT_TO_BRIDGE: " << iob.Rep_mr_add_server.machine << " " <<
                        iob.Rep_mr_add_server.port << endl;
endif reset_invite_timer();
        last_med.machine = iob.Rep_mr_add_server.machine;
        last_med.port = iob.Rep_mr_add_server.port;
        RMgr->Control()->LMMgr()->ConnectToBridge(
                        real_room_id,
                        last_med.m,
                        last_med.udesc,
                        last_med.machine,
                        last_med.port);
        RMgr->Control()->ENMgr()->ServerAdded(real_room_id, last_med,
                                        meeting->PartListWith
        RMgr->Control()->VIMgr()->ServerAdded(1, vi_room_id, last_med);

return(SUCCESS);
```

```
} int RoomFsm::E50_action(InterObjectBuffer& iob)
{
ifdef STATE_MACH_TEST
        cout << "                          ********  LAST SEQ: " << last_seq << endl;
        cout << "Room: " << vi_room_id << " " << real_room_id << " E50_action:  " << endl;
        cout << "Send EVE_SERVER_ADDED fail: " << endl;
endif reset_invite_timer();
        RMgr->Control()->VIMgr()->ServerAdded(0, vi_room_id, last_med);
        return(SUCCESS);
} int RoomFsm::E51_action(InterObjectBuffer& iob)
{
        next_msg_prepare();

#ifdef STATE_MACH_TEST
        cout << "                          ********  LAST SEQ: " << last_seq << endl;
        cout << "Room: " << vi_room_id << " " << real_room_id << " E51_action:  " << endl;
        cout << "Send MR_DROP_SERVER : " << iob.eve_vi_add_server.med.udesc << " " << (int)i
endif last_med = iob.eve_vi_drop_server.med;
        RMgr->Control()->MRMgr()->DropServer(last_seq, real_room_id,
                                                last_med.m, last_med.udesc);
        set_invite_timer(INVITE_TIMEOUT);
        return(SUCCESS);
} int RoomFsm::E52_action(InterObjectBuffer& iob)
{
ifdef STATE_MACH_TEST
        cout << "                          ********  LAST SEQ: " << last_seq << endl;
        cout << "Room: " << vi_room_id << " " << real_room_id << " E52_action:  " << endl;
        cout << "Send MAN_DISCONNECT_FROM_BRIDGE: " << endl;
#endif
        reset_invite_timer();
        last_med.machine = ""; // HACK
        last_med.port = 0;
        RMgr->Control()->LMMgr()->DisconnectFromBridge(
                        real_room_id,
                        last_med.m,
                        last_med.udesc,
                        last_med.machine,
                        last_med.port);
        RMgr->Control()->ENMgr()->ServerDropped(real_room_id, last_med,
                                                meeting->PartListWith
        RMgr->Control()->VIMgr()->ServerDropped(1, vi_room_id, last_med);

return(SUCCESS);
} int RoomFsm::E53_action(InterObjectBuffer& iob)
{
ifdef STATE_MACH_TEST
        cout << "                          ********  LAST SEQ: " << last_seq << endl;
        cout << "Room: " << vi_room_id << " " << real_room_id << " E53_action:  " << endl;
        cout << "Send EVE_SERVER_DROPPED fail: " << endl;
#endif
        reset_invite_timer();
        RMgr->Control()->VIMgr()->ServerDropped(0, vi_room_id, last_med);
        return(SUCCESS);
```

```cpp
RoomFsm::E57_action(InterObjectBuffer& iob)

next_msg_prepare();

#ifdef STATE_MACH_TEST
        cout << "                        ********  LAST SEQ: " << last_seq << endl;
        cout << "Room: " << vi_room_id << " " << real_room_id << " E13/E57_action: " << endl;
        cout << "Send EVE_MEETING_INVITE to (CM) part " << last_part_id <<
                " in " << iob.Rep_reg_get_person_info.machine << "::" <<
                                iob.Rep_reg_get_person_info.port << endl;
        cout << "Start timer. " << endl;
endif List(int) plist;
        plist.insert_next(last_part_id);
        List_of_p(PartMediaBridgeDescList) pmed_list;
        PartMediaBridgeDescList *pmed;
        List_of_piter(Conferee) conf_list(meeting->ConfereeList());
        Conferee *conferee;
        conf_list.reset();
        while (conf_list.next(conferee)){
                if (conferee->Id() != last_part_id) {
                        pmed = new PartMediaBridgeDescList(conferee->Id(),
                                                                                                confe)
                        pmed_list.insert_next(pmed);
                }
        }

RMgr->Control()->ENMgr()->MeetingInvite(real_room_id, meeting->Id(),
                                                                                req_media, plist, pmed_list);
        while (pmed_list.next(pmed)){
                pmed_list.remove_prev();
                delete pmed;
        } set_invite_timer(INVITE_TIMEOUT);
        return(SUCCESS);
} int RoomFsm::E59_action(InterObjectBuffer& iob)

reset_invite_timer();
        next_msg_prepare();

accepted_media = iob.eve_accept_invitation.med;
        req_media.update_applicable_media(accepted_media);

#ifdef STATE_MACH_TEST
        cout << "                        ********  LAST SEQ: " << last_seq << endl;
        cout << "Room: " << vi_room_id << " " << real_room_id << " E38/E59_action: " << endl;
        cout << "Num Media Accepted : " << accepted_media.length() << endl;
          cout << "Send MR_ADD_PARTICIPANT to MR " << last_part_id;
#endif
        RMgr->Control()->MRMgr()->AddParticipant(last_seq, meeting->Id(), return(SUCCESS);
} int RoomFsm::E60_action(InterObjectBuffer& iob)
{
        return(E7_action(iob));
} int RoomFsm::E61_action(InterObjectBuffer& iob)
```

```
{
        meeting->add_participant(iob.eve_added_participant.participant,
                                 iob.eve_added_participant.med);
#ifdef STATE_MACH_TEST
        cout << "                        *********   LAST SEQ: " << last_seq << endl;
        cout << "Room: " << vi_room_id << " " << real_room_id << " Meet: "
             << meeting->Id() << " E61_action:   " << endl;
        cout << "Send EVE_VI_ADDED_PARTICIPANT success to VI" << endl;
#endif
        RMgr->Control()->VIMgr()->AddedParticipant(1,
                        real_room_id, meeting->Id(), vi_room_id,
                        iob.eve_added_participant.participant,
                        iob.eve_added_participant.med);
        return(SUCCESS);
} int RoomFsm::E62_action(InterObjectBuffer& iob)
{
ifdef STATE_MACH_TEST
        cout << "                        *********   LAST SEQ: " << last_seq << endl;
        cout << "Room: " << vi_room_id << " " << real_room_id << " Meet: "
             << meeting->Id()  << " Part: " << iob.template1.participant << " E62_action: "
        cout << "Send EVE_DROPPED_PARTICIPANT VI" << endl;
#endif
        RMgr->Control()->VIMgr()->DroppedParticipant(1, vi_room_id,
                                iob.template1.participant);
        meeting->drop_participant(iob.template1.participant);
        return(SUCCESS);
} int RoomFsm::E63_action(InterObjectBuffer& iob)
{
ifdef STATE_MACH_TEST
        cout << "                        *********   LAST SEQ: " << last_seq << endl;
        cout << "Room: " << vi_room_id << " " << real_room_id << " Meet: "
             << meeting->Id() << " E61_action:   " << endl;
        cout << "Send EVE_LEFT_MEETING to VI: " << iob.template1.participant
                        << endl;
#endif
        RMgr->Control()->VIMgr()->MeetingLeft(1, vi_room_id,
                        iob.template1.participant,  req_media); // dummy media
        return(SUCCESS);
} int RoomFsm::E64_action(InterObjectBuffer& iob)
{
ifdef STATE_MACH_TEST
        cout << "                        *********   LAST SEQ: " << last_seq << endl;
        cout << "Room: " << vi_room_id << " " << real_room_id << " Meet: "
             << meeting->Id() << " E61_action:   " << endl;
        cout << "Send EVE_REENTER_MEETING to VI: " << iob.template1.participant
                        << endl;
#endif
        RMgr->Control()->VIMgr()->MeetingReentered(1, vi_room_id,
                        iob.template1.participant,  req_media); // dummy media
        return(SUCCESS);
} int RoomFsm::E65_action(InterObjectBuffer& iob)
{
ifdef STATE_MACH_TEST
        cout << "                        *********   LAST SEQ: " << last_seq << endl;
        cout << "Room: " << vi_room_id << " " << real_room_id << " E65_action:  " << endl;
        cout << "Send MAN_CONNECT_TO_BRIDGE: " << iob.template7.med.machine << "  " <<
                        iob.template7.med.port << endl;
endif
```

```
            RMgr->Control()->LMMgr()->ConnectToBridge(
                            real_room_id,
                            iob.template7.med.m,
                            iob.template7.med.udesc,
                            iob.template7.med.machine,
                            iob.template7.med.port);
            RMgr->Control()->VIMgr()->ServerAdded(1, vi_room_id,
                                                            iob.template7.med);
            return(SUCCESS);
} int RoomFsm::E66_action(InterObjectBuffer& iob)
{
ifdef STATE_MACH_TEST
        cout << "                                *********   LAST SEQ: " << last_seq << endl;
        cout << "Room: " << vi_room_id << " " << real_room_id << " E65_action:   " << endl;
        cout << "Send MAN_DISCONNECT_FROM_BRIDGE: " << iob.template7.med.machine << "   " <<
                        iob.template7.med.port << endl;
endif iob.template7.med.machine = "";  // HACK
        iob.template7.med.port = 0;
        RMgr->Control()->LMMgr()->DisconnectFromBridge(
                        real_room_id,
                        iob.template7.med.m,
                        iob.template7.med.udesc,
                        iob.template7.med.machine,
                        iob.template7.med.port);
        RMgr->Control()->VIMgr()->ServerDropped(1, vi_room_id,
                                                        iob.template7.med);
        return(SUCCESS);
} int RoomFsm::E69_action(InterObjectBuffer& iob)
{
ifdef STATE_MACH_TEST
        cout << "Room: " << vi_room_id << " " << real_room_id << " E69_action:   " << endl;
        cout << "Send EVE_MEETING_DESTROYED to VI" <<
                        iob.template2.meeting_id  << endl;
endif RMgr->Control()->VIMgr()->MeetingDestroyed(1, vi_room_id);
        return(SUCCESS);
} int RoomFsm::E70_action(InterObjectBuffer& iob)
{
ifdef STATE_MACH_TEST
        cout << "Room: " << vi_room_id << " " << real_room_id << " E70_action:   " << endl;
        cout << "Send EVE_ROOM_DESTROYED to VI" << endl;
endif RMgr->Control()->VIMgr()->MeetingDestroyed(1, vi_room_id);
        return(SUCCESS);
} int RoomFsm::E75_action(InterObjectBuffer& iob)
{
        next_msg_prepare();
        last_part_id = iob.eve_vi_add_participant.participant;
        req_media = iob.eve_vi_add_participant.med;

#ifdef STATE_MACH_TEST
        cout << "                                *********   LAST SEQ: " << last_seq << endl;
        cout << "Room: " << vi_room_id << " " << real_room_id << " E75_action:   " << endl;
```

```
        cout << "Send MR_GET_PERSON_INFO to MR for meeting: " << meeting->Id() << "   Par..
#endif
        RMgr->Control()->MRMgr()->GetPersonInfo(last_seq, last_part_id);
        return(SUCCESS);
} int RoomFsm::E76_action(InterObjectBuffer& iob)
{
        return(E39_action(iob));
} int RoomFsm::E77_action(InterObjectBuffer& iob)
{
ifdef STATE_MACH_TEST
        cout << "                              *********   LAST SEQ: " << last_seq << endl;
        cout << "Room: " << vi_room_id << " " << real_room_id << " E77_action: " << endl;
        cout << "Send EVE_MEETING_SUSPENDED to VI" << endl;
endif RMgr->Control()->VIMgr()->MeetingSuspended(1, vi_room_id);

return(SUCCESS);
} int RoomFsm::E78_action(InterObjectBuffer& iob)
{
        next_msg_prepare();
        last_part_id = iob.eve_vi_drop_participant.participant;

#ifdef STATE_MACH_TEST
        cout << "                              *********   LAST SEQ: " << last_seq << endl;
        cout << "Room: " << vi_room_id << " " << real_room_id << " E78_action: " << endl;
        cout << "Send MR_DROP_PARTICIPANT to MR for : " <<
                    iob.eve_vi_drop_participant.participant << endl;
#endif
        RMgr->Control()->MRMgr()->DropParticipant(last_seq, meeting->Id(),
                                                  iob.eve_vi_drop_participant.partici;
        set_invite_timer(INVITE_TIMEOUT);
        return(SUCCESS);
} int RoomFsm::E79_action(InterObjectBuffer& iob)
{
ifdef STATE_MACH_TEST
        cout << "                              *********   LAST SEQ: " << last_seq << endl;
        cout << "Room: " << vi_room_id << " " << real_room_id << " Meet: "
             << meeting->Id() << " E79_action: " << endl;
        cout << "Send EVE_DROPPED_PARTICIPANT VI : " << last_part_id << endl;
#endif
        RMgr->Control()->VIMgr()->DroppedParticipant(1, vi_room_id,                        last_p RMgr->Control()->ENMgr()->DroppedParticipant(real_room_id,
                                    meeting->Id(), last_part_id,
                                    meeting->PartListWithoutMe());
        meeting->drop_participant(last_part_id);
        return(SUCCESS);
} int RoomFsm::E80_action(InterObjectBuffer& iob)
{
ifdef STATE_MACH_TEST
        cout << "                              *********   LAST SEQ: " << last_seq << endl;
        cout << "Room: " << vi_room_id << " " << real_room_id << " Meet: "
             << meeting->Id() << " E80_action: " << endl;
        cout << "Send EVE_DROPPED_PARTICIPANT VI : " << last_part_id << endl;
#endif
```

```
                RMgr->Control()->VIMgr()->DroppedParticipant(0, vi_room_id,
                                                    iob.template1.participant);
        return(SUCCESS);
} int RoomFsm::E81_action(InterObjectBuffer& iob)
{
        next_msg_prepare();
        req_media.update_prev_request("", 0, MEDIA_UNSET);

#ifdef STATE_MACH_TEST
        cout << "                         ********  LAST SEQ: " << last_seq << endl;
        cout << "Room: " << vi_room_id << " " << real_room_id << " E81_action: " << endl;
        cout << "MR_ADD_SERVER failed" << endl;
        cout << "Send MR_CREATE_MEETING to MR " << endl;
endif
        RMgr->Control()->MRMgr()->CreateMeeting(last_seq, real_room_id);
        return(SUCCESS);
} int RoomFsm::E82_action(InterObjectBuffer& iob)
{
        next_msg_prepare();
        req_media.update_prev_request("", 0, MEDIA_UNSET);

#ifdef STATE_MACH_TEST
        cout << "                         ********  LAST SEQ: " << last_seq << endl;
        cout << "Room: " << vi_room_id << " " << real_room_id << " E82_action: " << endl;
        cout << "MR_ADD_SERVER failed" << endl;
        cout << "Send MR_ADD_SERVER to MR: NumServers: " << req_media.num_yet_to_service() <
endif MediaBridgeDesc *b;
        if (req_media.next_bridge_to_service(b) == SUCCESS) {
                RMgr->Control()->MRMgr()->AddServer(last_seq, real_room_id,
                                                                                b->m,
#ifdef STATE_MACH_TEST
        cout << "Media: " << (int)b->m << " Udesc: " << b->udesc << endl;
#endif
        }
        return(SUCCESS);
} int RoomFsm::E83_action(InterObjectBuffer& iob)
{
        int ret = E79_action(iob);

#ifdef STATE_MACH_TEST
        cout << "Terminating the FSM ... " << endl;
#endif
        return(ret);
} int RoomFsm::E84_action(InterObjectBuffer& iob)
{
        next_msg_prepare();
        req_media = iob.Rep_list_servers.med;

#ifdef STATE_MACH_TEST
        cout << "                         ********  LAST SEQ: " << last_seq << endl;
        cout << "Room: " << vi_room_id << " " << real_room_id << " E84_action: " << endl;
        cout << "Send MR_CREATE_MEETING to MR " << endl;
endif MediaBridgeDesc *b;
        int nserv = req_media.length();    298
```

```
                for (;nserv; nserv--) {
                    if (req_media.next_bridge_to_service(b) == SUCCESS) {
#ifdef STATE_MACH_TEST
                        cout << "Send MAN_CONNECT_TO_BRIDGE for Media: " << (int)b->m
                             << " Udesc: " << b->udesc << " Addr: "  <<
                             b->machine << "::" << b->port << endl;
#endif
                        RMgr->Control()->LMMgr()->ConnectToBridge(
                                real_room_id, b->m, b->udesc, b->machine, b->port);
                        RMgr->Control()->VIMgr()->ServerAdded(1, vi_room_id, *b);
                    }
            }
        RMgr->Control()->MRMgr()->CreateMeeting(last_seq, real_room_id);
        return(SUCCESS);
} int RoomFsm::E86_action(InterObjectBuffer& iob)
{
        last_part_id = iob.template2.src_part;

#ifdef STATE_MACH_TEST
        cout << "                              ********   LAST SEQ: " << last_seq << endl;
        cout << "Room: " << vi_room_id << " " << real_room_id << " E86_action: " << endl;
        cout << "Send EVE_VI_JOIN_MEETING to VI for : " << last_part_id << endl;
#endif
        RMgr->Control()->VIMgr()->JoinMeeting(vi_room_id, last_part_id);
        return(SUCCESS);
} int RoomFsm::E88_action(InterObjectBuffer& iob)
{
        List(int) plist;

#ifdef STATE_MACH_TEST
        cout << "                              ********   LAST SEQ: " << last_seq << endl;
        cout << "Room: " << vi_room_id << " " << real_room_id << " E88_action: " << endl;
        cout << "Send EVE_JOIN_MEETING_REJECTED to peer CM" << endl;
endif plist.insert_next(last_part_id);
        RMgr->Control()->ENMgr()->JoinMeetingRejected(real_room_id, plist);

return(SUCCESS);
} int RoomFsm::E90_action(InterObjectBuffer& iob)
{
ifdef STATE_MACH_TEST
        cout << "                              ********   LAST SEQ: " << last_seq << endl;
        cout << "Room: " << vi_room_id << " " << real_room_id << " E90: " << endl;
        cout << "Terminating FSM..." << endl;
endif RMgr->Control()->VIMgr()->MeetingDestroyed(1, vi_room_id);

return(SUCCESS);
} int RoomFsm::E91_action(InterObjectBuffer& iob)
{
ifdef STATE_MACH_TEST
        cout << "                              ********   LAST SEQ: " << last_seq << endl;
        cout << "Room: " << vi_room_id << " " << real_room_id << " E91: " << endl;
        cout << "Terminating FSM..." << endl;
endif
```

```
        RMgr->Cc    ol()->VIMgr()->MeetingDestroyed(-1, real_room_id);

return(SUCCESS);
} define STATE_MACH_TEST
//#define DUMMY_MAIN include <state.h>
include <sysent.h>

List_of_pimplement(RoomFsm)
List_of_pimplement(Conferee)

RoomFsm::RoomFsm(int p_vi_room_id, int p_real_room_id,
                        InterObjectBuffer& iob, RoomFsmMgr* mgr)
{
        RMgr = mgr;
        meeting = NULL;
        vi_room_id = p_vi_room_id;
        real_room_id = p_real_room_id;
        invite_timeout = -1;
        my_room = 1;

#ifdef STATE_MACH_TEST
        cout << "VI_ROOM_ID: " << vi_room_id << "   REAL_ROOM_ID: " << real_room_id << endl;
endif current_state = ST_Ground;
        for (int i = 0; i < MAX_NUM_FSM_STATES; i++) {
                for (int j = 0; j < MAX_NUM_FSM_TRANSITIONS; j++) {
                        if (j == T56)
                                register_transition(i, T56, ST_Terminate,
                                                &RoomFsm::terminate_action);
                        else
                                register_transition(i, j, i, &RoomFsm::default_action);
                }
        } register_transition(ST_Ground, T1, ST_NewRoom,
                                                &RoomFsm::E1_action);
        register_transition(ST_Ground, T2, ST_ListServersWait,
                                                &RoomFsm::E2_action);
        register_transition(ST_ListServersWait, T60, ST_MeetCreatedWait,
                                                &RoomFsm::E84_action);
        register_transition(ST_ListServersWait, T61, ST_Terminate,
                                                &RoomFsm::E6_action);
        register_transition(ST_Ground, T3, ST_ExistingMeet,
                                                &RoomFsm::E3_action);
        register_transition(ST_Ground, T4, ST_MeetInvitation,
                                                &RoomFsm::E4_action);

register_transition(ST_NewRoom, T5, ST_RoomCreated,
                                                &RoomFsm::E5_action);
        register_transition(ST_NewRoom, T6, ST_Terminate,
                                                &RoomFsm::E6_action);
        register_transition(ST_NewRoom, T23, ST_MeetCreatedWait,
                                                &RoomFsm::E31_action);

register_transition(ST_RoomCreated, T8, ST_MeetCreatedWait,
                                                &RoomFsm::E32_action);
        register_transition(ST_RoomCreated, T58, ST_MeetCreatedWait,
                                                &RoomFsm::E81_action);
        register_transition(ST_RoomCreated, T57, ST_RoomWithServers,
                                                &RoomFsm::E82_action);
        register_transition(ST_RoomCreated, T7, ST_RoomWithServers,
```

```
                                                    &RoomFsm::E7_action);

register_transition(ST_RoomWithServers, T8, ST_MeetCreatedWait,
                                                    &RoomFsm::E9_action);
register_transition(ST_RoomWithServers, T7, ST_RoomWithServers,
                                                    &RoomFsm::E60_action);
register_transition(ST_RoomWithServers, T57, ST_MeetCreatedWait,
                                                    &RoomFsm::E82_action);
register_transition(ST_RoomWithServers, T58, ST_MeetCreatedWait,
                                                    &RoomFsm::E81_action);

register_transition(ST_MeetCreatedWait, T24, ST_Terminate,
                                                    &RoomFsm::E33_action);
register_transition(ST_MeetCreatedWait, T67, ST_MeetInProgress,
                                                    &RoomFsm::E8_action);
register_transition(ST_MeetCreatedWait, T9, ST_PersonInfoWait,
                                                    &RoomFsm::E10_action);

register_transition(ST_PersonInfoWait, T41, ST_Terminate,
                                                    &RoomFsm::E56_action);
register_transition(ST_PersonInfoWait, T40, ST_MeetAcceptWait,
                                                    &RoomFsm::E57_action);

register_transition(ST_MeetAcceptWait, T26, ST_Terminate,
                                                    &RoomFsm::E58_action);
register_transition(ST_MeetAcceptWait, T13, ST_MeetAddPartWait1,
                                                    &RoomFsm::E59_action);
register_transition(ST_MeetAcceptWait, T48, ST_Terminate,
                                                    &RoomFsm::E68_action);
register_transition(ST_MeetAcceptWait, T56, ST_Terminate,
                                                    &RoomFsm::E68_action);

register_transition(ST_MeetAddPartWait1, T25, ST_Terminate,
                                                    &RoomFsm::E37_action);
register_transition(ST_MeetAddPartWait1, T10, ST_MeetInProgress,
                                                    &RoomFsm::E34_action);
register_transition(ST_MeetAddPartWait1, T56, ST_Terminate,
                                                    &RoomFsm::E68_action);

register_transition(ST_ExistingMeet, T4, ST_MeetInvitation,
                                                    &RoomFsm::E4_action);
register_transition(ST_ExistingMeet, T22, ST_Terminate,
                                                    &RoomFsm::E29_action);
register_transition(ST_ExistingMeet, T48, ST_Terminate,
                                                    &RoomFsm::E68_action);

register_transition(ST_MeetInvitation, T21, ST_Terminate,
                                                    &RoomFsm::E27_action);
register_transition(ST_MeetInvitation, T19, ST_WaitForPeerCMAdd,
                                                    &RoomFsm::E25_action);
register_transition(ST_MeetInvitation, T49, ST_Terminate,
                                                    &RoomFsm::E91_action);
register_transition(ST_MeetInvitation, T50, ST_Terminate,
                                                    &RoomFsm::E91_action);

register_transition(ST_WaitForPeerCMAdd, T20, ST_MeetInProgress,
                                                    &RoomFsm::E26_action);
register_transition(ST_WaitForPeerCMAdd, T48, ST_Terminate,
                                                    &RoomFsm::E90_action);
register_transition(ST_WaitForPeerCMAdd, T49, ST_Terminate,
                                                    &RoomFsm::E90_action);
register_transition(ST_WaitForPeerCMAdd, T50, ST_Terminate,
                                                    &RoomFsm::E90_action);

register_transition(ST_MeetInProgress, T42, ST_MeetInProgress,
                                                    &RoomFsm::E61_action);
```

```
register_transition(ST_MeetInProgress, T43, ST_MeetInProgress,
                                            &RoomFsm::E62_action);
register_transition(ST_MeetInProgress, T44, ST_MeetInProgress,
                                            &RoomFsm::E63_action);
register_transition(ST_MeetInProgress, T45, ST_MeetInProgress,
                                            &RoomFsm::E64_action);
register_transition(ST_MeetInProgress, T46, ST_MeetInProgress,
                                            &RoomFsm::E65_action);
register_transition(ST_MeetInProgress, T47, ST_MeetInProgress,
                                            &RoomFsm::E66_action);
register_transition(ST_MeetInProgress, T11, ST_Terminate,
                                            &RoomFsm::E12_action);
register_transition(ST_MeetInProgress, T49, ST_Terminate,
                                            &RoomFsm::E69_action);
register_transition(ST_MeetInProgress, T50, ST_Terminate,
                                            &RoomFsm::E70_action);
register_transition(ST_MeetInProgress, T12, ST_PersonInfoWait2,
                                            &RoomFsm::E75_action);
register_transition(ST_MeetInProgress, T27, ST_SelfOnHold,
                                            &RoomFsm::E41_action);
register_transition(ST_MeetInProgress, T14, ST_MeetSuspendedWait,
                                            &RoomFsm::E15_action);
register_transition(ST_MeetInProgress, T17, ST_MeetSuspended,
                                            &RoomFsm::E77_action);
register_transition(ST_MeetInProgress, T37, ST_DropServerWait,
                                            &RoomFsm::E51_action);
register_transition(ST_MeetInProgress, T34, ST_AddServerWait,
                                            &RoomFsm::E48_action);
register_transition(ST_MeetInProgress, T51, ST_DropPartWait,
                                            &RoomFsm::E78_action);
register_transition(ST_MeetInProgress, T62, ST_JoinMeetWait,
                                            &RoomFsm::E86_action);

register_transition(ST_JoinMeetWait, T65, ST_MeetInProgress,
                                            &RoomFsm::E88_action);
register_transition(ST_JoinMeetWait, T12, ST_PersonInfoWait2,
                                            &RoomFsm::E75_action);
/* Self Loops */
register_transition(ST_JoinMeetWait, T44, ST_JoinMeetWait,
                                            &RoomFsm::E63_action);
register_transition(ST_JoinMeetWait, T45, ST_JoinMeetWait,
                                            &RoomFsm::E64_action);
register_transition(ST_JoinMeetWait, T46, ST_JoinMeetWait,
                                            &RoomFsm::E65_action);
register_transition(ST_JoinMeetWait, T47, ST_JoinMeetWait,
                                            &RoomFsm::E66_action);
register_transition(ST_JoinMeetWait, T42, ST_JoinMeetWait,
                                            &RoomFsm::E61_action);
register_transition(ST_JoinMeetWait, T43, ST_JoinMeetWait,
                                            &RoomFsm::E62_action);

register_transition(ST_PersonInfoWait2, T49, ST_Terminate,
                                            &RoomFsm::E69_action);
register_transition(ST_PersonInfoWait2, T50, ST_Terminate,
                                            &RoomFsm::E70_action);
register_transition(ST_PersonInfoWait2, T41, ST_MeetInProgress,
                                            &RoomFsm::E76_action);
register_transition(ST_PersonInfoWait2, T40, ST_MeetAddPartWait2,
                                            &RoomFsm::E13_action);

register_transition(ST_MeetAddPartWait2, T49, ST_Terminate,
                                            &RoomFsm::E69_action);
register_transition(ST_MeetAddPartWait2, T50, ST_Terminate,
                                            &RoomFsm::E70_action);
register_transition(ST_MeetAddPartWait2, T26, ST_MeetInProgress,
                                            &RoomFsm::E39_action);
```

```
r__ ster_transition(ST_MeetAddPartWait2, T13, ST_MeetAddPartWait_,
                                                &RoomFsm::E38_action);
register_transition(ST_MeetAddPartWait2, T48, ST_MeetInProgress,
                                                &RoomFsm::E39_action);

register_transition(ST_MeetAddPartWait3, T49, ST_Terminate,
                                                &RoomFsm::E69_action);
register_transition(ST_MeetAddPartWait3, T50, ST_Terminate,
                                                &RoomFsm::E70_action);
register_transition(ST_MeetAddPartWait3, T25, ST_MeetInProgress,
                                                &RoomFsm::E40_action);
register_transition(ST_MeetAddPartWait3, T10, ST_MeetInProgress,
                                                &RoomFsm::E14_action);

register_transition(ST_SelfOnHold, T49, ST_Terminate,
                                                &RoomFsm::E69_action);
register_transition(ST_SelfOnHold, T50, ST_Terminate,
                                                &RoomFsm::E70_action);
register_transition(ST_SelfOnHold, T28, ST_ReenterAttempt,
                                                &RoomFsm::E42_action);
/* Self Loops */
register_transition(ST_SelfOnHold, T44, ST_SelfOnHold,
                                                &RoomFsm::E63_action);
register_transition(ST_SelfOnHold, T45, ST_SelfOnHold,
                                                &RoomFsm::E64_action);
register_transition(ST_SelfOnHold, T46, ST_SelfOnHold,
                                                &RoomFsm::E65_action);
register_transition(ST_SelfOnHold, T47, ST_SelfOnHold,
                                                &RoomFsm::E66_action);
register_transition(ST_SelfOnHold, T42, ST_SelfOnHold,
                                                &RoomFsm::E61_action);
register_transition(ST_SelfOnHold, T43, ST_SelfOnHold,
                                                &RoomFsm::E62_action);

register_transition(ST_ReenterAttempt, T49, ST_Terminate,
                                                &RoomFsm::E69_action);
register_transition(ST_ReenterAttempt, T50, ST_Terminate,
                                                &RoomFsm::E70_action);
register_transition(ST_ReenterAttempt, T30, ST_SelfOnHold,
                                                &RoomFsm::E44_action);
register_transition(ST_ReenterAttempt, T29, ST_MeetInProgress,
                                                &RoomFsm::E43_action);
/* Self Loops */
register_transition(ST_ReenterAttempt, T44, ST_ReenterAttempt,
                                                &RoomFsm::E63_action);
register_transition(ST_ReenterAttempt, T45, ST_ReenterAttempt,
                                                &RoomFsm::E64_action);
register_transition(ST_ReenterAttempt, T46, ST_ReenterAttempt,
                                                &RoomFsm::E65_action);
register_transition(ST_ReenterAttempt, T47, ST_ReenterAttempt,
                                                &RoomFsm::E66_action);
register_transition(ST_ReenterAttempt, T42, ST_ReenterAttempt,
                                                &RoomFsm::E61_action);
register_transition(ST_ReenterAttempt, T43, ST_ReenterAttempt,
                                                &RoomFsm::E62_action);

register_transition(ST_MeetSuspendedWait, T49, ST_Terminate,
                                                &RoomFsm::E69_action);
register_transition(ST_MeetSuspendedWait, T50, ST_Terminate,
                                                &RoomFsm::E70_action);
register_transition(ST_MeetSuspendedWait, T15, ST_MeetInProgress,
                                                &RoomFsm::E16_action);
register_transition(ST_MeetSuspendedWait, T16, ST_MeetSuspended,
                                                &RoomFsm::E17_action);

register_transition(ST_MeetSuspended, T49, ST_Terminate,
```

```
                                                  &RoomFsm::E69_action);
        register_transition(ST_MeetSuspended, T18, ST_MeetInProgress,
                                                  &RoomFsm::E19_action);
        register_transition(ST_MeetSuspended, T31, ST_MeetResumeWait,
                                                  &RoomFsm::E45_action);

register_transition(ST_MeetResumeWait, T49, ST_Terminate,
                                                  &RoomFsm::E69_action);
        register_transition(ST_MeetResumeWait, T33, ST_MeetSuspended,
                                                  &RoomFsm::E47_action);
        register_transition(ST_MeetResumeWait, T32, ST_MeetInProgress,
                                                  &RoomFsm::E46_action);

register_transition(ST_AddServerWait, T49, ST_Terminate,
                                                  &RoomFsm::E69_action);
        register_transition(ST_AddServerWait, T50, ST_Terminate,
                                                  &RoomFsm::E70_action);
        register_transition(ST_AddServerWait, T35, ST_MeetInProgress,
                                                  &RoomFsm::E49_action);
        register_transition(ST_AddServerWait, T8, ST_MeetInProgress,
                                                  &RoomFsm::E49_action);
        register_transition(ST_AddServerWait, T36, ST_MeetInProgress,
                                                  &RoomFsm::E50_action);
        register_transition(ST_AddServerWait, T58, ST_MeetInProgress,
                                                  &RoomFsm::E50_action);
        register_transition(ST_AddServerWait, T48, ST_MeetInProgress,
                                                  &RoomFsm::E50_action);

register_transition(ST_DropServerWait, T49, ST_Terminate,
                                                  &RoomFsm::E69_action);
        register_transition(ST_DropServerWait, T50, ST_Terminate,
                                                  &RoomFsm::E70_action);
        register_transition(ST_DropServerWait, T38, ST_MeetInProgress,
                                                  &RoomFsm::E52_action);
        register_transition(ST_DropServerWait, T39, ST_MeetInProgress,
                                                  &RoomFsm::E53_action);
        register_transition(ST_DropServerWait, T48, ST_MeetInProgress,
                                                  &RoomFsm::E53_action);

register_transition(ST_DropPartWait, T49, ST_Terminate,
                                                  &RoomFsm::E69_action);
        register_transition(ST_DropPartWait, T50, ST_Terminate,
                                                  &RoomFsm::E70_action);
        register_transition(ST_DropPartWait, T52, ST_MeetInProgress,
                                                  &RoomFsm::E79_action);
        register_transition(ST_DropPartWait, T59, ST_Terminate,
                                                  &RoomFsm::E83_action);
        register_transition(ST_DropPartWait, T53, ST_MeetInProgress,
                                                  &RoomFsm::E80_action);

fire(iob);
}

RoomFsm::~RoomFsm()
{
        if (meeting) delete meeting;
} void RoomFsm::next_msg_prepare()
{
        last_seq = RMgr->NextSeqNo();
} int RoomFsm::fire(InterObjectBuffer& iob)
{
        int input = T0;
```

```
        int Self = 0;

int NumServersReq = req_media.num_yet_to_service();
#ifdef STATE_MACH_TEST
        cout << "fire: NumServers: " << req_media.num_yet_to_service() << endl;
endif switch (iob.msg_type) {
        case EVENT_VI:
                switch (iob.msg_code) {
                case EVE_CREATE_MEETING:
                case EVE_CREATE_PERSISTENT_MEETING:
                        input = T1;
                        break;

case EVE_VI_CREATE_MEET_IN_EROOM:
                        input = T2;
                        break;

case EVE_VI_JOIN_MEETING:
                        input = T3;
                        break;

case EVE_JOIN_MEETING_REJECTED:
                        input = T65;
                        break;

case EVE_VI_ADD_PARTICIPANT:
                        input = T12;
                        break;

case EVE_VI_DROP_PARTICIPANT:
                        input = T51;
                        break;

case EVE_VI_SUSPEND_MEETING:
                        input = T14;
                        break;

case EVE_VI_RESUME_MEETING:
                        input = T31;
                        break;

case EVE_VI_REENTER_MEETING:
                        input = T28;
                        break;

case EVE_VI_LEAVE_MEETING:
                        input = T27;
                        break;

case EVE_VI_ADD_SERVER:
                        input = T34;
                        break;

case EVE_VI_DROP_SERVER:
                        input = T37;
                        break;

case EVE_VI_DESTROY_ROOM:
                        input = T55;
                        break;

case EVE_VI_DESTROY_MEETING:
                        input = T56;
```

```
                    break;

default:
                    break;
            }
            break;

case EVENT_CM:
        switch (iob.msg_code) {
        case EVE_MEETING_INVITE:
                input = T4;
                break;

case EVE_DROPPED_PARTICIPANT:
                Self = (RMgr->MySelf() == iob.template1.participant) ? 1 : 0;
                input = (Self) ? T11 : T43;
                break;

case EVE_JOIN_MEETING:
                input = T62;
                break;

case EVE_JOIN_MEETING_REJECTED:
                input = T64;
                break;

case EVE_ACCEPT_INVITATION:
                input = T13;
                break;

case EVE_REJECT_INVITATION:
                input = T26;
                break;

case EVE_MEETING_SUSPENDED:
                input = T17;
                break;

case EVE_MEETING_RESUMED:
                input = T31;
                break;

case EVE_ADDED_PARTICIPANT:
                Self = (RMgr->MySelf() == iob.eve_added_participant.participant);
                input = (Self) ? T20 : T42;
                break;

case EVE_LEFT_MEETING:
                input = T44;
                break;

case EVE_REENTER_MEETING:
                input = T45;
                break;

case EVE_SERVER_ADDED:
                input = T46;
                break;

case EVE_SERVER_DROPPED:
                input = T47;
                break;

case EVE_MEETING_DESTROYED:
                input = T49;
                break;
```

```
            case EVE_ROOM_DESTROYED:
                    input = T50;
                    break;

default:
                    break;
            }
            break;

case REPLY_MR_SERVER:
case ERROR_MR_SERVER:
        switch (iob.msg_code) {
        case MR_CREATE_ROOM:
                if (iob.msg_type == REPLY_MR_SERVER && NumServersReq > 0)
                        input = T5;
                if (iob.msg_type == REPLY_MR_SERVER && NumServersReq == 0)
                        input = T23;
                else if (iob.msg_type == ERROR_MR_SERVER)
                        input = T6;
                break;

case MR_CREATE_MEETING:
                if (LastPartId() == RMgr->MySelf())
                        input = (iob.msg_type == REPLY_MR_SERVER) ? T67 : T24;
                else
                        input = (iob.msg_type == REPLY_MR_SERVER) ? T9 : T24;
                break;

case MR_LIST_SERVERS:
                input = (iob.msg_type == REPLY_MR_SERVER) ? T60 : T61;
                break;

case MR_ADD_SERVER:
                if (iob.msg_type == REPLY_MR_SERVER && NumServersReq > 0)
                        input = T7;
                else if (iob.msg_type == REPLY_MR_SERVER && NumServersReq == 0)
                        input = T8;
                else if (iob.msg_type == REPLY_MR_SERVER)
                        input = T35;
                else if (iob.msg_type == ERROR_MR_SERVER && NumServersReq > 0)
                        input = T57;
                else if (iob.msg_type == ERROR_MR_SERVER && NumServersReq == 0)
                        input = T58;
                else if (iob.msg_type == ERROR_MR_SERVER)
                        input = T36;
                break;

case MR_DROP_SERVER:
                input = (iob.msg_type == REPLY_MR_SERVER) ? T38 : T39;
                break;

case MR_ADD_PARTICIPANT:
                input = (iob.msg_type == REPLY_MR_SERVER) ? T10 : T25;
                break;

case MR_DROP_PARTICIPANT:
                // Should add T59 - Get last_part_id from FSM ????
                if (iob.msg_type == REPLY_MR_SERVER &&
                                        last_part_id == RMgr->MySelf())
                        input = T59;
                else
                        input = (iob.msg_type == REPLY_MR_SERVER) ? T52 : T53;
                break;

case MR_SUSPEND_MEETING:
```

```
                        input = (iob.msg_type == REPLY_MR_SERVER) ? T16 : T15;
                        break;

case MR_REENTER_MEETING:
                        input = (iob.msg_type == REPLY_MR_SERVER) ? T29 : T30;
                        break;

case MR_RESUME_MEETING:
                        input = (iob.msg_type == REPLY_MR_SERVER) ? T32 : T33;
                        break;

default:
                        break;
                }
                break;

case REPLY_REGISTRY_SERVER:
        case ERROR_REGISTRY_SERVER:
                switch (iob.msg_code) {
                case REG_GET_PERSON_INFO:
                        input = (iob.msg_type == REPLY_REGISTRY_SERVER) ? T40 : T41;
                        break;

default:
                        break;
                }
                break;

case REPLY_VI:
        case ERROR_VI:
                switch (iob.msg_code) {
                case VI_MEETING_INVITATION:
                        input = (iob.msg_type == REPLY_VI) ? T19 : T21;
                        break;

default:
                        break;
                }
                break;

case TIMEOUT:
                switch (iob.msg_code) {
                case TIMEOUT:
                        input = T48;
                        break;

default:
                        break;
                }
                break;

default:
                break;
        } return(fire(input, iob));
} int RoomFsm::fire(unsigned input, InterObjectBuffer& iob)
{
        int ret;

#ifdef DEBUG
        cout << "FSM_INPUT: " << input << "  Current State: " << current_state << "   New Sta
#endif
```

```
                ret = (this->*transitions[current_state][input].action)(iob);
                current_state = transitions[current_state][input].dest;
                return(ret);
} void RoomFsm::check_update_invite_timer()
{
        InterObjectBuffer iob;

#ifdef DEBUG
//      cout << "invite_timeout: " << invite_timeout << endl;
#endif
        iob.msg_type = TIMEOUT;
        iob.msg_code = TIMEOUT;
        if (invite_timeout == -1) return;
        if (invite_timeout-- == 0) { // fire now
                reset_invite_timer();
                fire(iob);
        }
        alarm(1);
}

// Meeting methods

Meeting::Meeting(int meeting_id, RoomFsm *proom, RoomFsmMgr *pRMgr)
{
    id = meeting_id;
    RMgr = pRMgr;
    room = proom;
    status = e_MNORMAL;
}

Meeting::~Meeting()
{
        drop_all_participants();
} int Meeting::add_participant(int participant, MediaBridgeDescList mlist)
{
    Conferee *c;

conf_list.reset();
    while (conf_list.next(c)){
        if (c->Id() == participant)
            return(-ERR_PARTICIPANT_ALREADY_PRESENT);
    }
    if (c = new Conferee(participant, mlist)){
        conf_list.insert_next(c);
                if (participant != RMgr->MySelf())
                conf_wo_me_list.insert_next(participant);
        }
    else{
        cout << "Fatal mem alloc error: " << __FILE__ << " " << __LINE__ << endl;
        return(-ERR_NO_RESOURCES);
    }
    return(SUCCESS);
} int Meeting::drop_participant(int participant)
{
    Conferee *c;

drop_conf_wo_me_list(participant);
    conf_list.reset();
    while (conf_list.next(c)){
```

```
           i.     Id() == participant){
                  delete c;
                  conf_list.remove_prev();
                  return(SUCCESS);
               }
        } return(-ERR_PARTICIPANT_NOT_PRESENT);
} void Meeting::drop_conf_wo_me_list(int participant)
{
        int c;

conf_wo_me_list.reset();
        while (conf_wo_me_list.next(c)){
            if (c == participant)
                conf_wo_me_list.remove_prev();
        }
} int Meeting::suspend_meeting()
{
    if (status == e_MSUSPENDED) return(-ERR_MEETING_SUSPENDED);
    status = e_MSUSPENDED;
    return(SUCCESS);
} int Meeting::resume_meeting()
{
    status = e_MNORMAL;
    return(SUCCESS);
} void Meeting::drop_all_participants()
{
    Conferee *c;

conf_list.reset();
    while (conf_list.next(c)){
        delete c;
        conf_list.remove_prev();
    } int p;
        conf_wo_me_list.reset();
        while (conf_wo_me_list.next(p)){
                conf_wo_me_list.remove_prev();
        }
} void Meeting::add_media(int participant, MediaBridgeDesc med)
{
    List_of_piter(Conferee) clist(conf_list);
    Conferee *c;

clist.reset();
    while (clist.next(c)){
        if (c->Id() == participant){
            c->add_media(med);
            break;
        }
    }
} void Meeting::drop_media(int participant, MediaBridgeDesc med)
```

```
{
    List_of_piter(Conferee) clist(conf_list);
    Conferee *c;

clist.reset();
    while (clist.next(c)){
        if (c->Id() == participant){
            c->drop_media(med);
            break;
        }
    }
} void Meeting::drop_media(MediaBridgeDesc med)
{
    List_of_piter(Conferee) clist(conf_list);
    Conferee *c;

clist.reset();
    while (clist.next(c)){
        c->drop_media(med);
    }
} int Meeting::leave_meeting(int participant)
{
    List_of_piter(Conferee) clist(conf_list);
    Conferee *c;

clist.reset();
    while (clist.next(c)){
        if (c->Id() == participant){
                        c->leave();
            return(0);
        }
    }
    return(-ERR_PARTICIPANT_NOT_PRESENT);
} int Meeting::reenter_meeting(int participant)
{
    List_of_piter(Conferee) clist(conf_list);
    Conferee *c;

clist.reset();
    while (clist.next(c)){
        if (c->Id() == participant){
                        c->reenter();
            return(0);
        }
    }
    return(-ERR_PARTICIPANT_NOT_PRESENT);
}

// Conferee methods
void Conferee::add_media(MediaBridgeDesc& med)
{
        media_list.add(med);
} void Conferee::drop_media(MediaBridgeDesc& med)
{
        media_list.remove(med.m);
}
```

311

```
// RoomFsmMgr methods int RoomFsmMgr::CreateNewFSM(int vi_room_id, int actual_room_id,
                             InterObjectBuffer& iob)
{
    RoomFsm *r;

room_list.reset();
        while (room_list.next(r)){
                if (r->VIRoomId() == vi_room_id ||
                    r->RealRoomId() == actual_room_id){
                        cout << "Room already existing. Just firing..." << endl;
                        r->fire(iob);
                        return(-ERR_ROOM_ALREADY_PRESENT);
                }
        } if ((r = new RoomFsm(vi_room_id, actual_room_id, iob, this)) == NULL)
        return(-ERR_NO_RESOURCES);

room_list.insert_next(r);
    return(SUCCESS);
} int RoomFsmMgr::fire_VI(int vi_room_id, InterObjectBuffer& iob)
{
    RoomFsm *r;

room_list.reset();
        while (room_list.next(r)){
                if (r->VIRoomId() == vi_room_id){
#ifdef DEBUG
        cout << "FireVI---> ViRoomId: " << vi_room_id << endl;
#endif
                        r->fire(iob);
                        garbage_collect(r);
                        return(SUCCESS);
                }
        }
    return(SUCCESS);
} int RoomFsmMgr::fire(int actual_room_id, InterObjectBuffer& iob)
{
    RoomFsm *r;

room_list.reset();
        while (room_list.next(r)){
                if (r->RealRoomId() == actual_room_id){
#ifdef DEBUG
        cout << "Fire---> RealRoomId: " << actual_room_id << endl;
#endif
                        r->fire(iob);
                        garbage_collect(r);
                        return(SUCCESS);
                }
        }
    return(SUCCESS);
} int RoomFsmMgr::fire_using_seqno(int seq_no, InterObjectBuffer& iob)
{
    RoomFsm *r;

room_list.reset();
        while (room_list.next(r)){             312
```

```
                if (r->LastSeqNo() == seq_no){
#ifdef DEBUG
        cout << "FireSeq ---> Seq: " << seq_no << endl;
#endif
                        r->fire(iob);
                        garbage_collect(r);
                        return(SUCCESS);
                }
        }
    return(SUCCESS);
} void RoomFsmMgr::garbage_collect(RoomFsm *r)
{
        if (r->state() == ST_Terminate){
                room_list.remove_prev();
                delete r;
        }
} void RoomFsmMgr::garbage_collect()
{
    RoomFsm *r;

room_list.reset();
        while (room_list.next(r)){
                if (r->state() == ST_Terminate){
                        room_list.remove_prev();
                        delete r;
                }
        }
} void RoomFsmMgr::alarm_handler()
{
    RoomFsm *r;
        List_of_piter(RoomFsm) rlist(room_list);

rlist.reset();
        while (rlist.next(r)){
                if (r) {
                        r->timer_tick();
                }
        }
}
```

We claim:

1. A multimedia communications network capable of establishing predetermined voice, video, and data connections between two or more users, comprising:

a plurality of multimedia ports connectable to a plurality of users capable of communication by way of voice, video, and data;

a virtual meeting server in the network connected to the multimedia ports for creating and maintaining a circuit configuration in the network representing a controllably persistent virtual meeting room having predetermined user defined characteristics, the characteristics of the virtual meeting room being determined in response to commands from any one of the user terminals, the commands identifying a plurality of meeting participants and multimedia communications capabilities of each participant, the virtual meeting room comprising a virtual meeting room identification, a plurality of server descriptions, a meeting description, and a plurality of participant descriptions, the virtual meeting server having a means/br automatically associating a voice server, a video server, and a data server in the network with a meeting between a plurality of multimedia participants in response to at least one of the descriptions in the virtual meeting room;

a voice server, responsive to the virtual meeting server, tbr transmitting and receiving voice signals to and from selected multimedia ports in accordance with the meeting and participant descriptions in the virtual meeting room;

a video server, responsive to the virtual meeting server, for transmitting and receiving video signals to and from selected multimedia ports in accordance with the meeting and participant descriptions in the virtual meeting room; and a data server, responsive to the virtual meeting server, for transmitting and receiving data signals to and from selected multimedia ports in accordance with the meeting and participant descriptions in the virtual meeting room;

the virtual meeting room being controllably persistent such that it can exist in the network independent of participants of a meeting being connected to the network.

2. The communications network of claim 1, in which at least one of the servers comprises a media bridge for receiving respective media communications signals from one or more meeting participants during a meeting and transmitting some or all of the media communications signals to one or more of the meeting participants during the meeting, the media bridge being associated with a storage device which is capable of recording some or all of the signals received by the media bridge during the meeting so that all meeting participants may disconnect from the network and then reconnect to the network and return to where the meeting left off at the time of disconnection.

* * * * *